US 6,697,898 B1

(12) United States Patent
Shishizuka et al.

(10) Patent No.: US 6,697,898 B1
(45) Date of Patent: Feb. 24, 2004

(54) INFORMATION PROCESSING SYSTEM FOR COMPOSITE APPLIANCE

(75) Inventors: Junichi Shishizuka, Kawasaki (JP); Yasuhisa Ishizawa, Hachioji (JP); Satoshi Nagata, Tama (JP); Atsushi Date, Tokyo (JP); Ken Onodera, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/491,980

(22) Filed: Jan. 27, 2000

(30) Foreign Application Priority Data

Jan. 25, 1999 (JP) .......................................... 11-055959

(51) Int. Cl.⁷ ............................................. G06F 13/00
(52) U.S. Cl. ........................ 710/107; 710/104; 710/105
(58) Field of Search ................................ 710/100, 104, 710/105, 107

(56) References Cited

U.S. PATENT DOCUMENTS

| | | | |
|---|---|---|---|
| 5,179,663 A | 1/1993 | Iimura .......................... 710/35 |
| 5,542,110 A | 7/1996 | Minagawa .................. 395/287 |
| 5,628,026 A | 5/1997 | Baron et al. .................... 710/1 |
| 5,748,921 A | 5/1998 | Lambrecht et al. .......... 710/309 |
| 6,006,289 A | 12/1999 | James et al. .................. 710/35 |
| 6,088,743 A | 7/2000 | Takeda .......................... 710/52 |
| 6,145,028 A | 11/2000 | Shank et al. .................. 710/31 |

FOREIGN PATENT DOCUMENTS

EP    1022896 A2  *  7/2000

OTHER PUBLICATIONS

Microsoft Press, "Computer Dictionary", 1997, Third Edition, p. 255.
U.S. patent application Ser. No. 09/491,976 filed Jan. 27, 2000.
U.S. patent application Ser. No. 09/492,518 filed Jan. 27, 2000.
U.S. patent application Ser. No. 09/491,979 filed Jan. 27, 2000.
U.S. patent application Ser. No. 09/435,905 filed Nov. 8, 1999.

* cited by examiner

Primary Examiner—Paul R. Myers
(74) Attorney, Agent, or Firm—Fitzpatrick, Cella, Harper & Scinto

(57) ABSTRACT

A generated job is divided in units of pages, and devices for executing processes for the respective pages are assigned. Processes by the first and second CPUs are assigned in accordance with whether a large or small number of real-time operations are required in data processing. By controlling the use of a plurality of buses so as to perform processes in units of pages in parallel, the throughput of data processing can be increased.

10 Claims, 118 Drawing Sheets

| ADDRESS | 63 56 55 | 48 47 | 40 39 | 32 31 | 24 23 | 16 15 | 8 7 | 0 |
|---|---|---|---|---|---|---|---|---|
| 0 | R0 | G0 | B0 | R1 | G1 | B1 | R2 | G2 |
| 4 | B2 | R3 | G3 | B3 | R4 | G4 | B4 | R5 |
| 8 | G5 | B5 | R6 | G6 | B6 | R7 | G7 | B7 |
| C | R8 | G8 | B8 | R9 | G9 | B9 | R10 | G10 |
| ... | ... | ... | ... | ... | ... | ... | ... | ... |

FIG. 51

| ADDRESS | 63 56 | 55 48 | 47 40 | 39 32 | 31 24 | 23 16 | 15 8 | 7 0 |
|---|---|---|---|---|---|---|---|---|
| 0 | R0 | G0 | B0 | Register Value | R1 | G1 | B1 | Register Value |
| 4 | R2 | G2 | B2 | Register Value | R3 | G3 | B3 | Register Value |
| 8 | R4 | G4 | B4 | Register Value | R5 | G5 | B5 | Register Value |
| C | R6 | G6 | B6 | Register Value | R7 | G7 | B7 | Register Value |
| ......... | ......... | ......... | ......... | ......... | ......... | ......... | ......... | ......... |

FIG. 52

| ADDRESS | 63 56 | 55 48 | 47 40 | 39 32 | 31 24 | 23 16 | 15 8 | 7 0 |
|---|---|---|---|---|---|---|---|---|
| 0 | Pixel 0 | Pixel 1 | Pixel 2 | Pixel 3 | Pixel 4 | Pixel 5 | Pixel 6 | Pixel 7 |
| 4 | Pixel 8 | Pixel 9 | Pixel 10 | Pixel 11 | Pixel 12 | Pixel 13 | Pixel 14 | Pixel 15 |
| 8 | Pixel 16 | Pixel 17 | Pixel 18 | Pixel 19 | Pixel 20 | Pixel 21 | Pixel 22 | Pixel 23 |
| C | Pixel 24 | Pixel 25 | Pixel 26 | Pixel 27 | Pixel 28 | Pixel 29 | Pixel 30 | Pixel 31 |
| ......... | ......... | ......... | ......... | ......... | ......... | ......... | ......... | ......... |

FIG. 53

| ADDRESS | 0 | 4 | |
|---|---|---|---|
| 0 | P63 | P127 | |
| 1 | P62 | P126 | |
| 2 | P61 | P125 | |
| 3 | P60 | P124 | ......... |
| 4 | P59 | P123 | |
| 5 | P58 | P122 | |
| 6 | P57 | P121 | |
| 7 | P56 | P120 | |
| 8 | P55 | P119 | |
| 9 | P54 | P118 | |
| 10 | P53 | P117 | |
| 11 | P52 | P116 | ......... |
| 12 | P51 | P115 | |
| 13 | P50 | P114 | |
| 14 | P49 | P113 | |
| 15 | P48 | P112 | |
| 16 | P47 | P111 | |
| 17 | P46 | P110 | |
| 18 | P45 | P109 | |
| 19 | P44 | P108 | ......... |
| 20 | P43 | P107 | |
| 21 | P42 | P106 | |
| 22 | P41 | P105 | |
| 23 | P40 | P104 | |
| 24 | P39 | P103 | |
| 25 | P38 | P102 | |
| 26 | P37 | P101 | |
| 27 | P36 | P100 | ......... |
| 28 | P35 | P99 | |
| 29 | P34 | P98 | |
| 30 | P33 | P97 | |
| 31 | P32 | P96 | |
| 32 | P31 | P95 | |
| 33 | P30 | P94 | |
| 34 | P29 | P93 | |
| 35 | P28 | P92 | ......... |
| 36 | P27 | P91 | |
| 37 | P26 | P90 | |
| 38 | P25 | P89 | |
| 39 | P24 | P88 | |
| 40 | P23 | P87 | |
| 41 | P22 | P86 | |
| 42 | P21 | P85 | |
| 43 | P20 | P84 | ......... |
| 44 | P19 | P83 | |
| 45 | P18 | P82 | |
| 46 | P17 | P81 | |
| 47 | P16 | P80 | |
| 48 | P15 | P79 | |
| 49 | P14 | P78 | |
| 50 | P13 | P77 | |
| 51 | P12 | P76 | ......... |
| 52 | P11 | P75 | |
| 53 | P10 | P74 | |
| 54 | P9 | P73 | |
| 55 | P8 | P72 | |
| 56 | P7 | P71 | |
| 57 | P6 | P70 | |
| 58 | P5 | P69 | |
| 59 | P4 | P68 | ......... |
| 60 | P3 | P67 | |
| 61 | P2 | P66 | |
| 62 | P1 | P65 | |
| 63 | P0 | P64 | ......... |

FIG. 64

| sccPmState[1:0] | SPStat(Clock Gate) | sccDmaPmState[1:0] |
|---|---|---|
| 00 | 0(Clock OFF) | 00 |
| 10 | | 01 |
| 10 | | 10 |
| 10 | | 11 |
| 01 | 1(Clock ON) | 00 |
| 11 | | 01 |
| 11 | | 10 |
| 11 | | 11 |

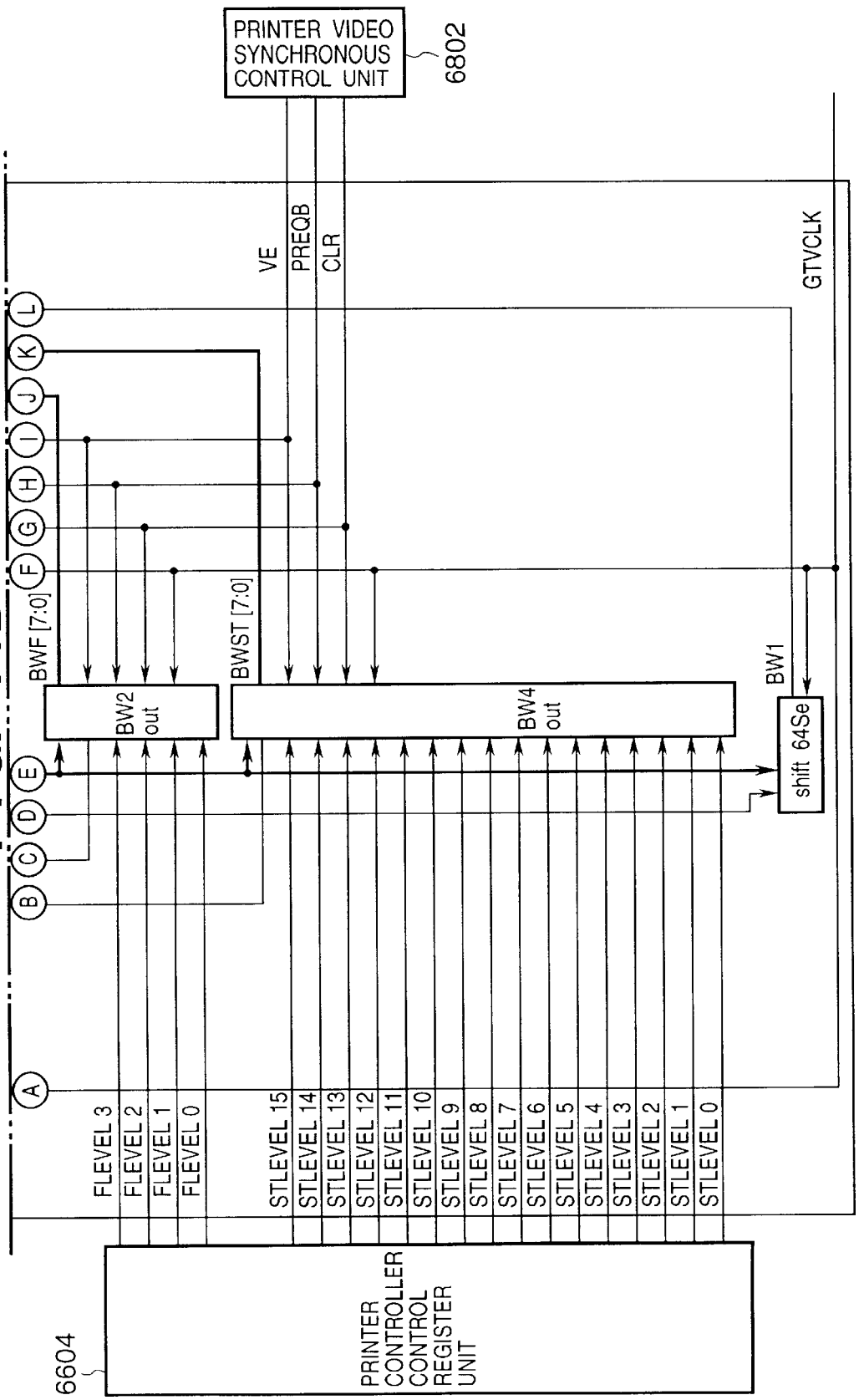

FIG. 72

| ADDRESS | 63  56 | 55  48 | 47  40 | 39  32 | 31  24 | 23  16 | 15  8 | 7  0 |
|---|---|---|---|---|---|---|---|---|
| 0 | R0 | G0 | B0 | R1 | G1 | B1 | R2 | G2 |
| 4 | B2 | R3 | G3 | B3 | R4 | G4 | B4 | R5 |
| 8 | G5 | B5 | R6 | G6 | B6 | R7 | G7 | B7 |
| C | R8 | G8 | B8 | R9 | G9 | B9 | R10 | G10 |
| ......... | ......... | ......... | ......... | ......... | ......... | ......... | ......... | ......... |

FIG. 73

| ADDRESS | 63 | | 56 55 | | 48 47 | | 40 39 | | 32 31 | | 24 23 | | 16 15 | | 8 7 | | 0 |
|---|---|---|---|---|---|---|---|---|---|---|---|---|---|---|---|---|---|
| 0 | R0 | | G0 | | B0 | | 00h | | R1 | | G1 | | B1 | | 00h | |
| 4 | R2 | | G2 | | B2 | | 00h | | R3 | | G3 | | B3 | | 00h | |
| 8 | R4 | | G4 | | B4 | | 00h | | R5 | | G5 | | B5 | | 00h | |
| C | R6 | | G6 | | B6 | | 00h | | R7 | | G7 | | B7 | | 00h | |
| ⋯ | ⋯ | | ⋯ | | ⋯ | | ⋯ | | ⋯ | | ⋯ | | ⋯ | | ⋯ | |

FIG. 74

| ADDRESS | 63 56 | 55 48 | 47 40 | 39 32 | 31 24 | 23 16 | 15 8 | 7 0 |
|---|---|---|---|---|---|---|---|---|
| 0 | Pixel 0 | Pixel 1 | Pixel 2 | Pixel 3 | Pixel 4 | Pixel 5 | Pixel 6 | Pixel 7 |
| 4 | Pixel 8 | Pixel 9 | Pixel 10 | Pixel 11 | Pixel 12 | Pixel 13 | Pixel 14 | Pixel 15 |
| 8 | Pixel 16 | Pixel 17 | Pixel 18 | Pixel 19 | Pixel 20 | Pixel 21 | Pixel 22 | Pixel 23 |
| C | Pixel 24 | Pixel 25 | Pixel 26 | Pixel 27 | Pixel 28 | Pixel 29 | Pixel 30 | Pixel 31 |
| ………… | ………… | ………… | ………… | ………… | ………… | ………… | ………… | ………… |

FIG. 75

| ADDRESS | 0 | 4 | ... |
|---|---|---|---|
| 0 | P63 | P127 | |
| 1 | P62 | P126 | |
| 2 | P61 | P125 | |
| 3 | P60 | P124 | |
| 4 | P59 | P123 | |
| 5 | P58 | P122 | ...... |
| 6 | P57 | P121 | |
| 7 | P56 | P120 | |
| 8 | P55 | P119 | |
| 9 | P54 | P118 | |
| 10 | P53 | P117 | |
| 11 | P52 | P116 | ...... |
| 12 | P51 | P115 | |
| 13 | P50 | P114 | |
| 14 | P49 | P113 | |
| 15 | P48 | P112 | |
| 16 | P47 | P111 | |
| 17 | P46 | P110 | |
| 18 | P45 | P109 | |
| 19 | P44 | P108 | |
| 20 | P43 | P107 | |
| 21 | P42 | P106 | |
| 22 | P41 | P105 | |
| 23 | P40 | P104 | |
| 24 | P39 | P103 | |
| 25 | P38 | P102 | |
| 26 | P37 | P101 | |
| 27 | P36 | P100 | |
| 28 | P35 | P99 | ...... |
| 29 | P34 | P98 | |
| 30 | P33 | P97 | |
| 31 | P32 | P96 | |
| 32 | P31 | P95 | |
| 33 | P30 | P94 | |
| 34 | P29 | P93 | |
| 35 | P28 | P92 | ...... |
| 36 | P27 | P91 | |
| 37 | P26 | P90 | |
| 38 | P25 | P89 | |
| 39 | P24 | P88 | |
| 40 | P23 | P87 | |
| 41 | P22 | P86 | |
| 42 | P21 | P85 | |
| 43 | P20 | P84 | |
| 44 | P19 | P83 | |
| 45 | P18 | P82 | |
| 46 | P17 | P81 | |
| 47 | P16 | P80 | |
| 48 | P15 | P79 | |
| 49 | P14 | P78 | |
| 50 | P13 | P77 | |
| 51 | P12 | P76 | ...... |
| 52 | P11 | P75 | |
| 53 | P10 | P74 | |
| 54 | P9 | P73 | |
| 55 | P8 | P72 | |
| 56 | P7 | P71 | |
| 57 | P6 | P70 | |
| 58 | P5 | P69 | |
| 59 | P4 | P68 | ...... |
| 60 | P3 | P67 | |
| 61 | P2 | P66 | |
| 62 | P1 | P65 | |
| 63 | P0 | P64 | |

FIG. 85

| prcPmState[1:0] | PPStat(Clock Gate) | prcDmaPmState[1:0] |
|---|---|---|
| 00 | 0(Clock OFF) | 00 |
| 10 | | 01 |
| 10 | | 10 |
| 10 | | 11 |
| 01 | 1(Clock ON) | 00 |
| 11 | | 01 |
| 11 | | 10 |
| 11 | | 11 |

FIG. 88

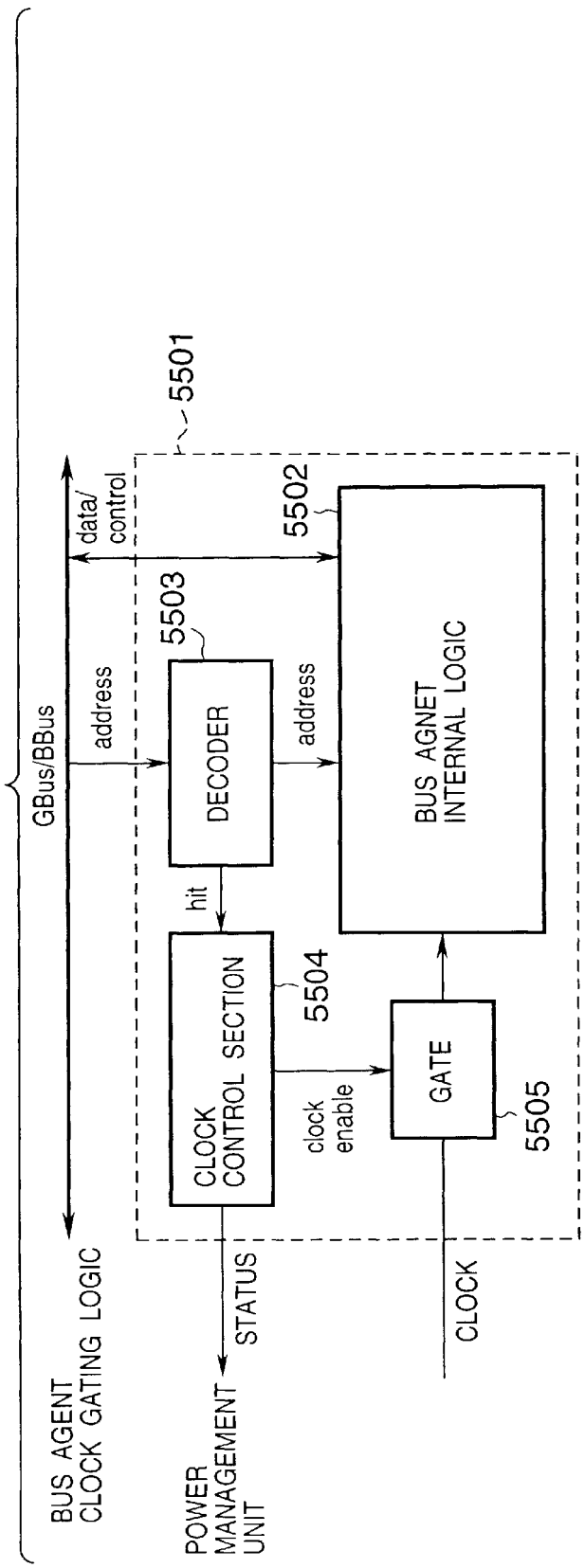

(CLOCK CONTROL)
- THE BUS AGENT DETECTS AN ACTIVITY OF A BUS AND AUTOMATICALLY TURNS ON AND OFF THE CLOCK
- THE BUS AGENT HAS THREE STATES OF SLEEP, WAKEUP AND WAIT
- IN THE SLEEP STATE, THE BUS AGENT HAS NO ACTIVITY AND KEEPS THE CLOCK IN A STOPPED CONDITION
- EVEN IN THE SLEEP STATE, THE DECODER AND THE CLOCK CONTROL SECTIONS ARE OPERATING AND WAIT FOR A REQUEST WHILE MONITORING THE BUS
- WHEN THE DECODER DETECTS AN ADDRESS OF ITSELF, IT OPENS THE CLOCK GATE TO OPERATE A CLOCK OF AN INTERNAL LOGIC AND RESPONDS TO A BUS REQUEST. THE BUS AGENT SHIFTS TO THE WAKEUP STATE
- UPON COMPLETING DATA TRANSFER, THE BUS AGENT SHIFTS TO THE WAIT STATE AND WAITS FOR A NEXT REQUEST THE CLOCK KEEPS OPERATING IN THIS WHILE
- WHEN A REQUEST IS ISSUED, THE BUS AGENT RETURNS TO THE WAKEUP STATE AND EXECUTES DATA TRANSFER WHILE THE BUS AGENT IS WAITING FOR A REQUEST, A TIMER COUNTS
- WHEN THE TIMER EXPIRES WITH NO REQUEST, THE BUS AGENT SHIFTS TO THE SLEEP STATE AND STOPS THE CLOCK

INFORMATION PROCESSING SYSTEM FOR COMPOSITE APPLIANCE

BACKGROUND OF THE INVENTION

1. Field of the Invention

The present invention relates to a system for processing information for a composite appliance such as a printer, facsimile (FAX), or copying machine.

2. Description of the Related Art

There has conventionally been put to practical use an image processing apparatus called a composite appliance such as a copying machine or facsimile which is equipped with a combination of an image input apparatus such as a scanner and an image output apparatus such as a printer, or a computer system which is equipped with an image input apparatus and image output apparatus as separate component units. To realize composite functions such as an image input function, image output function, and copying function in this image processing apparatus, when the image input apparatus and image output apparatus cannot operate in synchronization with each other, the copying function is realized by outputting, to the image output apparatus, image data temporarily stored from the image input apparatus in a memory. When the image input apparatus and image output apparatus can operate in synchronization with each other, the copying function is realized by disposing a passage for directly transferring an image signal from the image input apparatus to the image output apparatus.

However, the conventional digital composite appliances have been developed by adding the function of a conventional device such that the facsimile function is added to a copying machine or the printer function is added to a facsimile. Such digital composite appliance can only perform composite operations and parallel operations in units of jobs.

In the conventional digital composite appliance, local memories are distributed to interfaces such as a scanner and printer for a case where the use of a bus enough to exchange various processing data for input/output cannot be ensured.

FIG. 112 is a timing chart for explaining job processing under control in units of jobs. Print job 1 and print job 2 are to be processed by a composite appliance. Assume that these jobs are to acquire a given resource (e.g., a page memory). Print job 1 first issued at time T1 acquires the resource. Subsequent print job 2 tries to acquire the resource at timing T2, but fails because the resource is occupied by print job 1. Hence, the resource acquisition request is queued. When print job 1 releases the resource at timing T3, print job 2 acquires the resource in accordance with the queued resource acquisition request of print job 2, and performs processing. That is, print job 1 and print job 2 are serially processed from T1 to T3 because print job 1 exclusively uses the resource.

In the conventional digital composite appliance, a series of job processes are sequentially executed in units of jobs. When a plurality of jobs are input to the digital composite appliance, subsequent jobs wait until a preceding job ends. This decreases the job throughput.

In some cases, memories ensured by distributing them to local devices store repetitive information between the devices. A redundant memory area equal to or larger than a necessary area is required.

When a single CPU executes processes which are different in whether real-time operation is required, processing requiring real-time operation is sacrificed by processing requiring no real-time operation. This decreases the performance of the whole system.

SUMMARY OF THE INVENTION

It is an object of the present invention to provide a system which solves any of the above-described problems.

To achieve the above object, according to an aspect of the present invention, an information processing system for a composite appliance, comprises a first CPU for interpreting a protocol, job generation means for generating a job on the basis of a result interpreted by the first CPU, a second CPU for processing the generated job, means for dividing the generated job into elements in units of pages on the basis of processing by the second CPU, device management means for managing assignment and release of devices for processing the elements divided in units of pages on the basis of processing by the second CPU, and means for controlling use of a plurality of busses to process input data and output data in parallel on the basis of processing results of the devices in units of the divided pages.

In the information processing system for a composite appliance, data processing by the first CPU and data processing by the second CPU are preferably divided and independently performed to synchronize the first data processing and second data processing, thereby increasing throughput of data processing.

In the information processing system for a composite appliance, processes by the first and second CPUs are preferably selectively used in accordance with whether real-time operation is required in data processing, thereby increasing throughput of data processing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 is a timing chart showing a timing of burst write by the G-bus device;

FIGS. 24A through 24D are diagrams showing maps of 512 Mbytes slashed in FIGS. 23A through 23D including registers and so on;

FIG. 50 is a diagram showing an arrangement of color image data having 8 bits each in R, G and B (24-bit storage mode) in a memory;

FIG. 51 is a diagram showing an arrangement of color image data having 8 bits each in R, G and B (32-bit storage mode) in the memory;

FIG. 52 is a diagram showing an arrangement of white-black image data having 8 bits in the memory;

FIG. 53 is a diagram showing an arrangement of binary white-black image data in the memory;

FIG. 64 is a diagram showing relationship among values of signal sccDmaPmState, clock states and values of signal sccPmState;

FIG. 71B is a block diagram of the video data width converter 6803;

FIG. 72 is a diagram showing an arrangement of color image data having 8 bits each in R, G and B (24-bit storage mode) in a memory;

FIG. 73 is a diagram showing an arrangement of color image data having 8 bits each in R, G and B (32-bit storage mode) in the memory;

FIG. 74 is a diagram showing an arrangement of 8-bit white-black image data in the memory.

FIG. 75 is a diagram showing an arrangement of binary white-black image data in the memory;

FIG. 85 is a diagram showing relationship among values of signal pscDmaPmState, clock states and values of signal prcPmState;

FIG. 88 is a block diagram of a bus agent;

DESCRIPTION OF THE PREFERRED EMBODIMENTS OF THE INVENTION

Figure 1:
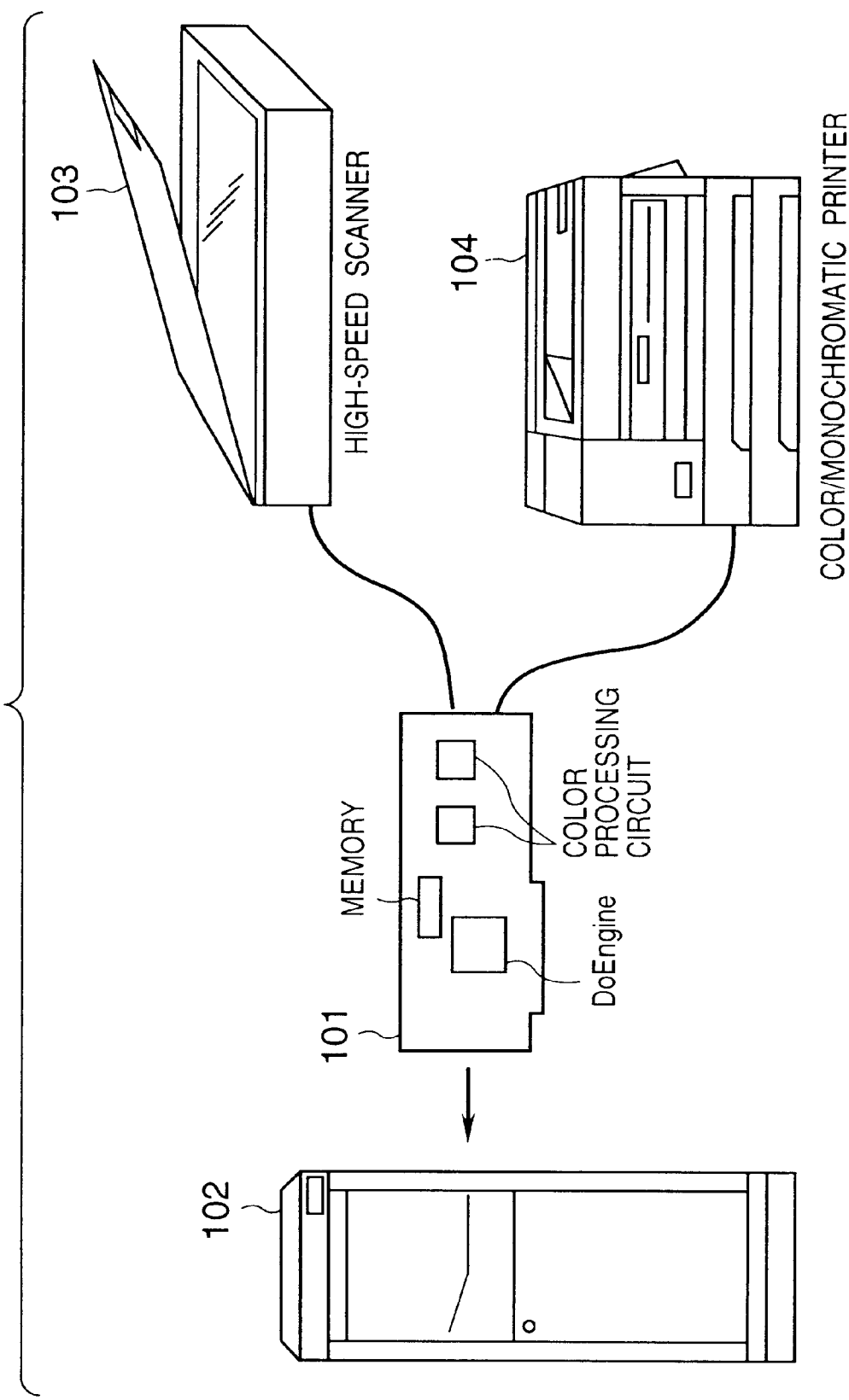
FIG. 1 is a diagram showing an example of configuration of an apparatus or a system which uses a DoEngine.

Now, description will be made of a "DoEngine" preferred as an embodiment of the present invention which is a single-chip scanning and printing engine comprising a processor core, a processor peripheral controller, a memory controller, a scanner/printer controller, a PCI interface and so on.

1. DoEngine

The DoEngine is a single-chip scanning printing engine which comprises a processor core compatible with an R4000 Processor manufactured by MIPS Technologies, Inc., a processor peripheral controller, a memory controller, a scanner/printer controller, a PCI interface and so on. The DoEngine employs a fast parallel operation and building block techniques.

A cache memory having a total capacity of 32 Kbytes at maximum: 16 Kbytes for instructions and data respectively; an FPU (floating point arithmetic unit), an MMU (memory management unit), a coprocessor definable by user and so on can be built in a processor shell (a collective name of processor peripheral circuits including the processor core).

Since the DoEngine has the PCI bus interface, it is compatible with a computer system which has a PCI bus slot. Furthermore, the DoEngine has a PCI host bus bridge configuration in addition to a PCI satellite configuration, whereby it can issue a PCI bus configuration, and when it is combined with an inexpensive PCI peripheral device, it is usable as a main engine for a multi-function peripheral. Furthermore, the DoEngine can be combined with a rendering engine having a PCI bus interface and a compression/elongation engine.

The DoEngine has two independent buses in its chip, namely an IO bus (B bus) which connects universal IO core and a graphics bus (G bus) which is optimized to transfer of image data. High-speed data transfer with high parallelism which is indispensable for simultaneous operations in a multi-function system is realized by connecting a memory and a processor to these buses by way of crossbar switches.

The memory controller comprises, as a memory, a two way set associative memory front cache having 8 Kbytes to support a synchronous DRAM (SDRAM) which has a maximum cost performance for access to successive data rows represented by image data and minimize performance degradation in random access in a small unit which cannot enjoy a merit of burst access high-speed data transfer from the SDRAM. The memory front cache is of a type which hardly allows bus snoop of all memory writes and high performance is obtainable with a cache memory without a complicated mechanism even in a system configuration which adopts a crossbar switch. Furthermore, the DoEngine is configured to have a data interface (video interface) between a printer and a scanner which permits real time data transfer (appliance control), and perform high-quality and high-speed copying operation by synchronous support of appliances and image processing with hardware even in a discrete scanner-printer configuration.

In the DoEngine, the core operates at 3.3 V and the IO is 5 V tolerant type.

FIGS. 1, 2 and 3A through 3C show example of configurations of apparatuses or systems which use DoEngines. FIG. 1 shows a discrete type system composed of a personal computer 102 in which a local board 101 comprising a DoEngine is mounted by way of a PCI interface thereof. In addition to the DoEngine, a memory which is connected to the DoEngine by way of a memory bus described later and a color processing circuit (chip) are disposed on the local board 101. By way of the local board 101, a high-speed scanner 103 and a color/monochromatic printer 104 are connected to the personal computer 102. Under the control of the personal computer, this configuration makes it possible to process image data input from the scanner 103 with the local board 101 and output the data from the printer 104.

Figure 2:
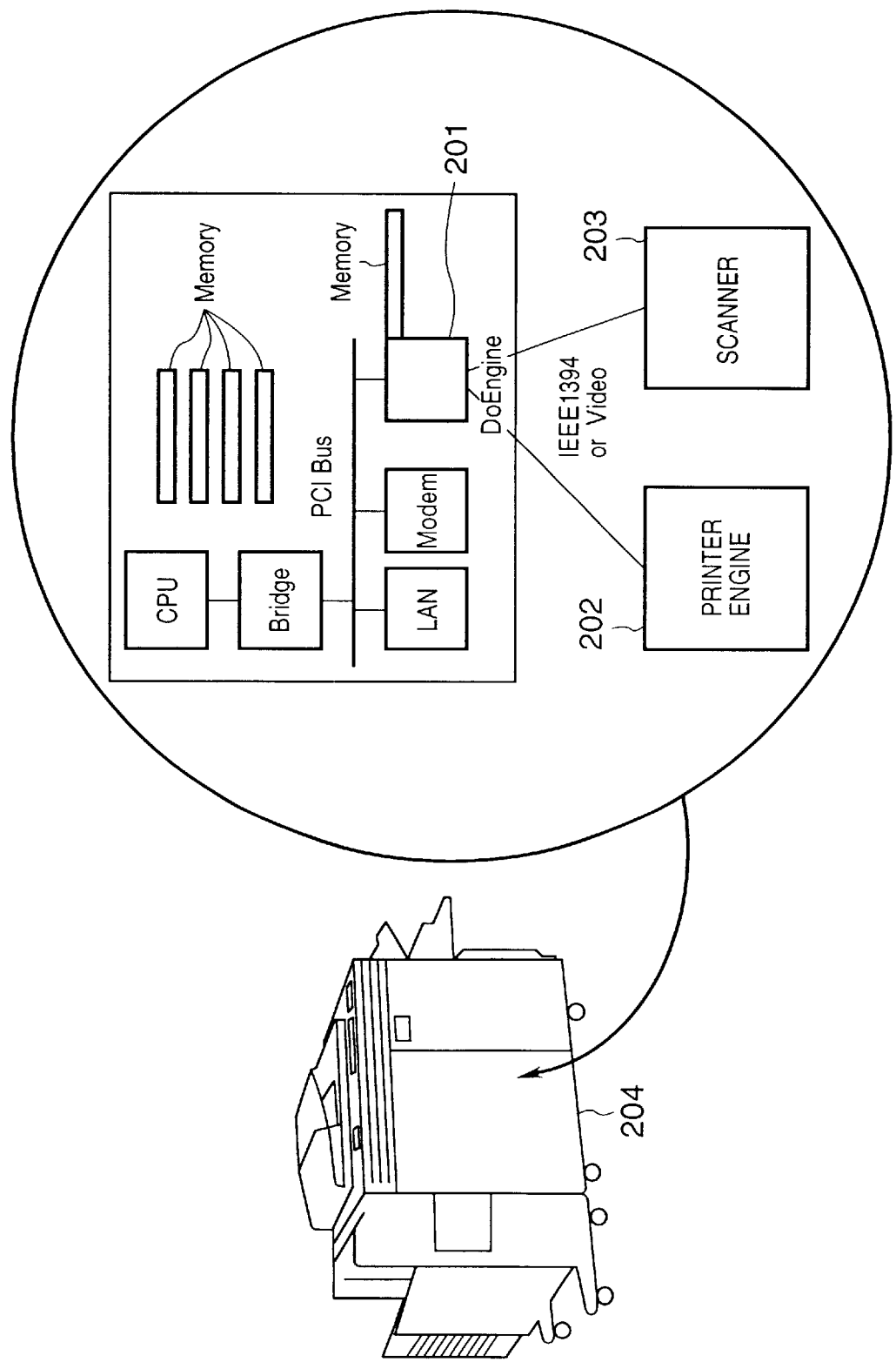
FIG. 2 is a diagram showing an example of configuration of an apparatus or a system which uses a DoEngine.
Figure 3C:
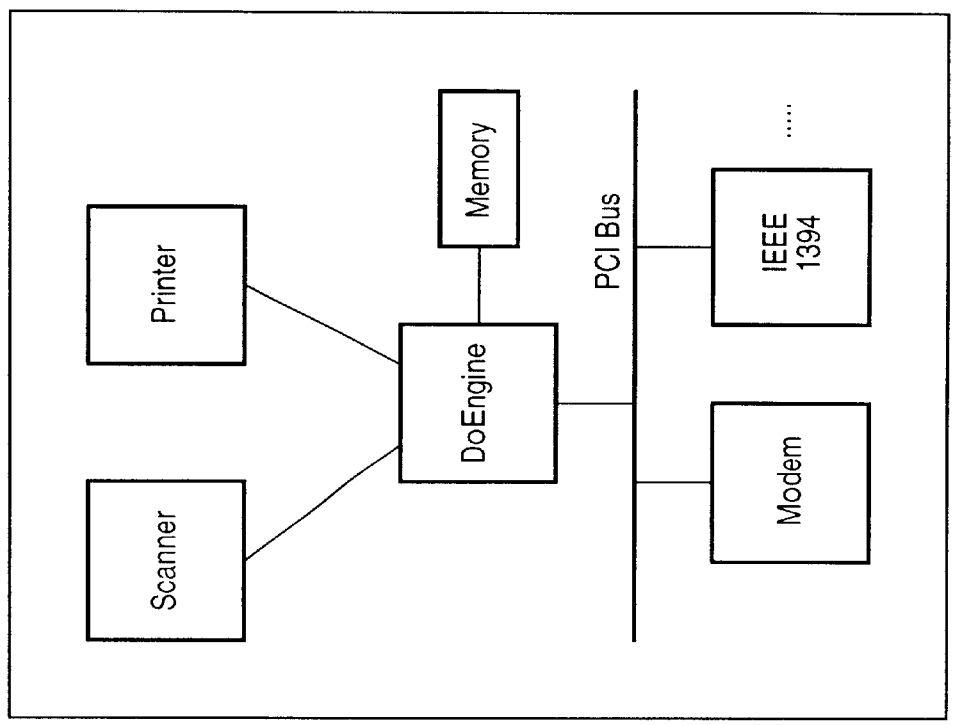
FIGS. 3A, 3B and 3C are diagrams showing examples of configurations of apparatuses and a system which uses a DoEngine.
Figure 3A:
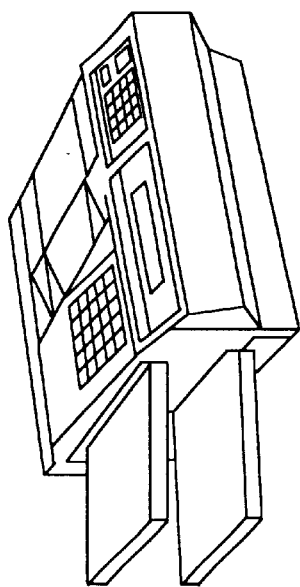
Figure 3B:
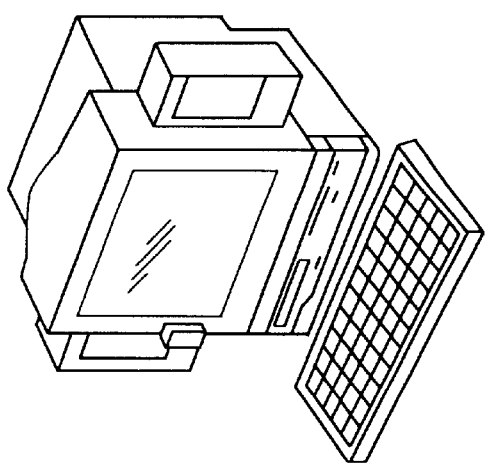

Each of FIGS. 2, 3A and 3B shows an example wherein a scanner 203 and a printer 202 are integrally built in: FIG. 2 showing a configuration similar to that of an ordinary copying machine, FIG. 3A showing a configuration of a facsimile or the like. FIG. 3B shows a computer which controls the facsimile shown in FIG. 3A.

Out of these drawings, FIGS. 1 and 2 show examples of slave mode wherein the DoEngines are controlled by an external CPU connected by way of a PCI interface, whereas FIGS. 3A and 3B show an example of master mode wherein a CPU of the DoEngine functions as a master unit which controls a device connected by way of a PCI interface.

Table 1 lists specifications for the DoEngine. The DoEngine is equipped as external interfaces a PCI, a memory bus, a video, general purpose input/output, IEEE 1284, RS232C, 100 base T/10 base T, an LCD panel and keys, and may further have a USB. In addition to the CPU core, the DoEngine is equipped as built-in blocks a primary cache, a memory controller with cache, a copy engine, an IO bus arbiter (B bus arbiter) a graphics bus arbiter (G bus arbiter) and so on. Furthermore, a DMA controller has five channels, and arbitration is performed by arrival order processing with priority for both a graphics bus (G bus) and an IO bus (B bus).

TABLE 1

| Item | Outline | Specification |
|---|---|---|
| Chip | Operating frequency | Internal 100 MHz, internal bus and memory Bus 100 MHz |
| | Package | 313 pin BGA |
| | External interface | PCI |
| | | Memory bus |
| | | Video |
| | | General purpose input/output |
| | | IEEE1284 |
| | | RS232C |
| | | (USB) |
| | | LAN 100/10baseT |
| | | LCD panel and keys |
| | Internal block | CPU core |
| | | Primary cache |
| | | MMU |
| | | ICU |
| | | System bus bridge |
| | | Memory controller with cache |
| | | COPY engine |
| | | PLL |
| | | Power source control unit |
| | | IO bus arbiter |
| | | Graphics bus arbiter |
| DMA controller | Number of channels | 2 channels |
| | Maximum transfer speed (peak) | 100 Mbytes/sec@50 MHz |
| | Passage usable for transfer | Internal output block⇔ local memory |
| Memory and bus control | Support memory | SDRAM |
| | Data width | 64 bits |
| | Maximum memory capacity | 1 Gbyte |
| | Maximum memory bus transfer speed | 682 Mbytes/Sec |
| Graphics bus | Arbitration system | Arrival order value processing with priority |
| | Maximum bus transfer speed | 800 Mbytes/Sec |
| | Bus width | 64 Bits, 100 MHz |
| PCI bus | PCI bus format | Rev.2.1, 32 Bits, 33M PCI |
| | Transfer speed in master mode | Read 96 Mbytes/Sec, Write 88 Mbytes/Sec, |
| IO bus | Transfer speed in slave mode | Read 101 Mbytes/Sec, Write 101 Mbytes/Sec, |
| | Arbitration system | Arrival order value processing with priority |
| | Maximum bus transfer speed | 200 Mbytes/Sec |
| | Bus width | 32 Bits, 50 MHz |

2. Configuration and Operations of DoEngine

This section provides a general description of the DoEngine as well as an explanation of a block diagram, an outline, details, a core interface, a timing chart, etc. of each functional block.

2.1. Chip configuration of DoEngine

Figure 4:
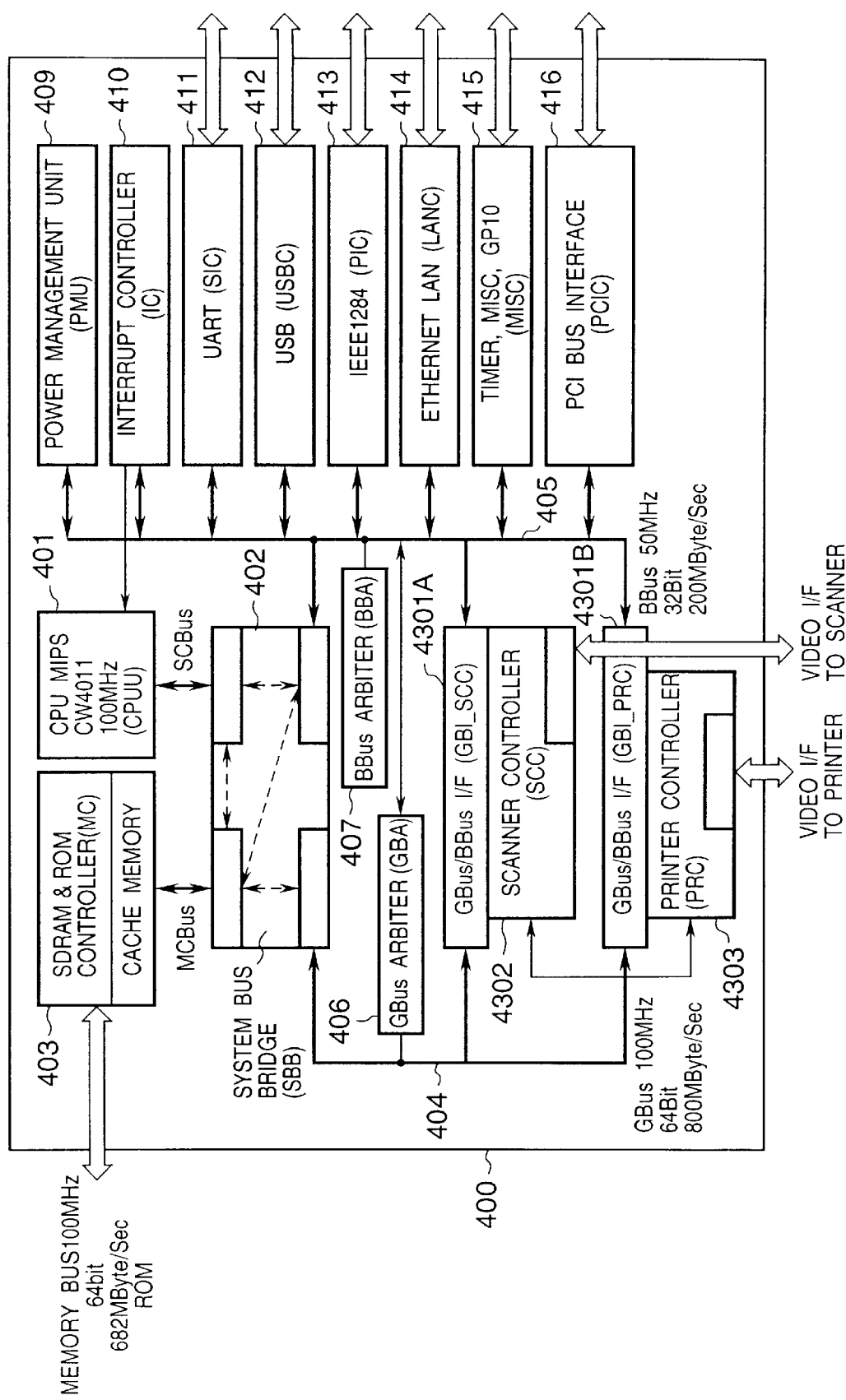
FIG. 4 is a block diagram of a DoEngine.

FIG. 4 shows a block diagram of a DoEngine. DoEngine 400 has been designed and developed as a main controller for a multi function peripheral (MFP) or a multi function system (MFS) of the next generation.

MIPS R4000 core manufactured by MIPS Technologies, Inc. is adopted as a CPU (processor core) 401. Mounted in the processor core 401 are a cache memory having 8 Kbytes each for instructions and data, an MMU, and so on. The processor core 401 is connected to a system bus bridge (SBB) 402 by way of a processor bus (SC bus) having 64 bits. The SBB 402 is a 4×4 crossbar switch having 64 bits, and connected to a memory controller 403 which controls an SDRAM with a cache memory and a ROM by way of an exclusive local bus (MC bus) in addition to the processor core 401, and to a G bus 404 which is a graphics bus and a B bus 405 which is an IO bus: four buses in total. The system bus bridge 402 is designed so as to maintain parallel connections among these four modules simultaneously as far as possible.

The G bus 404 is cooperatively controlled by a G bus arbiter (GBA) 406, and connected to a scanner controller 4302 and a printer controller 4303 for connection to a scanner and a printer. Furthermore, the B bus 405 is cooperatively controlled by a B bus arbiter (BBA) 407, and connected not only to a scanner/printer controller but also to a power management unit (PMU) 409, an interrupt controller (IC) 410, a serial interface controller (SIC) 411 which uses a UART, a USB controller 412, a parallel interface controller (PIC) 413 which uses an IEEE1284, an LAN controller (LANC) 414 which uses Ethernet, an LCD panel, a key, a general purpose input/output controller (PC) 415 and a PCI bus interface (PCIC) 416.

2.2. Processor Shell

Meant by a processor shell is a block which comprises not only a processor core but also an MMU (memory management unit), an instruction cache, a data cache, a writeback buffer and a multiplication unit.

<Cache Memory>

Figure 5:
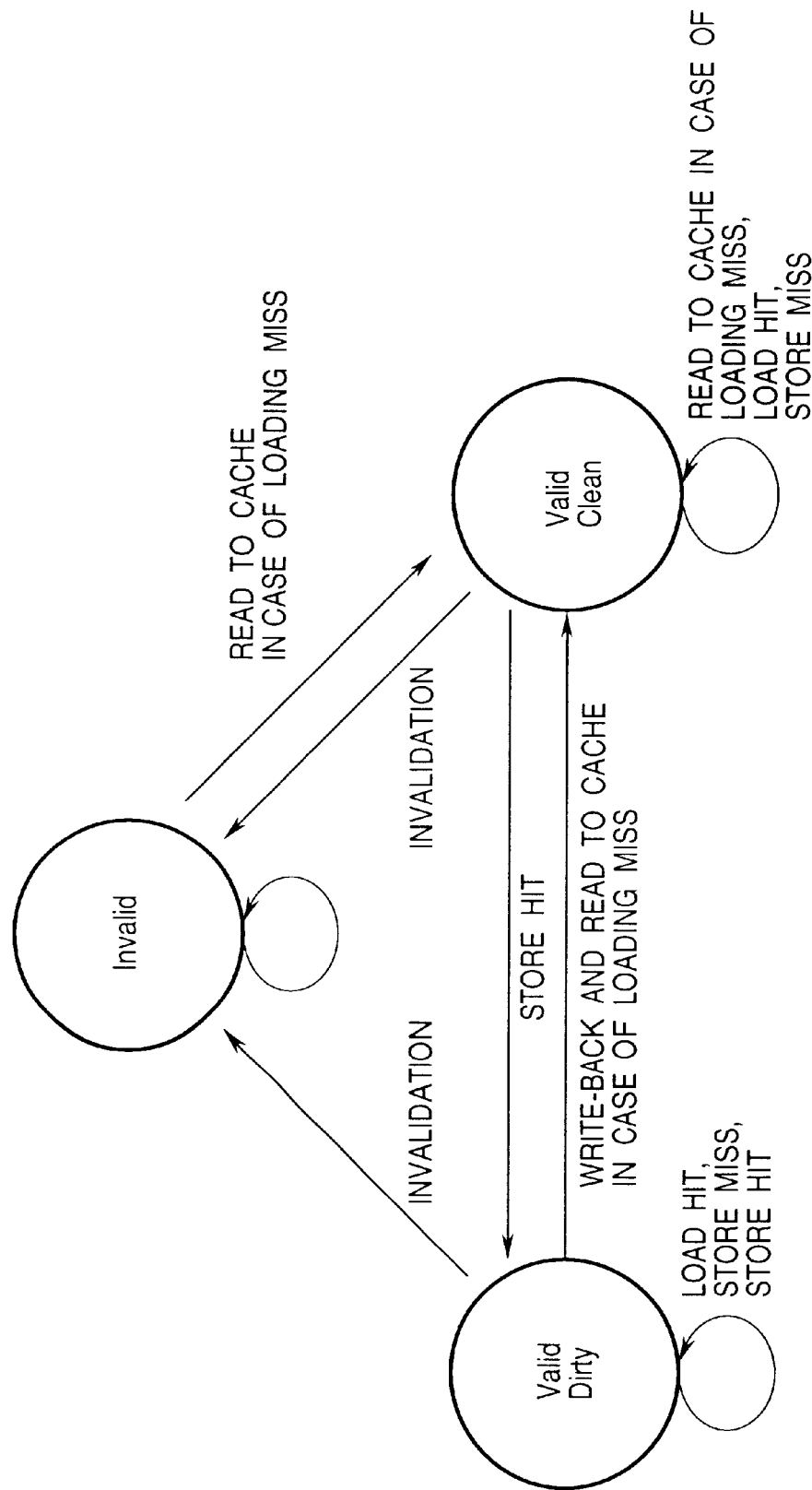
FIG. 5 is a diagram showing three states of a cache memory controller.

As shown in FIG. 5, a cache memory controller manages three state caches: invalid, valid clean (cache is not updated) and valid dirty (cache is updated). A cache is controlled dependently on this state.

2.3. Interrupt Controller

Figure 6:
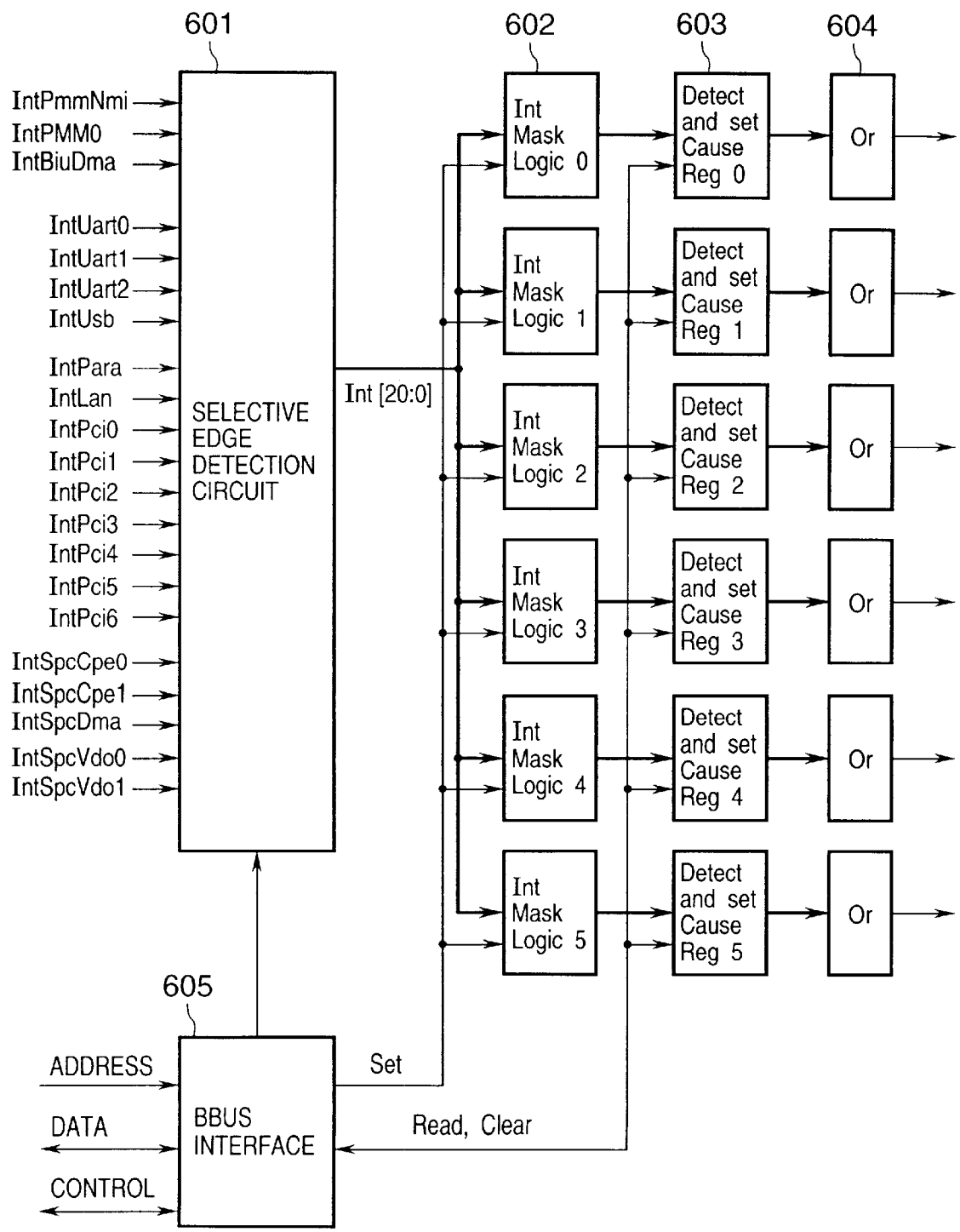
FIG. 6 is a block diagram of an interrupt controller 410.

FIG. 6 shows a block diagram of an interrupt controller 410.

The interrupt controller 410 is connected to the B bus 405 by way of a B bus interface 605 to collect interrupts from functional blocks in the DoEngine chip and from outside the chip, and relocates them into six levels of external interrupts and non-maskable interrupts (NMI) which are supported by the CPU core 401. The functional blocks in the chip are the power management unit 409, the serial interface controller 411, the USB controller 412, the parallel interface controller 413, the Ethernet controller 414, the general purpose 10 controller 415, the PCI interface controller 416, a scanner controller 4302, a printer controller 4303 and so on.

In relocating the interrupts, the interrupts can be masked dependently on causes for interrupt with mask registers (Int Mask Logic 0–5) 602 which can be configured as software.

Furthermore, an edge sense/level sense is selectable for external interrupt inputs for individual signal lines with a selective edge detector circuit 601. Cause registers (Detect and set Cause Reg 0–5) 603 indicate interrupts which are asserted at each level and is capable of clearing the interrupts by performing write operations.

An interrupt signal at each level is output as a logical sum from a logical sum circuit 604 so that an interrupt signal is output when at least one interrupt is made at each level. Leveling among a plurality of causes at each level is made in software.

2.4. Memory Controller

Figure 7:
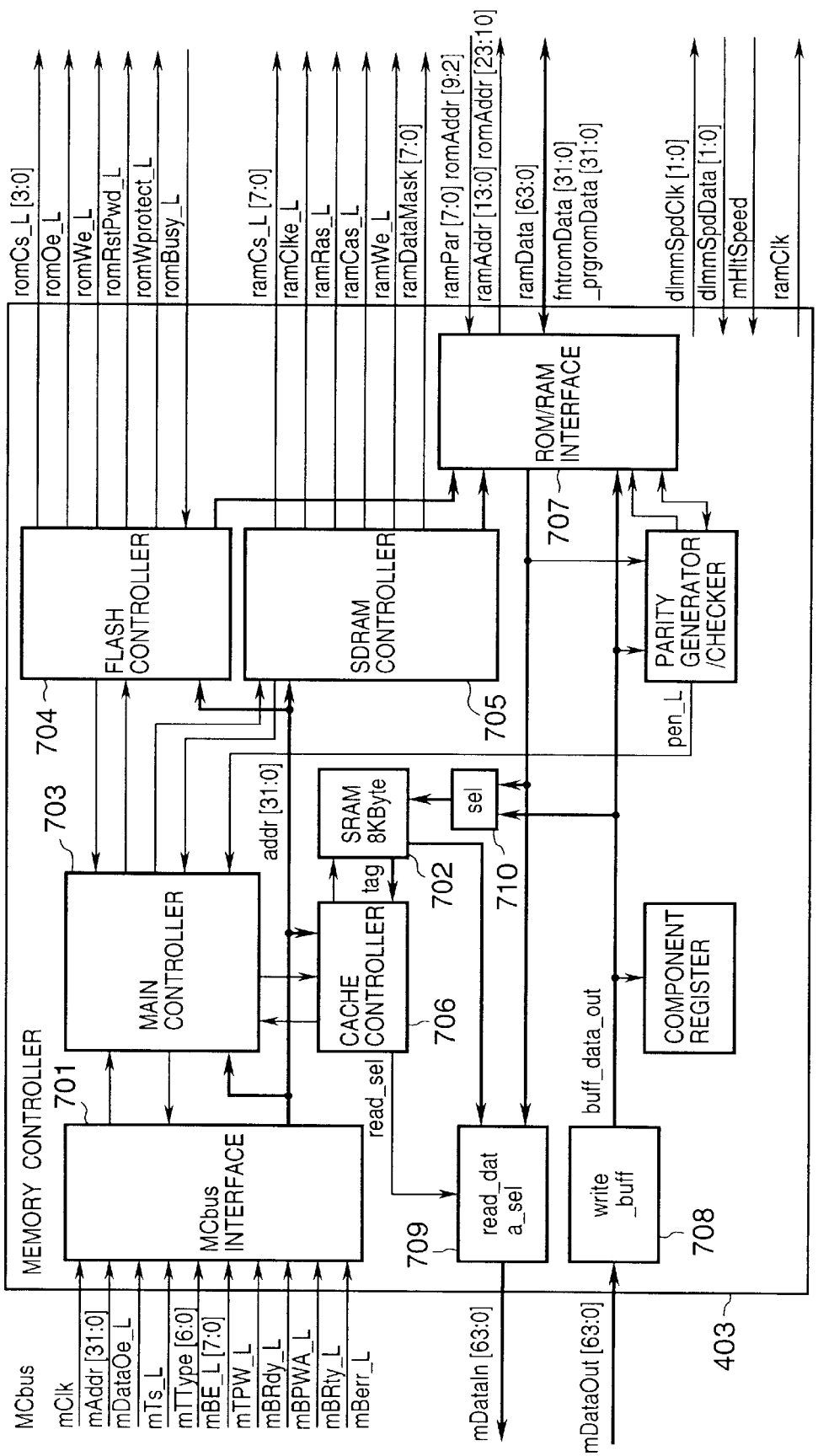
FIG. 7 is a block diagram of a memory controller 403.

FIG. 7 is a block diagram of the memory controller 403. The memory controller 403 is connected to an MC bus which is a local bus exclusive for the memory controller by way of an MC bus interface 701, and supports a synchronous DRAM (SDRAM) having a capacity of 1 Gbytes at maximum and a flash ROM or a ROM having a capacity of 32 Mbytes. The memory controller performs 64 (16×4) burst transfer in order to make use of a high speed for burst transfer which is obtained as a characteristic of the SDRAM, Taking into consideration single transfer of data having successive addresses from a CPU or a B bus, the memory controller comprises SRAM (memory front cache) 702 to avoid the single transfer directly to the SDRAM as far as possible, thereby enhancing a transfer efficiency. A data bus between the memory controller and the SDRAM has a width of 72 bits for a sum of signals ramData and ramPar (8-bit signal ramPar is parity), and data bus between the memory controller and the flash ROM has a width of 32 bits for signals fntromData and prgromData.

2.4.2. Configuration and Operations

Components of the memory controller are configured as described below:

<MC Bus Interface (701)>

The MC bus is provided as a bus exclusively between the SBB 402 and the memory controller 403, and used as a basic bus in the SBB.

In contrast to a special purpose P bus which connects the CPU 401 to the bus bridge 402 is specified exclusively for 4 bursts, the MC bus is specified for additional bursts up to 16 bursts ×4. For this reason, mTType [6:0] is newly defined as a signal representing a burst length.

(Definition of MC Bus Signals)

MC bus signals are defined as follows:

mClk (output) . . . MC bus clock mAddr[31:0] (output) . . . MC bus address

This signal is a 32 bit address bus and maintained from a time when mTs_L is asserted until mBRdy_L is asserted.

mDataOut[63:0] (output) . . . MC bus data output

This signal is a 64 bit output data bus and is valid only when mDataOe_L is asserted.

mDataOe_L (output) . . . MCbus data output enable

This signal indicates that mDataOut[63:0] is valid. Furthermore, it indicates its transfer is write.

mDataIn[63:0] (input) . . . MC bus data input

This signal is a 64 bit input data bus and sampled at rise of mClk for which mBRdy_L is asserted.

mTs_L (output) . . . MCbus transaction start strobe

This signal indicates a transfer start. It is asserted during a first clock of transfer. mTs_L is kept asserted when the transfer terminates in a clock and a next transfer starts immediately.

mTType[6:0] (output) . . . MC bus transaction type

This signal indicates a transfer type in the MC bus. It is maintained during transfer in single transfer or a first beat in burst transfer. Three upper bits represent a source (master) and lower bits designate a single/burst length. Types are listed below:

| mTType[6:4] | Signal source |
|---|---|
| 001 | CPU |
| 010 | B bus |
| 100 | G bus |

| mTType[3:0] | Single/burst length |
|---|---|
| 1xxx | Single (1–8 byte) |
| 0001 | 2 bursts |
| 0010 | 4 bursts |
| 0011 | 6 bursts |
| 0100 | 8 bursts |
| 0101 | 16 bursts |
| 0110 | 2 × 16 bursts |
| 0111 | 3 × 16 bursts |
| 0000 | 4 × 16 bursts | mBE_L[7:0] (output) . . . MC bus transaction byte enable

This signal indicates an effective byte lane in 64 bit data bus in the single transfer. In the burst transfer, this signal is valid for a write time only and ignored for a read time.

mBRdy_L (input) . . . MC bus ready

This signal indicates that a current transfer (beat) terminates.

mTPW_L (output) . . . Next transaction is in page write (write in page).

This signal indicates that a next transfer is write on the same page (the same row address) and that write can be continued up to four at maximum. A page size is preliminarily set in a configuration register.

mBPWA_L (input) . . . In-page bus write allowed

This signal indicates whether or not an MC bus slave (memory controller) allows in-page write transaction and is sampled by a clock which is the same as that for mBRdy_L. mTPW_L is insignificant when mBPWA_L is diasserted.

mBRty_L (input) . . . Bus retry

This signal asserts when the MC bus slave (memory controller) terminates access while it is not executed and indicates that it must be retried after idling for at least a cycle. (If mBRdy_L and mBRty_L are asserted at the same time, mBRty_L is preferential.)

mBerr_L (input) . . . Bus error

This signal is asserted when a parity error or another bus error occurs.

The definitions of the inputs and outputs mentioned above are made as seen from the SBB.

(MC Bus Transaction)

Transactions in the MC bus support transactions mentioned below:

(1) Basic transaction (1, 2, 3, 4, 8 byte Read/Write)

Supports 1, 2, 3, 4, 8 byte single transactions according to the mBE_L[7:0] signal.

(2) Burst transaction

Supports transactions up to 4-double word burst (from the CPU).

(3) Supports transactions up to 16-double word burst×4 from the G bus.

(4) In-page write transaction

Supports successive write accesses for write in the same page indicated by mTPW_L.

(5) Bus retry

Asserts the mBRty_L signal and informs bus retry when memory access is impossible due to a limit in the memory controller.

<SDRAM Controller (705)>

The SDRAM which has a configuration described below is controlled by the memory controller 403 as described below:

(Configuration of DRAM)

A DRAM is configured to be capable of performing 8 bank control of a ×4, ×8, ×16 bit type 16/64 megabit SDRAM with 64 bit data bus.

TABLE 2

| Number of devices in bank | Device configuration | Row bits (including bank selection bits) Column bits | Bank size | Maximum memory (8 banks) |
|---|---|---|---|---|
| 16 (64 Mbit Type) | 16M × 4 | 14 × 10 | 128 Mbytes | 1 Gbyte |
| 8 (64 Mbit Type) | 8M × 8,9 | 14 × 9 | 64 Mbytes | 512 Mbytes |
| 4 (64 Mbit Type) | 4M × 16,18 | 14 × 8 | 32 Mbytes | 256 Mbytes |
| 16 (16 Mbit Type) | 4M × 4 | 12 × 10 | 32 Mbytes | 256 Mbytes |
| 8 (16 Mbit Type) | 2M × 8,9 | 12 × 9 | 16 Mbytes | 128 Mbytes |
| 4 (16 Mbit Type) | 1M × 16,18 | 12 × 8 | 8 Mbytes | 64 Mbytes |

(Configuration of DRAM Address Bits)

As for allocation of address bits in the DRAM, MA[13:0] is used in case of a 64 bit SDRAM or MA[11:0] is used in case of a 16 bit SDRAM.

TABLE 3

| 64 Mbit SDRAM | | | | | |
|---|---|---|---|---|---|
| 31 | 30 | 29 ... 27 | 26 | 25 24 ... 11 | 10 ... 3 | 2 ... 0 |
| 0 | 0 | CS | C9 | C8 R13... R0 | C7–C0 | BS |
| 16 Mbit SDRAM | | | | | |
| 31 | 28 | 27 ... 25 | 24 | 23 22 ... 11 | 10 ... 3 | 2 ... 0 |
| 0 | 0 | CS | C9 | C8 R11... R0 | C7–C0 | BS |

0 zero

Cs Chip Select

C9–C0 Column Address
    C8 is ignored in case of ×8 bit SDRAM.
    C9 and C8 are ignored in case of ×16 bit SDRAM.
    R13–R0 Row Address
    R11 of 16M SDRAM is used to select banks in the SDRAM.
    R12 and R13 are used to select banks in 64M SDRAM which consists of four banks, whereas R13 is used to select banks in 64M SDRAM which consists of two banks.

BS ByteSelect (SDRAM having programmable configuration (mode register))

The SDRAM comprises a mode register and sets items mentioned below with mode register setting commands.

(1) Burst Length

The SDRAM is capable of setting any one of burst lengths of 1, 2, 4, 8 and full page, out of which a burst length of 4 is optimum since a burst transfer length from the CPU is 4. 16 or more bursts can be transferred from the G bus by successively issuing read/write commands (without auto precharge).

(2) Wrap Type

The SDRAM sets an address increment order for burst transfer. It can set "sequential" or "interleave."

(3) CAS Latency

CAS latency can be set at 1, 2 or 3 which is determined dependently on a grade and of an SDRAM and an operation clock to be used.

(SDRAM Commands)

Commands listed below are supported for the SDRAM. For details of the commands, refer to a SDRAM data book.

Mode register setting command

Active command

Precharge command

Write command

Read command

CBR (Auto) refresh command

Self refresh start command

Burst stop command

NOP command (SDRAM Refresh)

Since the SDRAM operates at 2048 cycles/32 ms (4096/64 ms), it issues a CBR refresh command at intervals of 16,625 ns. The memory controller has a settable refresh counter and automatically issues a CBR refresh command. The memory controller does not receive a refresh request during transfer of 16-burst ×n from the G bus. Therefore, the refresh counter must set a value with a margin of a time for the transfer of 16-burst ×4. Furthermore, the memory controller supports self refresh. When this command is issued, self refresh is continued in a power down mode (ramclke_L=Low).

(Initialization of SDRAM)

After power on reset, the memory controller initializes the SDRAM as described below. With a pause time of 100 $\mu$s after a power switch is turned on, the memory controller (1) precharges all the banks using precharge commands.

(2) sets a mode register for the SDRAM.

(3) performs refresh eight times using auto refresh commands.

<Flash ROM Controller (704)>

The flash ROM controller 704 supports an address signal romaddr[23:2] and four chip select signals (romCs_L[3:0]). Address signals romAddr2–romAddr9 are multiplexed with parity signals ramPar0–ramPar7 and address signals romAddr10–romAddr23 are multiplexed with DRAM addresses ramAddr0–ramAddr13.

<SRAM Control (Memory Front Cache)>

The SDRAM which is used as a main memory provides a remarkably high speed for the burst transfer but cannot exhibit a high speed for the single transfer. Therefore, a memory front cache is mounted in the memory controller to accelerate the single transfer. The memory front cache is composed of a cache controller 706 and an SRAM 702.

Since transfer masters and transfer lengths of the memory front cache can be known from the mTType[6:0] signal defined by the MC bus, the cache can be set on/off for each master or each transfer length. The cache is of types which are listed below. A designation of a cache denotes not a cache built in the processor core, but the memory front cache which is built in the memory controller unless otherwise specified.

2 way set associative

8-Kbyte data RAM

128×21×2 tag RAM

LRU (least recently used) algorithm

Write through

No write allocate

Figure 8:
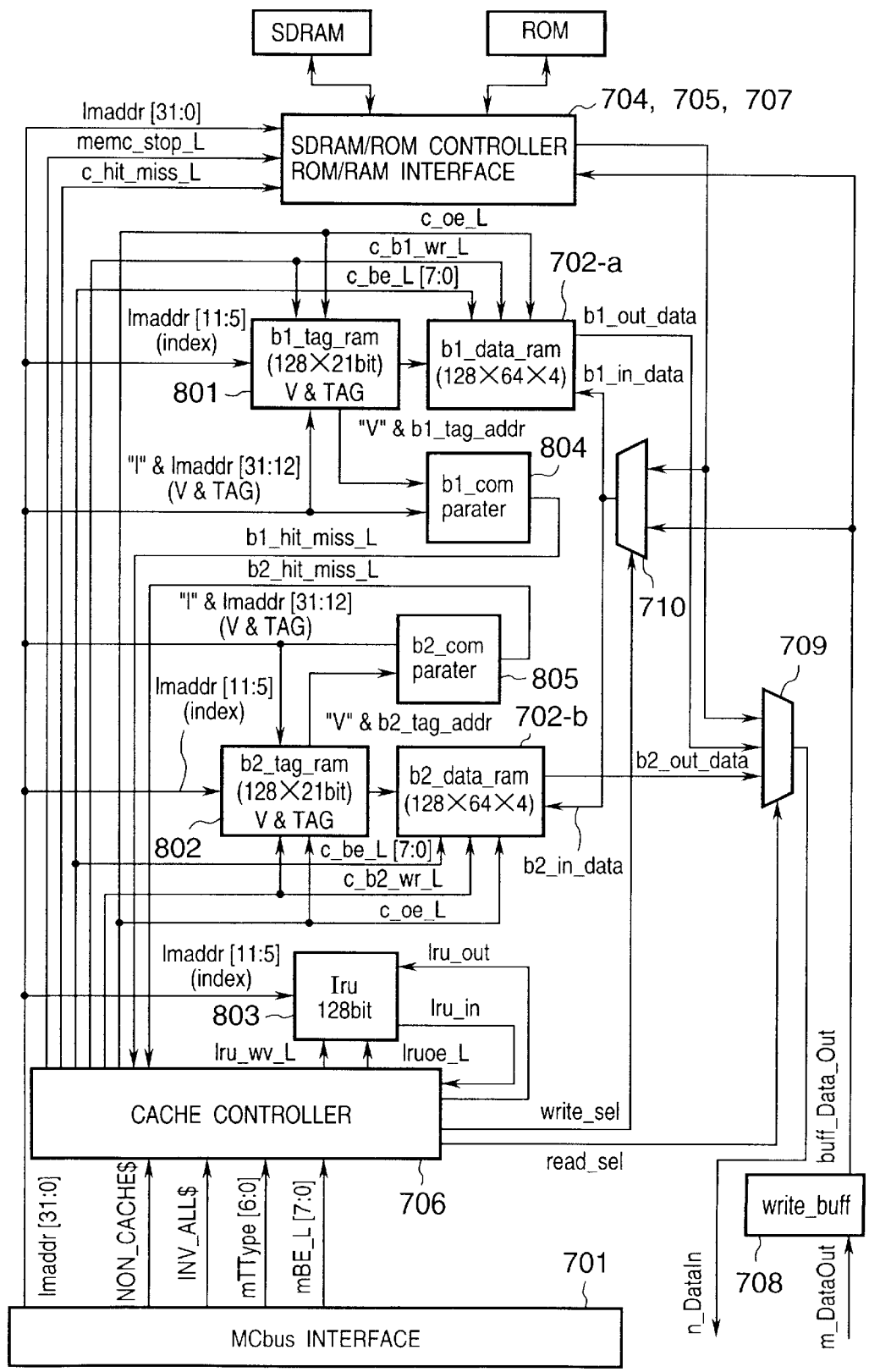
FIG. 8 is a detailed block diagram of a cache controller 706 and peripheral devices.

FIG. 8 shows a detailed block diagram of the cache controller 706 and surroundings.

(Operations of Cache)

With reference to the block diagram shown in FIG. 8 and flowcharts shown in FIGS. 9 and 10, description will be made of operations of the cache which are performed when a memory read/write transfer is requested from the MC bus.

When data transfer is started from the MC bus, the DoEngine judges whether the transfer is to be executed with the cache on or off by the mTType[6:0] which is indicated on the MC bus at an initial stage of the transfer. Let us assume in this embodiment that the DoEngine judges cache on for the single transfer and cache off for the burst transfer (step S901). That is, transfer is executed with the cache on when mTType(3) is "1" h indicating the single transfer or with the cache off when mTType(3) is "0" h indicating the burst transfer.

When an address lmaddr[31:0] is given in case of the single transfer (cache on), lmaddr[11:5] is given as an index to b1_tag_ram 801, b2_tag_ram 802, b1_data_ram 702-a, b2_data_ram 702-b, and lru 803, and a valid bit "v" and b1_tag_addr which correspond to the input indices as well as a valid bit "v," b2_tag_addr, b1_out_data, b2_out data and lru_in are output from each block (step S902).

b1_tag_addr and b2_tag_addr output from the b1_tag_ram 801 and the b2_tag_ram 802 are compared with an address lmaddr[31:12] by a b1_comparator 804 and a b2_comparator 805, whereby hit or miss is informed to the cache controller 706 for judgement by b1_hit_miss_L or b2_hit_miss L signal (step S903).

In case of hit, the cache controller 706 judges read or write (step S904). Hit means that the b1_tag_addr or b2_tag_addr is coincident with lmaddr [31:12]. In case of hit and read, the cache controller 706 operates as follows. When b1 is hit and requested transfer is read, the cache controller 706 selects b1_out_data out of b1_out_data and b2_out_data which have been read out, and outputs 8-byte data indicated by lmaddr[4:3] to the MC bus (step S905). Simultaneously, the cache controller 706 rewrites lru corresponding to the index into "0" (=b1 hit) to terminate the transfer. When b2 is hit and requested transfer is read, the cache controller 706 selects b2_out_data out of b1_out_data and b2_out_data which have been read out, and outputs 8-byte data indicated by lmaddr[4:3] to the MC bus (step S905). Simultaneously, the cache controller 706 rewrites lru corresponding to the index into "1" h (=b2 hit) to terminate the transfer.

In case of hit and write, on the other hand, the cache controller 706 operates as follows. When b1 is hit and requested transfer is write, the cache controller 706 rewrites only a valid byte lane indicated by mBE_L[7:0] out of 8-byte data indicated by lmaddr[4:3] of b1_data_ram 702-a indicated by the index and simultaneously rewrites lru corresponding to the index into "0" h (b1 hit). Furthermore, the cache controller 706 similarly rewrites SDRAM to terminate the transfer (step S906). When b2 is hit and the requested transfer is write, the cache controller 706 rewrites only a valid byte lane indicated by mBE_L[7:0] out of the 8-byte data indicated by lmaddr[4:3] of b2_data_ram 702-b indicated by the index and simultaneously rewrites lru corresponding to the index into "1" h (=b2 hit). Furthermore, the cache controller 706 similarly rewrites SDRAM to terminate the transfer (step S906).

When both b1 and b2 are missed, on the other hand, the cache controller 706 judges read or write (step S1001). When the requested transfer is read, 8-byte data indicated by its lmaddr[31:3] is readout of the SDRAM (step S1003) and output to the MC bus (step S1004). Simultaneously, lru corresponding to the index is read out and when lru is "0" h, the data from the SDRAM is written into b2_data_ram and lru is also rewritten into "1" h. When lru is "1" h, the data from the SDRAM is written into b1_data_ram and lru is rewritten into "0" h to terminate the transfer (step S1005). When both b1 and b2 are missed and the requested transfer is write, the cache controller 706 only writes the data into the SDRAM to terminate the transfer (step S1002).

In case of burst transfer (cache off) at step S901, the cache controller 706 reads and writes data from and into the SDRAM only (steps S907 through S909) without rewriting cache data or tag.

<ROM/RAM Interface (707)>

Figure 11:
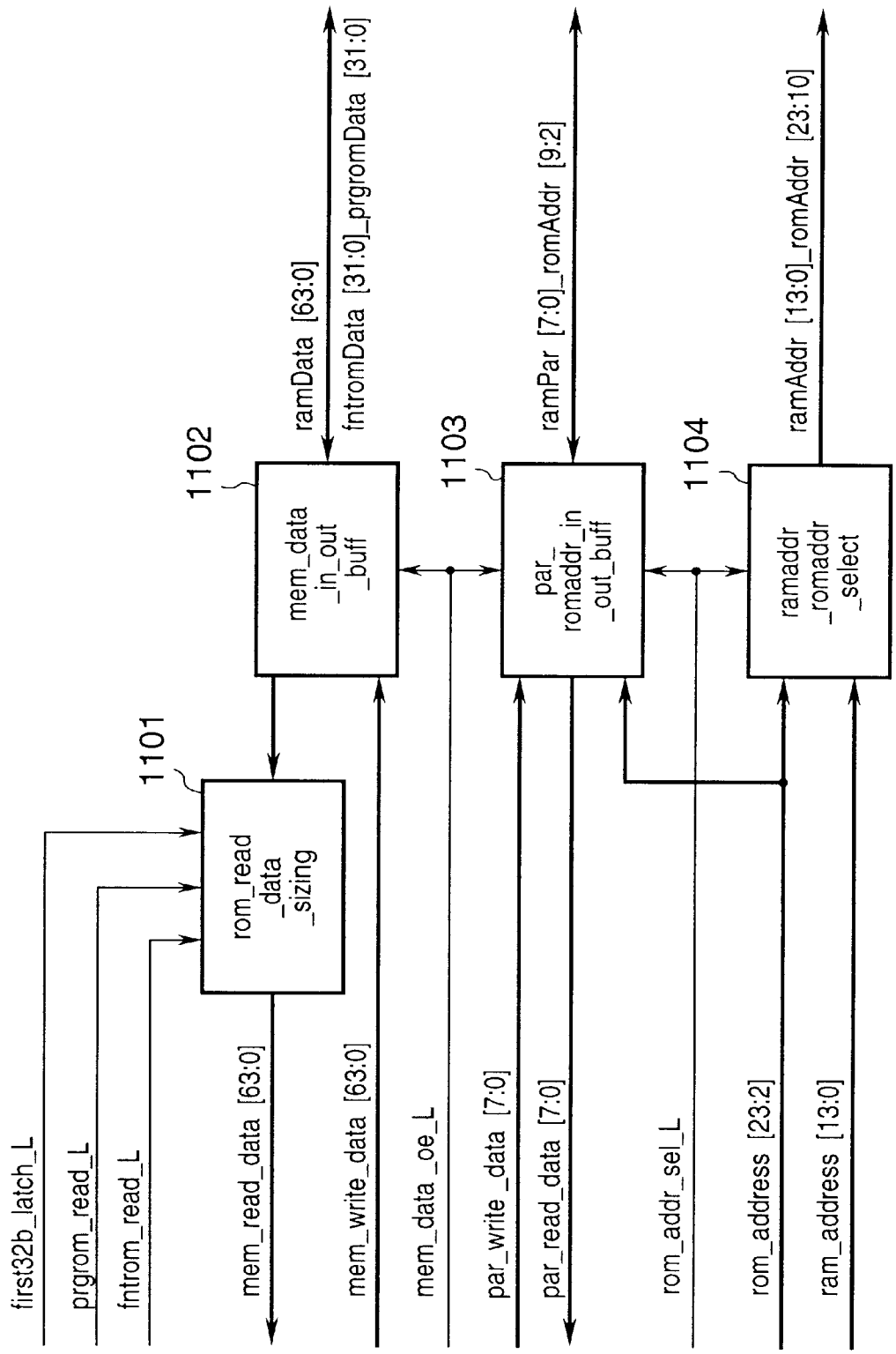
FIG. 11 is a diagram showing a configuration of a ROM/RAM controller 707.

FIG. 11 shows a configuration of a ROM/RAM controller 707. Blocks 1101 through 1104 multiplex a data signal, an address signal and a parity signal of the SDRAM into a data signal and an address signal of a flash ROM.

2.4.3. Timing Diagram

With reference to FIGS. 12 through 19, description will be made of timings of the processings such as data read and write by the memory controller 403 which have been explained above.

Figure 12:
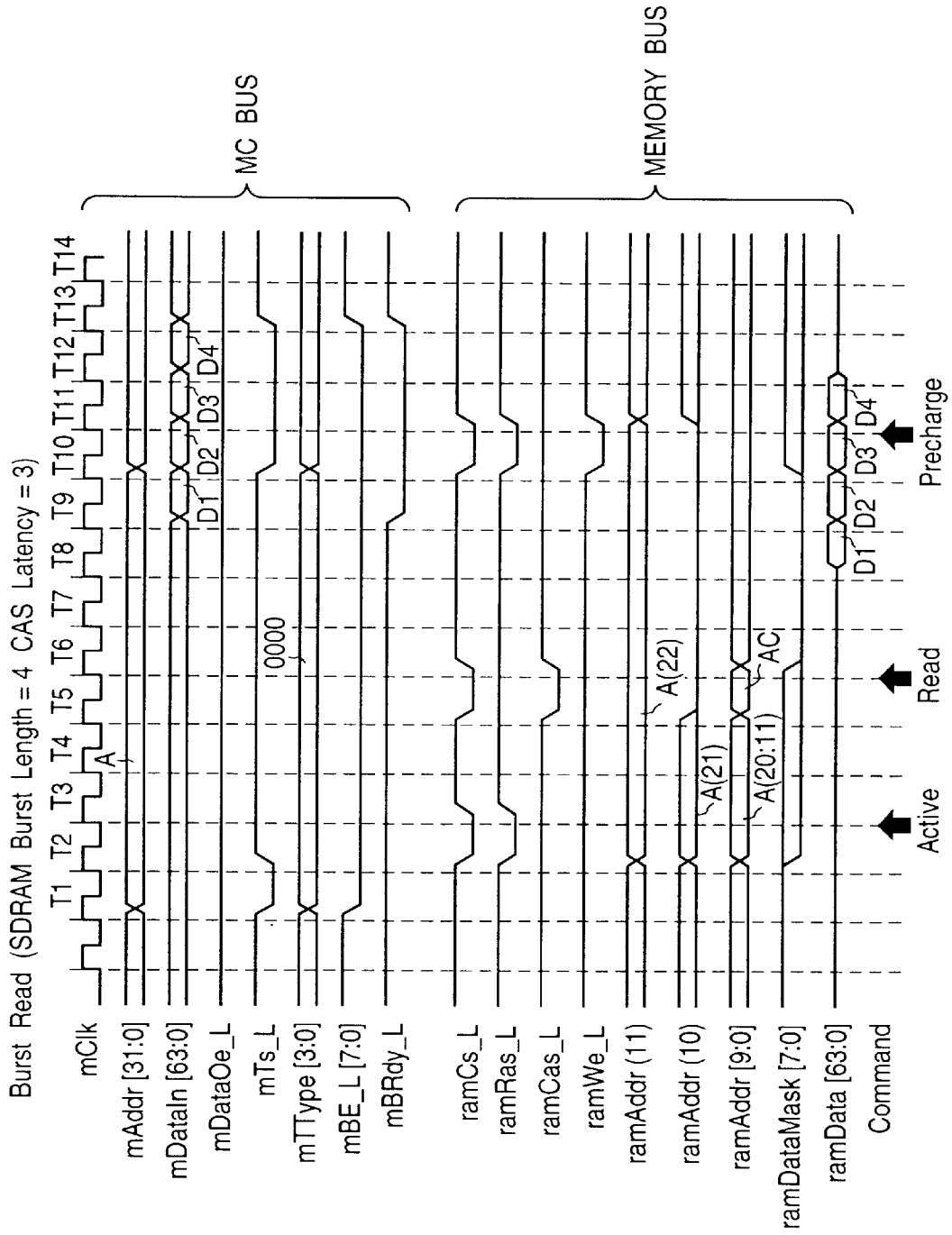
FIG. 12 is a timing chart showing a timing of burst read by a CPU.

FIG. 12 shows a timing of burst read from the CPU. A burst length is 4 and a CAS latency is 3. FIG. 12 corresponds to the processing at the step S909 in FIG. 9.

Figure 13:
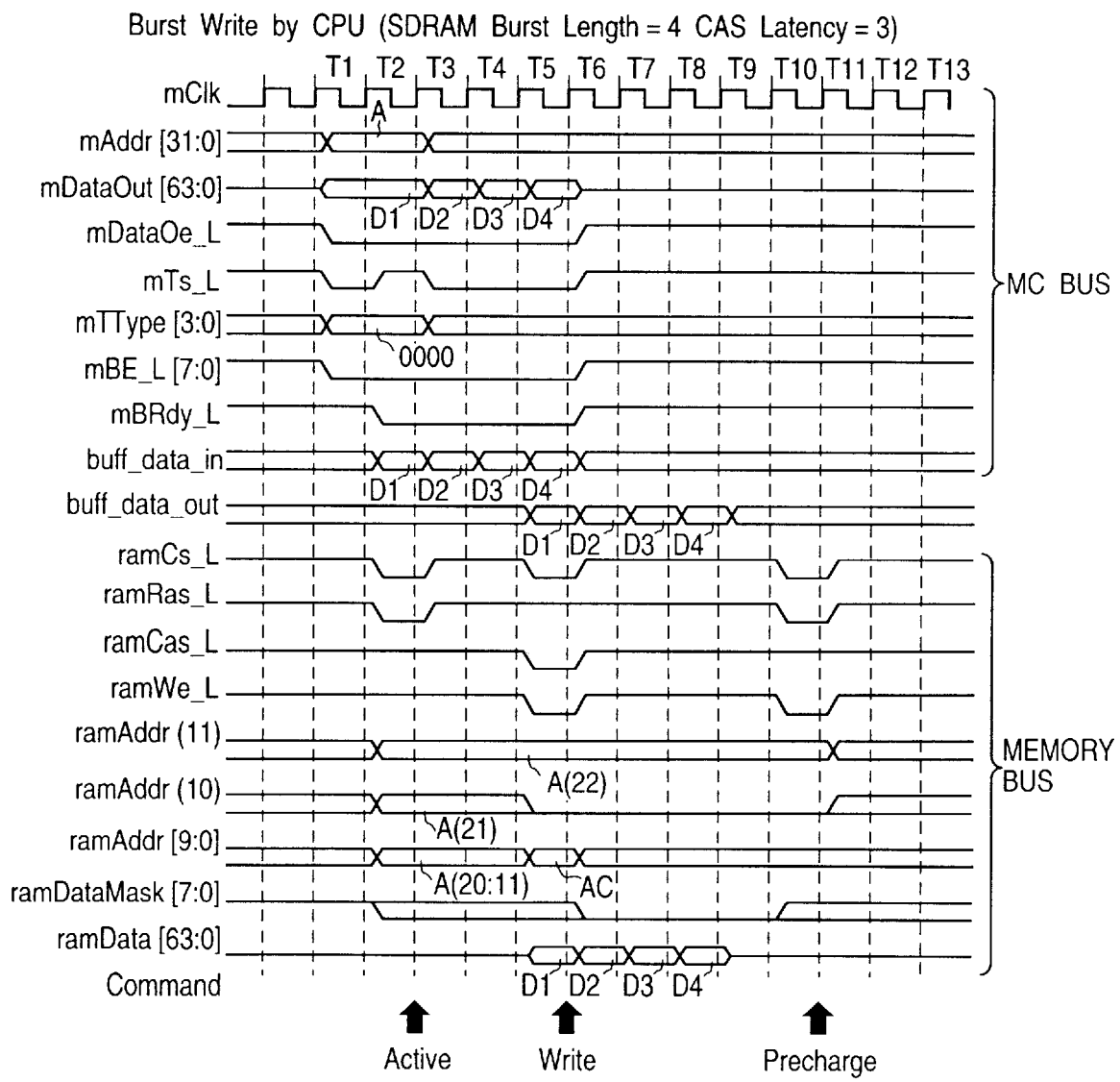
FIG. 13 is a timing chart showing a timing of burst write by the CPU.

FIG. 13 shows a timing of burst write from the CPU. A burst length is 4 and a CAS latency is 3. FIG. 13 corresponds to the processing at the step S908 in FIG. 9.

Figure 14:
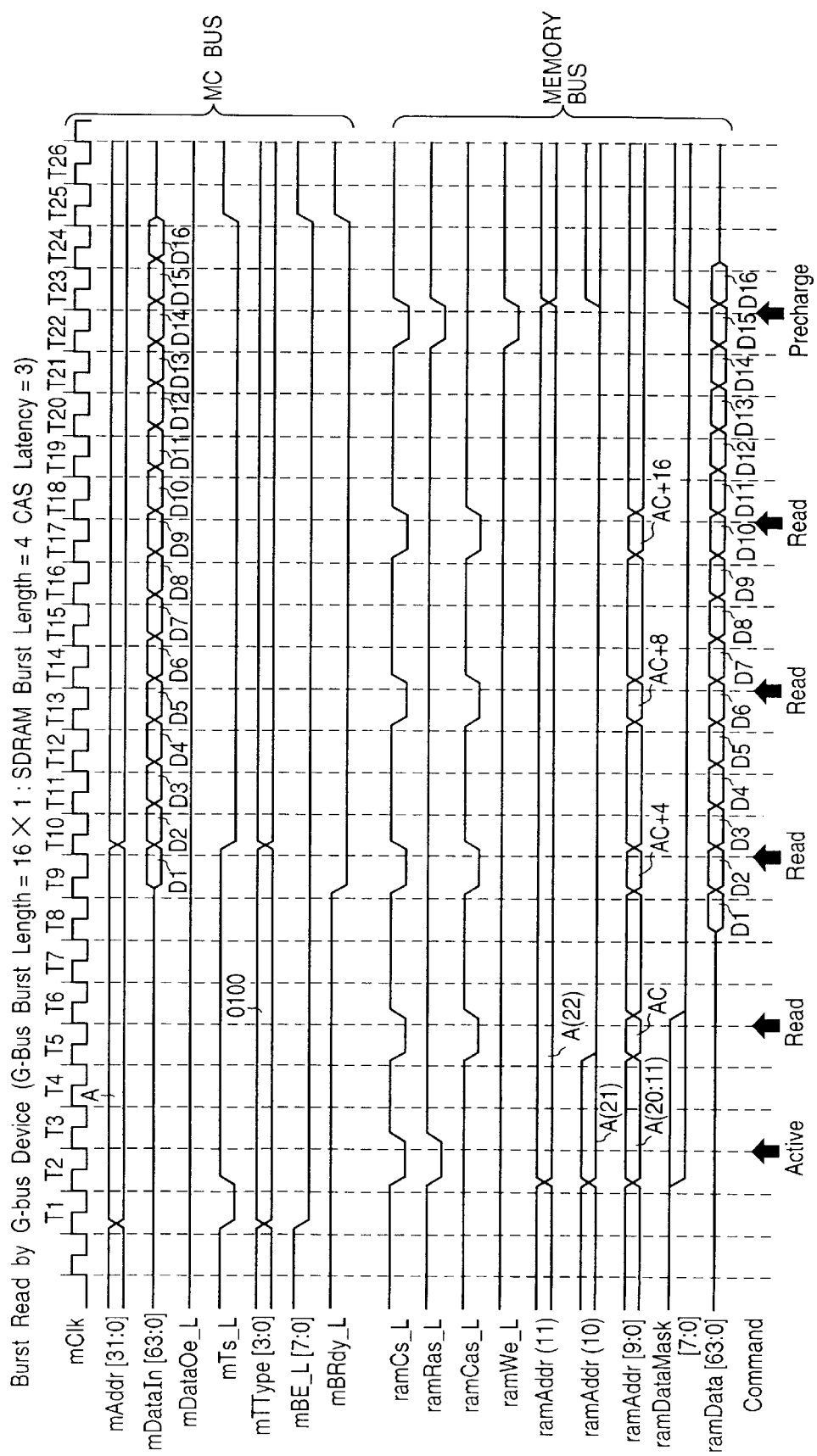
FIG. 14 is a timing chart showing a timing of burst read by a G-bus device.

FIG. 14 shows a timing of burst read from the G bus device. A burst length of the G bus is 16, a burst length of the SDRAM is 4 and a CAS latency is 3. FIG. 14 corresponds to the processing at the step S909 in FIG. 9.

Figure 15:
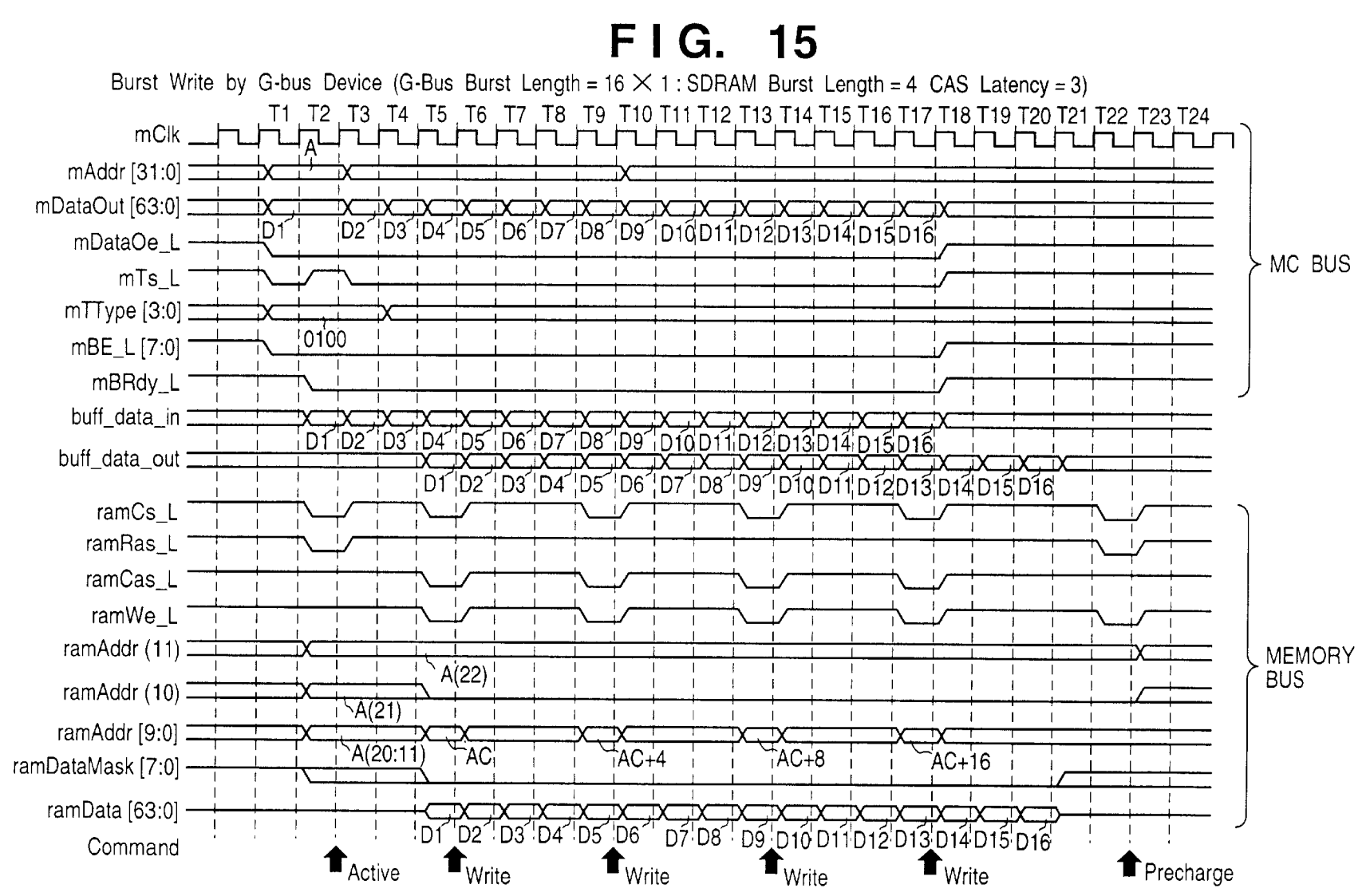

FIG. 15 shows a timing of burst write from the G bus device. A burst length of the G bus is 16, a burst length of the SDRAM is 4 and a CAS latency is 3.

Figure 9:
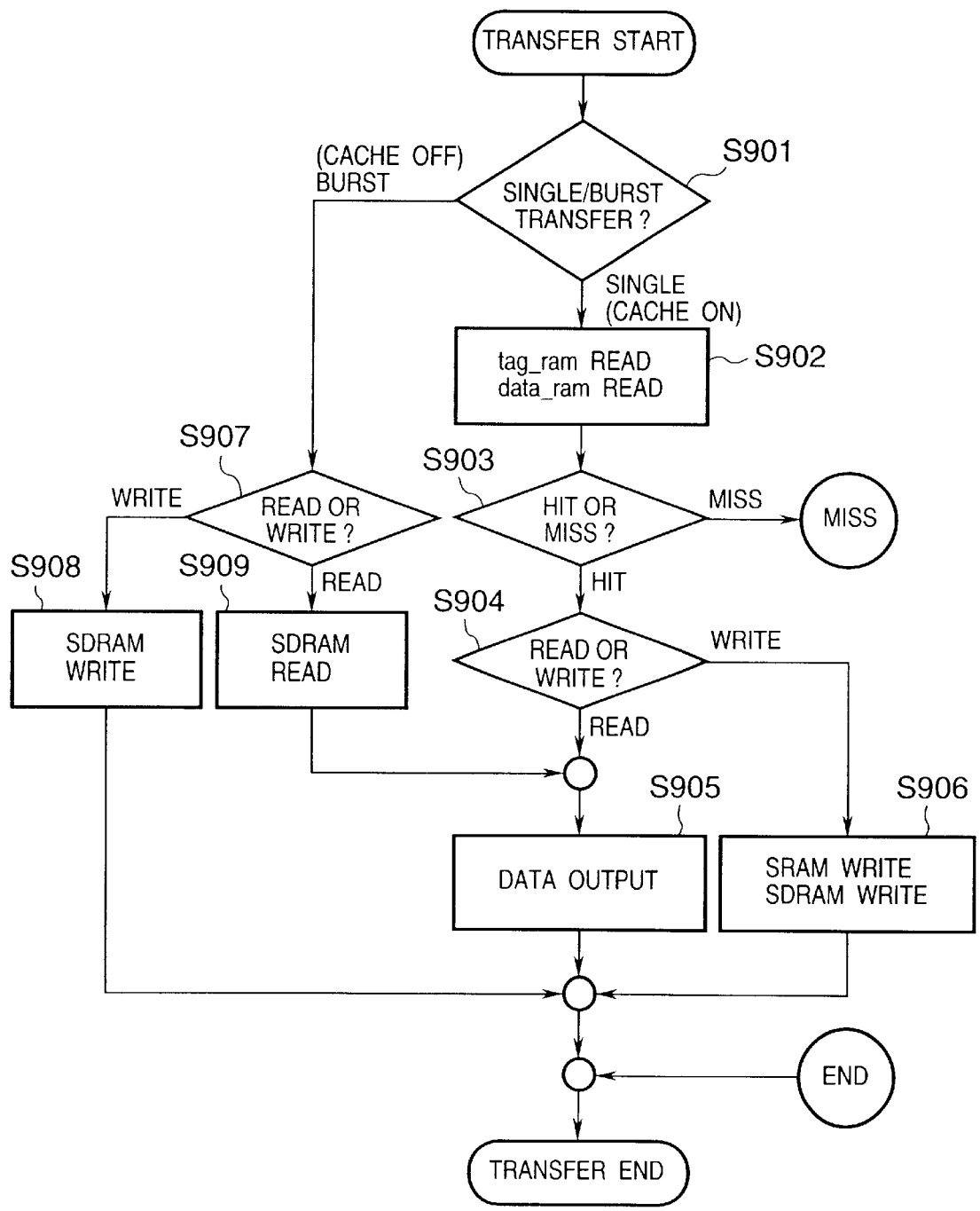
FIG. 9 is a flowchart showing operations of a cache when a memory read/write transfer is requested from an MC bus.

FIG. 15 corresponds to the processing at the step S908 in FIG. 9.

Figure 16:
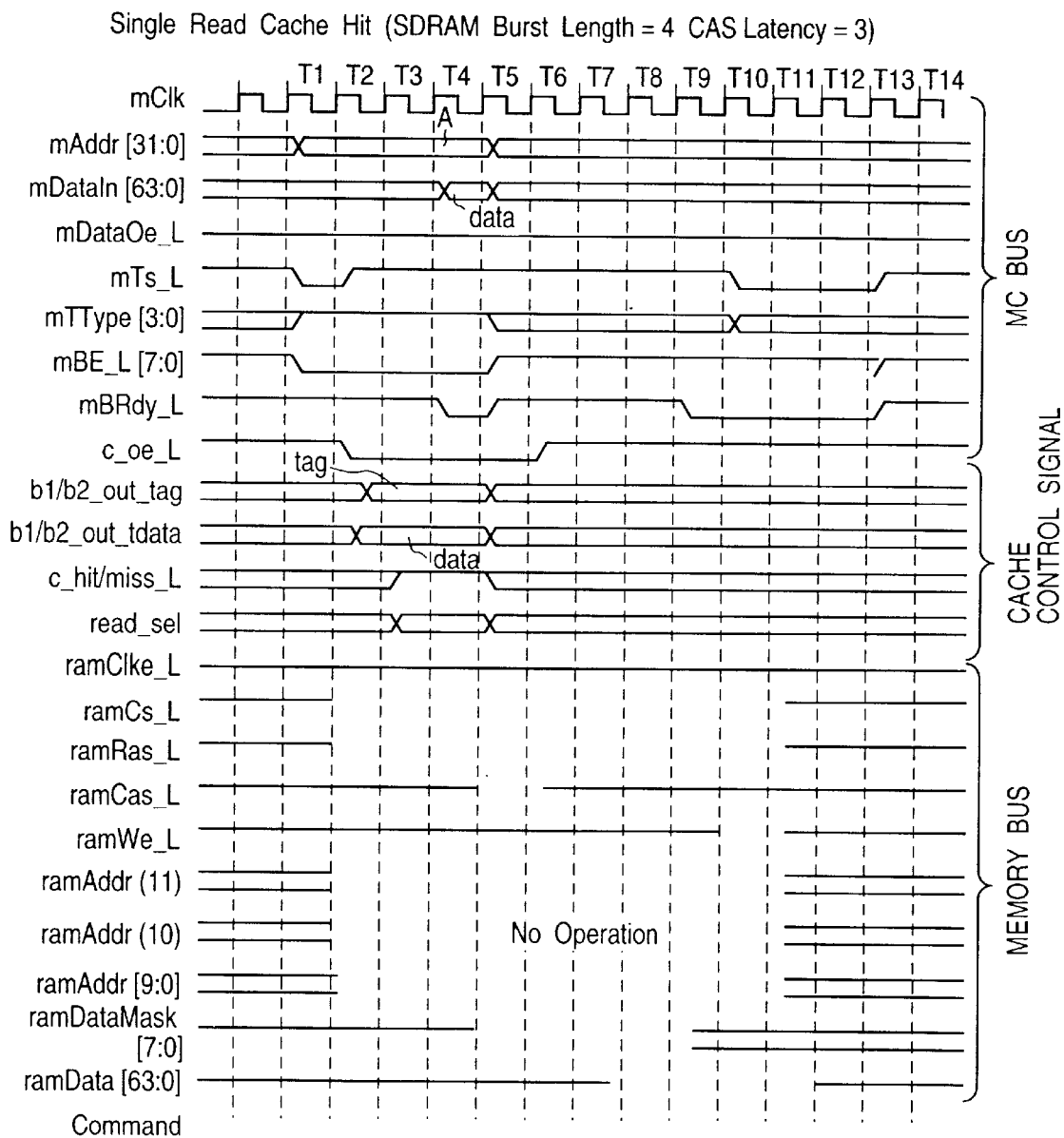
FIG. 16 is a timing chart showing a timing of single read when a memory front cache is hit.

FIG. 16 a timing of single read when the memory front cache is hit. Output as read data mDataIn[63:0] is b1/b2_out_data read out of b1_data_ram 702-a or b2_data_ram 702-b which is a cache memory. A burst length of the SDRAM is 4 and a CAS latency is 3. FIG. 16 corresponds to the processing at the step S905 in FIG. 9.

Figure 17:
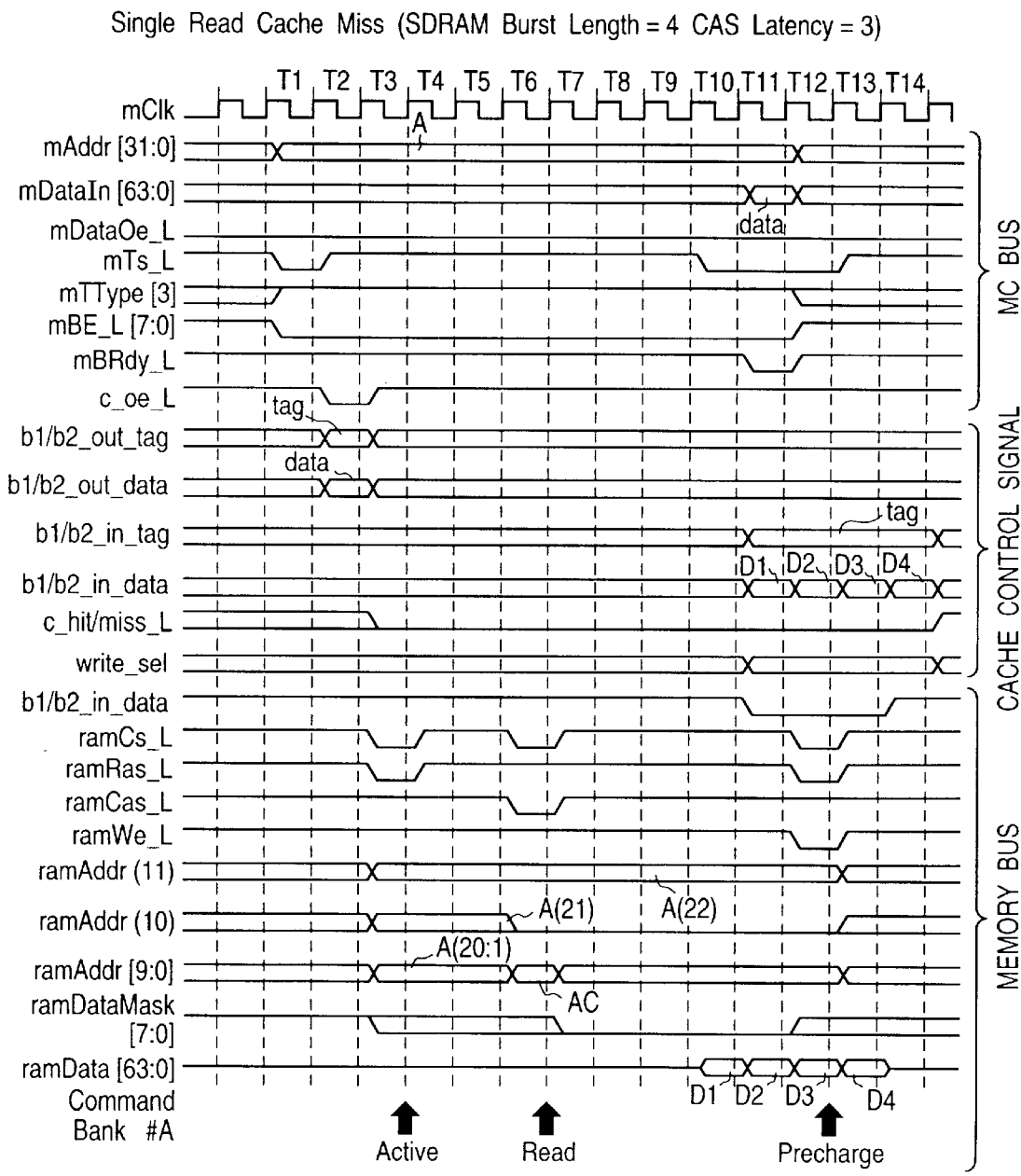
FIG. 17 is a timing chart showing a timing of single read when the memory front cache is not hit.

FIG. 17 shows a timing of single read when the memory front cache is not hit. Output as read data mDataIn[63:0] is ramData[63:0] which is read from the SDRAM. This data is also written as b1/b2_in_data into b1_data_ram 702-a or b2_data_ram 702-b which is a cache memory. A burst length of the SDRAM is 4 and a CAS latency is 3. FIG. 17 corresponds to the processing at step S1004 or S1005 in FIG. 10.

Figure 18:
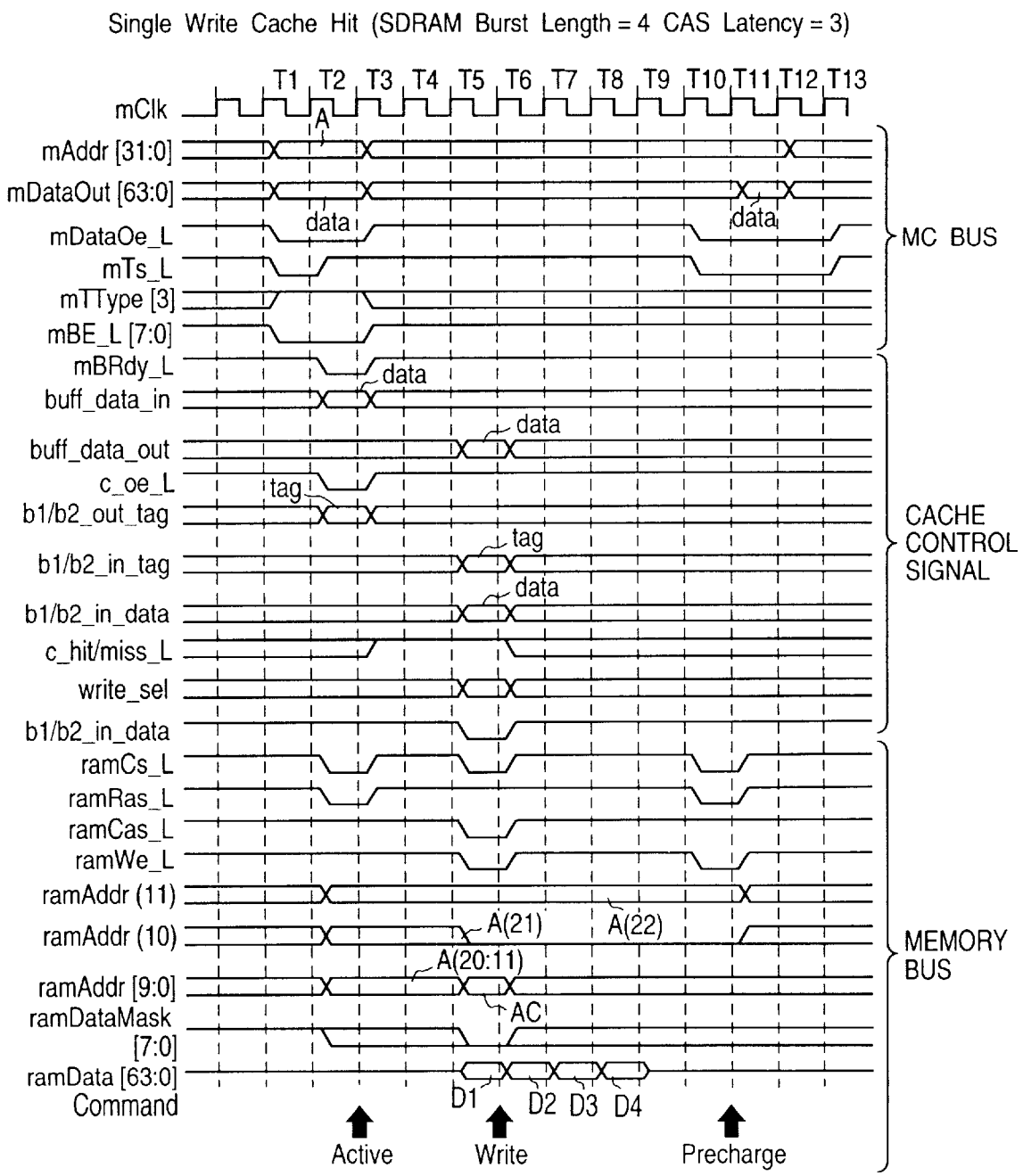
FIG. 18 is a timing chart showing a timing for single write when the memory front cache is hit.

FIG. 18 shows a timing of single write when the front memory cache is hit. Write data mDataOut[63:0] is written into b1_data_ram 702-a or b2_data_ram 702-b which is the cache memory and the SDRAM. A burst length of the SDRAM is 4 and a CAS latency is 3. FIG. 18 corresponds to the processing at step S906 in FIG. 9.

Figure 19:
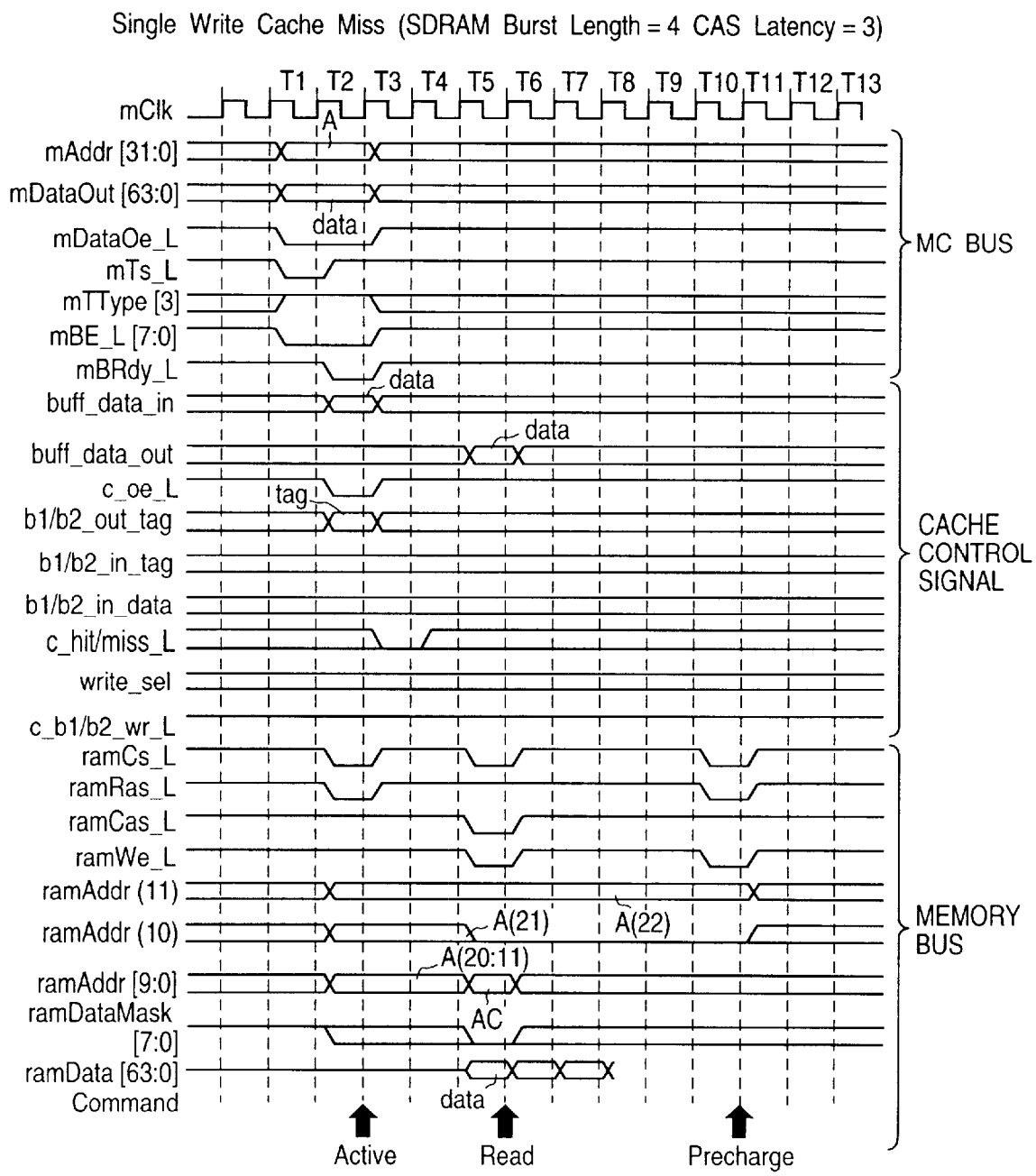
FIG. 19 is a timing chart showing a timing for single write when the memory front cache is not hit.

FIG. 19 shows a timing of single write when the memory front cache is not hit. The write data mDataOut[63:0] is written not into b1_data_ram 702-a or b2_data_ram 702-b, but only into the SDRAM. A burst length of the SDRAM is 4 and a CAS latency is 3. FIG. 19 corresponds to the processing at step S1002 in FIG. 10.

Though the memory controller 403 is configured to judge, upon start of the data transfer from the MC bus, the single transfer as cache on or burst transfer as cache off using mTType[6:0] indicated on the MC bus at an initial stage of the data transfer in this embodiment, the memory controller 403 may be configured to further judge a burst length in case of the burst transfer and when the burst length is shorter than a line of the cache, operate with the cache kept on or otherwise operate with the cache kept off.

When signals indicating the identifiers of bus masters which request data transfer to memories are included in the MC bus, the memory controller can judge the identifiers and performs the cache on/cache off control in correspondence to the indetifiers. In this case, it is possible to switch cache on/cache off referring to a rewritable table which is prepared to correspond the identifiers to cache on/cache off. when a specific address is allocated to this table, for example, it is rewritable from the CPU 401 or the like.

2.5. System Bus Bridge (SBB), B Bus and G Bus

Figure 20:
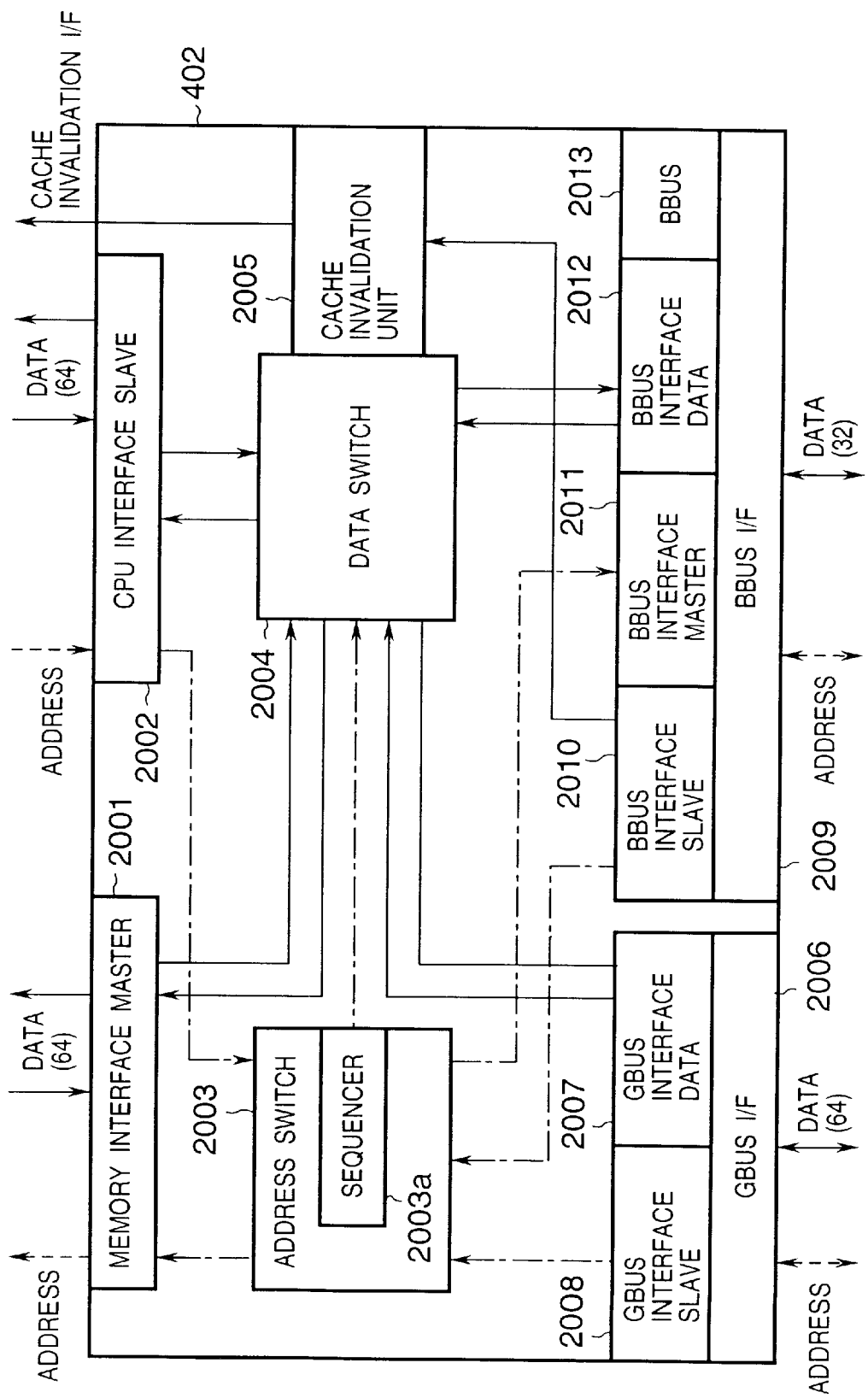
FIG. 20 is a block diagram of a system bus bridge (SBB) 402.

FIG. 20 shows a block diagram of the system bus bridge (SBB) 402. The SBB 402 is a multi-channel two-way bus bridge which provides connections among the B bus (input/output bus), the G bus (graphics bus), the SC bus (processor local bus) and the MC bus with crossbar switches. The SBB 402 is capable of establishing two systems at the same time by using crossbar switch, thereby enabling to performs high-speed data transfer with high parallelelism.

The SBB 402 is equipped with a B bus interface 2906 for connection to the B bus 405, a G bus interface 2006 for connection to the G bus 404, a CPU interface slave port 2002 for connection to the processor core 401 and a memory interface master port for connection to the memory controller 403, and comprises an address switch 2003 for connecting an address bus and a data switch 2004 for connecting a data bus. Furthermore, the SBB 402 is equipped with a cache invalidation unit 2005 which invalidates the cache memory of the processor core.

Mounted in the B bus interface 2009 are a write buffer which accelerates DMA write from the B bus device and read prefetch queues which enhance a read efficiency of the B bus device. Coherency management of data which exists temporarily in these queues is performed by hardware. In addition, a device which is connected to the Bbus is referred to as a device.

The processor core supports dynamic bus sizing of a 32-bit bus, but the SBB 402 does not support it. This is for the purpose of minimizing a modification of the SBB required in the future to use a processor which does not support the bus sizing.

2.5.1. Configurations and Operations of SBB and Buses

<B Bus Interface>

Figure 21:
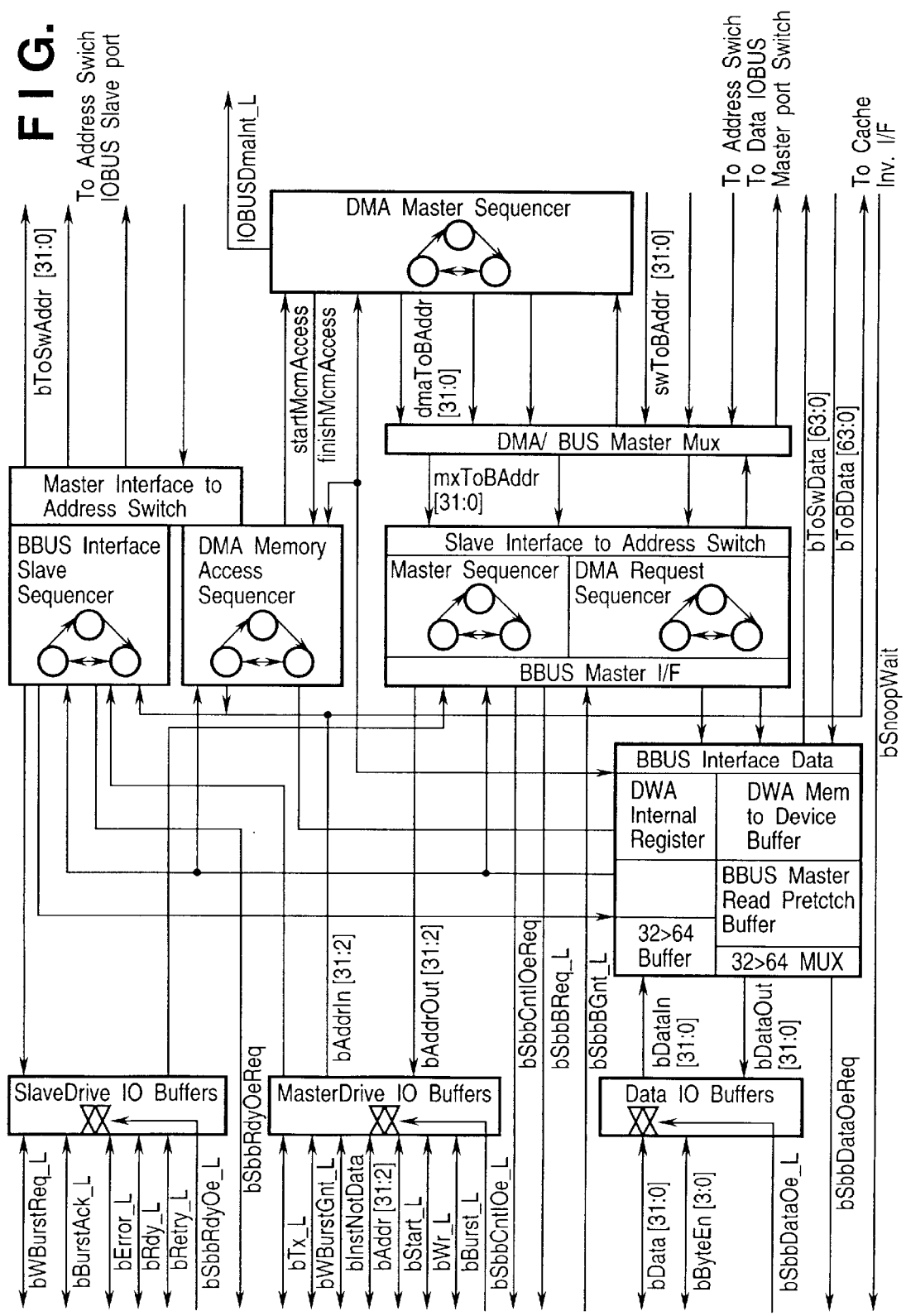
FIG. 21 is a block diagram of a B bus interface.

FIG. 21 shows a block diagram of the B bus interface.

The B bus interface 2009 is a two-way bridge circuit between the B bus and the MC bus. The B bus is an internal general purpose bus of the DoEngine.

The B bus interface 2009 comprises five blocks of a master control block 2011, a slave control block 2010, a data interface 2012, a DMAC 2013 and a B bus buffer. In FIG. 21, the DMAC 2013 is functionally divided into three sequencers and a register block. Out of these three sequencers, a DMA memory access sequencer is built in the B bus slave control block 2010 and a DMA reg sequencer is built in the B bus master control block 2011. A DMA register, which is a register block, is built in the B bus data interface 2012.

Furthermore, the B bus interface 2009 controls to invalidate two data and instruction caches in the CPU shell by way of a cache invalidation interface when data is written into a memory from the B bus or when data is transferred by the DMA from the device to the memory.

A writeback buffer at a CPU write time is not mounted in the B bus interface, but a write buffer at external master write on the B bus is mounted. Accordingly, the B bus interface accelerates writes from successive external masters which are not burst transfer. Flash of this write buffer is performed when the memory is allowed to be connected by the B bus arbiter 407. Write buffer bypass of the B bus master read is not made.

Furthermore, a read prefetch queue of the external master is executed. It is executed to accelerate successive read of data streams from the external master. The read buffer is invalidated when:

1. New read of the B bus does not hit data in the buffer.
2. Data is written from the CPU into the memory.
3. Data is written from the G bus into the memory.
4. Data is written from the B bus into the memory.

Furthermore, each device on the B bus 405 and a DMA controller 2013 between the memories are built in the B bus interface 2009. When the DMA controller is built in the system bus bridge 402, access requests can be issued simultaneously to both the bridges, thereby performing efficient DMA transfer.

The B bus interface 2009 does not request use of the dynamic bus sizing in correspondence to an access request from the processor 401. The B bus interface 2009 neither responds to bus sizing from the memory controller 403 when the B bus master requests a memory access. That is, the memory controller is not to expect the bus sizing.

<B Bus>

The B bus is a general purpose IO bus in the DoEngine and specified for:

Address-data discrete type 32-bit bus

Capability to insert an optional weight cycle, no weight shortest

Support of burst transaction

Maximum transfer speed of 200 Mbytes/sec at clock of 50 MHz

Support of bus error and bus retry

Support of a plurality of bus masters.

(Definitions of B Bus Signals)

Definitions of bus signals are described below in an order of "signal name, input source→output destination (, 3States) . . . description of signal." An items of 3State is provided only for a signal which has three states.

bAddr[31:2] (IOBus Address Bus): Master→Slave, 3State . . . An address bus for IOBus.

bData[31:0] (IOBus Data Bus): DataDriver→DataReceiver, 3state . . . A data bus for IOBus.

b(Datadrivername)DataOeReq (IOBus Data Output Enable Request): Datadriver→DefaultDriverLogic . . .

An output signal sent to a default driver control logic to realize a two-way IO bus described later. This is a request signal for a device having a Datadrivername to drive data on a bus. A default driver control logic outputs b(Datadrivername)DataOe_L to a device which is granted to output data. Example of Datadriver: Pci,Sbb,Jpeg,Spu.

b (Datadrivername) DataOe_L (IOBus Data Output Enable): dfaultDriverLogic→Datadriver . . .

When the default driver logic allows a device which outputs b(Datadrivername)DataOeReq to drive data on a data bus, the b(Datadrivername)DataOe_L signal is returned to the device.

bError_L (IOBus Bus Error): Salve→Master 3State . . . Indicates an end of IO bus transaction due to an error.

b(Mastername)BGnt_L (IOBus Grant): Arbiter→Master . . .

Indicates that bus arbitration grants a right of bus use to the master. Example of Mastername: Pci,Sbb,Jpeg,Spu.

bInstNotData (IOBus Instruction/Data Output Indicator): Master→Slave, 3State . . .

Driven to High when the B bus master performs instruction fetch to the B bus slave. Driven to Low in case of data transaction.

b(Mastername)CntlOeReq (IOBus Master Control Output Enable Request): Master→DefaultDriverLogic . . .

Asserted to IOBus Output Control Logic when the B bus master wants to drive bStart_L,bTx_L,bWr_L, vInstNotData and bAddr[31:2] on a three-state bus. The IOBus Output Control Logic returns a b(Mastername) CntlOe_L signal to a master which grants drive on the basis of bMCntlOeReq.

b(Mastername)ContlOe_L (IOBus Master Control Output Enable):DefaultDriverLogic→Master . . .

When the default driver logic grants drive to a master which outputs b(Mastername)CntlOeReq, the b(Mastername)CntlOe_L signal is returned to the master.

bRdy_L (IOBus Ready): Slave→Master, 3State . . .

The B bus slave asserts this signal to indicate that current B bus data transaction terminates with a current clock cycle. The B bus master knows by this signal that the current transaction terminates with this clock cycle.

b(Mastername)BReq_L (IOBus Bus Request): Master→Arbiter . . .

Indicates that the B bus master requests a right of bus use to the B bus arbiter.

bRetry_L (IOBus Bus Retry): Slave→Master 3State . . .

A B bus slave requests re-execution of bus transaction to the master.

b(Slavename)RdyOeReq (IOBus Slave Ready Output Enable Request): Slave→DefaultDriverLogic . . .

The B bus slave asserts this signal to IOBus Output Control Logic when it desires to drive bRdy_L, bWBurstReq_L,bBurstAck_L on a 3-state bus. The IOBus DefaultDriverLogic returns a b(Slavename)Rdyoe_L signal to a slave to which drive is granted on the basis of b(Slavename)RdyOeReq from each master.

b(Slavename)RdyOe_L (IOBus Slave Ready Output Enable): DefaultDriverLogic→Slave . . .

When the default driver logic grants drive to a master which outputs b(Slavename)RdyOeReq, the b(Slavename) RdyOe_L signal is returned to the master.

bSnoopWait (IOBus Snoop Wait): SBB→NextMaster . . .

Indicates that the B bus interface is executing cache snooping for another device connected to the B bus. The device connected to the B bus cannot issue a new transaction while this signal is asserted.

bStart_L (IOBus Transaction START): Master→Slave 3State . . .

Signal to indicate that the B bus master starts a B bus transaction. The B bus slave can know the start of the B bus transaction by monitoring this signal.

bTx_L (IOBus Transaction Indicator Input): Master→Slave 3State . . .

The B bus master asserts this signal to the B bus slave to indicate the B bus transaction is currently being executed.

bWBurstGnt_L (IOBus Burst Write Grant): Master→Slave, 3State . . .

This signal is driven to indicate that the B bus master executes burst write in response to a B bus burst write request.

bWBurstReq_L (IOBus Burst Write Request): Slave→Master, 3State . . .

This signal is asserted when the B bus slave requests burst write to the B bus master.

bWr_L (IOBus Write Transaction Indicator): Master→Slave, 3 State . . .

This signal is asserted to allow the B bus master to inform to the B bus slave that a current transaction is write.

bByteEn[3:0] (IOBus Byte Enables): DataDriver→DataReceiver, 3State . . .

An agent which drives data on the B bus drives this signal to High to indicate that a byte lane on bData[31:0] corresponding to each bit is valid. Lines on this signal correspond to bData byte lanes as listed in Table 4.

TABLE 4

| Byte Enable | Corresponding bData [31:0] |
| --- | --- |
| bByteEn3 | [31:24] |
| bByteEn2 | [23:16] |
| bByteEn1 | [15:8] |
| bByteEn0 | [7:0] | bBurst_L (IOBus Extended Burst Request): Master→Slave, 3State . . .

Indicates that the B bus master desires to execute extended burst. Assert and negate timings are the same as those of bTx_L.

bBurstAck_L (IOBus Extended Burst Acknowledge): Slave→Master, 3State . . .

Indicates that the B bus slave can execute extended burst. Assert and negate timings are the same as those of bRdy_L.

bBurstShortNotLong_L (IOBus Burst Length): Master→Slave, 3State . . .

Indicates a burst length of an extended burst to be executed by the B bus master. Assert and negate timings are the same as those of bTx_L, and signal values correspond to burst length as listed in Table 5.

TABLE 5

| bBurstShortNotLong_L | Burst Length |
| --- | --- |
| H | 4 beats |
| L | 8 beats |

The B bus signals are defined as described above. Since the B buses (and G buses) which are the internal buses of the DoEngine are to be connected to more than ten functional blocks, it is difficult to connect all the blocks through an InOut separate bus. The DoEngine adopts a two-way bus in the chip.

<G Bus Interface>

Figure 22:
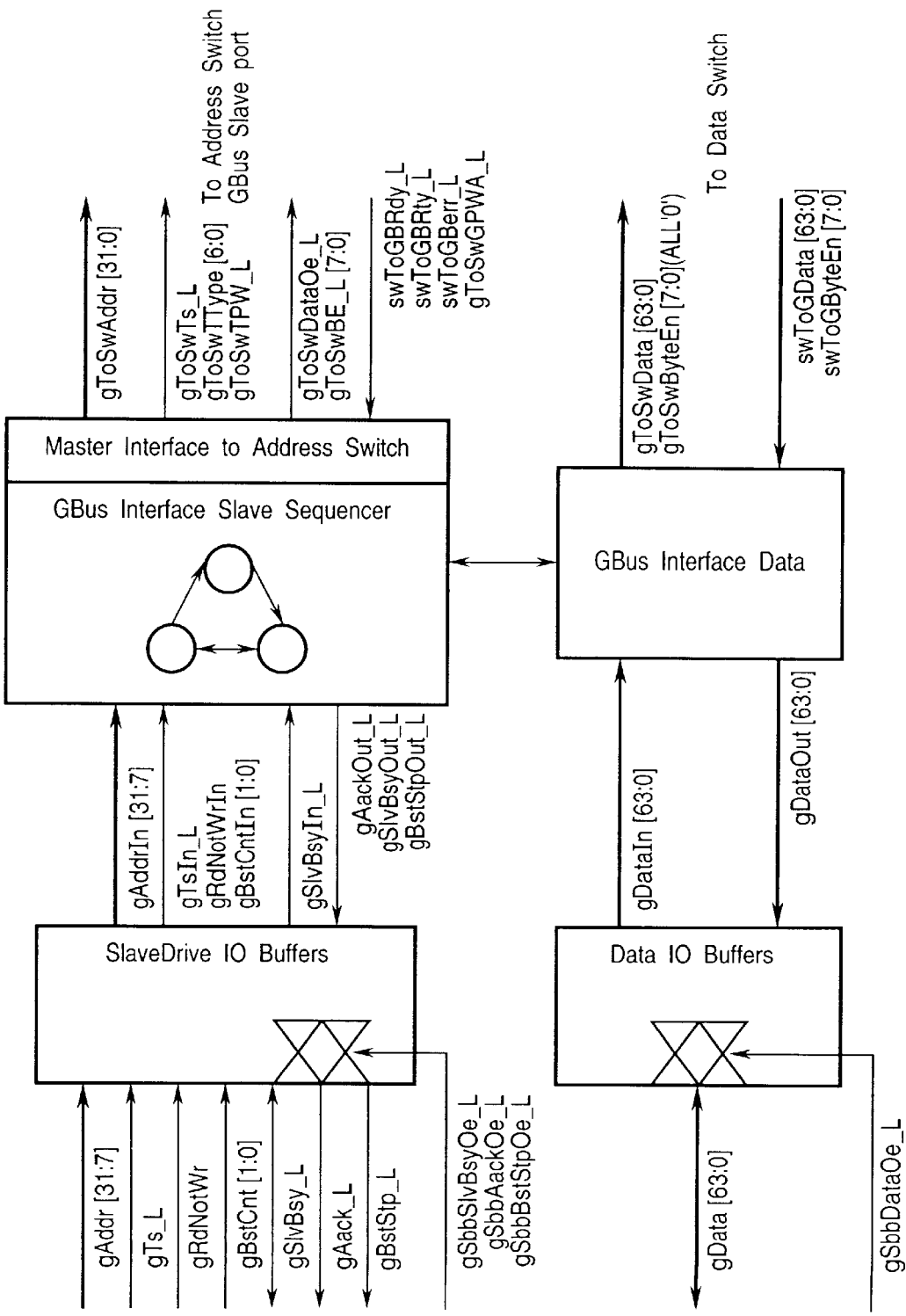
FIG. 22 is a block diagram of a G-bus interface 2006.
Figure 23:
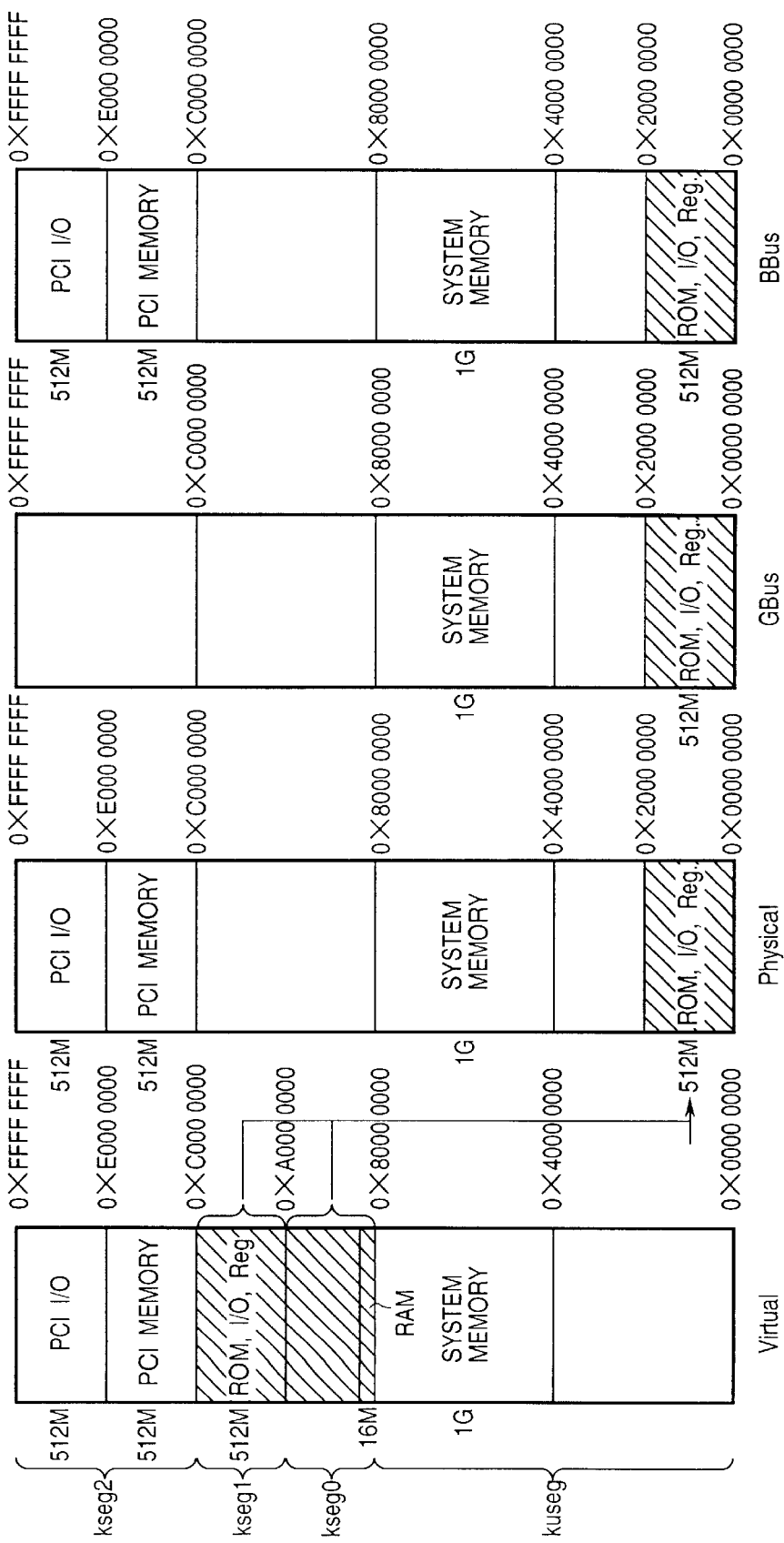
FIGS. 23A through 23D are diagrams showing a virtual memory map, a physical memory map, a memory map in an address space of the G bus and a memory map in an address space of the B bus.
Figure 24:
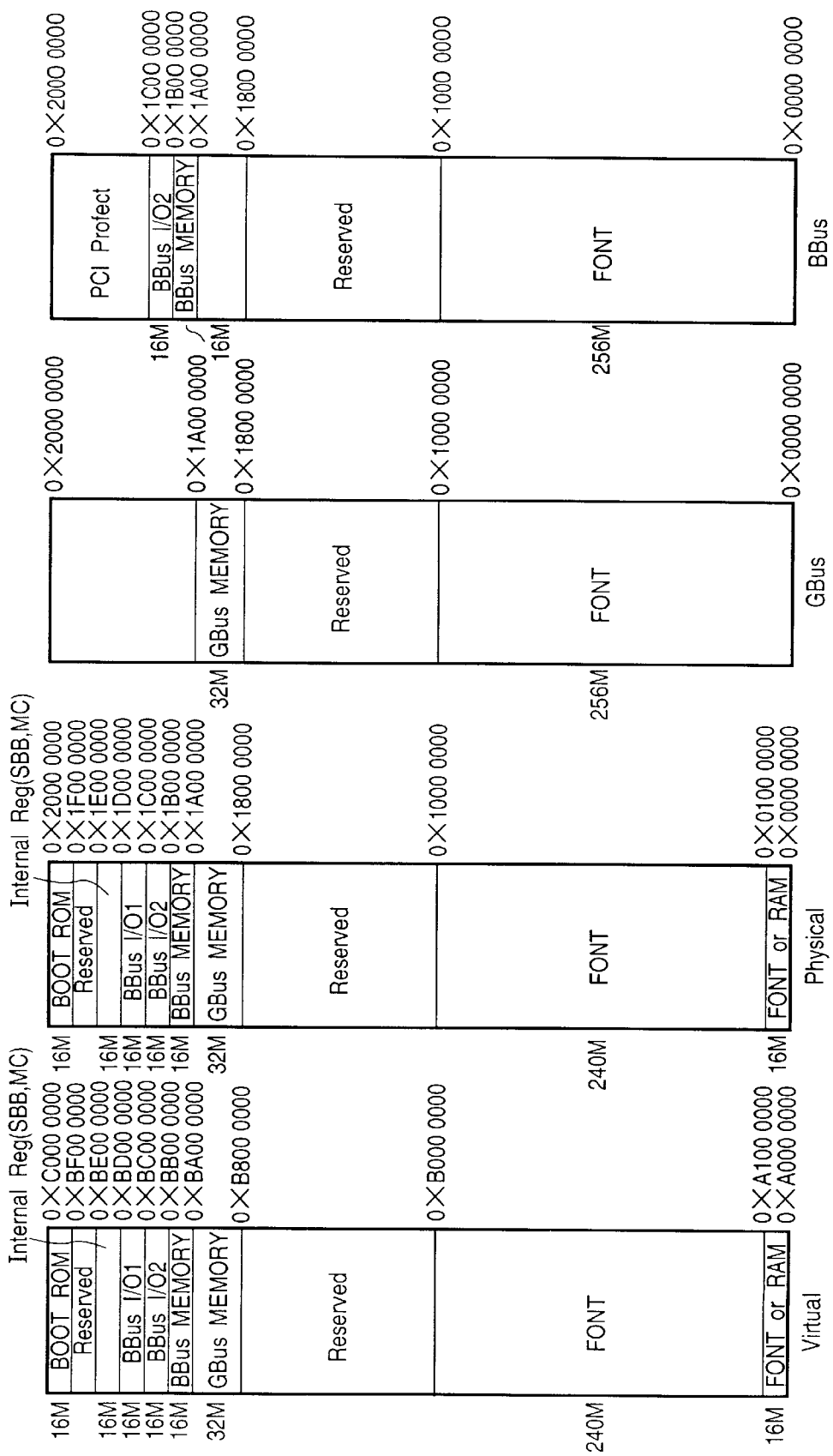

FIG. 22 shows a block diagram of the G bus interface 2006. it is outlined below.

(Outline of G Bus)

The G bus is a bus which is defined to execute high-speed data transfer among image data processing sections in the single chip controller DoEngine for MFPs. The G bus has a 64-bit data bus and supports an address space of 4 Gbytes (128-byte boundary). The G bus is configured basically for transfer using 16 beats (128 bytes=64 bits×16) as a long burst and is capable of transferring data successively up to 4 long bursts (512 bytes=16 beats×4). (The G bus does not support data transfer not longer than 16 beats such as single beat.)

(Definitions of G Bus Signals)

First, symbols used for defining signals will be defined. Signal directions are described immediately after signal names as occasion demands. The signal directions are defined as follows:

In (Input signal) . . . An input signal into a bus agent

Out (Output signal) . . . An output signal from the bus agent

InOut (Bi-Directional Tri-State signal) . . . A two-way signal driven by a plurality of bus agents. This signal is driven by only an agent at a time. A default driver manages collectively enable request signals from the agents which drive the InOut signal and determines one of the agents which is to drive the InOut signal. When no agent issues the enable request or when a plurality of agents issue enable requests at the same time, a default driver signal is driven. When the agent is to drive the signal to low, it must drive the signal to high for a preceding clock and a following clock. The signal can be asserted only after lapse of a clock from a drive start. The signal is basically released at a clock next to negation.

A symbol "_L" following a signal name indicates that the signal is low active. The G bus signals are described in a manner nearly the same as that for the B bus signals. For description, the G bus signals are classified into system signals, address and data signals, interface control signals and arbitration signals. In addition, a bus agent is a collective name of a bus master and a bus slave which are connected to the bus.

(System Signals)

gClk (G-Bus Clock) . . .

Provides timings for all transactions on the G bus and is used as an input for all devices.

gRst_L (G-Bus Reset) . . .

Resets all devices on the G bus. Clears all internal registers and negates all output signals.

(Address and data signals)

gAddr[31:7], InOut, (G-Bus Address): Master→Slave . . .

Supports an address space of 4 Gbytes with 25 bits of gAddr[31] through gAddr[7] since all data transfer on the G bus is executed in a unit of 128 bytes (16 beats).

drive: The master drives simultaneously with gTs_L.

assert: A clock next to drive.

negate: A clock which confirms assert of gAack_L.

g(Mastername)AddrOeReq (G-Bus Address OutPut Enable Request): Master→DefaultDriverLogic . . .

An output signal sent to a default driver logic to establish a two-way G bus. A request signal for the bus master to drive an address bus.

g(Mastername)AddrOe_L (G-Bus Address OutPut Enable): DefaultDriveLogic→Master . . .

A signal to indicate that the default driver logic grants address bus drive to a bus master which outputs g(Mastername)AddrOeReq.

gData[63:0], InOut, (G-Bus Data): DataDriver→DataReceiver . . .

A 64-bit data bus for drive by the master at a write time or drive by the slave at a read time.

[Write]

drive: The master drives simultaneously with gTs_L. When gSlvBsy_L is asserted, however, the master waits until gslvBsy_L is negated before drive.

assert: A clock next to the drive.

change: A clock which confirms assertion of gAack_L, thereafter every clock.

negate: A transfer end time or a clock which has confirmed assertion of gAack_L when transfer stop request by gTrStp_L is confirmed.

[Read]

drive: The slave drives simultaneously with gAack_L.

assert: This signal is asserted by a clock next to drive when the salve is Ready or waits until the slave is Ready and then is asserted.

change: A clock which confirms assertion of gAack_L, thereafter every clock. In case of read, every clock from a clock which has confirmed assertion of gAack_L.

negate: A transfer end time.

release: A clock one clock after negate or a clock which has confirmed a transfer stop request by gTrStp_L.

g(DataDrivername)DataOeReq (G-Bus Data OutPut Enable Request): DataDriver→DefaultDriverLogic . . .

Request signal for a data driver to drive a data bus.

g(DataDrivername)DataOe_L (G-Bus Data OutPut Enablet): DefaultDriverLogic→DataDriver . . .

A signal to indicate that a default driver logic grants data bus drive to a data driver which has output g(DataDrivername)DataOeReq.

(Interface Control Signals)

gTs_L (InOut G-Bus Transaction Sart): Master→Slave . . .

This signal is asserted by the master for one clock to indicates a transfer start (address phase). The master drives gAddr,gRdNotWr,gBstCnt together with gTs_L to clarify a kind of the transfer and a data amount. In case of a write, the master must assure that the clarified transfer data amount can be transmitted with no weight. In case of a read, the master must assure that the clarified transfer data amount can be received with no weight. When transfer is disabled in the course, the slave may cancel transfer of next 16 beats by gBsStep_L. However, the slave never cancels transfer in the course of the 16 beats.

drive: Drive by a clock which has confirmed assertion of gGnt_L.

assert: A clock next to drive.

negate: Negated after assertion of a clock.

g(Mastername)TsOeReq (G-Bus Transaction Start OutPut Enable Request): Master→DefaultDriverLogic . . .

Request signal for the bus master to drive gTs_L.

g(Mastername)TsOe_L (G-Bus Transaction Start OutPut Enable): DefaultDriverLogic→Master . . .

A signal to indicate that the default driver clock grant drive of gTs_L to a bus master which has output g(Mastername)TsOeReq.

gAack_L, InOut, (G-Bus Address Acknowledge): Slave Master . . .

This signal is driven to Low for a clock by a slave. A pertinent slave recognizes transfer, confirms that a bus is empty and informs a master that data transfer can start. In case of a write, the slave must assure that it receives a transfer data amount requested by the master with no weight. In case of a read, the slave must assure that it transmits the requested transfer data amount with no weight. Should data transfer be disabled in the course, next 16-beat transfer can be cancelled by gBstStp_L. However, transfer cannot be cancelled in the course of the 16 beats.

drive: At an address decode bit, drive of this signal is started by a clock which has confirmed assertion of gTs_L. When gSlvBsy_L is asserted, however, the drive is postponed until gSlvBsy_L is negated. When the signal is not driven due to use of a data bus, its drive is started by a clock which has confirmed a transfer stop request by gTrStp_L.

assert: This signal is asserted by a clock next to drive when the slave is Ready or otherwise assertion of this signal is postponed until the slave is Ready. In reply to transfer stop by gTrStp_L, the signal is asserted by a clock next to drive.

negate: This signal is asserted by a clock which has confirmed gTrStp_L when gTrStp_L is asserted after drive. Furthermore, the signal is negated after assertion of a clock.

g(Slavename)AackOeReq (G-Bus Address Acknowledge OutPut Enable Request): Slave→DefaultDriverLogic . . .

A request signal for a slave to drive gAack_L.

g(Slavename)AackOe_L (G-Bus Address Acknowledge OutPut Enablet): DefaultDriverLogic→Slave . . .

A signal to indicate that a default driver logic grants drive of gAack_L to a slave which has output g(Slavename) AackOeReq.

gSlvBsy_L, InOut, (G-Bus Slave Busy): Slave→Master . . .

A signal to indicate that a slave is driving to transfer data through a data bus.

drive: Drive of this signal is started by a clock which confirms assertion of gTs_L when an address decode is hit. When gSlvBsy_L is asserted, however, the drive is postponed until gSlvBsy_L is negated.

assert: This signal is asserted by a clock next to drive when a slave is Ready or otherwise assertion is postponed until the slave is Ready.

negate: Negated at a transfer end time.

release: A clock after negation or a clock which has confirmed a transfer stop request by gTrStp_L.

g(Slavename)SlvBsyOeReq (G_Bus Slave Busy OutPut Enable Request): Slave→DefaultDriverLogic . . .

A request signal for a slave to drive gSlvBsy_L.

g(Slavename)SlvBsyOe_L (G-Bus Slave Busy OutPut Enable): DefaultDriverLogic→Slave . . .

A signal to indicate that the default driver logic grants drive of gSlvBsy_L to a slave which has output g(Slavename)SlvBsyOeReq.

gRdNotWr, InOut, (G-Bus Read(High)/Write(Low)): Master→Slave . . .

This signal is driven by a master to indicate READ by High or WRITE byLow. It is driven for the same period as GA.

drive: This signal is driven by a master simultaneously with gTs_L.

assert: A clock next to drive.

negate: A clock which has confirmed assertion of gAack_L.

g(Mastername)RdNotWrOeReq (G-Bus Read/Write OutPut Enable Request): Master→DefaultDriverLogic . . .

A request signal for a bus master to drive gRdNotWr.

g(Mastername)RdNotWrOe_L (G-Bus Read/Write OutPut Enablet): DefaultDriverLogic→Master . . .

A signal to indicate that the default driver logic grants drive of gRdNotWr to a bus master which has output g(Mastername)RdNotWrOeReq.

gBstCnt[1:0], InOut, (G-Bus Burst Counter): Master→Slave . . .

This signal is driven by a master to indicate a number (1 to 4) of burst transfers to be executed successively. Values of the signal correspond to numbers of bytes as listed in Table 6.

drive: Driven by the master simultaneously with gTs_L.
assert: A clock next to drive.
negate: A clock which has confirmed assertion of gAack_L.

TABLE 6

| GBst Cnt[1:0] | | Number of Transfer Bytes |
|---|---|---|
| 01 | 16 beats × 1 | 64 bits × 16 × 1 = 128 bytes |
| 10 | 16 beats × 2 | 64 Bits × 16 × 2 = 256 bytes |
| 11 | 16 beats × 3 | 64 bits × 16 × 3 = 384 bytes |
| 00 | 16 beats × 4 | 64 bits × 16 × 4 = 512 bytes | g (Mastername) BstCntOeReq (G-Bus Burst Counter OutPut Enable Request): Master→DefaultDriverLogic . . .
A request signal for a bus master to drive gBstCnt.

g(Mastername)BstCntOe_L (G-Bus Burst Counter OutPut Enablet): DefaultDriverLogic→Master . . .
A signal to indicate that the default driver logic grants drive of gBstCnt to a bus master which has output g(Mastername)BstCntOeReq.

gBstStp_L, InOut, (G-Bus Burst Stop): Slave→Master . . .
This signal is driven by a slave to indicate that next successive burst transfer cannot be received. The signal is asserted at 15th beat of 1-burst (16-beat) transfer. It is not driven when it does not stop.
drive: 14th beat.
assert: 15th beat.
negate: After assertion of 1 clock.

g(Slavename)BstStpOeReq (G-Bus Burst Stop OutPut Enable Request): Slave→DefaultDriverLogic . . .
A request signal for a slave to drive on gBstStp_L.

g(Slavename)BstStpoe_L (G-Bus Burst Stop OutPut Enablet): DefaultDriverLogic→Slave . . .
A signal to indicate that the default driver logic grants drive of gBstStp_L to a slave which has output g(Slavename)BstStpOeReq.

(Arbitration Signals)

g(Mastername)Req_L, Out, (G-Bus Request): Master→Arbiter . . .
This signal is driven by a master to request to an arbiter for a bus. It has gReq_L exclusively for each master device.
assert: Asserted by a master which requires data transfer.
negate: Negated when ggnt_L is received.

g(Mastername)Gnt_L, In, (G-Bus GNT): Arbiter→Master . . .
This signal is driven by an arbiter to grant a next bus rights for bus requests. It has gGnt_L for each master device. The bus rights are granted in order from bus masters having higher priorities. The bus rights are granted to master having the same priority in order of bus requests.
assert: Asserted to a master selected by an arbitration when gGnt_L is not granted to another master or when gGnt_L granted to another master is to be negated by a next clock.
negate: A clock which has confirmed assertion of gAack_L.

gTrStp_L, In, (G-Bus Transaction Stop): Arbiter→Master, Slave . . .
This signal is driven by an arbiter to intercept a transaction whose address phase has been started by gGnt_L. However, a transaction whose data phase has been started by gAack_L cannot be intercepted. This signal is masked by gAack_L, thereby being negated and output when gAack_L is asserted.
assert: This signal is provided when a bus request is made from a master which has a priority higher than that of a transaction whose address phase has been started.
negate: A clock which has confirmed assertion of GAack_L.

(Write Cycles of G Bus)

Write cycles of the G bus are configured as described below.

(1) A master requests a bus and asserts signal gReq_L.

(2) An arbiter grants the request, asserts a signal ggnt_L and negates gReq_L.

(3) Upon reception of gGnt_L, the master drives signal gTs_L,gAddr,gRdNotWr,gBstCnt.
When gSlvBsy_L is not asserted for a write operation, the master drives also gData. When gSlvBsy_L is driven, the master postpones the drive until gSlvBsy_L is freed.

(4) A slave decodes an address when signal gTs_L is asserted and recognizes that data is transferred to the slave when the address is hit. The slave starts driving gSlvBsy_L and gAack_L when gSlvBsy_L is not asserted by another slave at this time. The slave drives also gData in case of read. When gSlvBsy_L is asserted by another slave, a data bus is in use and the slave postpones the start of the drive until the data bus gSlvBsy_L is negated. When the slave can make preparations for data transfer after starting the drive of signals gSlvBsy_L, gAack_L and (gData), it asserts each signal and starts data transfer.

(5) The address phase terminates when gAack_L is asserted and the master negates gAddr, gRdNotWr, gBstCnt. From this time, the master exchanges write data by every clock and transfers data in an amount specified by gBstCnt. The master and the slave must know end of the data transfer by counting clocks by themselves.

When the slave cannot transfer data in an amount requested by the master in the course of the data transfer, it can cancel transfer of next 16 beats by asserting bStStp_L at 15th beat. However, the slave cannot cancel in the course of the 16 beats.

When gBstStp_L is asserted, the master and the slave must terminate the data transfer by a next clock.

<Cache Invalidation Unit: CIU>

A cache invalidation unit (hereinafter referred to as CIU in short) 2005 monitors write transaction from the B bus to a memory and when transaction occurs, the cache invalidation unit invalidates a cache built in the CPU shell using a cache invalidation interface of the CPU shell before termination of write into the memory.

The CPU shell uses three kinds of signals which are mentioned below.

SnoopADDR[31:5] (Cache Invalidation Address)
DCINV (Dcache (data cache) Invalidation Strobe)
ICINV (Icache (instruction cache) Invalidation Strobe)

A cache is invalidated by three clocks at maximum. Since write from the B bus into a memory cannot terminate by three clocks, the cache invalidation unit 2005 does not perform a hand shake of an invalidation end using a stop L signal output from the processor shell 401. However, the cache invalidation unit 2005 drives bsnoop Wait at cycles which are the same as those for Stop_L on the B bus as a preparation for a modification in the future.

In a current implementation, the cache invalidation unit 2005 invalidates also an Icache for security when write occurs from the B bus. Invalidation of the Icache is unnecessary if a self modifying code is inhibited by an OS and the instruction cache is intentionally invalidated for loading data which may be used as an instruction. Some upgrading of performance is expectable in this case.

<Memory Maps>

FIGS. 23A through 23D and FIGS. 24A through 24D show memory maps. FIGS. 23A through 23D show a virtual memory map, a physical memory map, a memory map in an address space of the G bus and a memory map in an address space of the B bus respectively. Furthermore, FIGS. 24A through 24D are maps which illustrate 512 Mbytes of slashed areas including registers and the like in FIGS. 23A through 23D.

A memory model of the processor core is based on R3000. The processor core has a physical address space of 4 Gbytes by 32-bit addressing. A virtual space also performs 32-bit addressing. A maximum size of a user process is 2 Gbytes. Address mapping is different between a kernel mode and a user mode. The drawings show memory maps where an MMU is not used.

(User Mode Virtual Addressing)

A user virtual address space (kuseg) of 2 Gbytes are effective for virtual addressing in the user mode. Addresses of the user segments start from 0x00000000 and all effective accesses have msb cleared to 0. Reference to an address at which msb is set in the user mode causes an address error exception processing. TLB maps all references to kuseg in the same manner in the user mode and the kernel mode. Furthermore, TLB is cashable. kuseg is ordinarily used to hold the user code and data.

(Kernel Mode Virtual Addressing)

The virtual address space in the kernel memory mode has four address segments.

kuseg: 2 Gbytes from 0x800000000 of virtual addresses. This segment can be paged, cached in a selected unit and mapped. This segment is overlapped between kernel memory access and user memory access.

kseg0: 512 Mbytes from 0x80000000 of the virtual addresses. This segment is mapped directly into first 512 Mbytes of a physical memory. A reference is cached but TLB is not used for address mapping. kseg0 is ordinarily used for a kernel execution code or kernel data.

kseg1: 512 Mbytes from 0xA0000000 of the virtual addresses. This segment is mapped directly into first 512 Mbytes of the physical memory. A reference is not cached and TLB is not used for address mapping. kseg1 is ordinarily used by the OS for an I/O register, a ROM code and a disk buffer.

kseg2: 1 Gbytes from 0xC0000000 of the virtual addresses. This segment is mapped, like the kuseg, by the TLB from the virtual addresses into the physical addresses. Cashing of this segment is optional. The OS ordinarily uses kseg2 for data at each process which requires remapping by a stack or a context switch.

(Virtual Address Memory Map (FIGS. 23A and 24A))

The virtual address space has 4 Gbytes to which access can be made from all memories and I/Os in the system. A SYSTEM MEMORY (1 GB) exists in the keseg.

The kseg0 has a built-in RAM (16 MB). When it is desired to program a vector for exception processing, this RAM is implemented and an exception vector base address is set at 0x80000000. This address is mapped at 0x80000000 in the physical address space.

The kseg1 has ROMs, I/Os and registers which include a boot ROM (16 MB), SBB internal registers, MC internal registers (16 MB) and an IO Bus I/O 1 (16 MB: primitive B bus registers such as a G bus arbiter internal register, a B bus arbiter internal register and a PMU internal register), IO Bus I/O 2 (16 MB), IO Bus MEM (16 MB), G bus MEM (32 MB), FONT ROM (240 MB), FONT ROM or RAM (16 MB).

The kseg 2 has a PCI I/O (512 MB) and a PCI MEM (512 MB).

Since both kseg0 and kseg1 are mapped into the first 512 mybtes of the physical address space, the first 512 mybtes of all the kseg0, kseg1 and kuseg refer to the same physical address space.

(Physical Address Memory Map (FIGS. 23B and 24B))

Like the virtual address space, the physical address space has 4 Gbytes to which access can be made from all the memories and I/Os in the system.

The PCI I/O, PCI MEM and SYSTEM MEMORY are similar to those on the virtual address memory map.

Since both kseg1 and kseg2 are mapped into first 512 Mbytes in the physical address space, the ROMs, I/Os and Regs exist in a space from 0x00000000.

(G bus Memory Map (FIGS. 23C and 24C))

The G bus address space has 4 Gbytes to which access can be made only from the SYSTEM MEMORY, G bus MEM and FONT.

(B Bus Memory Map (FIGS. 23D and 24D))

The B bus address space has 4 Gbytes to which access can be made only from the PCI, I/O, PCI MEM, SYSTEM MEMORY, IO Bus I/O 2, IO Bus MEM and FONT.

Since an IO Bus I/O 1 is a primitive register, a space from 0x1C000000 to 0x20000000 is protected from the PCI and access cannot be made to this space from the PCI.

<Address Switch>

An address switch 2003 is provided to send an address signal from a bus which is used as a master to a bus which is used as a slave by way of the SBB 402 for data transfer among the SC bus, G bus, B bus and MC bus. For transfer by way of the SBB 402, the SC bus, G bus and B bus can be used as masters, whereas the B bus and MC bus can be used as slaves. And one of the SC bus, G bus and B bus functions as a master which sends the address signal to the MC bus, whereas only the SC bus functions as a master which sends the address signal to the B bus.

Furthermore, transfer between the SC bus and the B bus can be executed simultaneously with transfer between the G bus and the MC bus.

Figure 25:
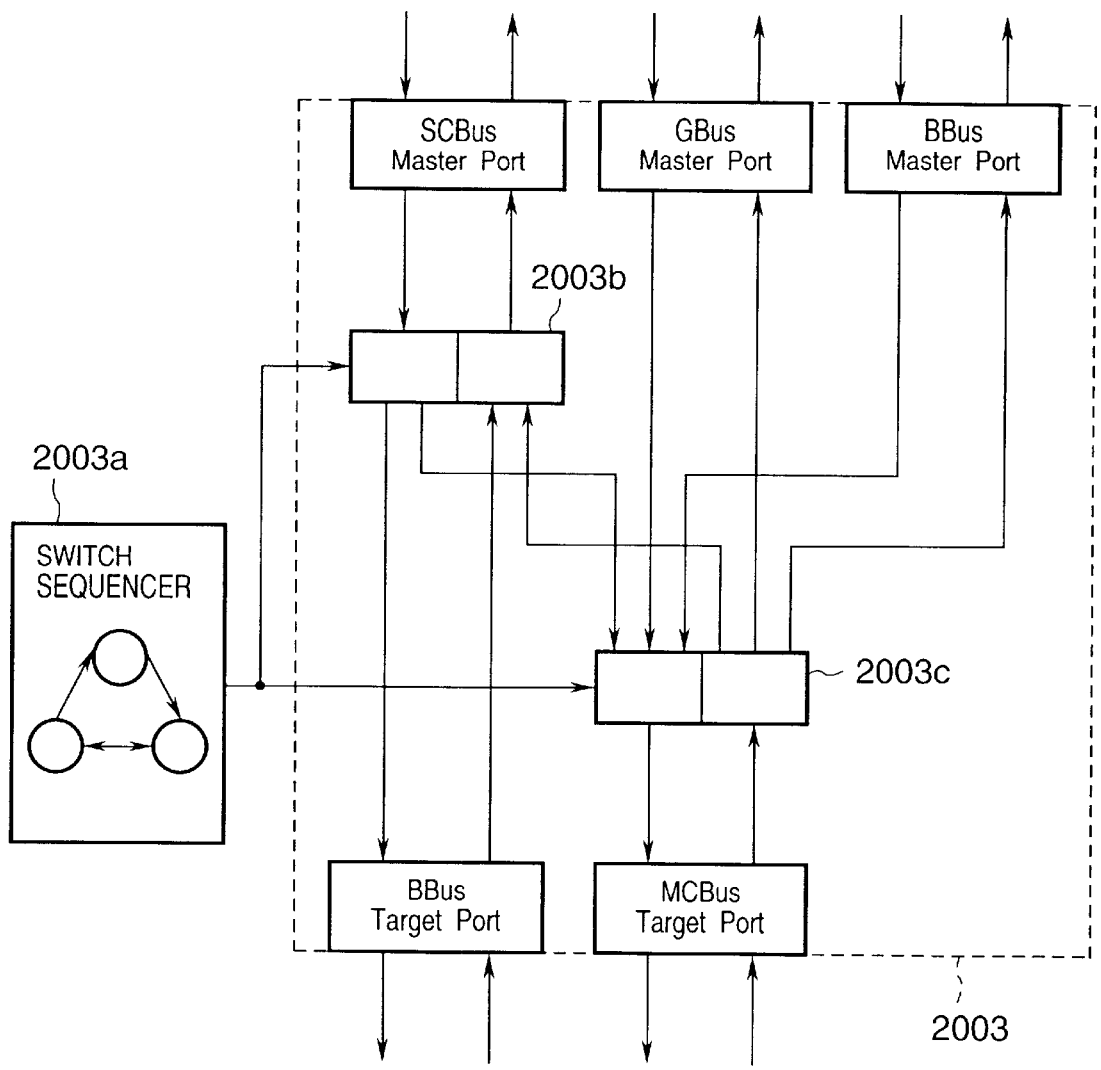
FIG. 25 is a block diagram of an address switch 2003.

FIG. 25 shows a block diagram of the address switch 2003. A switch sequencer 2003a changes over a switch 2003b to select the B bus or the MC bus as a slave and changes over a switch 2003c to select the SC bus, G bus or B bus as a master. This configuration uses any one of the SC bus, G bus and B bus as the master for MC bus, selects only the SC bus as the master for the B bus, and allows the transfer between the SC bus and the B bus simultaneously with the transfer between the G bus and the MC bus.

<Data Switch>

A data switch functions to switch a data flow in the SBB for data transfer among the SC bus, G bus, B bus and MC bus. Data is sent from a master to a slave for write or from the slave to the master for read.

Figure 26:
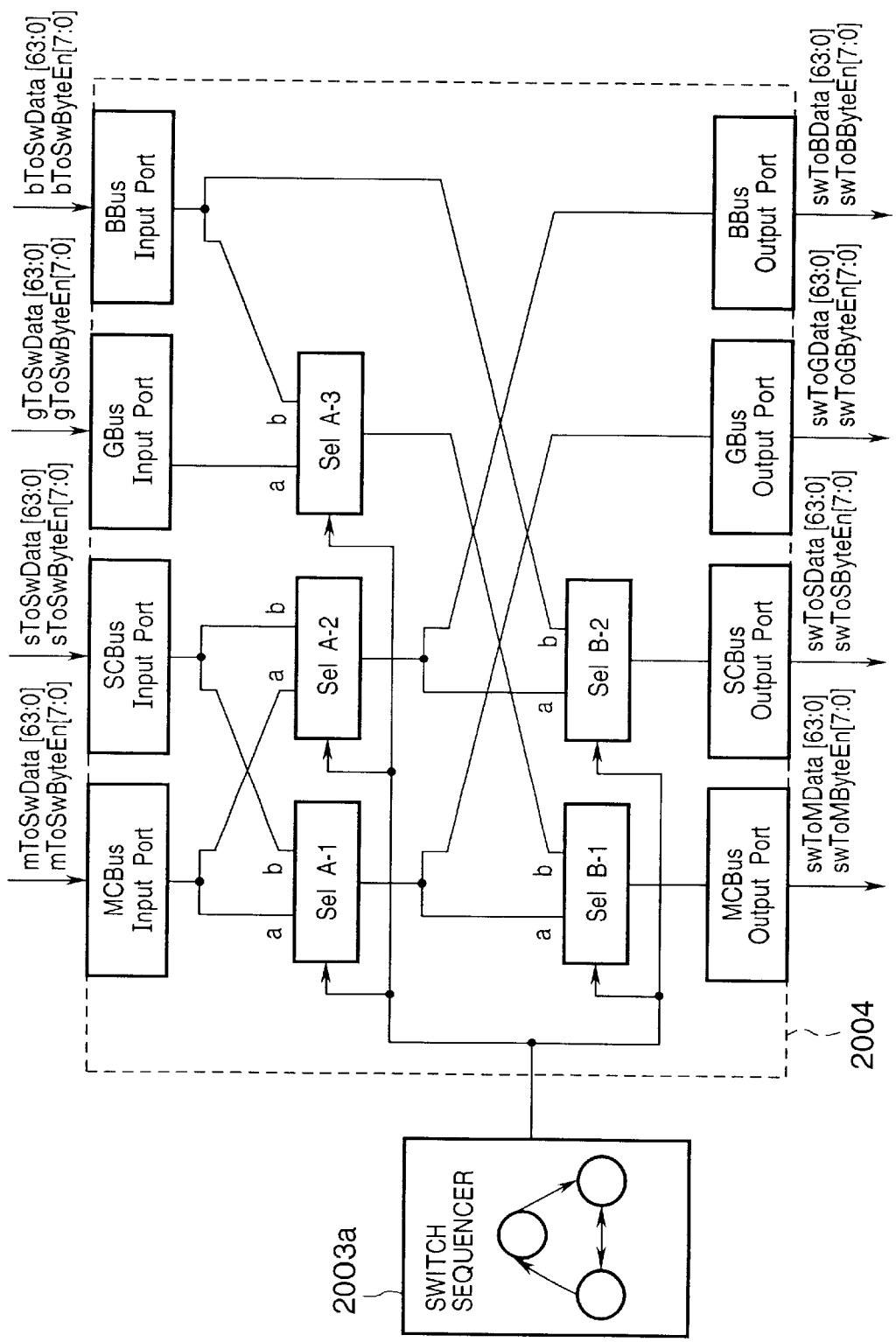
FIG. 26 is a block diagram of a data switch 2004.

FIG. 26 shows a block diagram of a data switch 2004. A configuration shown in FIG. 26 is capable of controlling the data flow for write or read by switching selectors A-1 through A-3, B-1 and B-2 as shown in Table 7, thereby selecting the SC bus, G bus or the B bus as a master and setting the B bus or the MC bus as a slave.

TABLE 7

| Master | Slave | W/R | Data flow | A-1 | A-2 | A-3 | B-1 | B-2 |
|---|---|---|---|---|---|---|---|---|
| SCBus | Bbus | Write | SC → B | | b | | | |
| | | Read | B → SC | | | | | b |
| | MCBus | Write | SC → MC | b | | | a | |
| | | Read | MC → SC | | | a | | a |

TABLE 7-continued

| Master | Slave | W/R | Data flow | A-1 | A-2 | A-3 | B-1 | B-2 |
|---|---|---|---|---|---|---|---|---|
| Gbus | MCBus | Write | G → MC | | | | a | b |
| | | Read | MC → G | a | | | | |
| Bbus | MCBus | Write | B → MC | | | | b | b |
| | | Read | MC → B | | a | | | |

<Arbitration>

For changing over the switches, the switch sequencer 2003a disposed in the SBB 402 performs arbitration among three kinds of connection requests from outside the SBB which are listed below:

1. CPU
2. G bus master
3. B bus master.

The arbitration is determined dependently on current connected conditions of the bus switches and a preliminarily set priority order, thereby changing connections of address switches and data switches.

<Timing Diagram>

Figure 27:
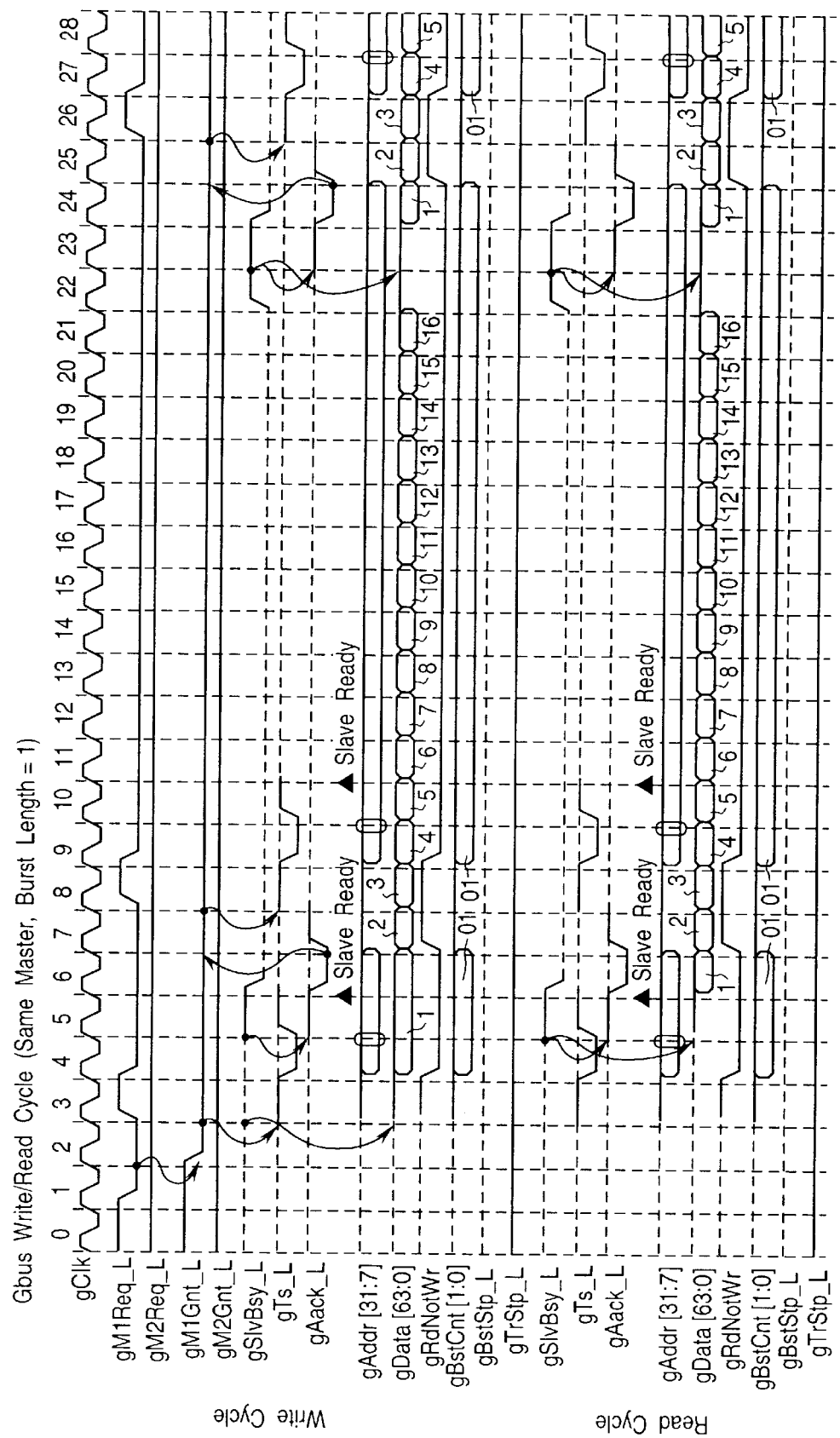
FIG. 27 is a timing chart showing a write/read cycle for the G bus.
Figure 28:
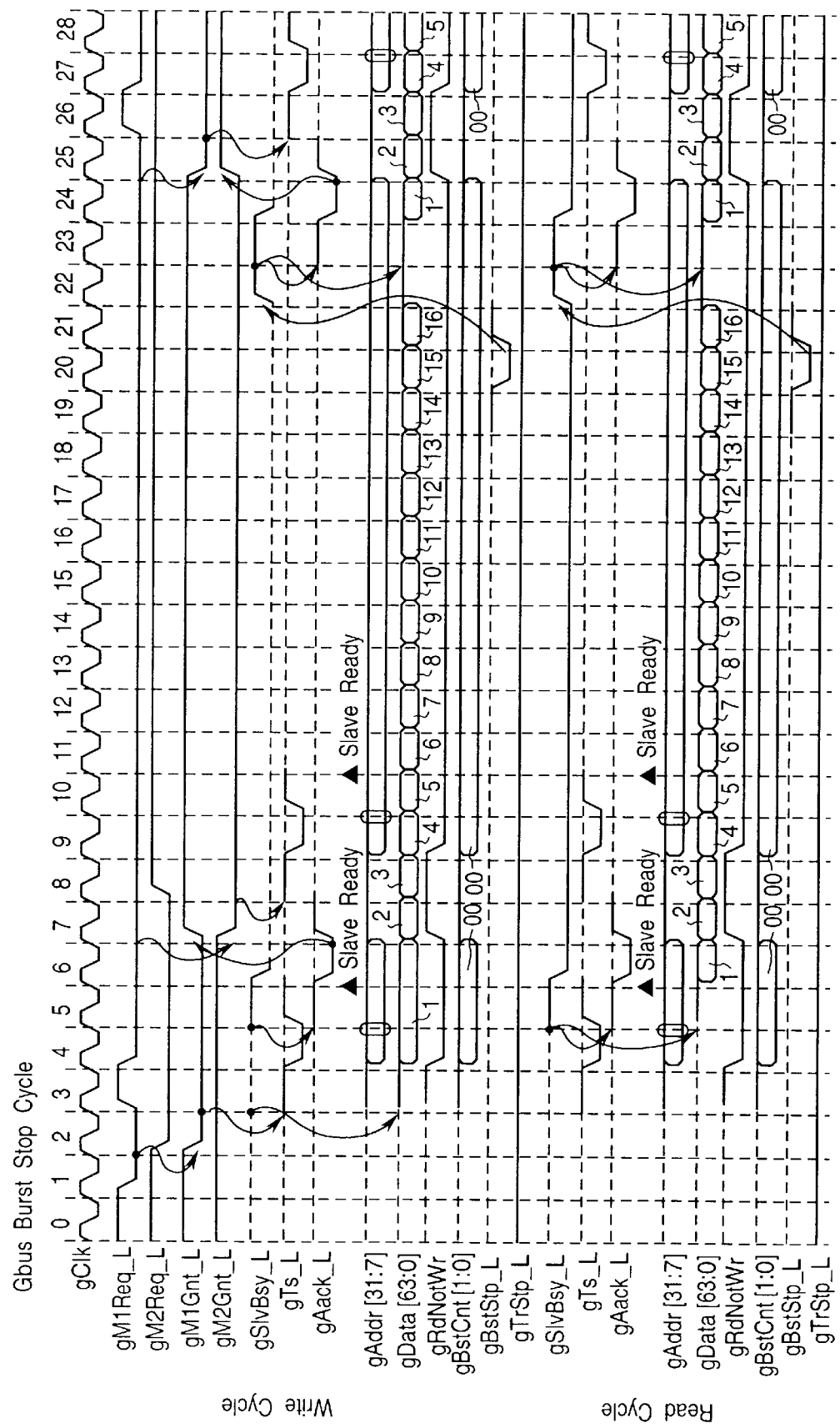
FIG. 28 is a timing chart showing a burst stop cycle for the G bus.
Figure 29:
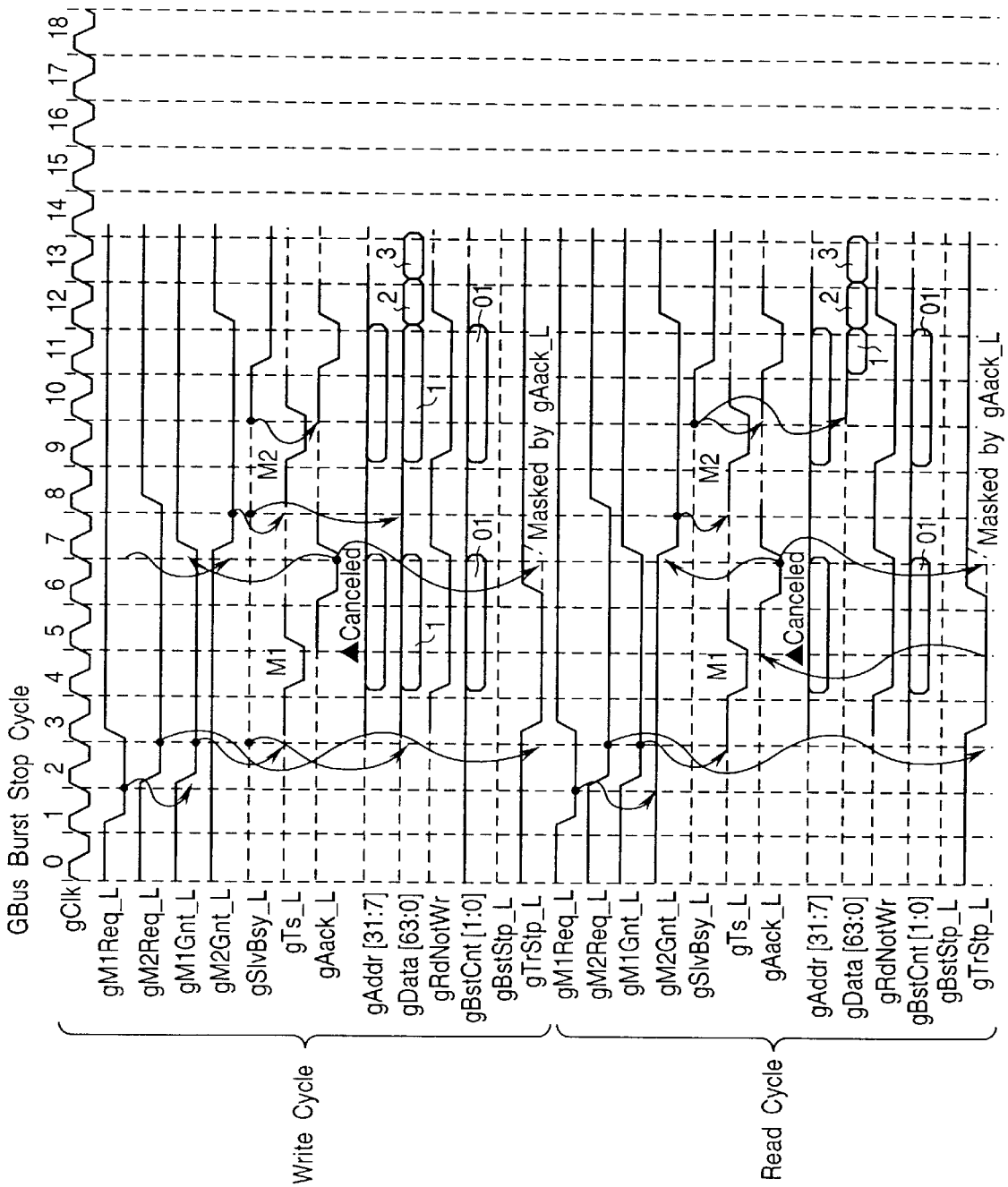
FIG. 29 is a timing chart showing a transaction stop cycle for the G bus.
Figure 30:
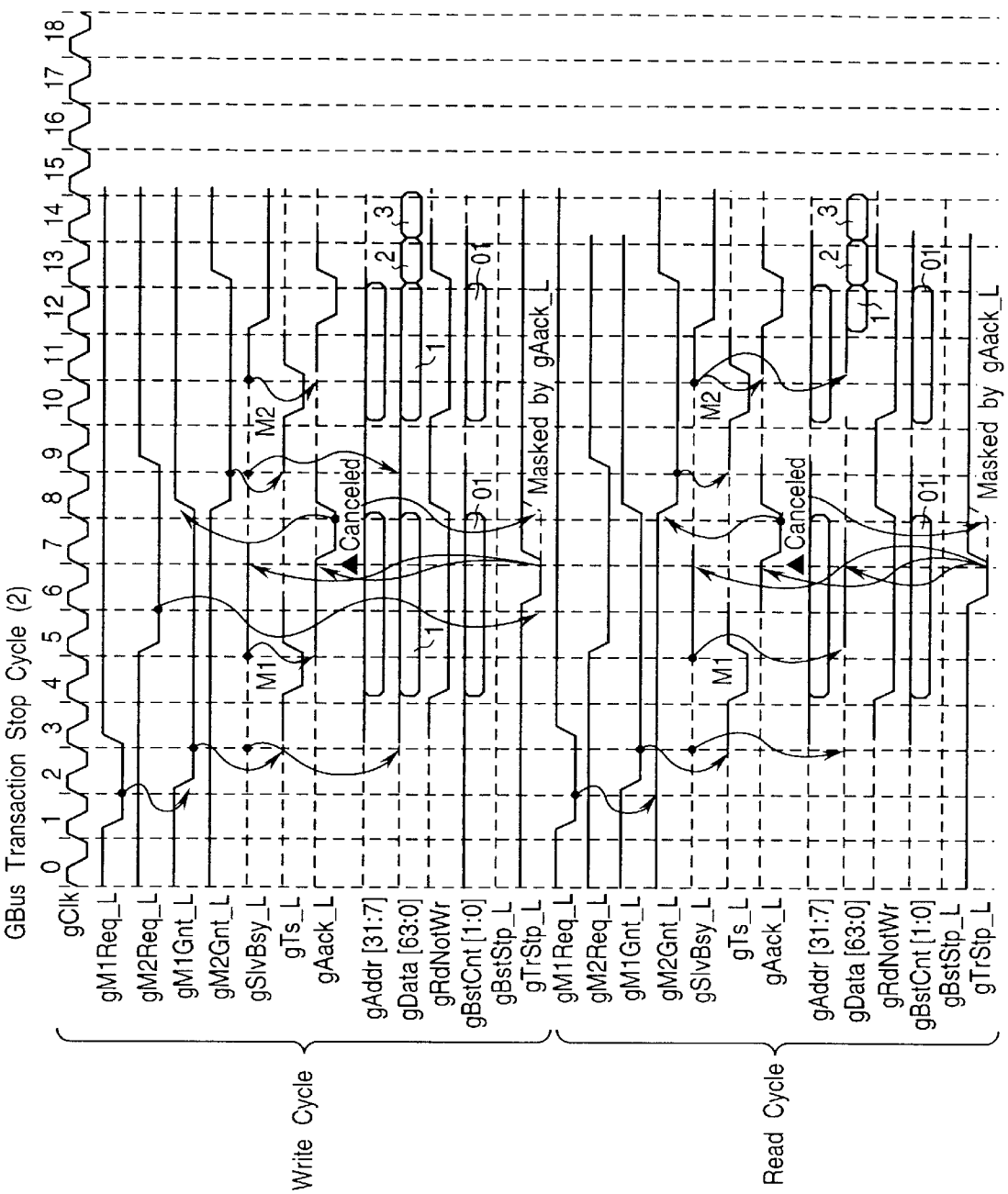
FIG. 30 is a timing chart showing the transaction stop cycle for the G bus.
Figure 31:
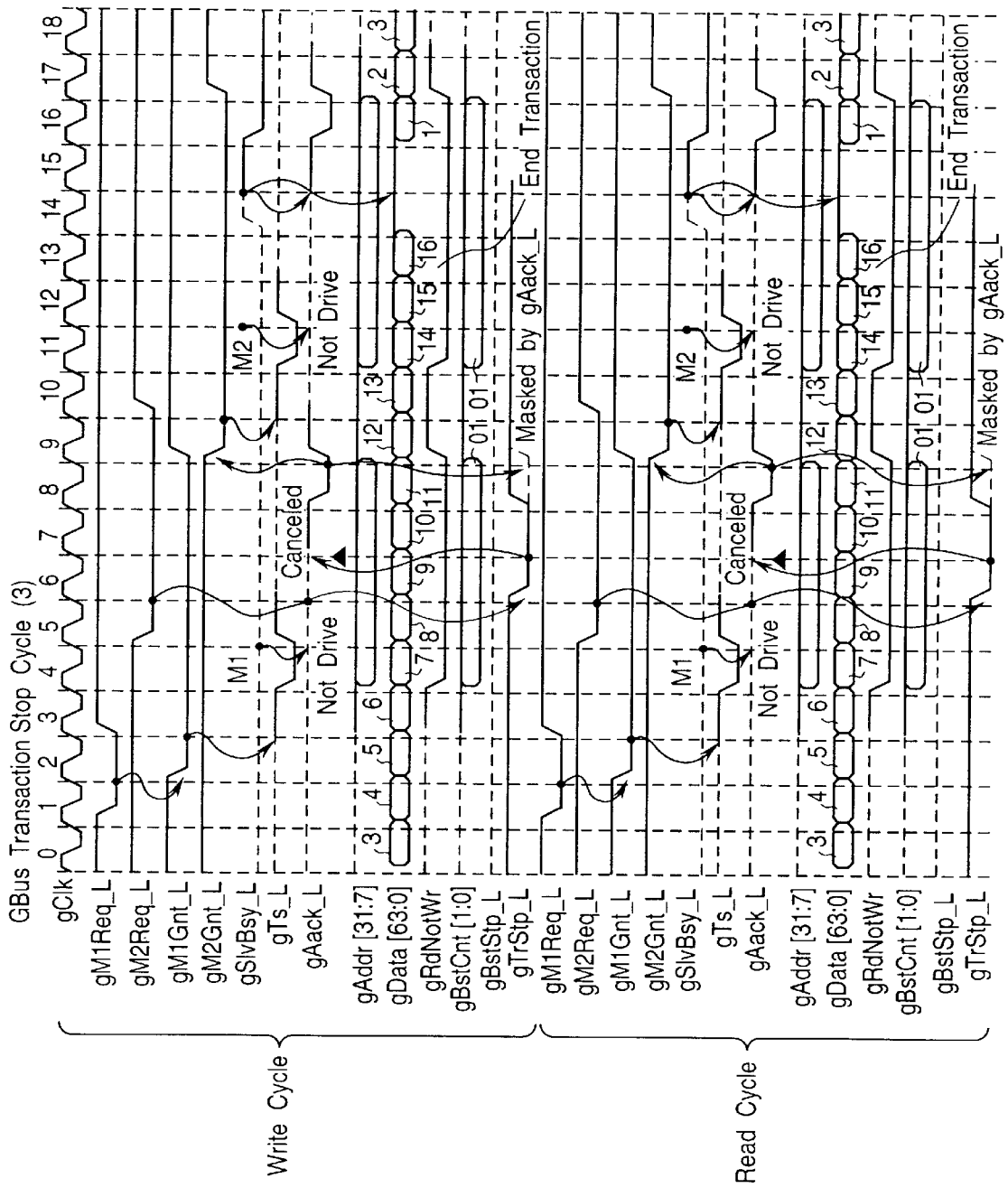
FIG. 31 is a timing chart showing the transaction stop cycle for the G bus.
Figure 32:
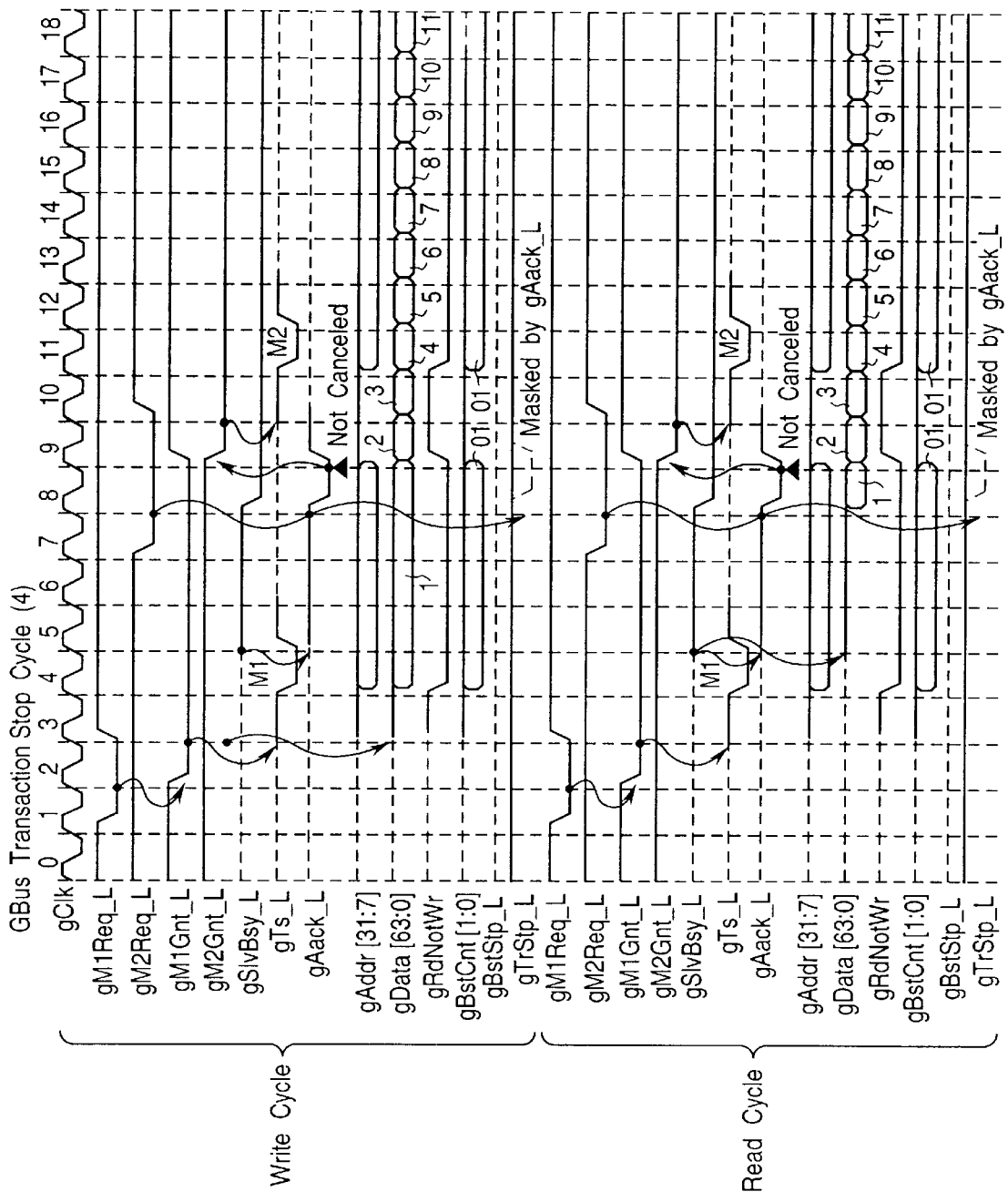
FIG. 32 is a timing chart showing the transaction stop cycle for the G bus.

FIGS. 27 through 32 show timing diagrams. FIG. 27 is a timing diagram showing cycles for write/read from the G bus, FIG. 28 is a timing diagram showing burst stop cycles of the G bus and FIGS. 29 through 32 are timing diagrams showing transaction stop cycles of the G bus.

2.6. PCI Bus Interface

Figure 33:
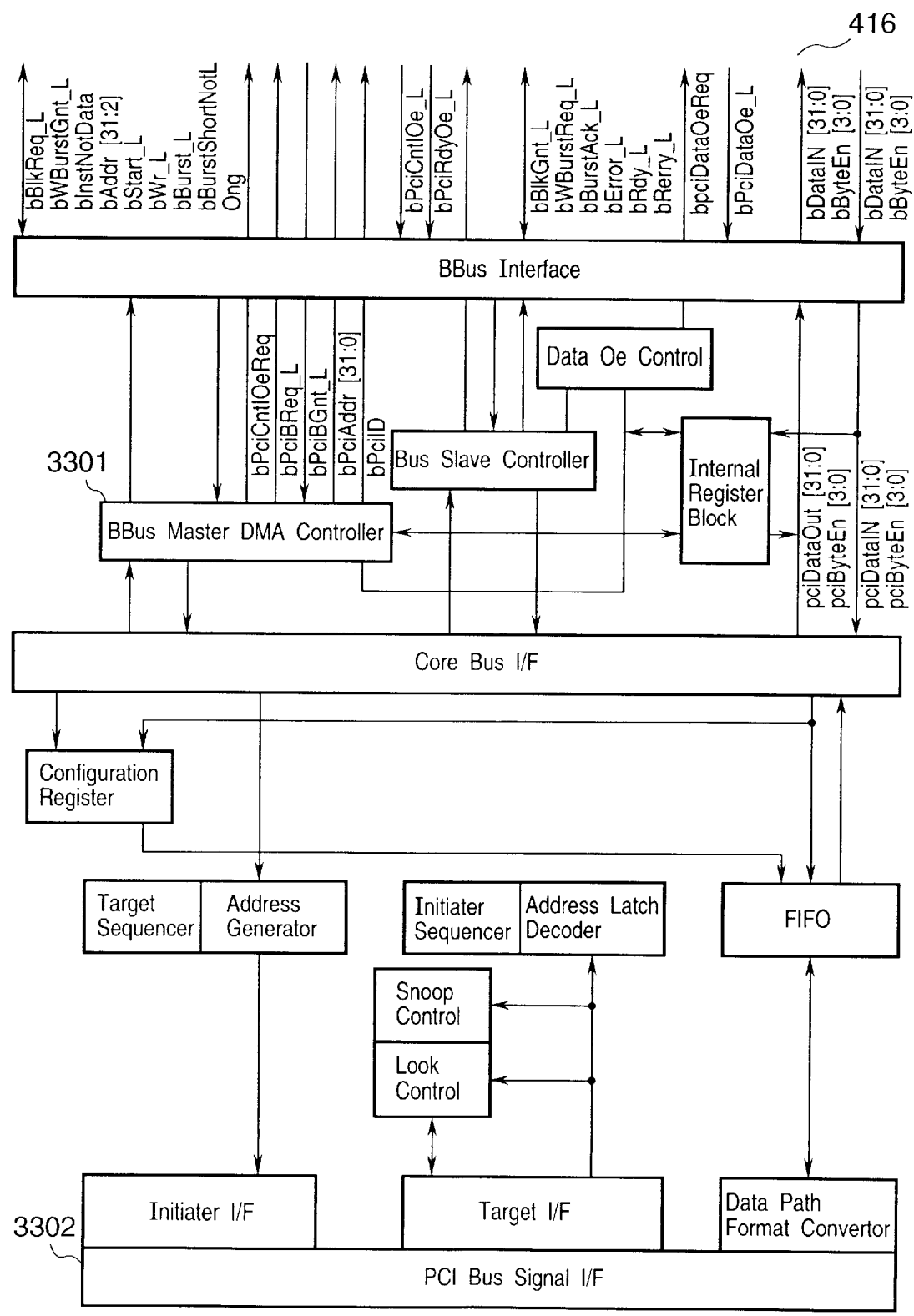
FIG. 33 is a block diagram of a PCI bus interface 416.

FIG. 33 shows a block diagram of the PCI bus interface 416.

The PCI bus interface 416 is a block which interfaces the B bus which is an internal general purpose IO bus of the DoEngine with the PCI bus which is an IO bus outside the chip.

Dependently on settings of input pins, the PCI bus interface 416 can be in a host bridge configuration which is capable of issuing a PCI bus configuration at a reset time or a target configuration which does not issue the PCI bus configuration.

When an access request is sent from the PCI bus master to an internal resource of the DoEngine by way of a PCI bus signal interface 3302, a master DMA controller 3301 of the B bus interface functions as a B bus master which bridges the access request into the B bus.

Furthermore, the master DMA controller 3301 is capable of transferring a DMA from a memory mapped in the PCI bus to a DoEngine memory. At a stage to transfer the DMA, the master DMA controller 3301 issues a transfer destination address (bPciAddr[31:0]) and an ID signal (bPciID) of the PCI master controller 3301 to the B bus and an arbitration sequencer simultaneously with a bus request to operate a B bus DMA intended by a programmer and a G bus DMA in a due access order.

The master DMA controller 3301 receives a bus grant (bPciBGnt_L) and stops assertion of the ID signal (bPciID) upon completion of the data transfer using a bus.

In addition, the PCI bus is rated for 33 MHz, 32 bits and in compliance with PCI 2.1.

2.7 G Bus Arbiter

Figure 34:
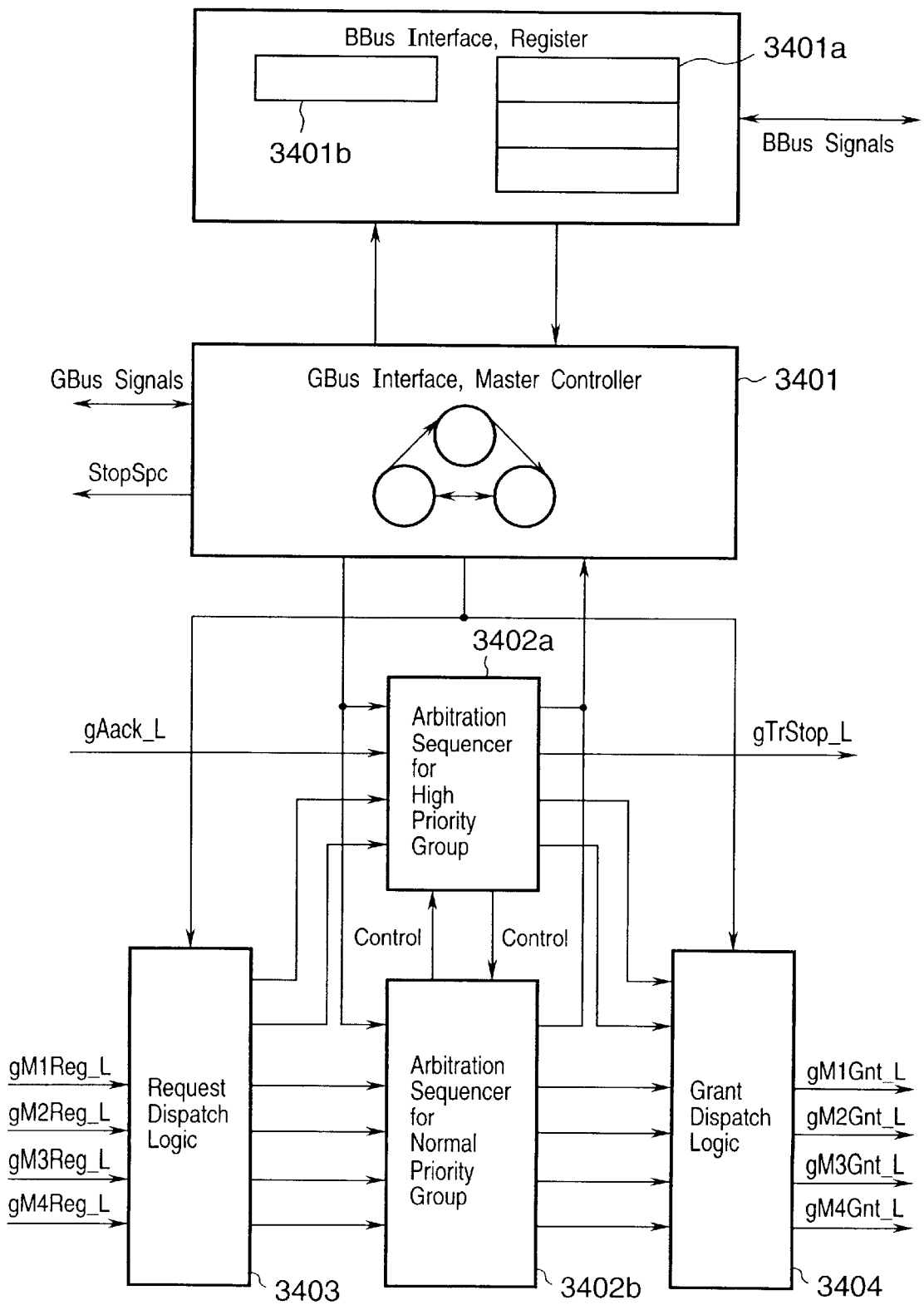
FIG. 34 is a block diagram of a G bus arbiter (GBA) 406.

FIG. 34 shows a block diagram of the Gbus arbiter (GBA) 406.

An arbitration of the G bus is of a central arbitration type, and has an exclusive request signal g(mastername)Req_L) and a grant signal (g(mastername)Gnt_L) for each bus master. In FIG. 34, master names are M1 through M4. The bus arbiter 406 supports up to 4 bus masters and has characteristics which are described below:

The arbiter can be programmed by setting an internal register 3401a.

Register setting is performed from the B bus.

The arbiter has a fair arbitration mode in which the bus license is fairly given so that all bus masters have the same priority and a priority arbitration mode in which any one of the bus masters has a high priority so as to allow it to use a bus preferentially. A bus master which is to have the high priority is determined by setting a register 3401b.

The arbiter permits setting a number of successive uses of the bus by the bus master having the high priority.

The arbiter supports a transaction stop cycle which stops a transaction whose address phase has been started but whose data phase has not been started yet.

The arbiter is capable of programming a sequence processing in a plurality of bus masters (described later). A programmed sequence is stored in a register table 3401a.

As a mechanism to maintain an access sequence intended by the programmer, the arbiter has a mechanism which reserves granting of bus use by a specific master on the basis of a master ID signal and a stop signal from a synchronous unit when the G bus master and B bus master issue sequential write to the same memory address.

In addition, programming into a register is performed by the CPU 401 by way of the B bus.

(Arbitration Sequencer)

Arbitration sequencers 3402a and 3402b used as kernels of the G bus arbiter perform arbitration between a priority master and other four non-priority masters with five masters. The fair arbitration mode is realized by allocating request signals and grant signals from the four bus masters to the four non-priority masters with a request dispatch circuit 3403 and a grant dispatch circuit 3404. Furthermore, the G bus arbiter operates in the priority arbitration mode by allocating one of the four bus masters as a priority master of a highly preferential arbitration sequencer 3402a. These allocations are carried out according to setting of registers 3401a and 3401b. Accordingly, the preferential bus master can obtain a right of bus use with a higher possibility than the other masters.

In addition to adjustment of the possibilities to obtain the right of bus use, a master which is allocated to the high priority sequencer 3402a is capable of using the bus successively in a number which is variable with a programmable register. This means that the G bus arbiter is capable of adjusting an occupied ratio of the bus to allow a specific master to use the bus more frequently.

(Fair Arbitration Mode)

In this mode, all the bus masters have the same priority and fair occasions to obtain a bus right. When the bus is free, a bus master which issues a request first can obtain the bus right. When a plurality of bus masters issue requests at the same time, the bus right is given sequentially in a predetermined order (round robin mode). When all the bus masters M1 through M4 issue requests by the same clock, for example, the bus right is given in an order of M1→M2→M3→M4. When all the bus masters issue request upon terminating transaction of M4, the bus license is given in a similar order of M1→M2→M3→M4→M1→M2 . . . When some of the bus masters issue requests, M4 laps round M1 and the bus right is granted to a master whichever has a larger out of those closest to a master which used the bus last.

Once the bus right is shifted to another bus master, it cannot obtain the bus right once again before the bus right is given to all bus masters which issue requests.

(Priority Arbitration)

In this mode, a bus master (a bus master registered in the register 3401b) is selected as a priority bus master which has a higher priority than other bus masters and the bus license is given to the priority bus master preferentially to the other bus masters, The bus masters other than the priority bus master have the same priority.

When a plurality of bus masters issue requests and the priority bus master issues requests successively, the priority bus master and the other non-priority bus masters obtain the bus license alternately.

When the bus license is shifted from the non-priority bus master to another bus master, the non-priority bus master cannot obtain the bus license once again only after the bus license is given to all other bus masters which issue requests.

(Transaction Stop Cycle)

Even if another bus master has started an address phase when the priority bus master issues a request in the priority arbitration mode, the priority bus master can obtain the bus license with a transaction stopped so far as a data phase has not been started yet. When the priority bus master has the bus license immediately before, however, the number of successive obtention of the bus license cannot be exceeded.

When an intercepted bus master has issued a request upon termination of a transaction of the priority bus master, the bus license is given to the bus master preferentially.

(Switching of Priority Bus Master)

The priority bus master can be switched to another bus master by rewriting the register 3401b. When the register which selects the priority bus master is rewritten, the priority bus master is switched upon termination of a transaction which is currently executed. A state of an arbiter is reset in an idle state and the arbitration is performed once again assuming that a bus master which issued a request at a time of the rewrite issues a request upon termination of the transaction.

Sufficient attention must be paid to the switching of the priority bus master. If the priority bus master is switched to a different bus master before a DMA of a bus master which is to have the priority terminates, a priority of a DMA of the initial priority bus master will be lowered. When it is not desired to lower the DMA of the initial priority bus master, the priority bus master must be switched after confirming termination of the DMA.

When a software requires dynamically switching the priority bus master not only at a system boot time but also during system operation, the operator should once intercept settings for all the bus masters and the DMA controller to prevent a new DMA request from occurring in the G bus, then set adequate values in the register of the G bus arbiter 406, further check the status register in the G bus arbiter 406 and confirm switching of the priority of the bus master, thereafter making access to a new G bus and starting the DMA.

Dynamic switching of the priority bus master must be performed with sufficient consideration since it may change or violate real time warranty for an operating system and a setting of task priority.

(Sequential Processing)

Figure 35:
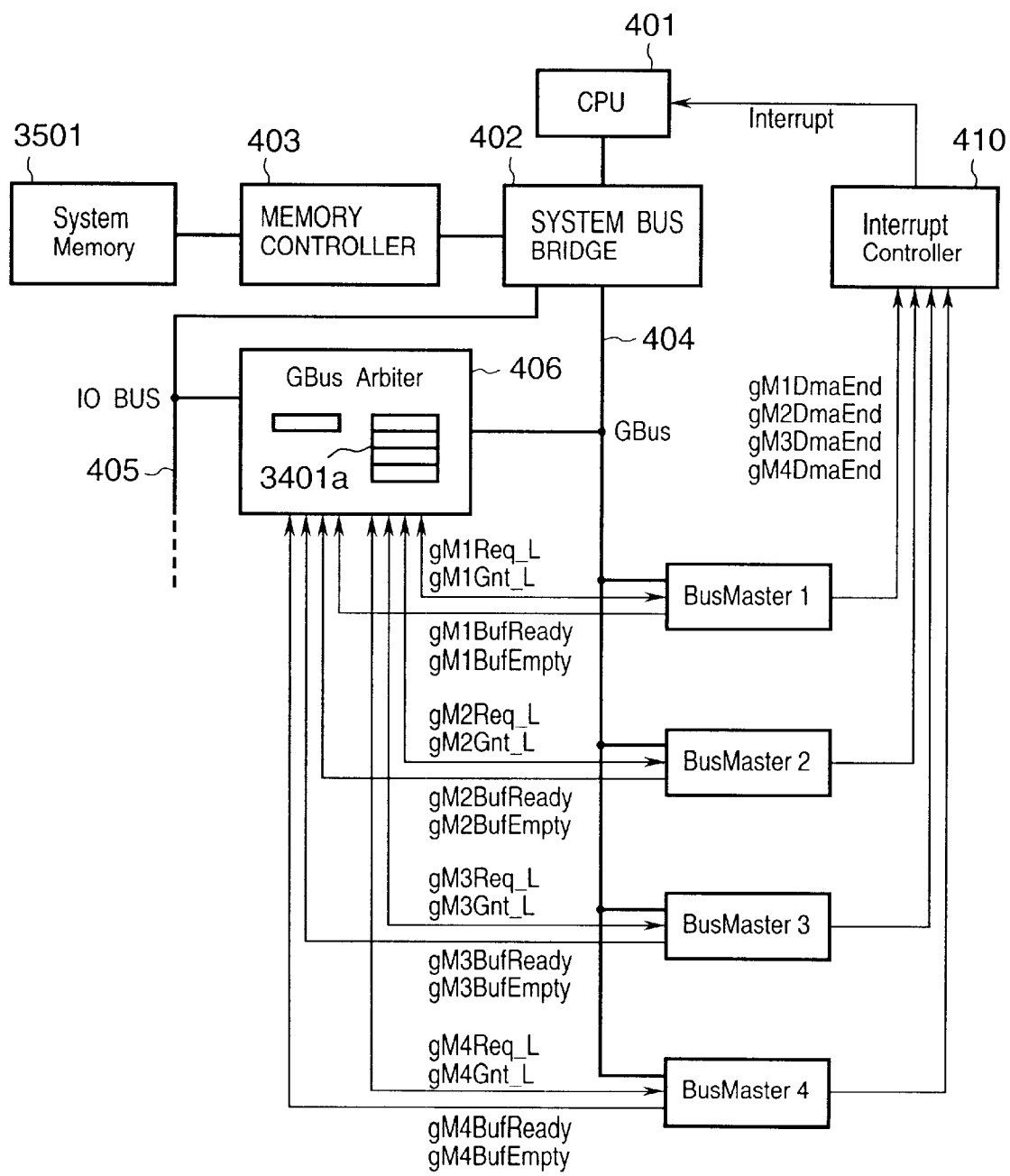
FIG. 35 is a block diagram of DMA by a bus master on G buses around a G bus 404 in a DoEngine 400.

FIG. 35 is a block diagram of the G bus 404 and other components in the DoEngine 400 which are related to DMA by the bus masters of the G bus. When it is required to process data sequentially with a plurality of bus masters, it is considered, for example, to perform processing A of data in a memory 3501 with a bus master 1, perform processing B with a bus master 2 and send processed data to a bus master 4.

By way of the B bus 405, a software for performing these processings, i.e., a program to be executed by the CPU 401 sets a sequence to allow the bus masters to use a bus, conditions to start granting the bus license and a condition for end in the register table 3401a in the bus arbiter 406. In this example, the sequence and the conditions are set as follows:

| Bus master | : Start condition | : End condition |
| --- | --- | --- |
| 1. Bus master 1 | : gM2BufEmpty | : gM1BufReady |
| 2. Bus master 2 | : gM1BufReady | : gM1BufEmpty |
| 3. Bus master 4 | : gM2BufReady | : gM2BufEmpty |

That is, upon receiving a signal set as the start condition from each bus master, the G bus arbiter 406 grants the bus license to the bus master and upon receiving a signal set as the end condition, the G bus arbiter 406 deprives the bus master of the bus license.

The software sets a DMA for each bus master. With this DMA, each master issues a request (g(mastername)Req_L) to the G bus arbiter 404. The G bus arbiter 404 grants the bus right to the bus master 1 in a sequence registered in the register table 3401a (gM1Gnt_L). The bus master 1 reads data in a certain unit from a memory 3501, performs the processing A and writes the data into a buffer in the bus master 1. The bus master 1 transmits a signal gM1BufReady to the arbiter 406 to inform that the bus master 1 has completed processing of a unit and the buffer is ready.

Upon receiving the signal, the arbiter 406 deprives the bus master 1 of the bus right and grant the bus right to the bus master 2 according to the conditions for granting and depriving of the bus right which are registered in the register table 3401a. The bus master 2 reads the data from the buffer of the bus master 1, performs the processing B and stores the data into a buffer in the bus master 2. When the buffer of the bus master 1 becomes empty in this while, gM1BufEmpty is asserted and the arbiter 406 stops granting the bus right to the bus master 2. The bus master 2 performs the processing B and transmits a signal gM2BufReady to inform that its buffer is ready.

The arbiter 406 receives the signal and grants the bus license to the bus master 4 this time according to contents of the register 3401a. The bus master 4 reads the data from the buffer of the bus master 2. When the buffer of the bus master 2 becomes empty, the bus master 4 transmits gM2BufEmpty to the arbiter 406 for information, and the arbiter 406 receives this signal, grants the bus license to the bus master 1 once again according to the contents of the register 3401a and starts a next processing of data.

Upon completing the MDA set in each bus master, it causes an interrupt to inform the completion to the processor. When the software receives end information from all the bus masters, it knows an end of a series of processings.

The operations described above are those in a complete sequential mode in which bus masters other than those related to the sequential processings cannot use the bus. In order to allow the bus masters which are not related to the sequential processings to use the bus even during the sequential processings, a priority sequential mode is prepared. Switching between these modes is performed by programming the register in the arbiter 406. In the priority sequential mode, the bus masters which perform the sequential processings can preferentially use the bus and the bus masters which are not related to the sequential processings are also allowed to use the bus. Arbitration between the bus masters which perform the sequential processings and the bus masters which are not related to the sequential processings is similar to that in the priority arbitration mode which has been described above. It is needless to say that the bus license is not granted to a bus master which is related to the sequential processing but does not satisfy the condition to obtain the bus right and has no turn of itself.

(Mechanism to Maintain Access Sequence)

When a signal stopSpc is asserted, a scanner controller/printer controller which is one of the G bus masters is excepted from among objects of the arbitration and the bus license is not granted to this G bus master even if it asserts a request. The arbitration is performed among the masters, with this G bus excepted. Detailed description will be made separately in a section of B bus arbiter.

<Timing Diagram>

Figure 36:
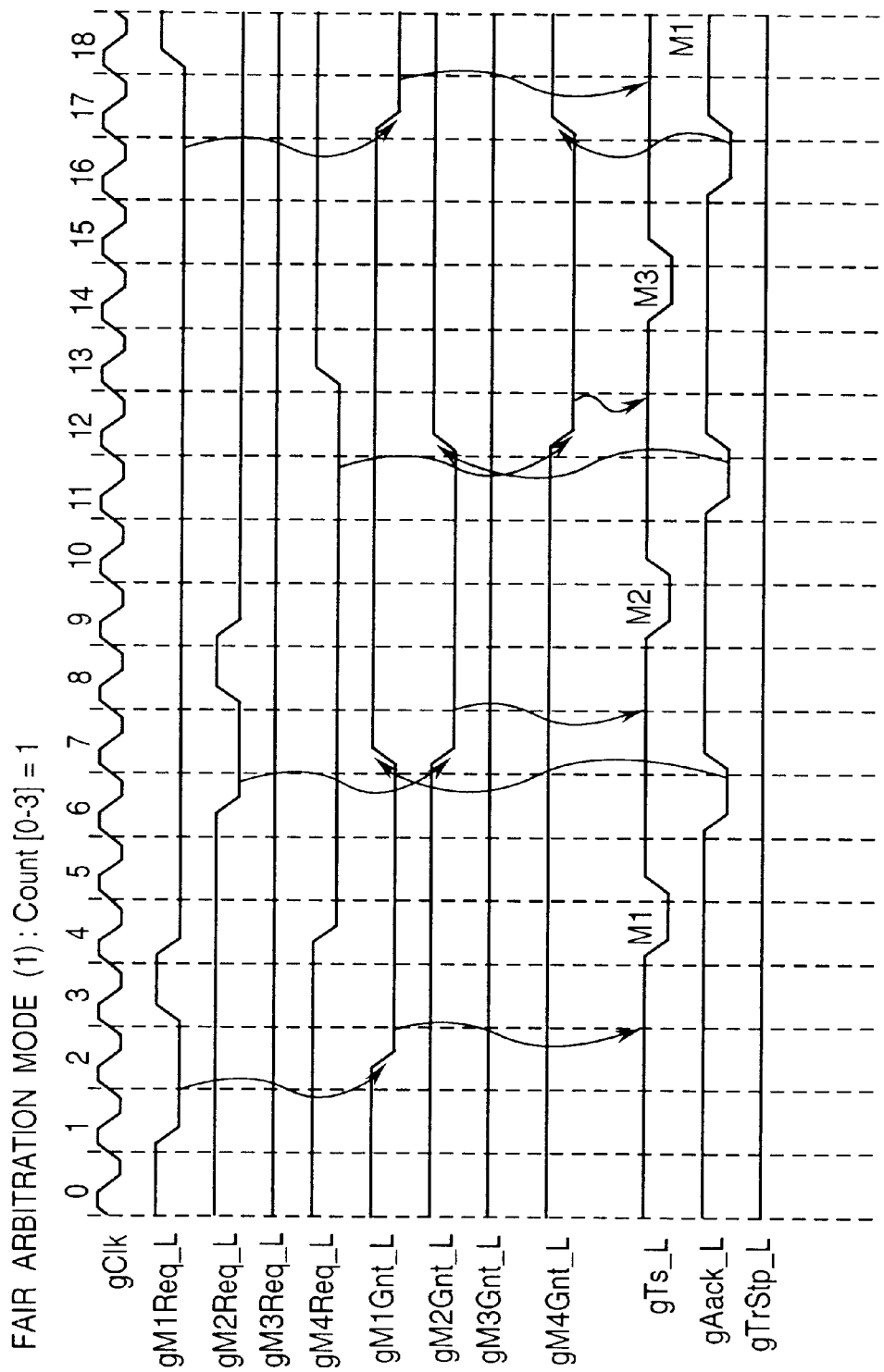
FIG. 36 is a diagram showing an example of a fair arbitration mode (fair mode) wherein a number of successive uses of bus is set at 1 for each of bus masters 1 through 4.

A timing of a G bus arbitration will be described with reference FIGS. 36 through 39. FIG. 36 exemplifies the fair arbitration mode (fair mode) in a case where a number of successive bus use is set at 1 for all the bus masters 1 through 4. A second bus request from the bus master 1 (at a timing 4) is postponed until all other bus masters that issues bus requests have been processed once.

Figure 37:
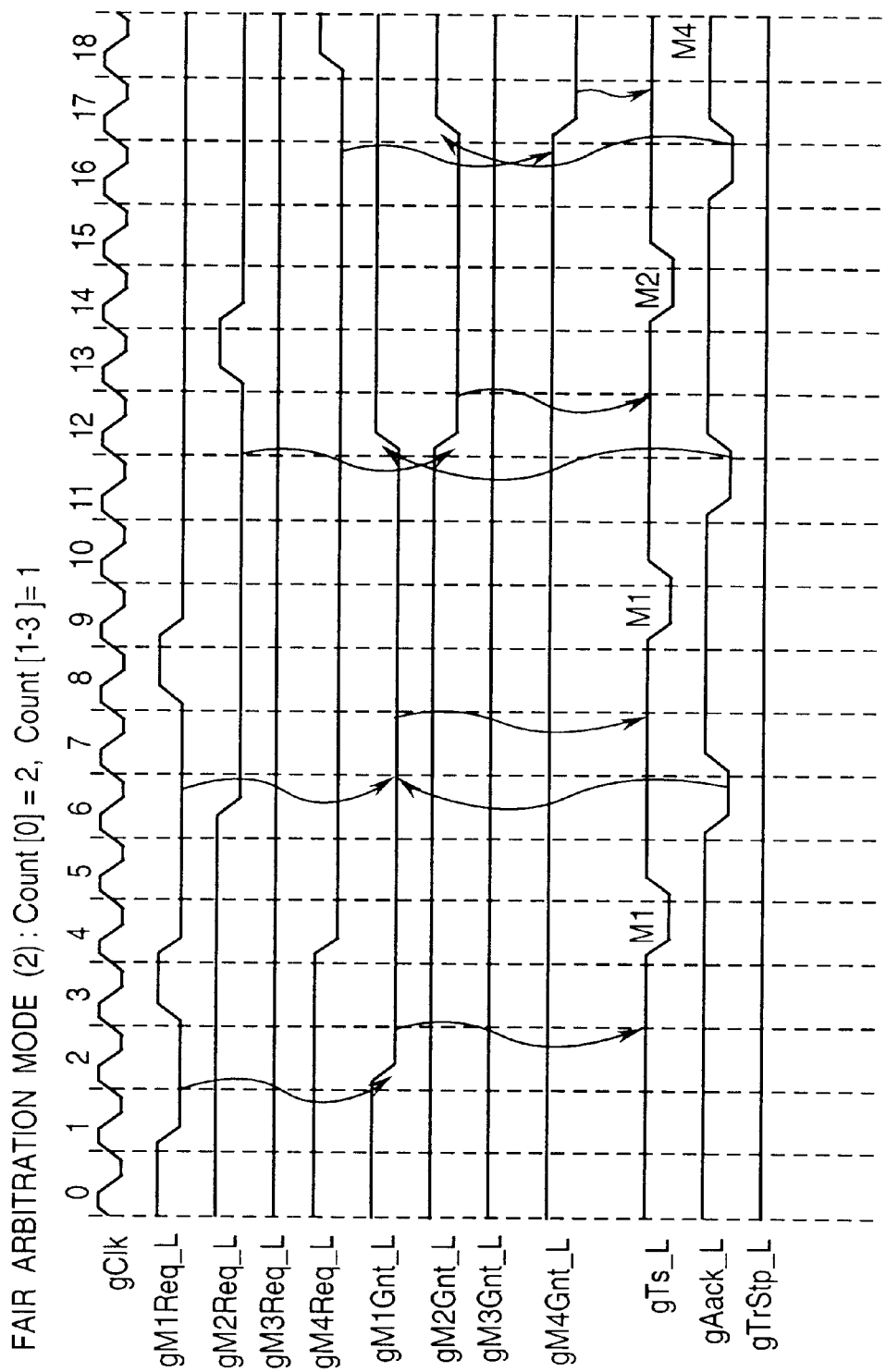
FIG. 37 is a diagram showing an example of a fair arbitration mode wherein a number of successive uses of bus is set at 2 for the bus master 1 only and at 1 for the other bus masters.

FIG. 37 is an example of fair arbitration mode wherein a number of successive bus use is set at 2 only for the bus master 1 and set at 1 for the other bus masters. The second request issued from the bus master 1 (at a timing 4) is granted immediately after a first request and the other bus masters are kept waiting until a processing for the second request has been completed.

Figure 38:
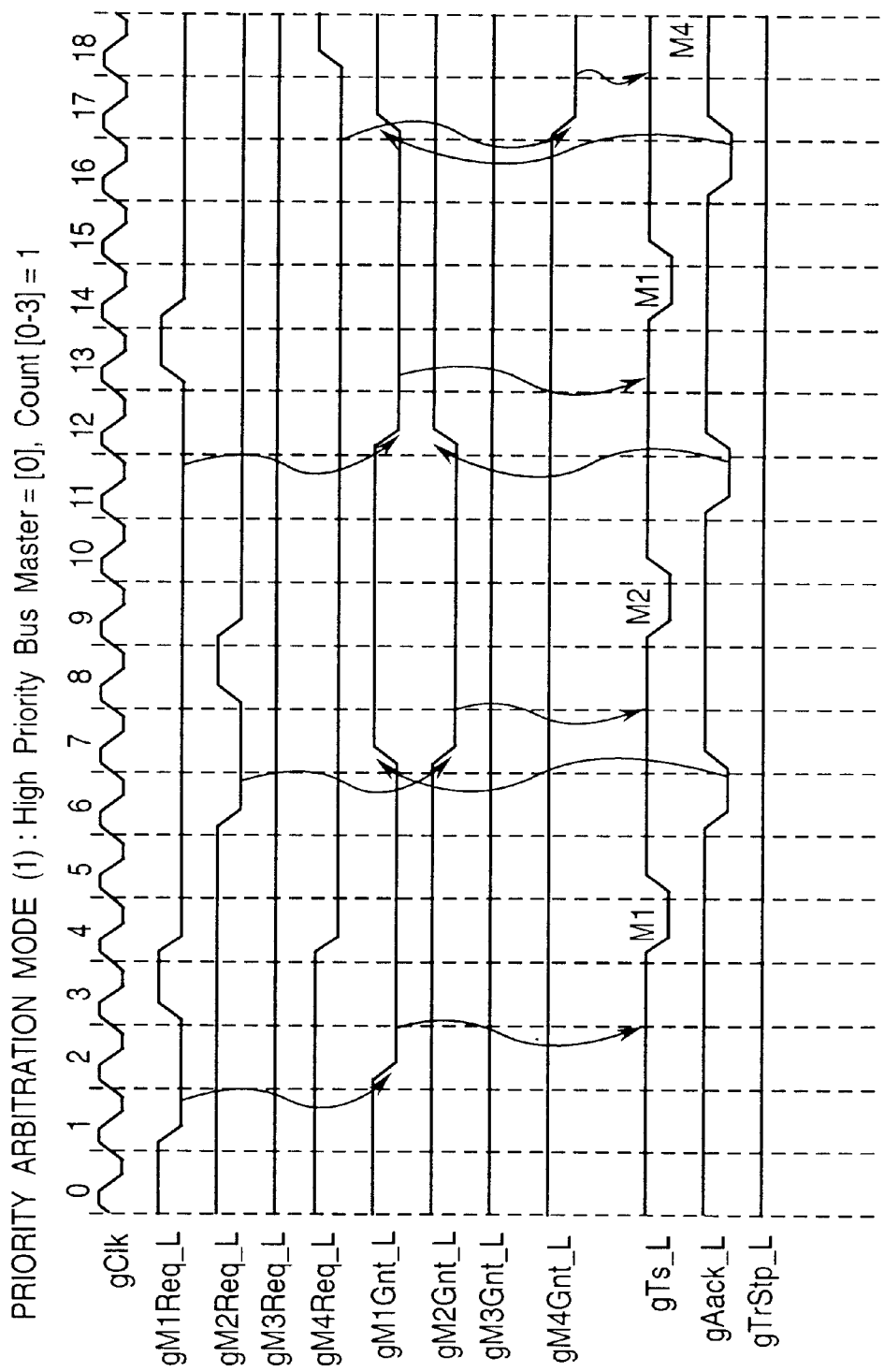
FIG. 38 is a diagram showing an example of a priority arbitration mode wherein a number of successive uses of bus is set at 1 for each bus master and the bus master 1 is set as a high priority bus master.

FIG. 38 is an example of priority arbitration mode wherein a number of successive bus use is set at 1 for each bus master and the bus master 1 is set as a priority bus master. Since the bus license is granted alternately to the priority bus master and non-priority bus masters, a second bus request from the bus master 1 is granted after the bus master 2 uses the bus and a bus request from the bus master 4 is granted after the bus master 1 uses the bus for the second time. Furthermore, a second bus request from the bus master 2 is granted after all other bus masters which issue bus request, the bus master 1 and the bus master 4 in FIG. 38, use the bus.

Figure 39:
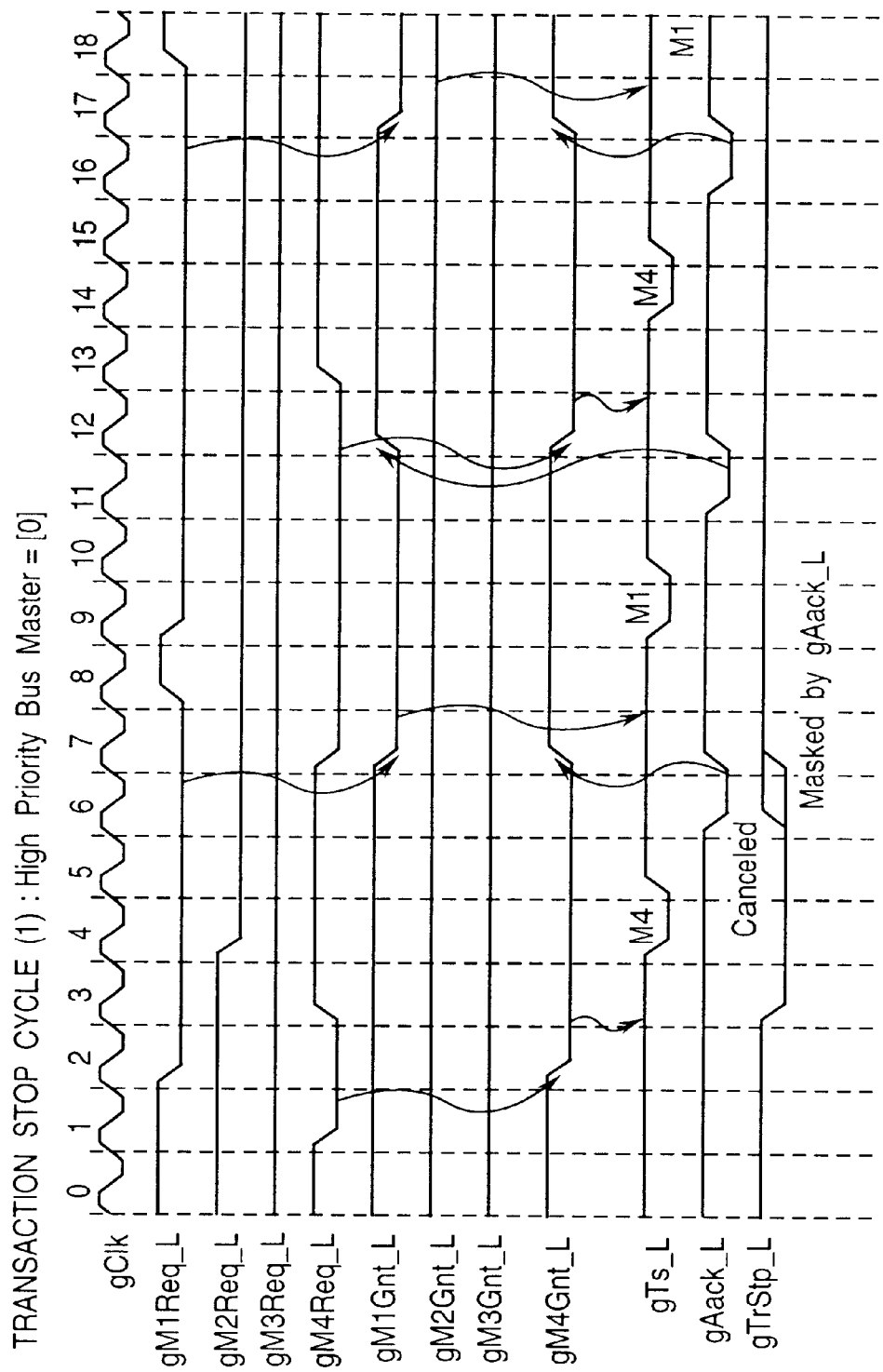
FIG. 39 is a diagram showing an example wherein a bus request for the bus master 4 is interrupted though it is allowed by the bus request from the bus master 1.

FIG. 39 is an example wherein a bus request from the bus master 4 is granted but intercepted by a bus request from the bus master 1. In this case, the bus request from the bus master 4 is granted prior to a bus request from the bus master 2 when the bus master 1 completes use of the bus.

2.8. B Bus Arbiter

Figure 40:
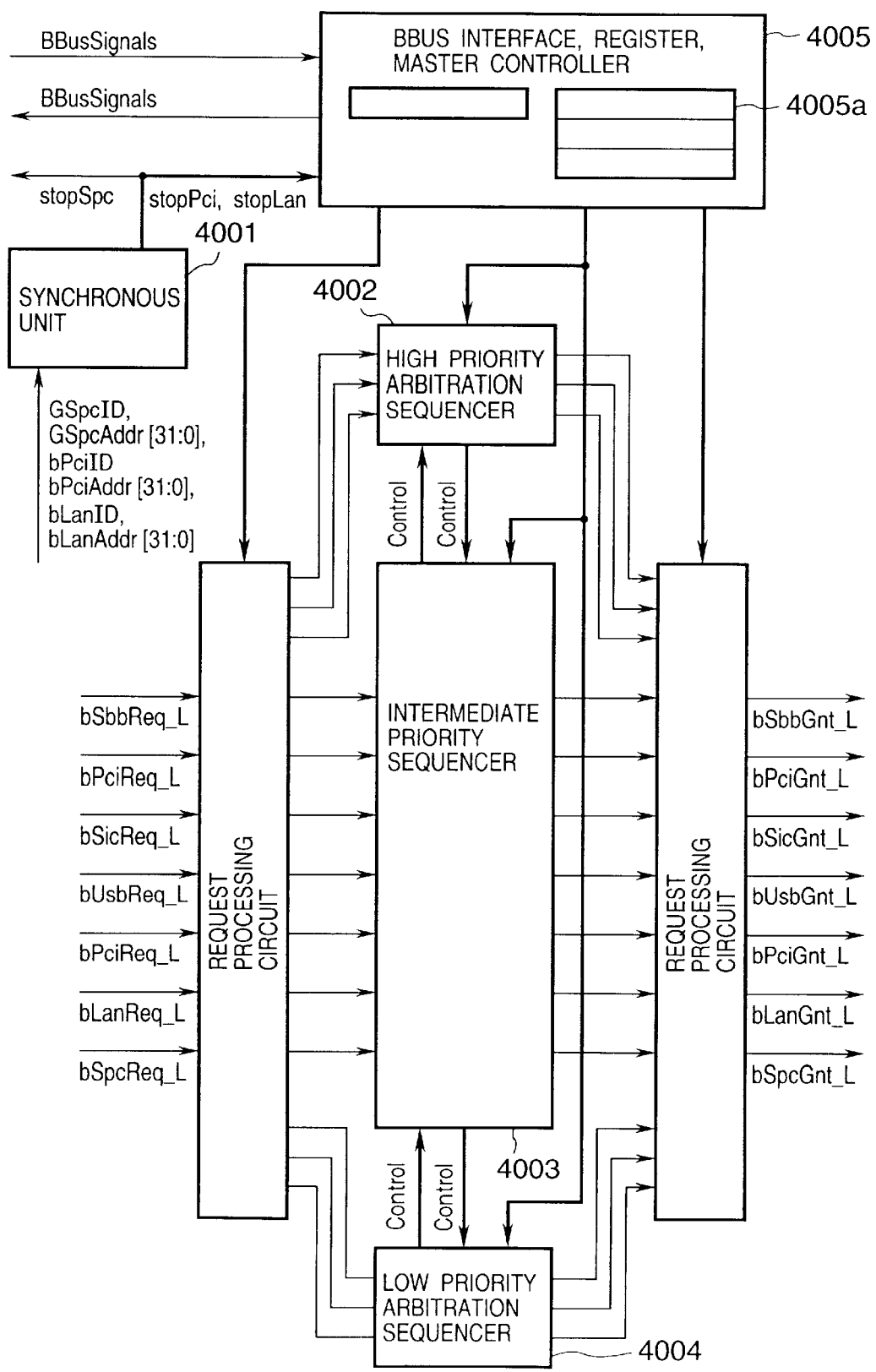
FIG. 40 is a block diagram of a B bus arbiter 407.

FIG. 40 is a block diagram of the B bus arbiter 407.

The B bus arbiter 407 receives a request of bus use from the B bus 405 which is an internal general purpose bus of the DoEngine, gives a license of use to a selected master after arbitration and inhibits the bus from being used by two or more masters at the same time.

The arbitration mode is configured to have three steps of priorities to each of which a plurality of masters can be allocated programmably. Three masters at maximum can be allocated to a highest priority, seven masters at maximum can be allocated to an intermediate priority and three masters at maximum can be allocated to a lowest priority.

The B bus arbiter has a mechanism which reserves granting of the right of bus use to a specific master on the basis of the master ID signal and the stop signal from the synchronous unit as a mechanism which functions to maintain an access sequence intended by the user when the G bus master and the B bus master sequentially issue writes to the same address.

(Arbitration Sequencer)

The B bus arbiter is composed of three sequencers 4002, 4003 and 4004. These arbitration sequencers has a high priority, an intermediate priority and a low priority respectively, and comprises arbitration sequencers for three, seven and three bus masters respectively. Request signals from units which may be used as bus masters in the B bus and grant signals to the units are distributed among these three sequencer units by a request selector and a grant selector. This distribution is selectable as a unique combination from among a plurality of combinations by a software-programmable register 4005a in a B bus interface 4005.

A fair arbitration can be realized, for example, by connecting request from seven masters at maximum to the intermediate priority arbitration sequencer 4003. Furthermore, some of the masters are allocated to the high priority arbitration sequencer 4002 so that they can acquire the bus license at a possibility higher than the other masters. Moreover, some requests are connected to the low priority sequencer 4004 so that they use the bus at a low rate. In addition to adjustment of possibilities to use the bus described above, the masters which are allocated to the high priority sequencer 4002 can use the bus successively in a number which is variable by a programmable register 4005a. Accordingly, the arbitration sequencer can adjust occupied rates of the bus and allow specific masters to use the bus for a longer time.

(Fair Bus Arbitration Mode)

Taking the intermediate priority sequencer 4003 as an example, description will be made of a method to realize a fair arbitration. All bus masters connected to a sequencer has the same priority and fair occasions to obtain the bus license. When the bus is free, a bus master which issues a request first can acquire the bus right (first come first serve). When a plurality of bus masters issue requests at the same time, the bus license is sequentially granted in a predetermine order (simultaneous request issuance round robin). When all bus masters M1 through M7 issue requests with the same clock, for example, the bus license is granted in a sequence of M1→M2→M3→M4→M5→M6→M7. When all the bus masters issue requests once again upon termination of transaction of M7, the bus license is granted in a similar sequence of M1→M2→M3→M4→M5→M6→M7→M1→M2. When some of the bus masters issue requests, the bus license is granted to a master whichever has a largest number closest to that of a master which used the bus last.

(Priority Arbitration)

The B bus interface has three arbitration sequencers which have high, intermediate and low priorities. An arbitration having a priority order is realized by selectively allocating a plurality of bus requests selectively to high priority and low priority arbiters.

When a bus master is allocated to the high priority arbiter and rest bus masters are allocated to an intermediate priority arbiter, for example, the bus master functions as a priority bus master having a priority order higher than the rest bus masters and acquires the bus license preferentially to the other bus masters. All bus masters allocated to arbitration sequencers which have the same priority have the same priority order.

When a plurality of bus masters issue requests and the priority bus master issues request successively, the priority bus master and the other bus masters acquire the bus license alternately. When M3 is the priority bus master and M1, M2, M3 and M4 issue requests successively, the bus license is granted in a sequence M3→M1→M3→M2→M3→M4→M3→M1.

Furthermore, a high priority bus master can acquire the bus license successively in a number which is preset in a programmable register in an arbiter. The number of successive bus use is 4 at maximum.

When the bus license is shifted from a bus master other than the priority bus master to another bus master, the bus master cannot acquire the bus license before the bus license is given to all bus masters which issue requests. When a bus master issues requests successively, the bus master can acquire the bus license successively if no other bus master issues a request, but only in a preset number if another bus master issues a request. Once the bus license is shifted to another bus master, the bus master can acquire the bus license once again only after the bus license is granted to all bus masters which issue requests.

Three requests at maximum can be allocated to the low priority arbitration sequencer 4004. The bus license is granted to the bus masters allocated to the low priority sequencer 4004 only in a condition where all the bus masters allocated to the intermediate sequencer and the high priority sequencer do not issue a request. Bus masters must be allocated with sufficient care to the low priority sequencer.

(Switching of Priority Bus Master)

The priority bus master can be switched by rewriting a register in an arbiter. When a register which selects the priority bus master is rewritten, the priority bus master is switched upon termination of a transaction which is being executed at that time. The arbiter is returned to the idle state and arbitration is performed among bus masters which issued requests when the register is rewritten assuming that the bus masters issue the requests upon termination of the transaction.

Sufficient care must be taken for the switching. If the priority bus master is switched to a different bus master before completing a DMA of a bus master which is to be preferential, a priority of the initial priority bus master is lowered. When it is desired not to lower the priority of the initial priority bus master, it is necessary to switch the priority bus master after confirming completion of the DMA.

The dynamic switching of the priority bus master must be carried out with sufficient consideration since it may change or violate real time warranty for the operating system and a priority order of tasks.

(Access Sequence Control Mechanism)

The B bus arbiter 407 comprises an access sequence control mechanism. The access sequence control mechanism is composed of the synchronous unit 4001, the B bus arbiter 407 and a bus license issuance suppression mechanism built in the G bus arbiter 406. A bus license issuance suppression mechanism built in the B bus arbiter 407 operates like that of the G bus arbiter. When a stopPci signal is input, a bus request is issued from a Pci bus master. The bus license issuance mechanism does not issue the bus license to this master but grants the bus license to another bus master even if a result of an arbitration shows a condition where the bus license can be granted the Pci bus master. Speaking concretely, the bus license issuance suppression mechanism masks bPciReq_L immediately when the stopPci signal is input.

Figure 41:
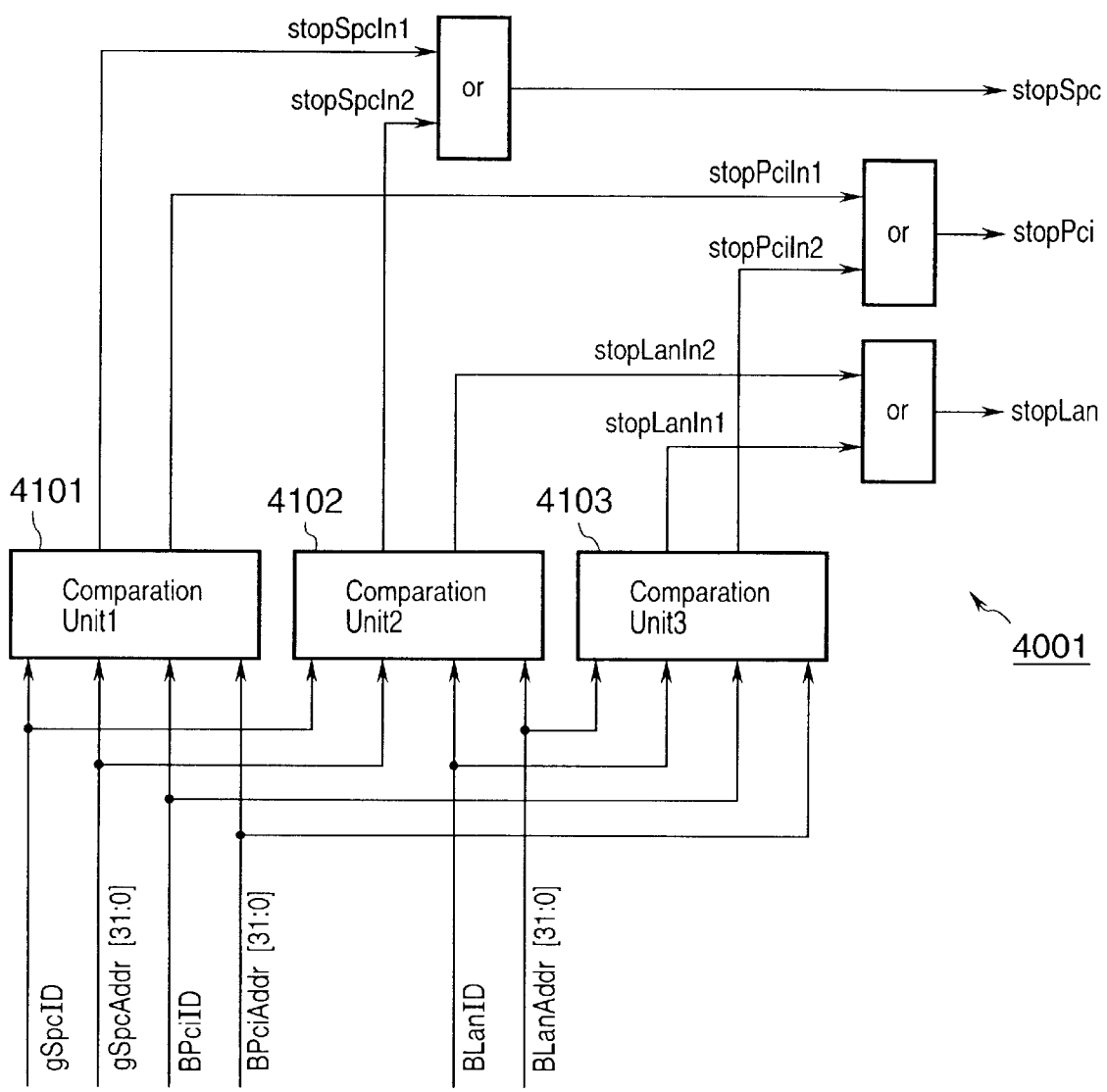
FIG. 41 is a block diagram of a synchronous unit 4001.

The bus license issuance suppression mechanism operates quite similarly in case of a bus request signal from the LAN controller 414 and a stop signal. FIG. 41 shows a block diagram of the synchronous unit 4001. In the synchronous unit, comparison units 4101 through 4103 are connected to any one of a plurality of combinations of DMA masters. In the DoEngine, the scanner controller/printer controller only exists as a DMAmaster on the G bus. A DMAPCI unit and LAN unit exist on the B bus. The B bus interface in the SBB which is a bus master on the B bus does not make access directly to a memory and does not output an ID or a transfer destination address to the synchronous unit 4001.

Figure 42:
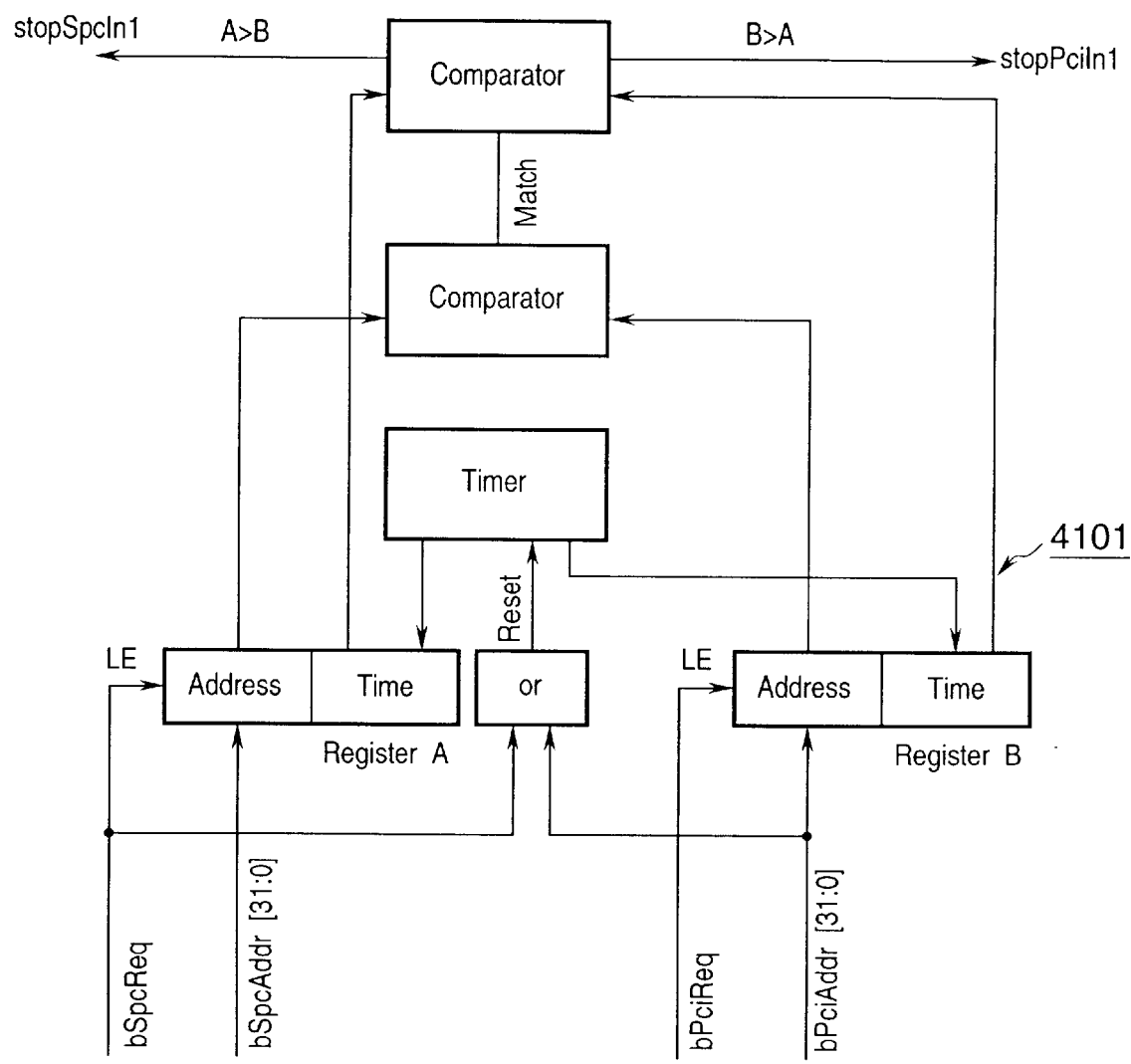
FIG. 42 is a diagram of a comparation unit in the synchronous unit.

FIG. 42 shows a comparison unit 1 out of the comparison units disposed in the synchronous unit. The other comparison units have a similar configuration.

From a DMA block accompanying the PCI interface 416 or the scanner controller/printer controller, an address of a transfer destination and a request signal peculiar to its DMA block are informed to the synchronous unit 4001 when a DMA write is programmed.

When a request is output from each DMA block, each comparison unit stores the address together with a current time counted with an internal timer, and when an address and a request related to the DMA write are input from another DMA block, each comparison unit compares both the addresses. When the addresses are coincident, the comparison unit further compares the times stored in registers and takes a measure to prevent the bus license from being granted to a bus arbiter of a bus connected to the DMA block which issued the DMA write request at a later time. This measure is informed to a bus arbiter of each bus with a stop(ID) signal.

Each bus arbiter does not allocate the bus license to the master to which the stop(ID) signal is informed by an arbitration.

When time elapses and the bus master which issued the access request precedently completes the DMA write in a corresponding memory address, the preceding master dismisses the request from the synchronous unit and the synchronous unit dismisses issuance of the bus license grant inhibiting signal for a DMA block from a bus arbiter of a bus connected to the DMA block which issued the DMA write request secondly. Thereafter, a master which is to perform a DMA write executes the DMA write.

When both the DMA writes are completed and both the requests are dismissed, a timer is reset. The timer counts up once again when a request is output from either of the masters.

2.9. Scanner Controller/Printer Controller

Figure 43:
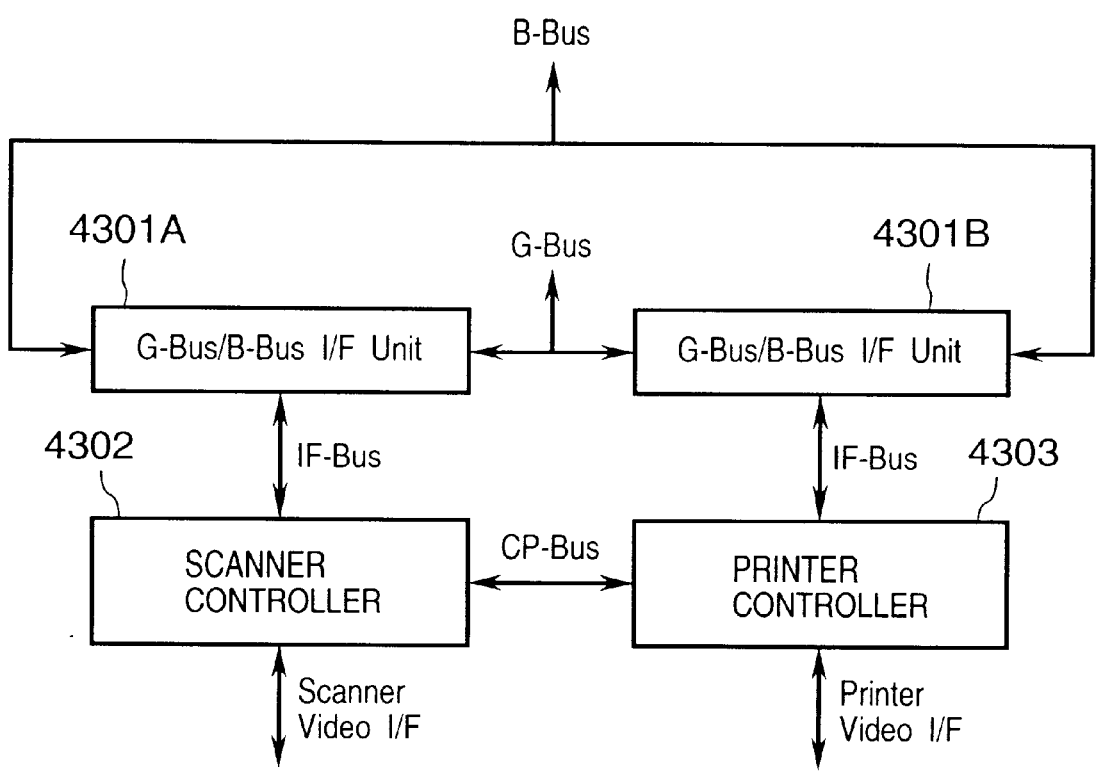
FIG. 43 is a block diagram of a scanner/printer controller.

FIG. 43 shows a block diagram of the scanner controller/printer controller and peripheral circuits. The scanner/printer controller is a block which interfaces a scanner and a printer with the G bus or the B bus. The scanner/printer controller is composed of three functional blocks which are described below:

1. Scanner Controller

A scanner controller is connected to a scanner by way of a video I/F to control operations and data transfer. The scanner controller is connected to a G bus/B bus I/F unit 4301A by way of an IF-bus for data transfer and register read/write. The data transfer has a master function.

2. Printer Controller

A printer controller is connected to a printer by way of a video I/F to control operations and data transfer. The printer controller is connected to a G bus/B bus I/F unit 4301B by way of an I/F bus for data transfer and register read/write. The data transfer has both a master function and a slave function.

3. G Bus/B Bus I/F Units

The G bus/B bus I/F units are used to connect the scanner controller 4302 and the printer controller 4303 to the G bus or the B bus. The G bus/B bus I/F units are connected independently to the scanner controller 4302 and the printer controller 4303 for connection to the G bus and B bus.

4. CP Bus

This is a bus for on-line connection of image data and synchronous signals for horizontal and vertical synchronization of a scanner and a printer.

2.9.1. Scanner Controller

Figure 44:
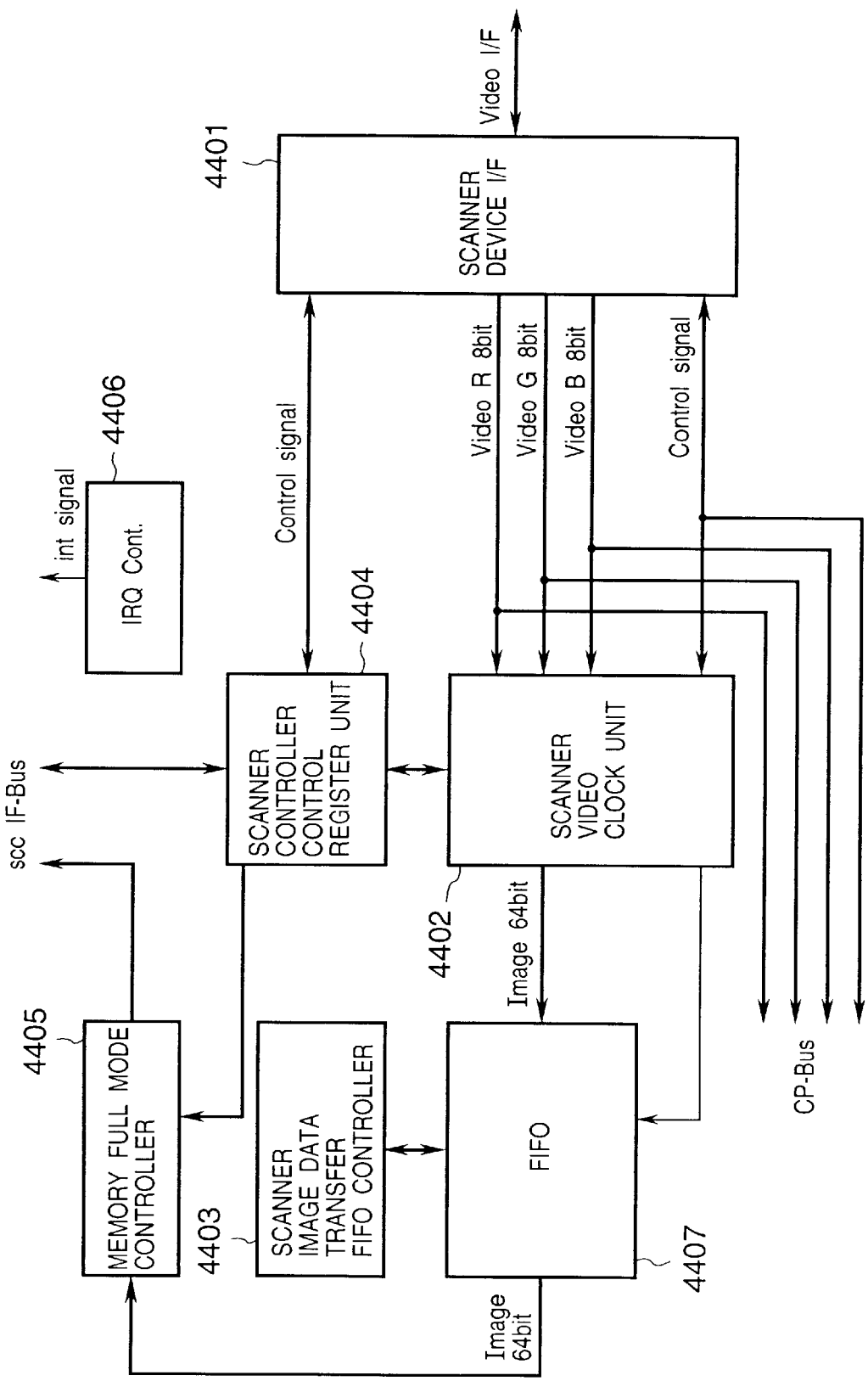
FIG. 44 is a block diagram of a scanner controller 4302.

FIG. 44 shows a block diagram of the scanner controller 4302. The scanner controller 4302 is a block which is connected to the scanner by way of a video I/F so as to interface with the G bus/B bus I/F unit (scc GBI) 4301A. The scanner controller 4302 is interfaced with the G bus/B bus I/F unit (scc GBI) 4301A byway of an sccI/F bus. The scanner controller is composed mostly of blocks which are mentioned below:

1. Scanner device I/F 4401

An input/output port to input and output signals into and from the video I/F of the scanner.

2. Scanner video clock unit 4402

A unit which is operated with video clocks from the scanner.

3. Scanner image data FIFO controller 4403

Controls as FIFO for image data transfer.

4. Scanner controller control register unit 4404

A register to control the scanner controller as a whole.

5. IRQ controller 4406

Controls an interrupt signal generated in the scanner controller (Scc).

6. Memory fill mode controller 4405

Controls a mode in which fixed data set in a register is transferred to a memory. Selects the fixed data or image data from the scanner.

7. FIFO (FIFO_SCC) 4407

A FIFO which is used when an output destination device may be asynchronous from video data at a stage to output video data from the scanner.

Kinds of image data input from the scanner include:

1. Color many-valued data having 8 bits each in R, G and B.
2. 8-bit white-black many-valued data
3. 1-bit white-black binary data.

Now, the blocks which compose the scanner controller will be outlined below:

[1. Outline of Scanner Device I/F]

Figure 45:
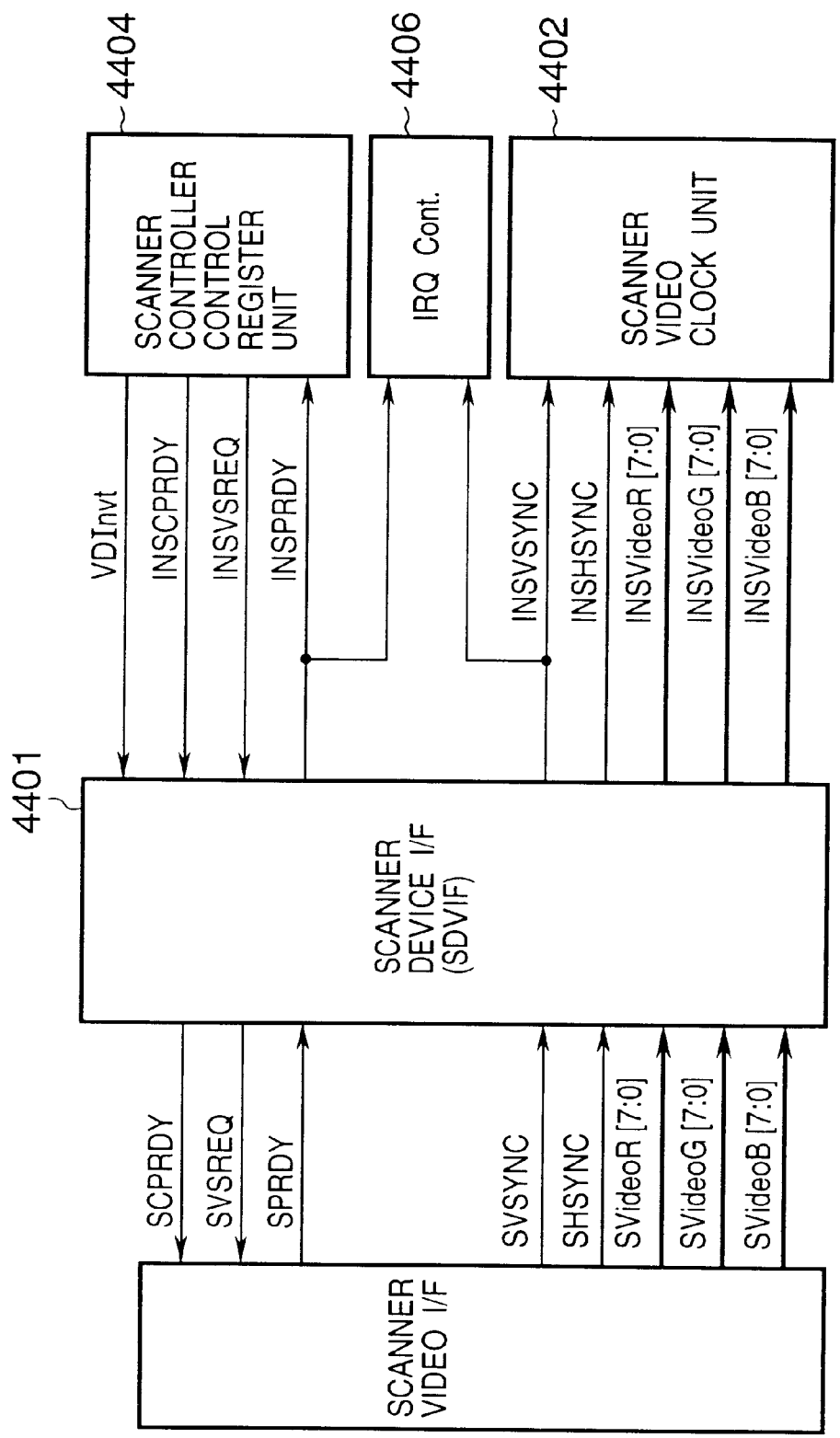
FIG. 45 is a block diagram of a scanner device I/F 4401.

FIG. 45 shows a block diagram of the scanner device I/F 4401. The scanner device I/F is an input/output port which inputs and outputs signals into and from a scanner video I/F 4501 of the scanner unit. The scanner device I/F 4401 is capable of determining whether or not level inversion is performed for each of image signals SVideoR[7:0], SVideoG[7:0] and SVideoB[7:0] input from the scanner video I/F in correspondence to a signal VDInvt from the scanner controller control register 4404.

[2. Outline of Scanner Video Clock Unit]

Figure 46:
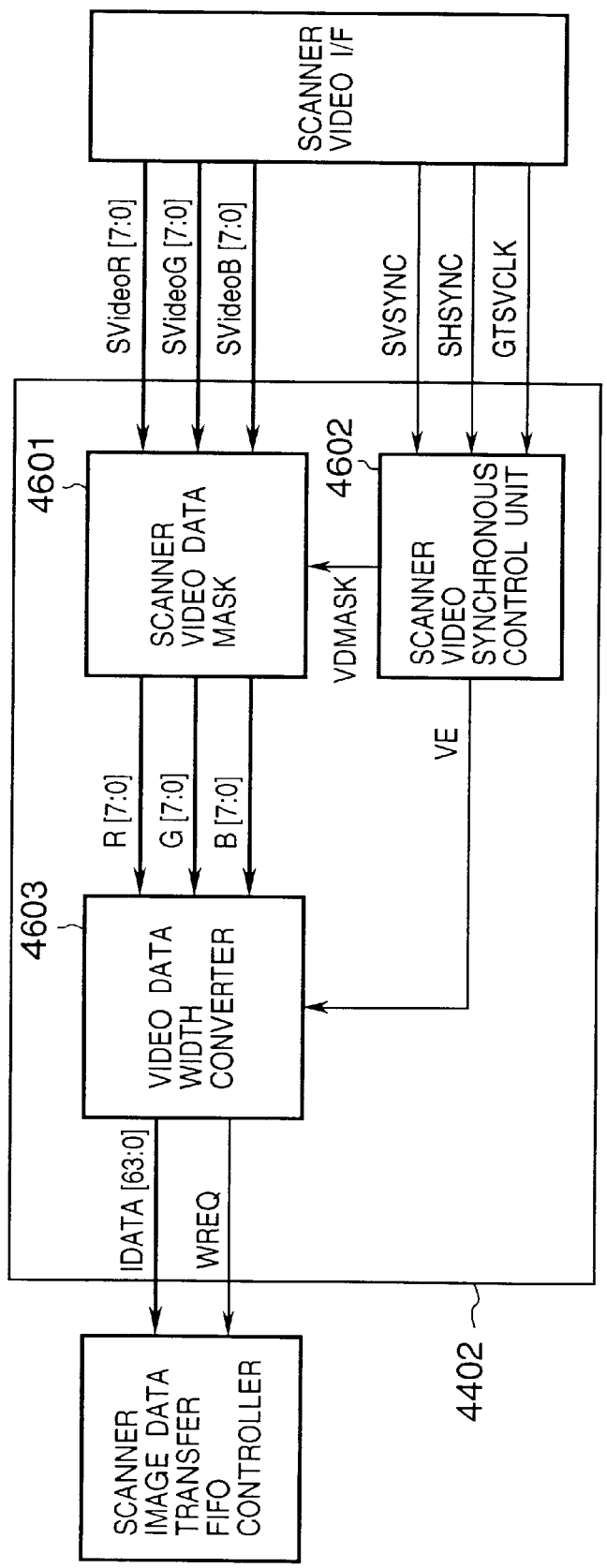
FIG. 46 is a block diagram of a scanner video clock unit 4402.

FIG. 46 shows a block diagram of the scanner video clock unit 4402. The scanner video clock unit 4402 is a block which is operated with video clocks from the scanner. The scanner video clock unit 4401 is composed of blocks which are mentioned below:

1. Scanner video data mask 4601

This is a block which masks image data from the scanner. Masked data has values which are set in a register.

2. Scanner video synchronous control unit 4602

This is a block which generates a timing signal or the like to be used for acquiring image data from a video clock, a VSYNC signal and a HSYNC signal provided from the scanner. This control unit manages data numbers and line numbers in horizontal and vertical directions of the image data.

3. Video data width converter.

This is a block which converts image data input from the scanner by packing it into data having a width of 64 bits.

(Outline of Scanner Video Data Mask)

Figure 47:
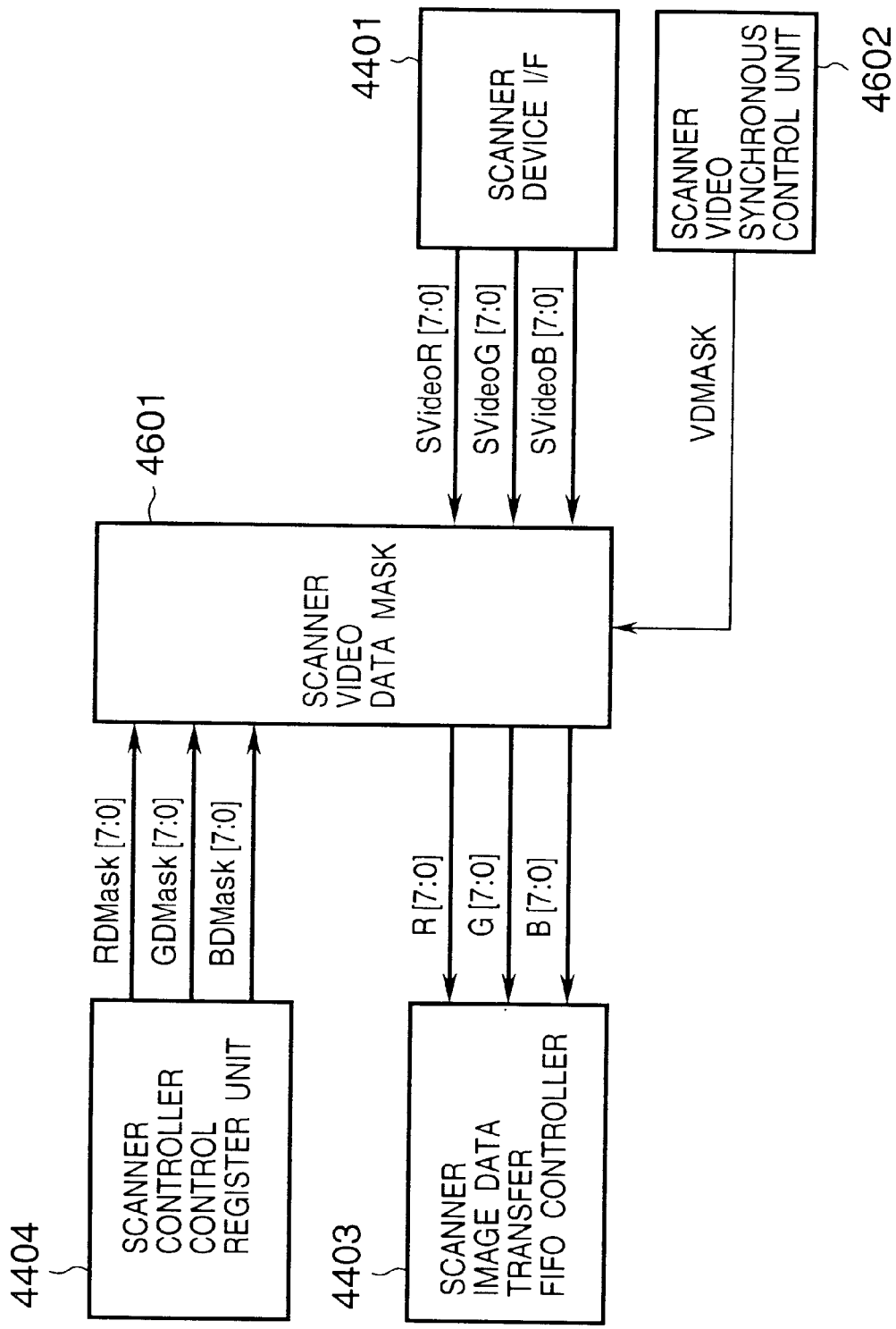
FIG. 47 is a block diagram of a scanner video data mask 4601.

FIG. 47 shows a block diagram of the scanner video data mask 4601. The scanner video data mask 4601 masks the image data input from the scanner in a pixel unit. Masked image data has values which are set by a register (RDMask [7:0], GDMask[7:0] and BDMask[7:0]).

(Outline of Scanner Video Synchronous Control Unit)

Figure 48:
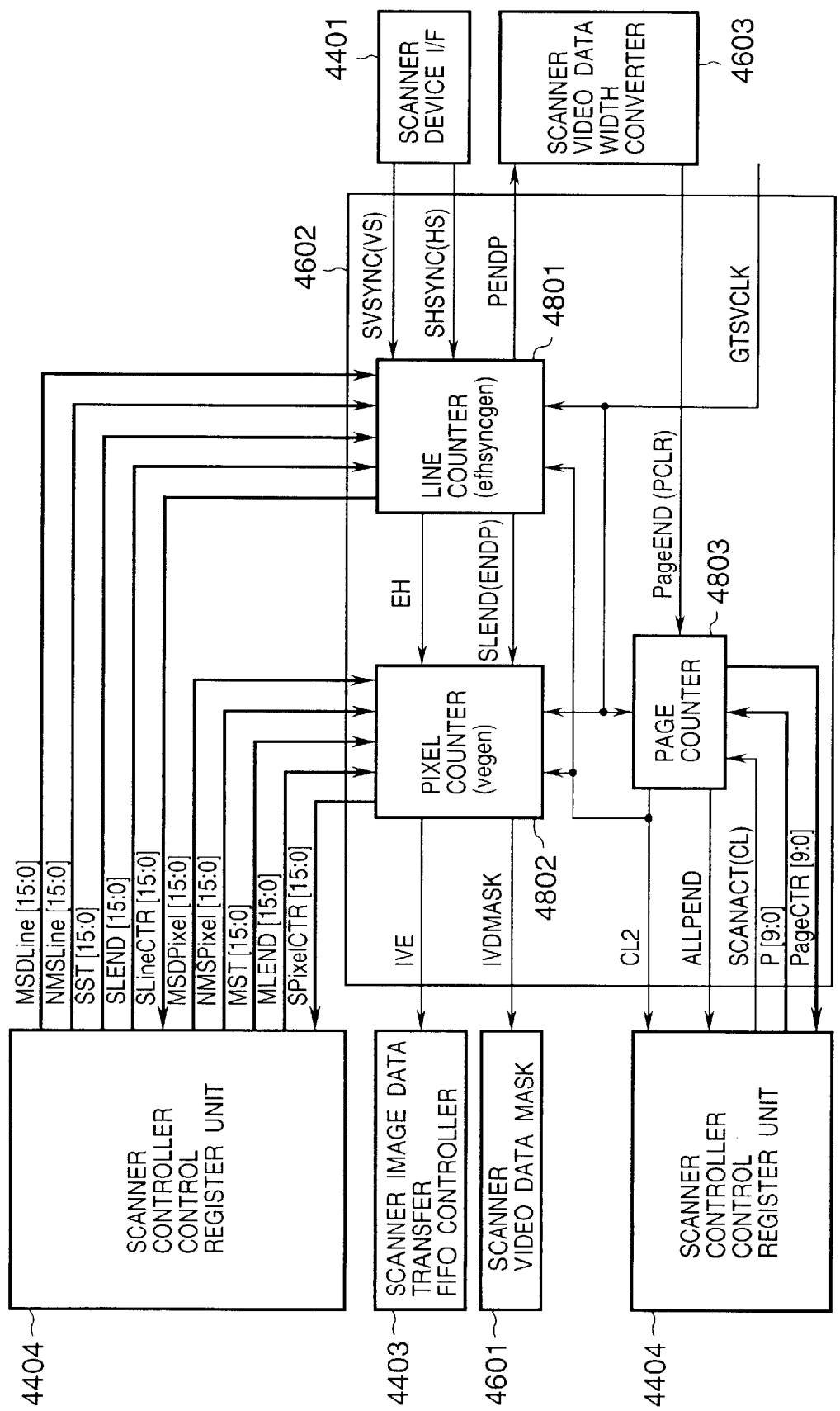
FIG. 48 is a block diagram of a scanner video data mask 4602.

FIG. 48 shows a block diagram of the scanner video synchronous control unit 4602. The scanner video synchronous control unit 4602 generates an enable signal (IVE) for image data to be acquired from a vertical synchronous signal (SVSYNC), a horizontal synchronous signal (SHSYNC) and an image data synchronous clock (GTSVCLK) of image data input from the scanner. Furthermore, the scanner video synchronous control unit 4602 manages a delay in a main scanning direction of the image data, a number of pixels to be acquired, a delay in a subsidiary scanning direction and a number of lines to be acquired. Furthermore, the scanner video synchronous control unit 4602 generates a status signal (PENDP) at a timing when the image data has been acquired in a preset amount.

A line counter 4801 generates a vertical synchronous signal (EH) for lines effective to read an image by managing the daly in the subsidiary scanning direction and the number of lines to be acquired. A pixel counter 4802 manages the image acquistion delay in the main scanning direction and the number of pixels to be acquired. A page counter 4803 manages image data to be input in a page unit. It generates an end signal (ALLPEND) when the image data has been input in an amount corresponding to a set number of pages.

(Outline of Scanner Video Data Width Converter 4603)

Figure 49:
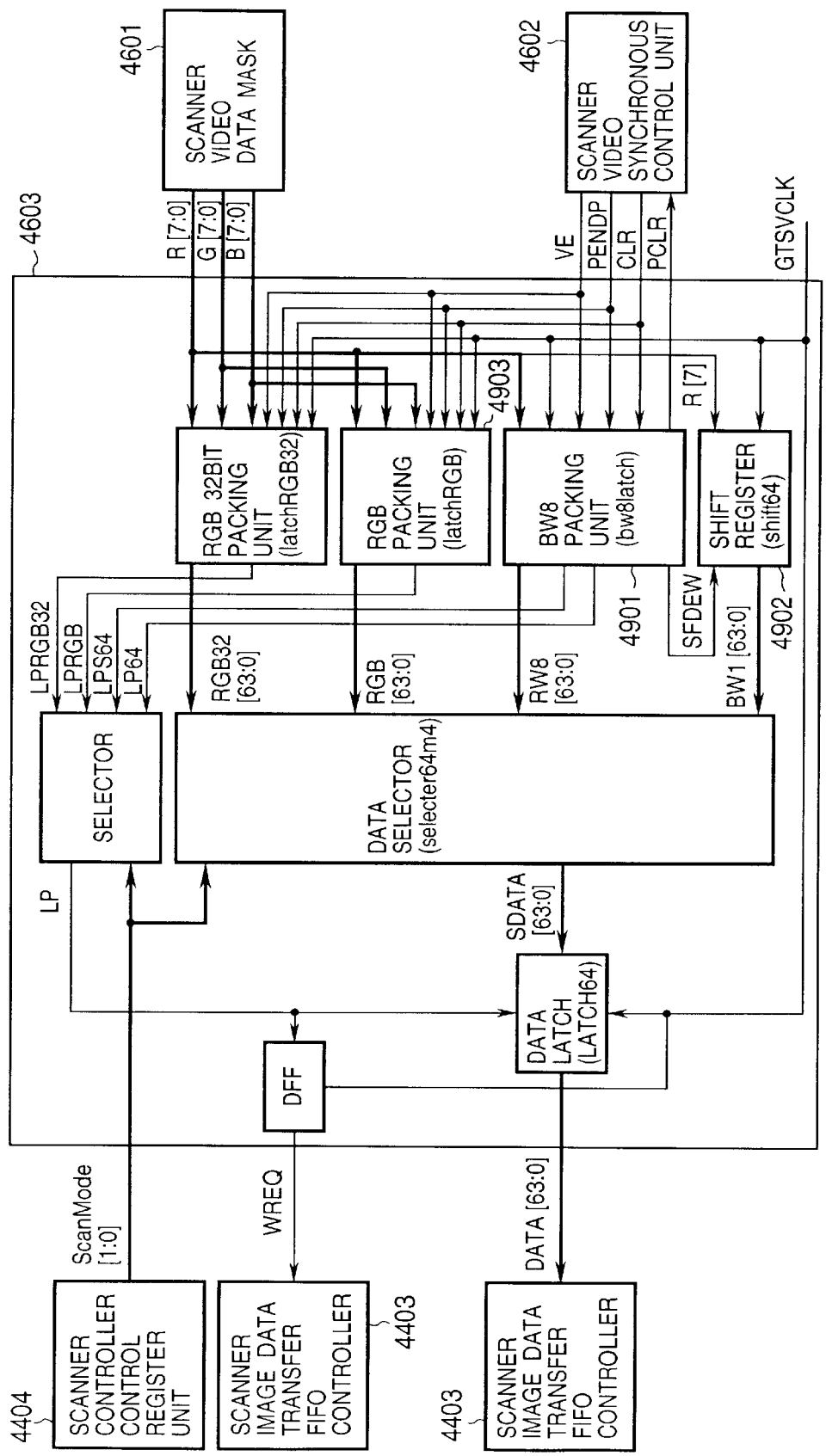
FIG. 49 is a block diagram of a scanner video data width converter 4603.

FIG. 49 shows a block diagram of a scanner video data width converter 4603. This is a unit which arranges image data input from the scanner in a width of 64 bits. Arranged data is written into the FIFO as 64-bit data. Three kinds of image data, the color image data having 8 bits each in R, G and B, the 8-bit white-black many-valued data and the 1-bit white-black binary data, can be input. A mode is set in the scanner controller control register 4404. The scanner video data width converter 4603 has a mode in which RGB color image data is arranged in 24 bits in a memory and a mode in which the image data is arranged in 32 bits with an additional byte. The three kinds of image data is input from signal lines which are mentioned below:

1. Color image data having 8 bits each in R, G and B . . . R[7:0], G[7:0], B[7:0]
2. 8-bit white-black many-valued image data . . . R[7:0]
3. 1-bit white-black binary image data . . . R7

The data is rearranged in 64 bits and in the memory as listed below:

1. Color image data having 8 bits each in R, G and B (24-bit store mode)

R 8 bits of first pixel→Bits 63–56
G 8 bits of first pixel→Bits 55–48

B 8 bits of first pixel→Bits 47–40
R 8 bits of second pixel→Bits 39–32
G 8 bits of second pixel→Bits 31–24
B 8 bits of second pixel→Bits 23–16
R 8 bits of third pixel→Bits 15–8
G 8 bits of third pixel→Bits 7–0
The data is arranged in a memory as shown in FIG. 50.
2. Color image data having 8 bits each in R, G and B (32-bit store mode)
R 8 bits of first pixel→Bits 63–56
G 8 bits of first pixel→Bits 55—48
B 8 bits of first pixel→Bits 47–40
R 8 bits of second pixel→Bits 31–24
G 8 bits of second pixel→Bits 23–16
B 8 bits of second pixel→Bits 15–8
The data is arranged in the memory as shown in FIG. 51.
3. 8-bit white-black many-valued image data
8 bits of first pixel→Bits 63–56
8 bits of second pixel→Bits 55–48
8 bits of third pixel→Bits 47–40
8 bits of fourth pixel→Bits 39–32
8 bits of fifth pixel→Bits 31–24
8 bits of sixth pixel→Bits 23–16
8 bits of seventh pixel→Bits 15–18
8 bits of eighth pixel→Bits 7–0
The data is arranged in the memory as shown in FIG. 52.
4. 1-bit white-black binary image data
1 bit of first pixel→Bit 63
1 bit of second pixel→Bit 62
1 bit of third pixel→Bit 61
1 bit of fourth pixel→Bit 60
. . .
1 bit of sixty-first pixel→Bit 3
1 bit of sixty-second pixel→Bit 2
1 bit of sixty-third pixel→Bit 1
1 bit of sixty-fourth pixel→bit 0
The data is arranged in the memory as shown in FIG. 53.
Now, description will be made of each packing unit.

Figure 54:
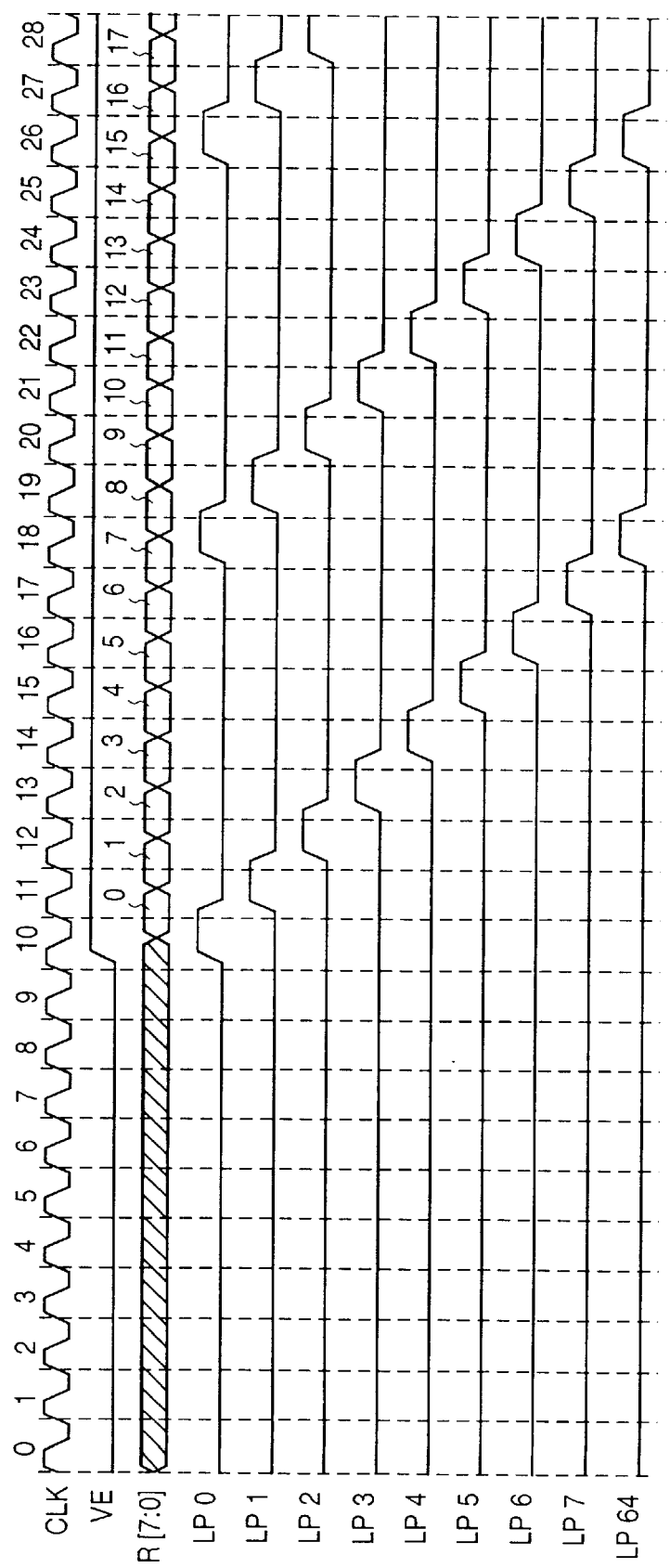
FIG. 54 is a timing chart for conversion of many-valued 8-bit white-black image data into a 64-bit width by a BW8 packing unit 4901.

FIG. 54 is a timing diagram of a stage to convert the 8-bit white-black many-valued image data into the 64-bit width by a BW8 packing unit 4901. When a signal VE is set at a high level, 8-bit white-black image data R[7:0] from the scanner is acquired and latched pixel by pixel into 64-bit latch in synchronization with signals LP0 through LP7. When the image data is prepared in an amount of 8 pixels, latched 8 pixels of 64 bits are output as a signal BW8[63:0] in synchronization with a signal LP64.

Figure 55:
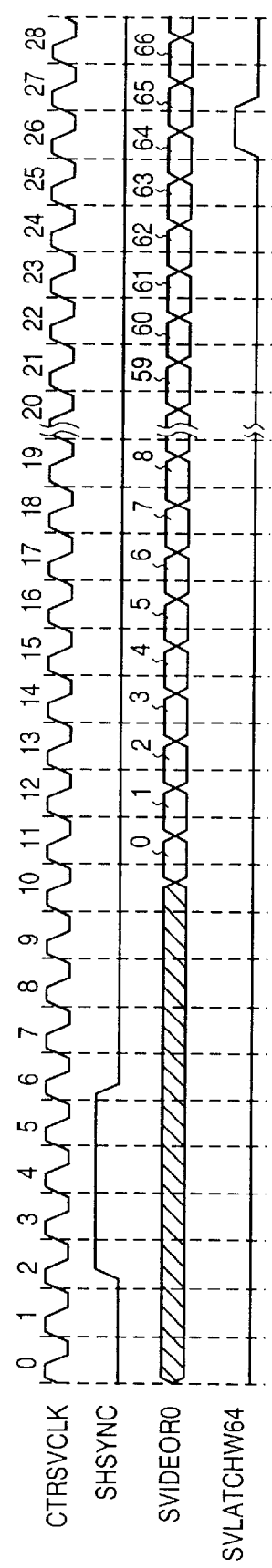
FIG. 55 is a timing chart for image data input to convert the binary white-black image data into the 64-bit width by a shift register 4902.

FIG. 55 is a timing diagram of a stage to convert the white-black binary image data into the 64-bit width by a shift register 4902. When the signal VE is set at the high level, binary white-black image data R7 (SVIDEOR0) is acquired in an amount of 64 bits while being shifted bit by bit with the shift register and output as a signal BW1[63:0] in synchronization with a signal SVLATCH64.

Figure 56:
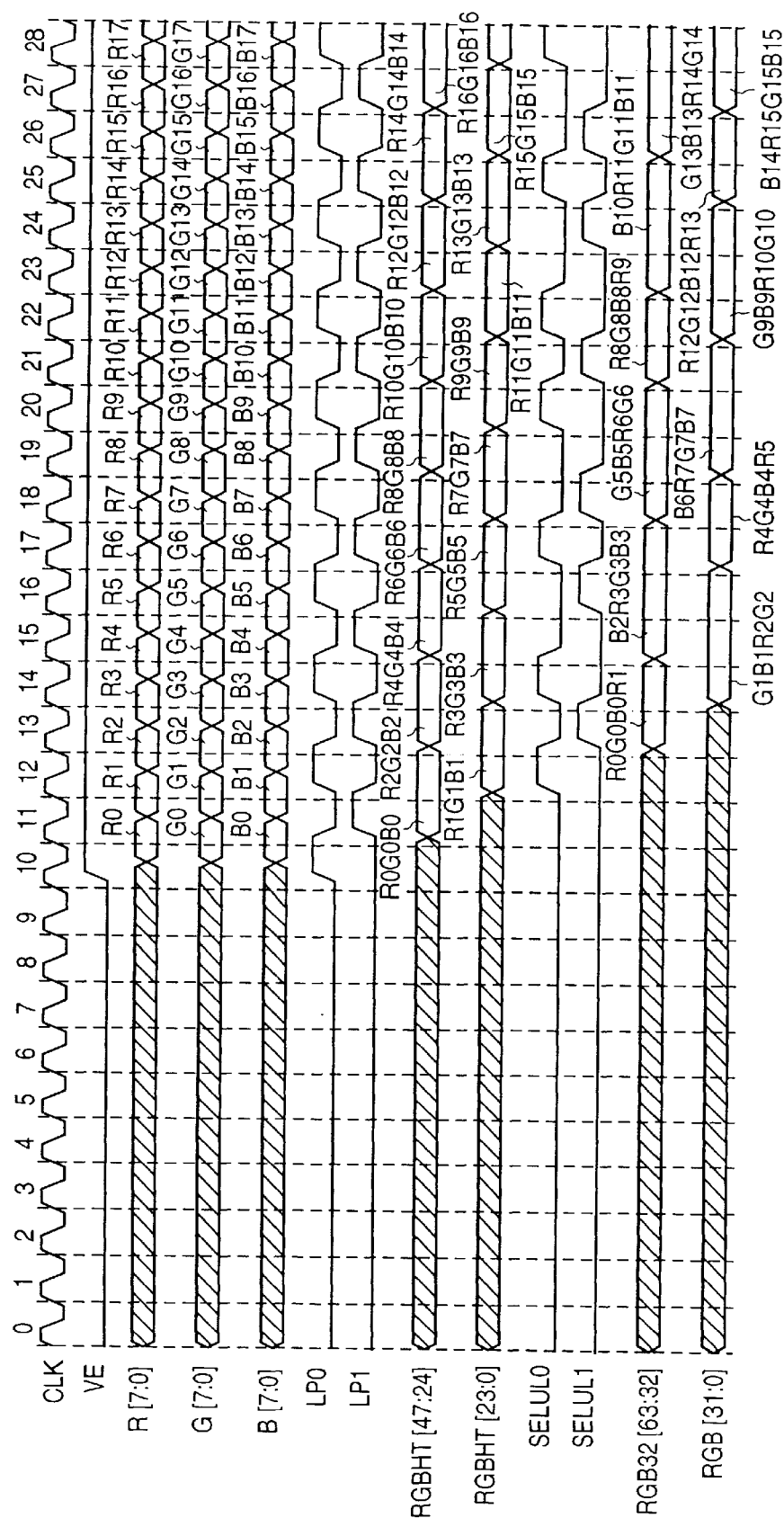
FIG. 56 is a timing chart to convert image data having 8 bits each in R, G and B (24 bits in total) into the 64-bit width by an RGB packing unit 4903.
Figure 57:
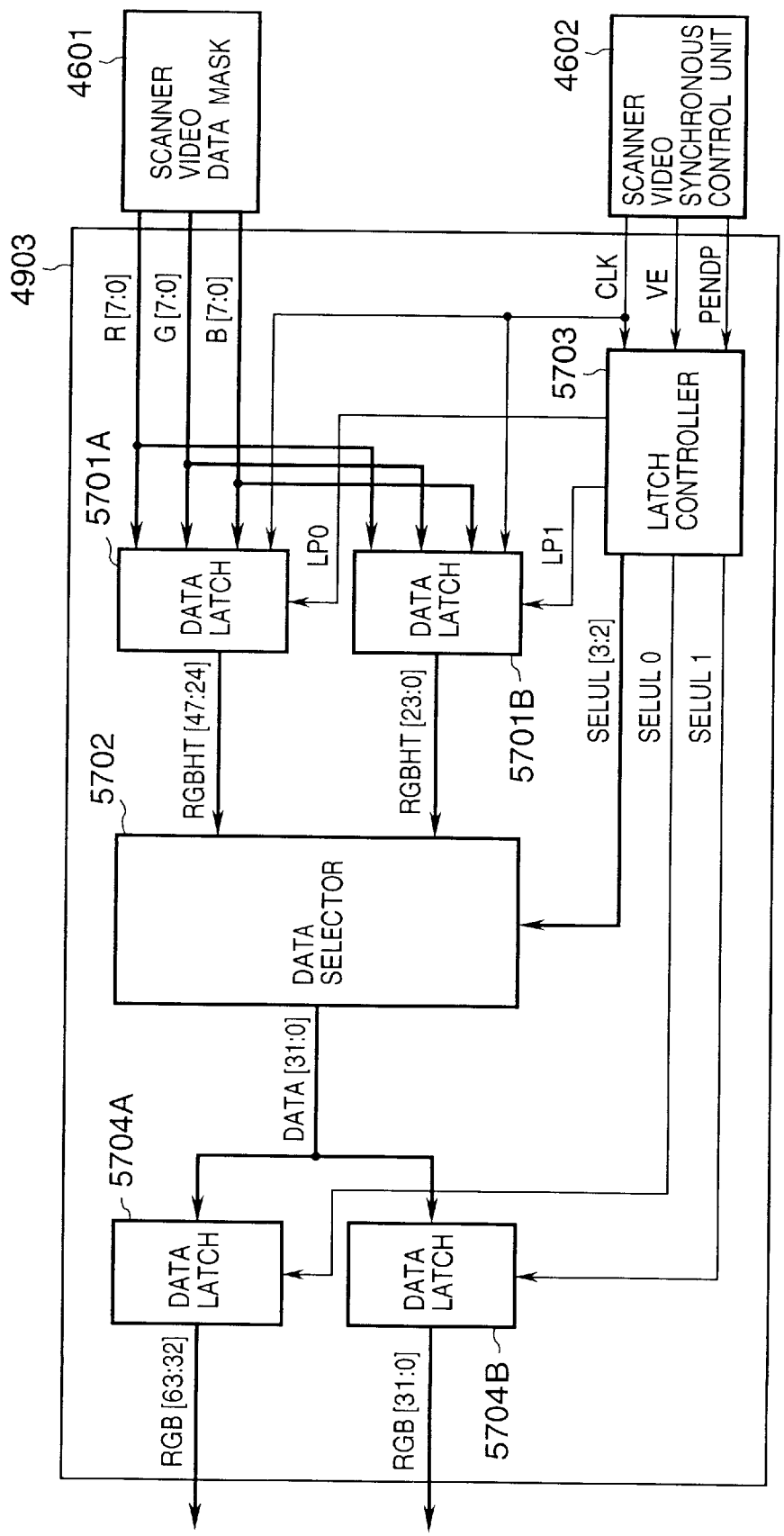
FIG. 57 is a block diagram of the RGB packing unit 4903.

FIG. 56 is a timing chart of a stage to convert the image data having the 8 bits each in R, G and B (24 bits in total) into the 64-bit width with an RGB packing unit 4903. Furthermore, FIG. 57 is a block diagram of the RGB packing unit 4903. In FIG. 57, image data R[7:0], G[7:0] and B[7:0] input from the scanner video data mask 4601 is input into 24-bit data latches 5701A and 5701B. The data latches 5701A and 5701B latch 24-bit data which are input in synchronization with latch signals LP0 and LP1 having a frequency of a clock CLK divided into halves phases reverse to each other. The data latched by the data latches 5701A and 5701B are input into a 48→32 bit data selector 5702 as an input signal RGBHT[47:0] and output as a 32-bit signal DATA[31:0] in correspondence to a 2-bit select signal LP[3:2]. This signal is output by one of three methods. A first method provides an input signal RGBHT[47:16] as the output signal DATA[31:0]. A second method provides input signals RGBHT[15:0] and RGBHT[47:32] as output signals DATA[31:16] and DATA[15:0] respectively. A third method provides an input signal RGNHT[31:0] as the output signal DATA[31:0].

By latching the 24-bit image data alternately to the data latches 5701A and 5701B in synchronization with latch signals and sequentially switching the three selection methods described above, an output from a data selector 5702 is 24-bit/pixel data summarized in 32 bits. After data from the selector 5702 is selected by the third method described above, however, both data corresponding to two pixels which are input into the data selector must be updated. Accordingly, select signal SELUL[3:2] is delayed for a clock as shown in FIG. 56.

The data which has been converted once into the 32-bit width by the data selector 5702 are latched alternately to data latches 5704A and 5704B and contents of the data latch 5704B is output as data converted into the 64-bit width at an updated timing or when a latch signal SELUL1 is set at a high level.

[3. Outline of Scanner Image Data Transfer FIFO Controller 4403]

Figure 58:
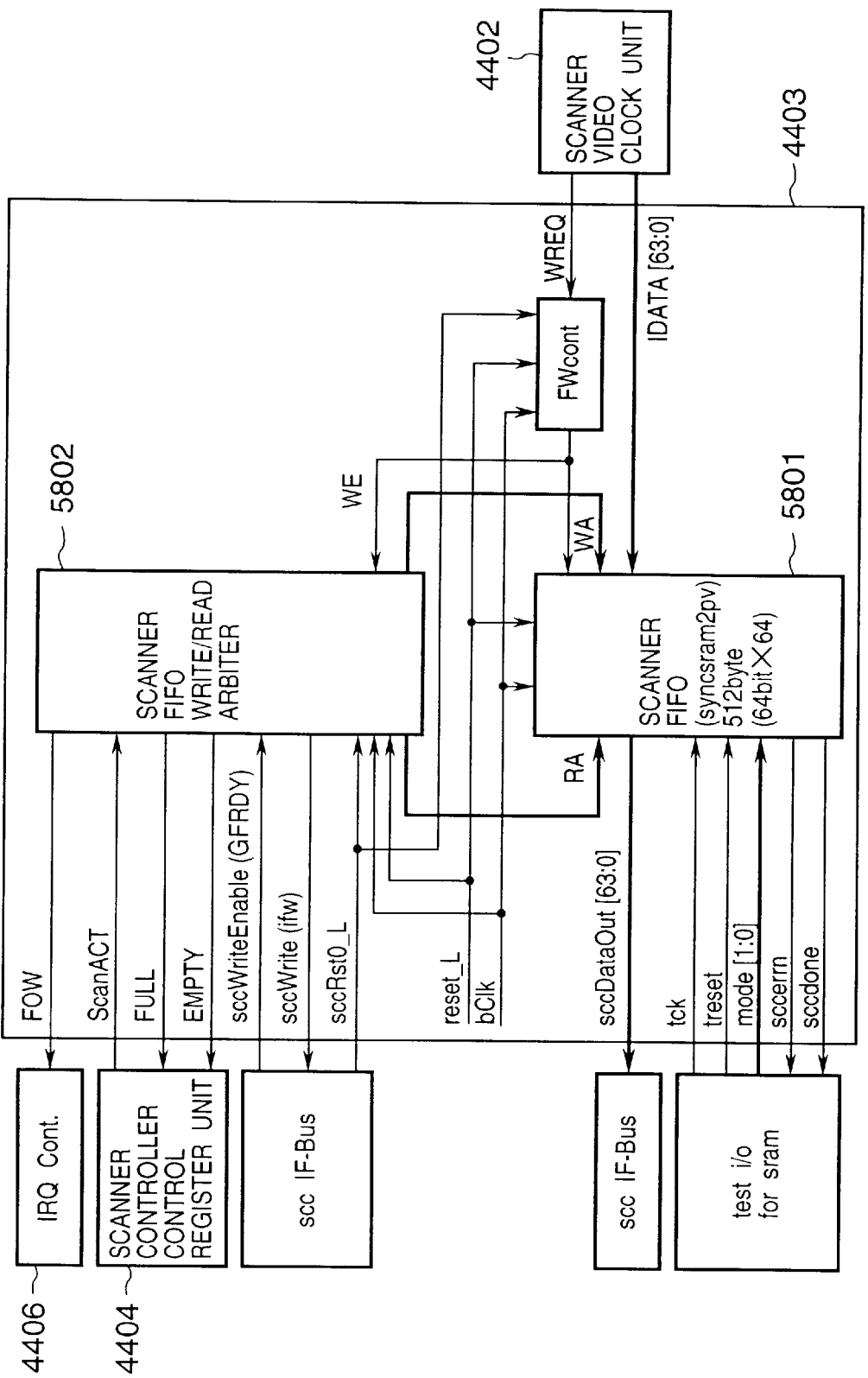
FIG. 58 is a block diagram of a scanner image data transfer FIFO controller 4403.

FIG. 58 shows a block diagram of a scanner image data transfer FIFO controller 4403. This block is composed of a FIFO 5801 which is a buffer to transfer image data input from the scanner by way of the G bus or the B bus and a circuit which controls the FIFO 5801. This FIFO has a capacity of 512 bytes (64 bits_64). While monitoring an empty flag (EF) of the FIFO 5801, a scanner FIFO write/read arbiter 5802 controls data output from the FIFO. Data is input into the FIFO with a request signal (WREQ) from the scanner video clock unit 4402.

[4. Outline of Scanner Controller Control Register 4404]

Figure 59:
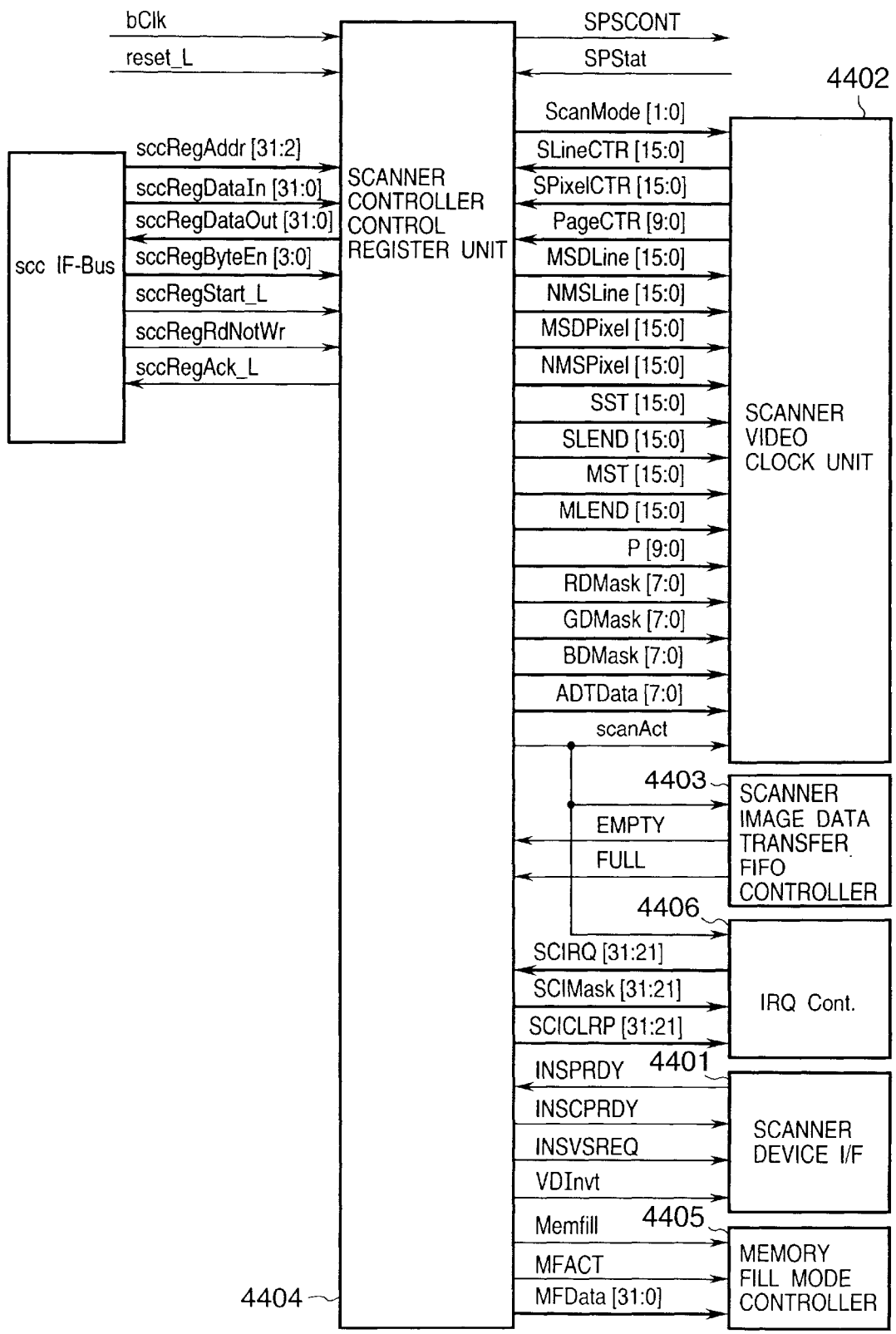
FIG. 59 is a block diagram of a scanner controller control register 4404.

FIG. 59 shows a block diagram of the scanner controller control register 4404. This block comprises registers which control internal members of the scanner controller. Internal registers of this block are:
 1. Scanner controller power management control register
 2. Scanner controller control register
 3. Scanner controller interrupt factor status register
 4. Scanner controller interrupt factor mask register
 5. Scanner subsidiary mask line number setting register
 6. Scanner main scanning mask pixel setting register
 7. Scanner subsidiary scanning line number setting register
 8. Scanner subsidiary scanning line number counter read register
 9. Scanner subsidiary scanning pixel number setting register
 10. Scanner main scanning pixel number counter read register
 11. Scan page number setting register
 12. Scanner page number counter read register
 13. Scanner device control register
 14. Scanner device status register
 15. Scanner video mask data register
 16. Memory Fill Data Register

[5. Outline of IRQ Controller 4406]

Figure 60:
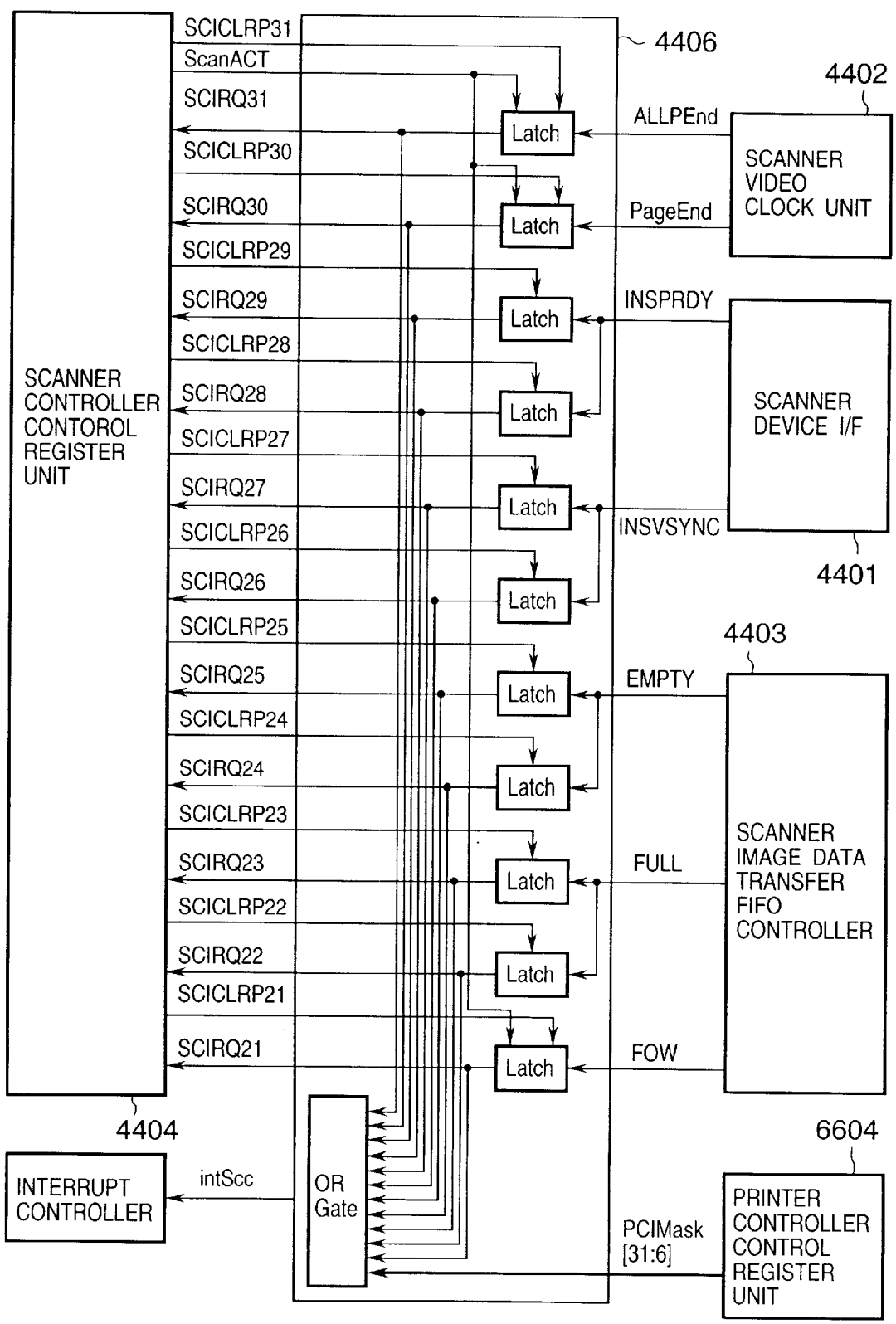
FIG. 60 is a block diagram of an IRQ controller 4406.

FIG. 60 shows a block diagram of an IRQ controller 4406. This block manages an interrupt signal generated in the scanner controller. Interrupt factors are as listed below:
 1. Input end of image data corresponding to set pages (ALLEND)

2. Input end of image data corresponding to a page (PageEnd)

3. Rise of an SPRDY signal from the scanner (false→true) (INSPRDY)

4. Fall of the SPRDY signal from the scanner (true→false) (INSPRDY)

5. Rise of a SVSYNC signal from the scanner (false→true) (INSVSYNC)

6. Fall of the SVSYNC signal from the scanner (true→false) (INSVSYNC)

7. Rise of an EMPTY signal of the image data FIFO (false→true) (EMPTY)

8. Fall of the EMPTY signal of the image data FIFO (true→false) (EMPTY)

9. Rise of a FULL signal of the image data FIFO (false→true) (FULL)

10. Fall of the FULL signal of the image data FIFO (true→false) (FULL)

11. Overwrite occurrence in the image data FIFO (FOW)

Flag information (SCIRQ[31:21]) corresponding to the interrupt factors is output to the scanner controller control register 4406. A mask bit (SCIMask[31:21]) and a clear signal (SCICLRP[31:21]) corresponding to each interrupt factor are input from the scanner controller control register 4406. A logical sum of each interrupt factor is output to the intScc.

[6. Outline of Memory Fill Mode Controller 4405]

Figure 61:
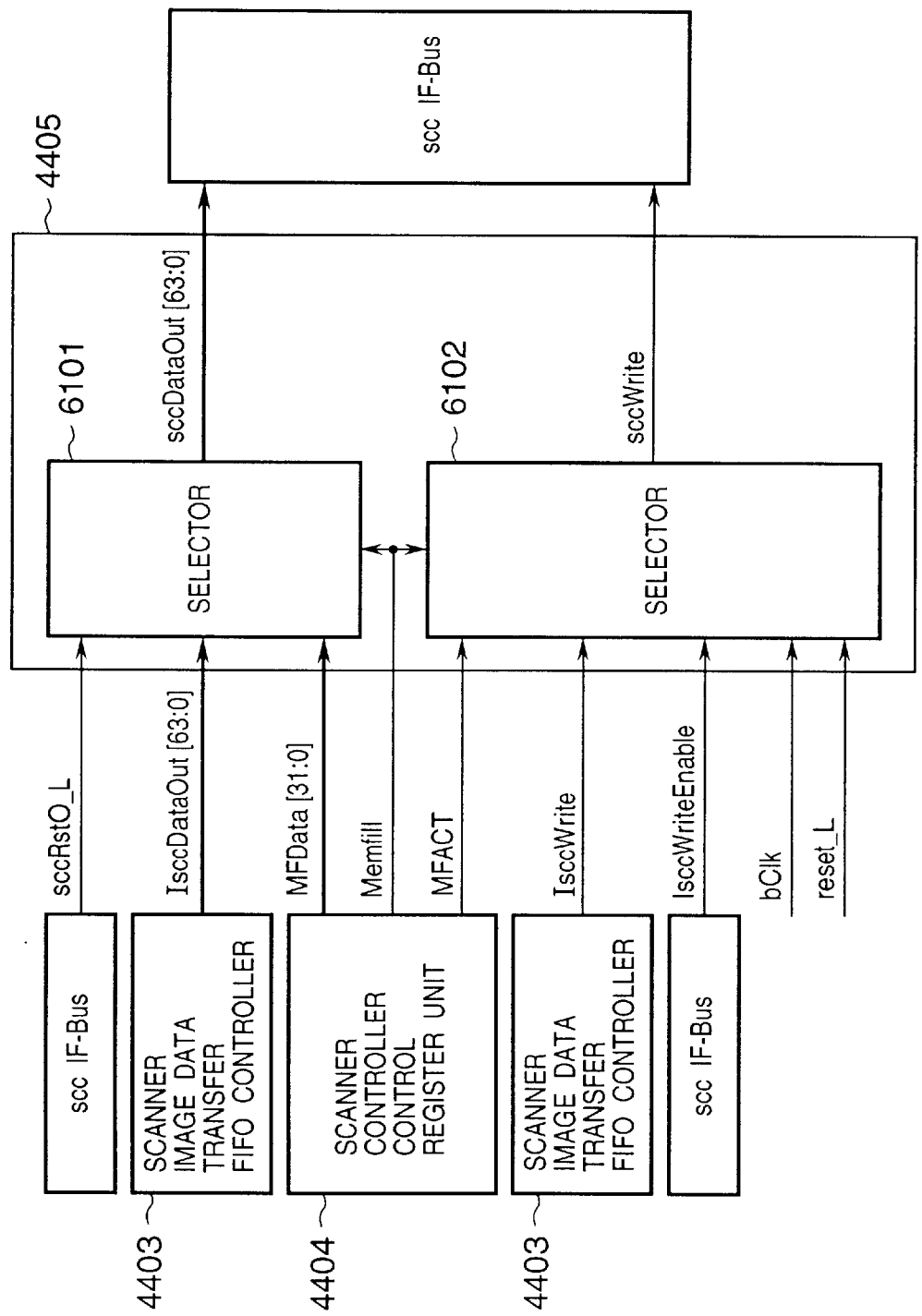
FIG. 61 is a block diagram of a memory fill mode controller 4405.

FIG. 61 shows a block diagram of a memory fill mode controller 4405. This block controls a mode in which fixed data set in a register is transferred to a memory by way of the GBI. This mode is set with a Memfill signal. When a fixed data transfer mode is specified, data (MFData[31:0]) set in the register is selected as data to be output to the sccGBI. Furthermore, a timing signal (sccWrite) for data transfer to the sccGBI is generated in this block.
(sccIF-bus)

An sccIF-bus is a local bus which connects the G bus/B bus I/F unit 4301A to the scanner controller 4302. This bus comprises signals which are listed below. Signals which are output from the scanner controller to the G bus/B bus I/F unit (GBI) are represented by OUT and signals which are input from the G bus/B bus I/F unit (GBI) to the scanner controller are designated by IN. Since the IF-bus is specified the same for both the scanner controller and the printer controller, signals for functions which are not supported by the scanner controller will also be described. Bclk of the B bus is used as a basic bus.

sccRst0_L: IN

This signal is used to return the FIFO in the scanner controller to its initial state.

sccDataOut[63:0]: OUT

This is a 64-bit data bus which is output from the scanner controller to the G bus/B bus I/F unit (GBI). Image data is transferred when the scanner controller operates for data transfer.

sccWrite: OUT

This is a write signal to the G bus/B bus I/F unit (GBI) when the scanner controller operates for data transfer. The G bus/B bus I/F unit acquires sccDataOut[63:0] at rise of Bclk for which the sccWrite signal is asserted. Continuous assertion of the sccWrite signal makes it possible to write data per clock.

sccWriteEnable: IN

This is a write signal to the G bus/B bus I/F unit (GBI) while the scanner controller is operating for data transfer. It is output from the G bus/B bus I/F unit (GBI). It indicates that rise of a next clock makes it possible to write data when the sccWriteEnable signal is asserted at rise of Bclk. The sccWrite signal is asserted by confirming the sccWriteEnable signal.

sccRegAddr[31:2]: IN

This is a register address bus which is used to make an access from the G bus/B bus I/F unit (GBI) to an internal register of the scanner controller. It becomes valid upon assertion of sccRegStart_L and is kept valid for the access to the internal register of the scanner controller until response with an sccRegAck_L signal.

sccRegbyteEn[3:0]: IN

This is a byte enable signal for sccRegDataIn[31:0] output from the G bus/B bus I/F unit (GBI). It becomes valid upon assertion of sccRegStart_L and is kept valid until response with the sccRegAck_L signal. Only a valid byte indicated by this signal is written into a register. At a read time from the internal register, this signal is ignored and all bytes are output. Each bit of this signal corresponds to a byte of the sccRegDataIn[31:0] as listed below:

|  | 3 | 2 | 1 | 0 |
|---|---|---|---|---|
| sccRegbyteEn: sccRegDataIn: sccRegStart_L: IN | [31:24] | [25:16] | [15:8] | [7:0] |

This is an access request signal which is used to make an access from the G bus/B bus I/F unit (GBI) to the internal register of the scanner controller. It indicates a request of access to the register when it is set at "Low." It is asserted together with the sccRegAddr[31:2] signal and a sccRegRdNotWr signal for a clock of Bclk. A next access is not asserted so long as the scanner controller returns the sccRegAck_L to this access.

sccRegDataOut[31:0]: OUT

This is a 32-bit data bus which is used to make a read access from the G bus/B bus I/F unit (GBI) to the internal register of the scanner controller. It is valid when the sccRegAck_L signal is asserted.

sccRegDataIn[31:0]: IN

This is a 32-bit data bus which is used to make a write access from the G bus/B bus I/F unit (GBI) to the internal register of the scanner controller. It becomes valid upon assertion of the sccRegStart_L and is kept valid for the access to the internal register of the scanner controller until response with the sccAck_signal.

sccRegRdNotWr: IN

This is a signal which indicates an access direction (read or write) for an access from the G bus/B bus I/F unit (GBI) to the internal register of the scanner controller. When the signal is "High," contents of the internal register of the scanner controller are read out to the sccRegDataOut[31:0] and when the signal is "Low," contents of the sccRegDataIn[31:0] are written into the internal register of the scanner controller. The signal becomes valid upon assertion of the sccRegStart_L and is kept valid for the access to the internal register of the scanner controller until response with the sccRegAck_L signal.

sccRegAck_L: OUT

This is a signal which indicates completion of an access to the internal register of the scanner controller. It is output from the scanner controller to the G bus/B bus I/F unit (GBI). It is asserted for a clock of Bclk. It is sensed at a clock next to assertion of the sccRegReq_L signal.

Signals sccRstl_L, scc byte En[7:0], sccRead and sccDataIn[63:0] are contained in the IF bus but not used in the scanner controller.

Figure 62:
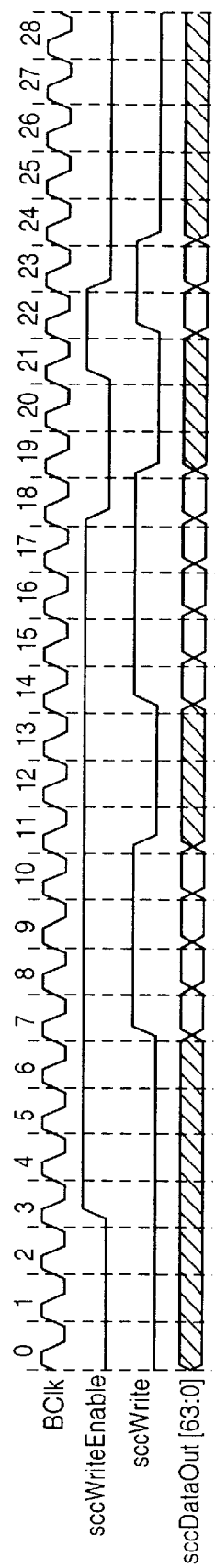
FIG. 62 is a timing chart for data read from the scanner controller 4302 and DMA transfer.
Figure 63:
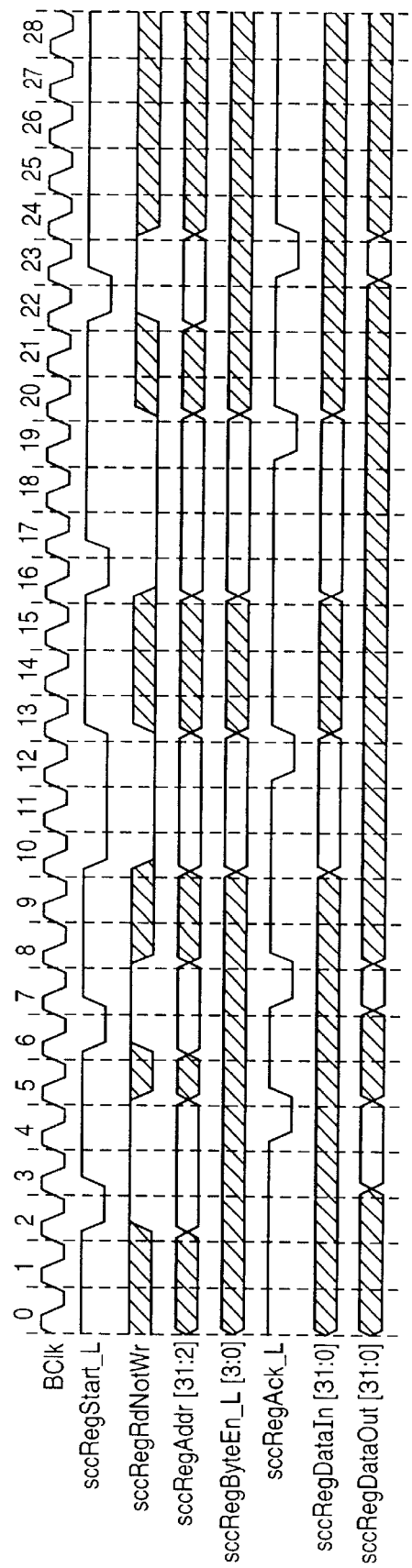
FIG. 63 is a timing chart for read or write from or into an internal register of the scanner controller 4302.

FIGS. 62 and 63 are timing diagrams exemplifying timings of the signals which have been described above. FIG. 62 shows timings to read data out of the scanner controller 4302 for DMA transfer, whereas FIG. 63 shows timings to read or write data into or from the internal register of the scanner controller 4302.

(Power Management)

In the scanner controller, power management is performed by gate control of a video clock (SVCLK) in accordance with settings in a scanner controller power management control register (0X1B005000). A value of a PM state signal (sccPmState[1:0]) to be output to a power management unit (PMU) 409 is determined by adding a state of sccDmaPmState[1:0] input from a G bus/B bus I/F unit 4301A to a clock state. The sccPmState[1:0] is shown in FIG. 64.

In FIG. 64, the sccDmaPmState[1:0] indicates a power consumption state of a G bus/B bus interface GBI_scc of the scanner. The GBI_scc has four power consumption states of 00 to 11. The state signal sccDmaPmState[1:0] is output from the GBI_scc to the scanner controller.

Furthermore, the scanner controller has two consumption states which are indicated by an internal signal SPStat.

The signal sccPmState[1:0] indicates a total condition consisting of a GBI_scc condition and a scanner controller condition. This signal is output to the power management unit of the system. That is, a power consumption state of the scanner controller is informed at four steps to the power management unit. The steps are indicated by the value of the signal sccPmState[1:0]. A value of 00 indicates a lowest level and each increment of 1 indicates a power consumption at a higher step.

(Scanner Controller Core Interface)

Figure 65:
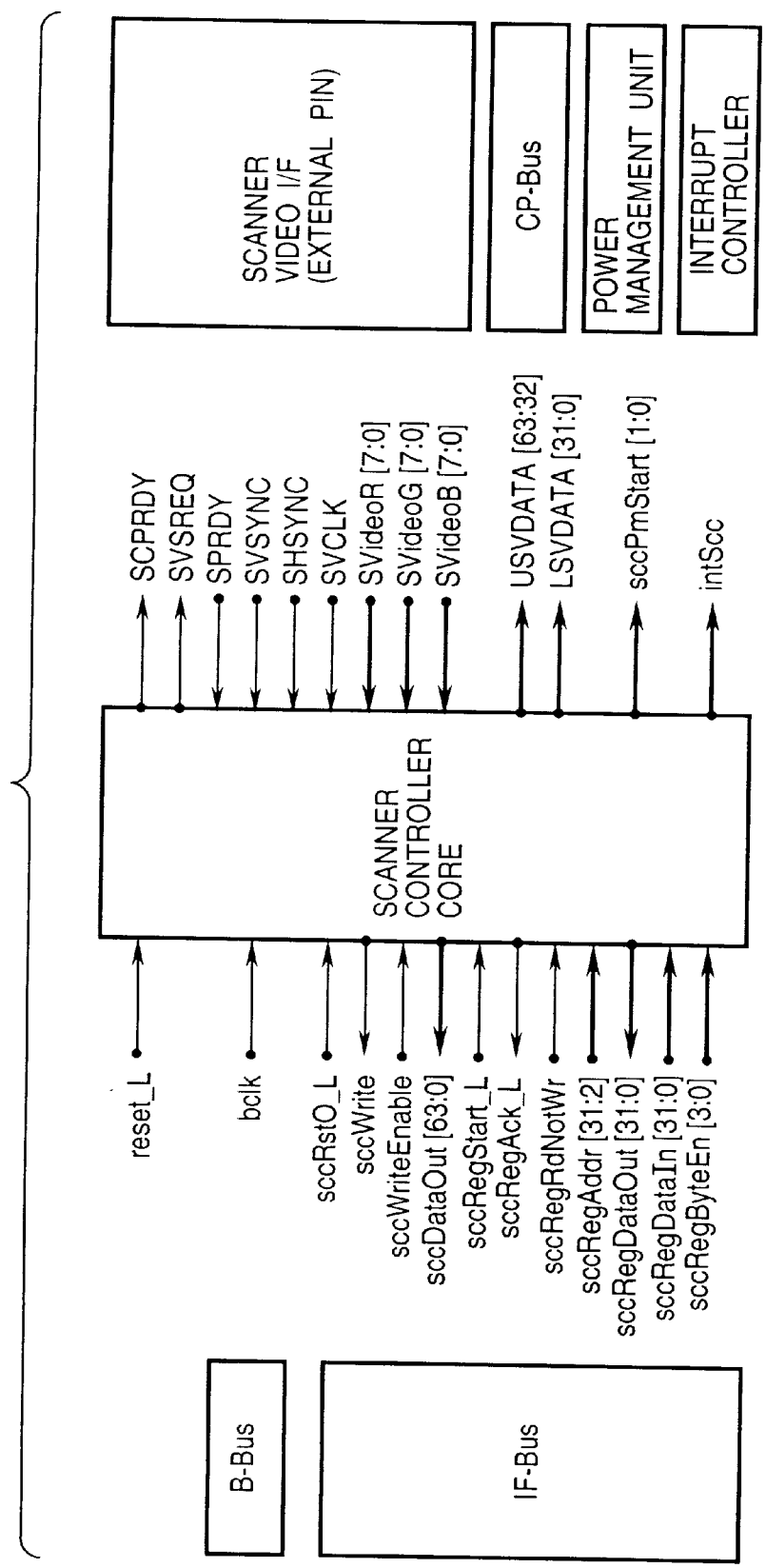
FIG. 65 is a diagram summarizing core areas including blocks in the scanner controller 4302 and signals which are input and output into and from external buses and scanners.

FIG. 65 summarizes signals which are input and output between core portions including the blocks in the scanner controller 4302 described above and external buses and scanners. The scanner controller 4302 is connected to the system bus bridge 402 through the G bus, to the IO devices, power management unit and system bridge through the B bus, to the printer controller through the CP bus, and to the G bus/B bus I/F unit through the I/F bus as shown in FIG. 65.

2.9.2. Printer Controller

Figure 66:
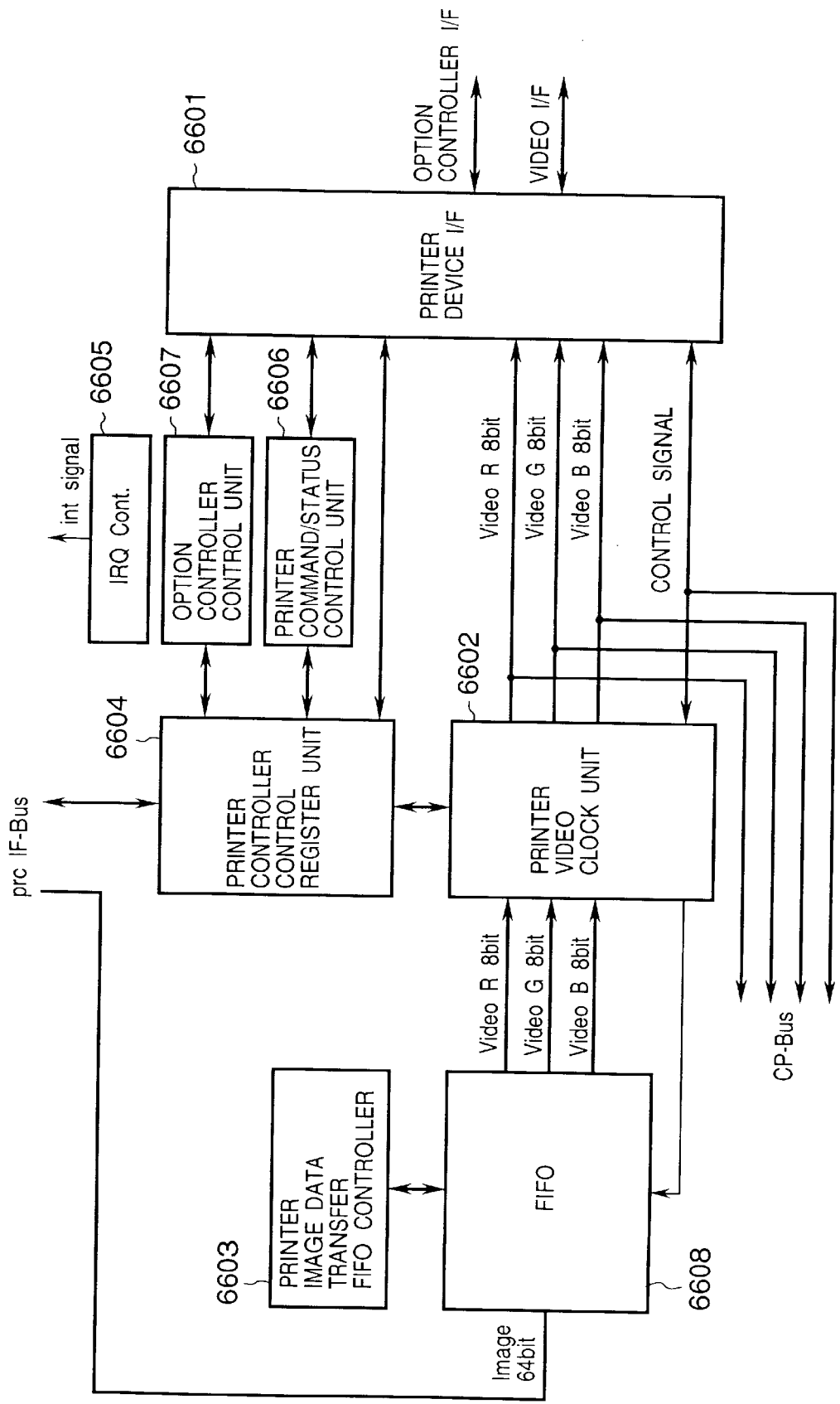
FIG. 66 is a block diagram of a printer controller 4303.

FIG. 66 shows a block diagram of the printer controller 4303. The printer controller is a block which is connected to the printer through the video I/F to interface with the G bus/B bus I/F unit. The printer controller consists mainly of the blocks which are listed below:

1. Printer device I/F 6601

This is an input/output port which performs signal input/output to or from a printer video I/F and an option controller I/F.

2. Printer video clock unit 6602

This unit operates with a video clock of the printer.

3. Printer image data FIFO controller 6603

This controller controls an image data transfer FIFO.

4. Printer controller control register unit 6604

This is a register unit which controls the printer controller as a whole.

5. IRQ controller 6605

This controller controls an interrupt signal generated in the printer controller (Prc).

6. Printer command/status control unit 6606

This unit controls transmission and reception of command/status with the printer by way of a video I/F.

7. Option controller control unit 6607

This controller controls a printer option controller.

8. FIFO (FIFO PRC) 6608

This FIFO is used to output video data to the printer when the printer may be asynchronous from the video data.

Five kinds of image data which is listed below is output to the printer:

1. Color many-valued data having 8 bits each in R, G and B (point sequential)

2. 8-bit white-black many-valued data 3. 1-bit white-black binary data

4. Color data having 1 bit each in C, M, Y and K (plane sequential)

5. Color data having 8 bits each in C, M, Y and K (plane sequential)

Now, description is made of each block which composes the printer controller.

[1. Outline of Printer Device I/F]

Figure 67:
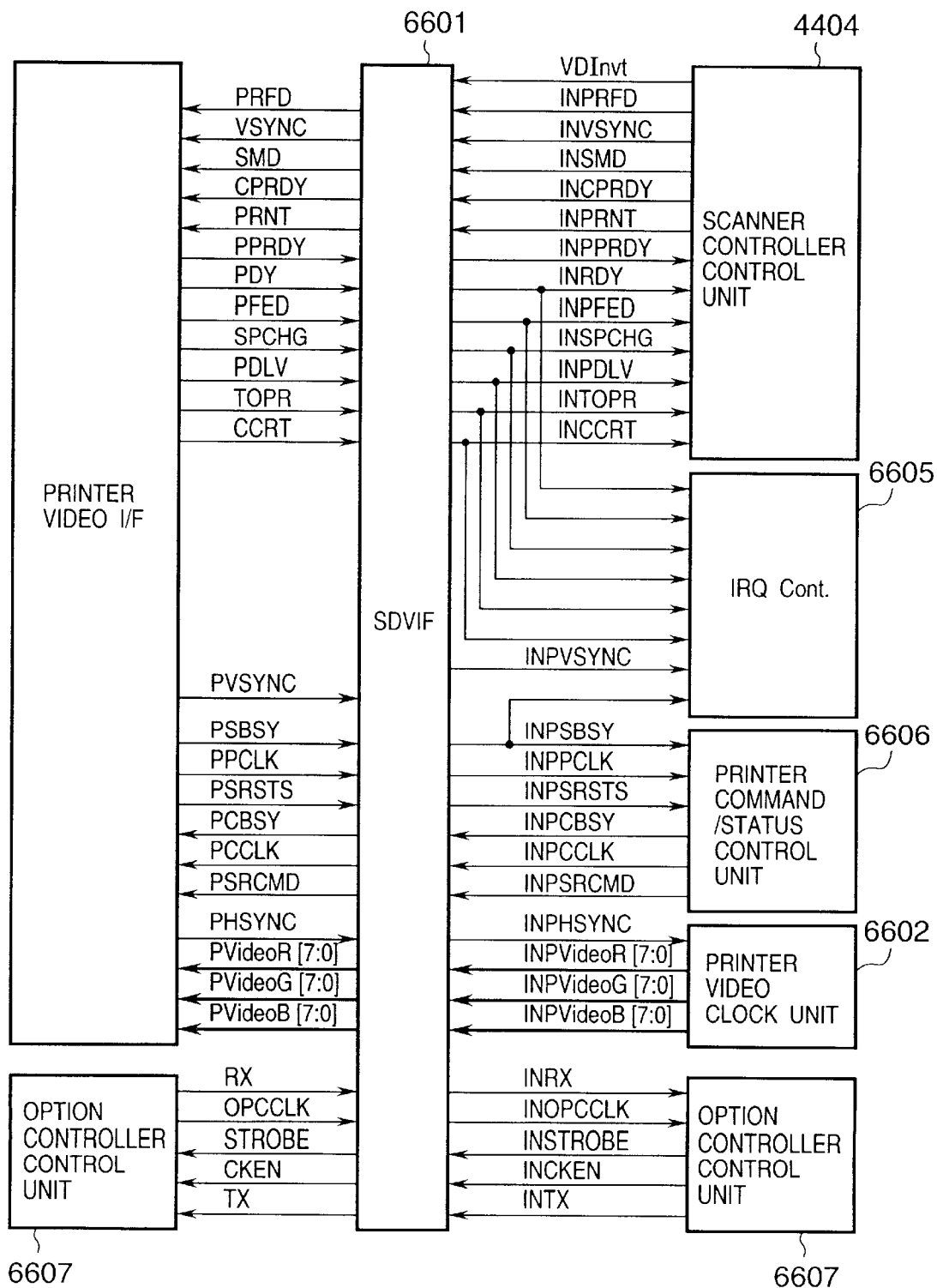
FIG. 67 is a block diagram of a printer device I/F 6601.

FIG. 67 shows a block diagram of a printer device I/F 6601. This block is an input/output port which inputs and outputs signals into and from a printer video I/F and an option controller I/F. A signal VDInvet signal can determine whether or not levels of output signals P video R[7:0] and B[7:0] are to be inverted.

[2. Outline of Printer Video Clock Unit]

Figure 68:
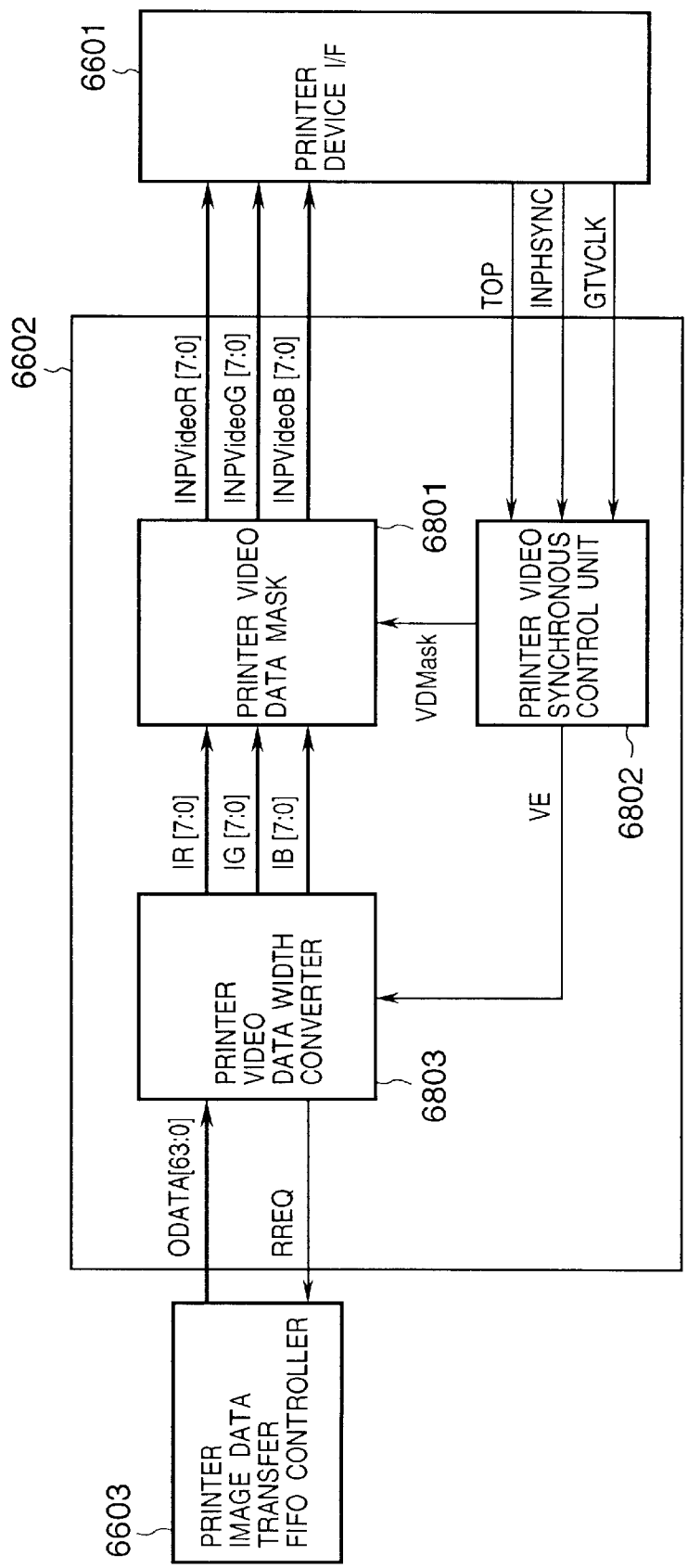
FIG. 68 is a block diagram of a printer video clock unit 6602.

FIG. 68 shows a block diagram of a printer video clock unit 6602. This block operates with a video clock from the printer and is composed of blocks which are described below:

1. Printer video data mask 6801 (DFF8ENMask)

This is a block which masks image data to the printer. Masked data has a value set in a register.

2. Printer video synchronous control unit 6802 (Prc_sync unit)

This is a block which generates a timing signal and the like for image data output from a video clock, a VSYNC signal and a HSYNC signal from the printer. It manages a horizontal data number, a vertical data number, a horizontal line number and a vertical line number of the image data.

3. Printer video data width converter 6803 (pvdwconv)

This is a block which converts image data sent in a 64-bit width from the I/F bus into RGB 24 bits, white-black 8 bits and white-black 1 bit dependently on a mode. A mode is set by a register.

(Printer Video Data Mask)

Figure 69:
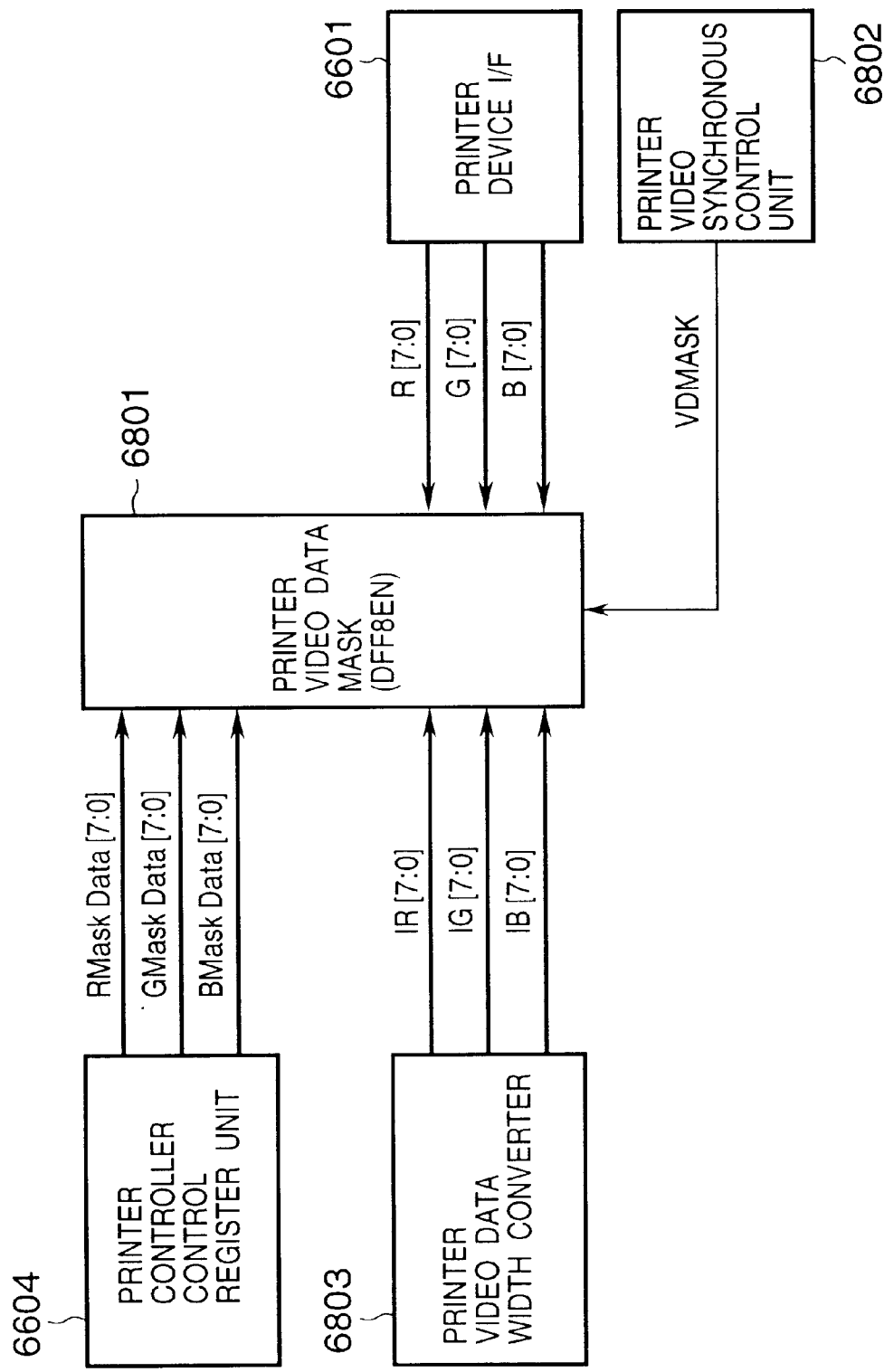
FIG. 69 is a block diagram of a printer video data mask 6801.

FIG. 69 shows a block diagram of a printer video data mask 6801. This block masks image data to be output to the printer in a pixel unit. Masked image data has a value set in the register (RDMask[7:0], GDMask[7:0], BDMask[7:0]).

(Printer Video Synchronous Control Unit)

Figure 70:
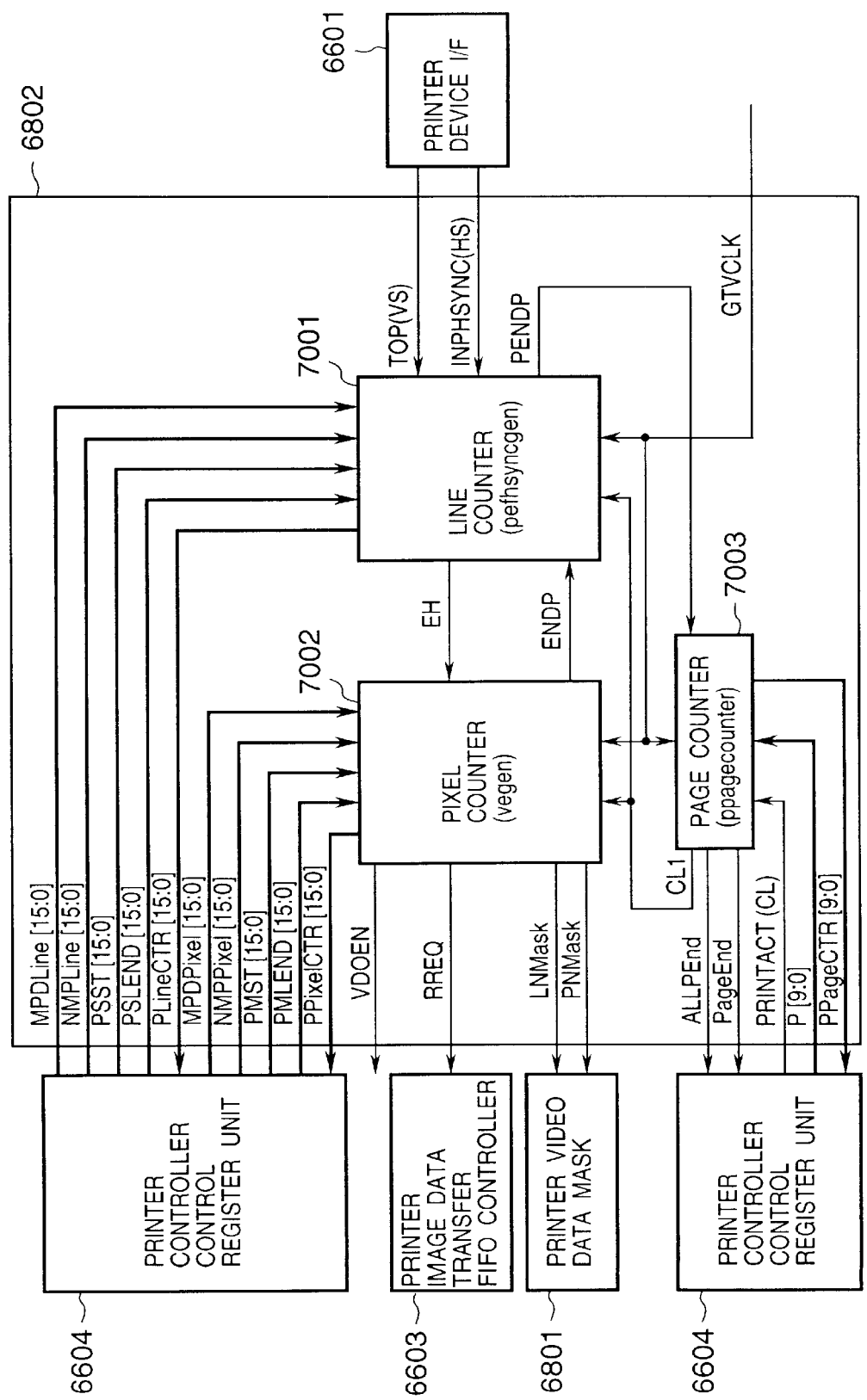
FIG. 70 is a block diagram of a printer video synchronous control unit 6802.

FIG. 70 shows a block diagram of a printer video synchronous control unit 6802. This block generates an enable signal (VDOEN) for image data to be output and a signal (RREQ) which requests data to the printer image data transfer FIFO controller 6603 with a vertical synchronous signal (TOP), a horizontal synchronous signal (INPHSYNC) and an image data synchronous clock (GTVCLK) for image data to be output to the printer.

Furthermore, this block manages a delay of the image data in a main scanning direction, a number of pixels to be acquired, a delay in a subsidiary scanning direction and a number of lines to be acquired. A line counter 7001 generates a status signal (PENDP) at a timing upon termination of output of a set amount of image data. Furthermore, the block generates a vertical synchronous signal (EH) for lines effective to output an image by managing the delay in the subsidiary scanning direction and a number of output lines. A pixel counter 7002 manages a delay of the image output in the main scanning direction and a number of output pixels. A page counter 7003 manages image data to be output in a page unit. It generates an end signal (ALLPEND) upon termination of output of the image data corresponding to a set number of pages.

(Printer Video Data Width Converter)

Figure 71A:
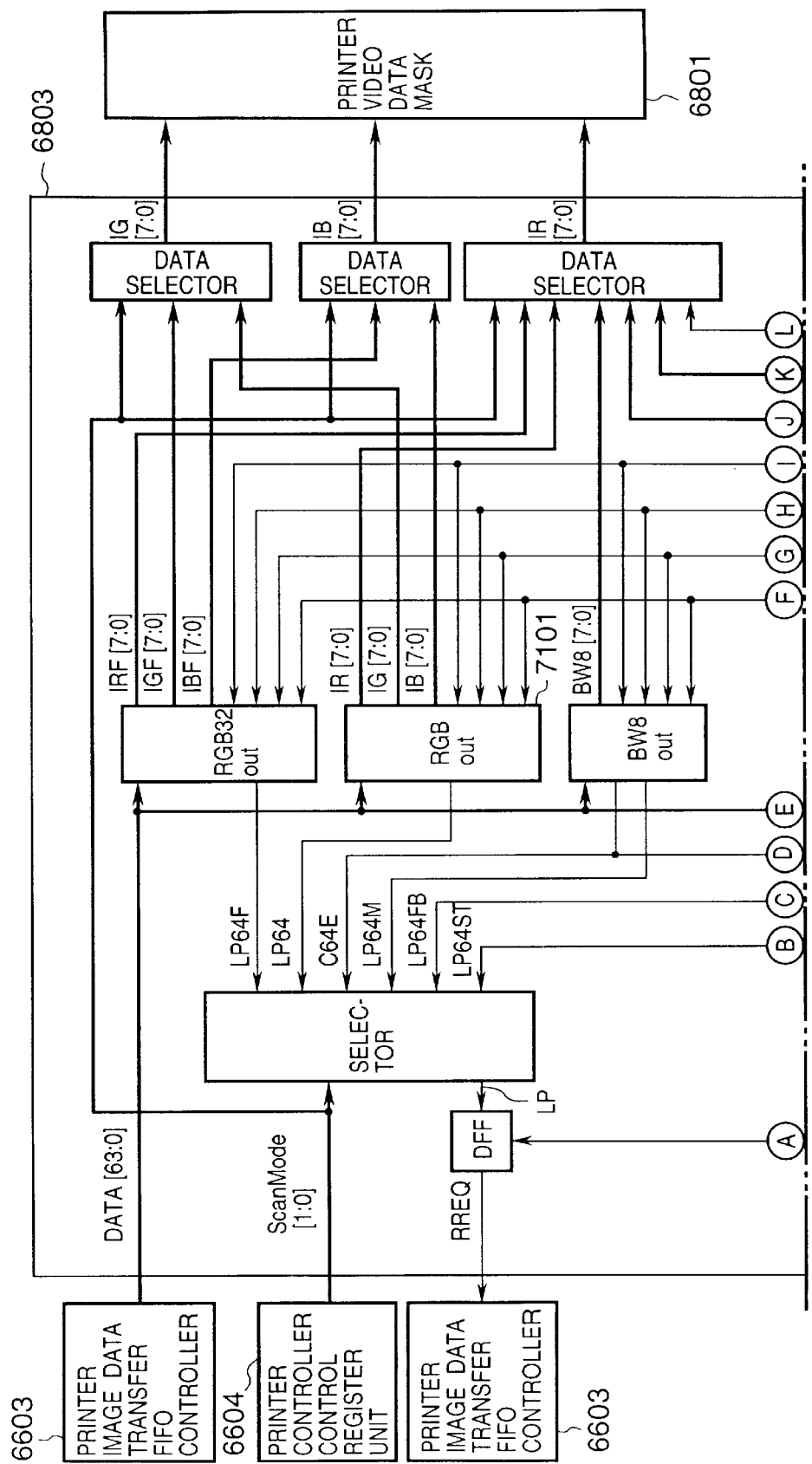
FIG. 71A is a block diagram of a video data width converter 6803.

FIG. 71 shows a block diagram of a video data width converter 6803. This block is a unit which converts data having a width of 64 bits which is input from the GBI (G bus/B Bus I/F) into the format of image data. It can output three types of data: color image data having 8 bits each in R, G and B, 8-bit white-black many-valued image data and 1-bit white-black binary data. It supports outputs in two modes: one wherein the color image data having 8 bits each in R, G and B is stored in a memory in a unit of 24 bits (24-bit mode) and the other wherein the color image data is stored in a unit of 32 bits with 1 byte data added to 24 bits (32-bit mode). Either of the mode is set by the printer controller control register 6604. The three types of data is output to signal lines which are mentioned below:

1. Color image data having 8 bits each in R, G and B . . . IR[7:0],IG[7:0],IB[7:0]
2. 8-bit white-black many-valued image data IR[7:0]
3. 1-bit white-black binary image data . . . IR 7

64-bit data is arranged in the memory as described below:

1. Color image data having 8 bits each in R, G and B (24-bit mode)
   R 8 bits of first pixel→bits 63–56
   G 8 bits of first pixel→bits 55–48
   B 8 bits of first pixel→bits 47–40
   R 8 bits of second pixel→bits 39–32
   G 8 bits of second pixel→bits 31–24
   B 8 bits of second pixel→bits 23–16
   R 8 bits of third pixel→bits 15–8
   G 8 bits of third pixel→bits 7–0

In this case, the image data is arranged in the memory as shown in FIG. 72.

2. Color image data having 8 bits each in R, G and B (32-bit mode)
   R 8 bits of first pixel→bits 63–56
   G 8 bits of first pixel→bits 55–48
   B 8 bits of first pixel→bits 47–40
   R 8 bits of second pixel→bits 31–24
   G 8 bits of second pixel→bits 23–16
   B 8 bits of second pixel→bits 15–8

In this case, the image data is arranged in the memory as shown in FIG. 73.

3. 8-bit write-black many-valued image data
   8 bits of first pixel→bits 63–56
   8 bits of second pixel→bits 55–48
   8 bits of third pixel→bits 47–40
   8 bits of fourth pixel→bits 39–32
   8 bits of fifth pixel→bits 31–24
   8 bits of sixth pixel→bits 23–16
   8 bits of seventh pixel→bits 15–8
   8 bits of eighth pixel→bits 7–0

In this case, the image data is arranged in the memory as shown in FIG. 74.

4. 1-bit white-black binary image data
   1 bit of first pixel→bit 63
   1 bit of second pixel→bit 62
   1 bit of third pixel→bit 61
   1 bit of fourth pixel→bit 60
   1 bit of sixtieth pixel→bit 4
   1 bit of sixty-first pixel→bit 3
   1 bit of sixty-second pixel→bit 2
   1 bit of sixth-third pixel→bit 1
   1 bit of sixth-fourth pixel→bit 0

In this case, the image data is arranged in the memory as shown in FIG. 75.

Now, description will be made of blocks which compose the printer video data width converter.

(RGB Out Unit 7101)

Figure 76:
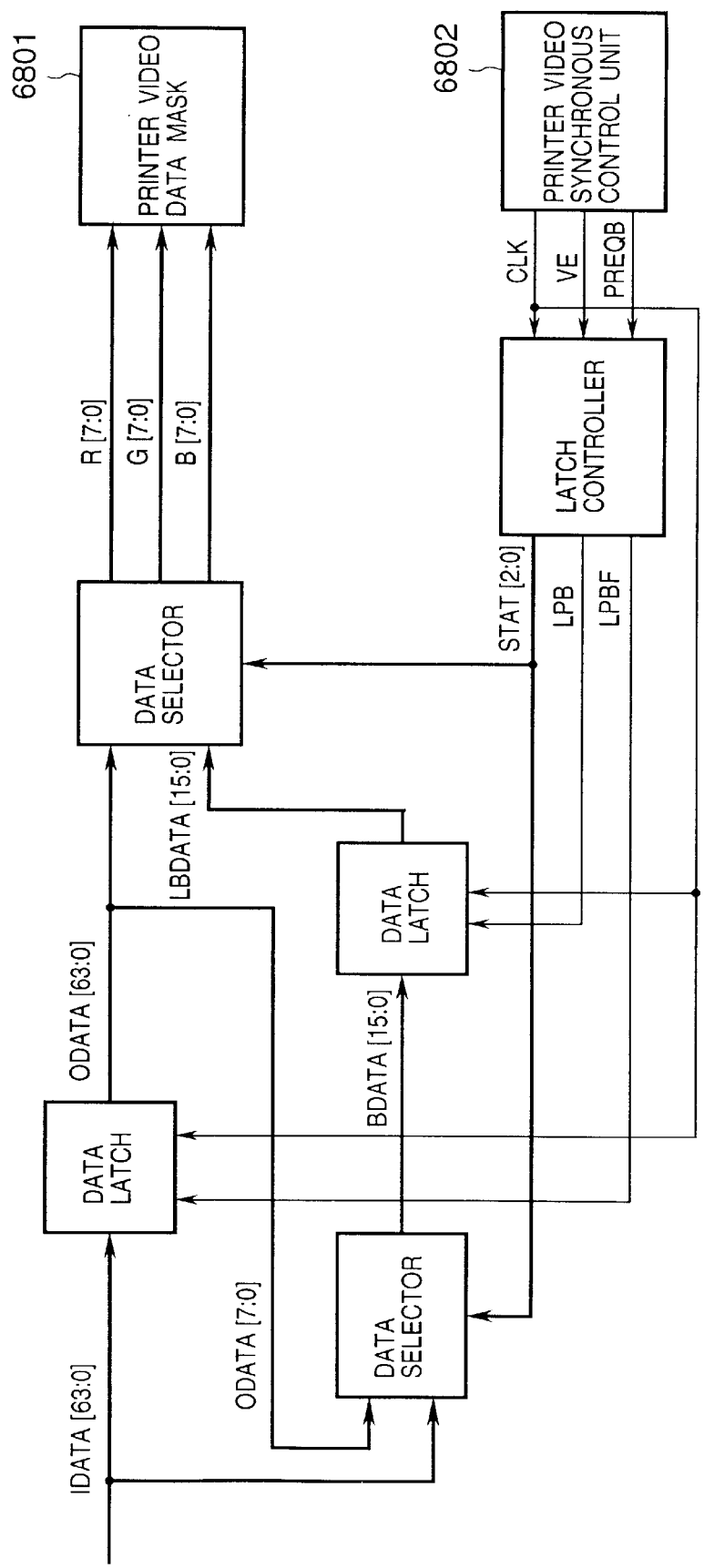
FIG. 76 is a block diagram of an RGBout unit 7101.

FIG. 76 shows a block diagram of an RGB out unit 7101. This block is a unit which converts data having a width of 64 bits which is packed in the 24-bit mode into the color image data having 8 bits each in R, G and B.

[3. Outline of Printer Image Data Transfer FIFO Controller]

Figure 77:
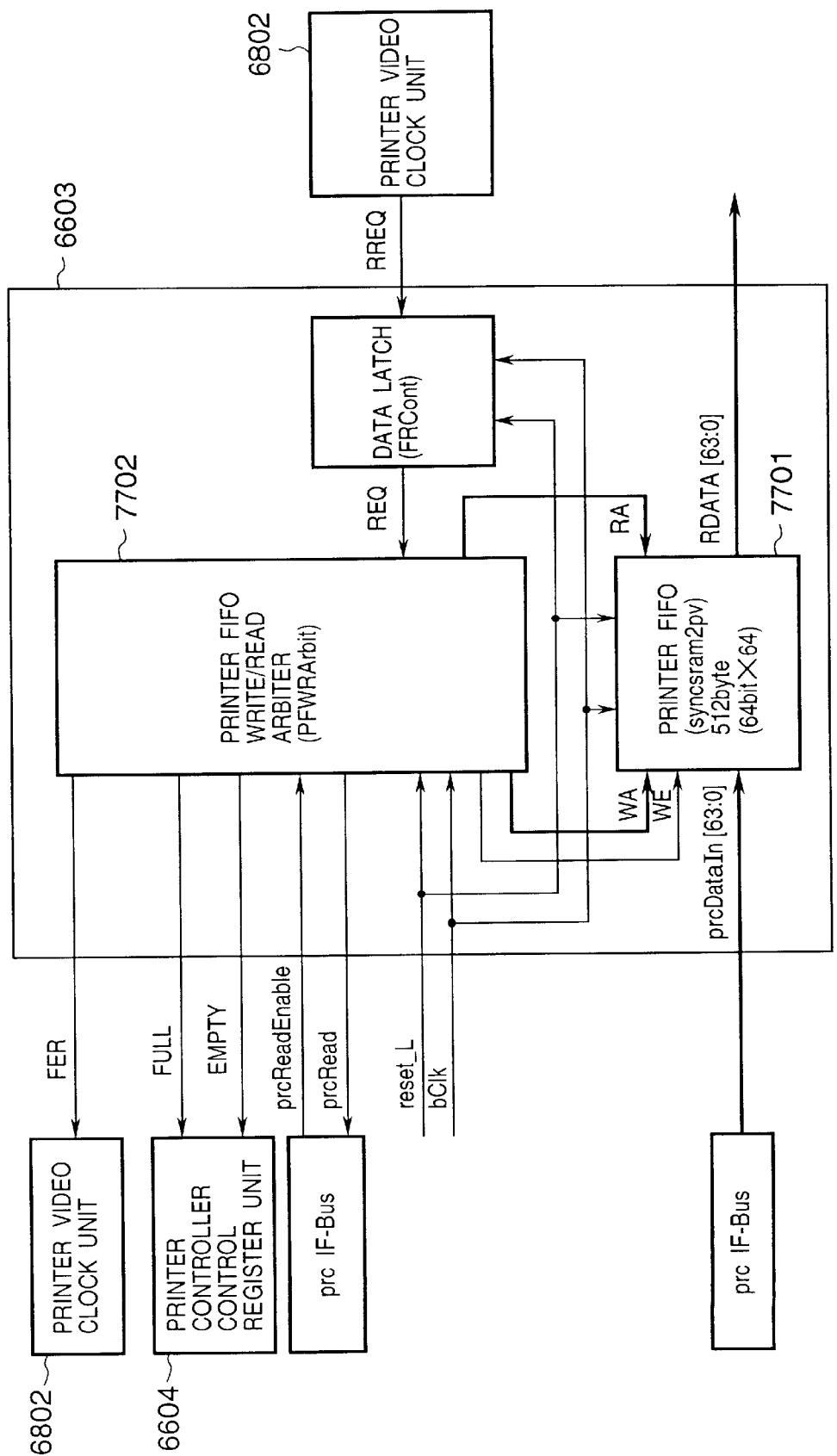
FIG. 77 is a block diagram of a printer image data transfer FIFO controller 6603.

FIG. 77 shows a block diagram of a printer image data transfer FIFO controller 6603. This controller consists of a FIFO which is a buffer to transfer image data to the printer by way of the GBI (G bus/B bus I/F) and a circuit which controls the FIFO. The controller comprises a FIFO 7701 which has a capacity of 512 bytes (64 bits_64). A printer FIFO write/read arbiter 7702 controls data input into the FIFO while monitoring a full flag (FF) of the FIFO 7701. Data is output to the FIFO when the printer video clock unit 6602 issues a request signal (RREQ).

[4. Printer Controller Control Register Unit]

Figure 78:
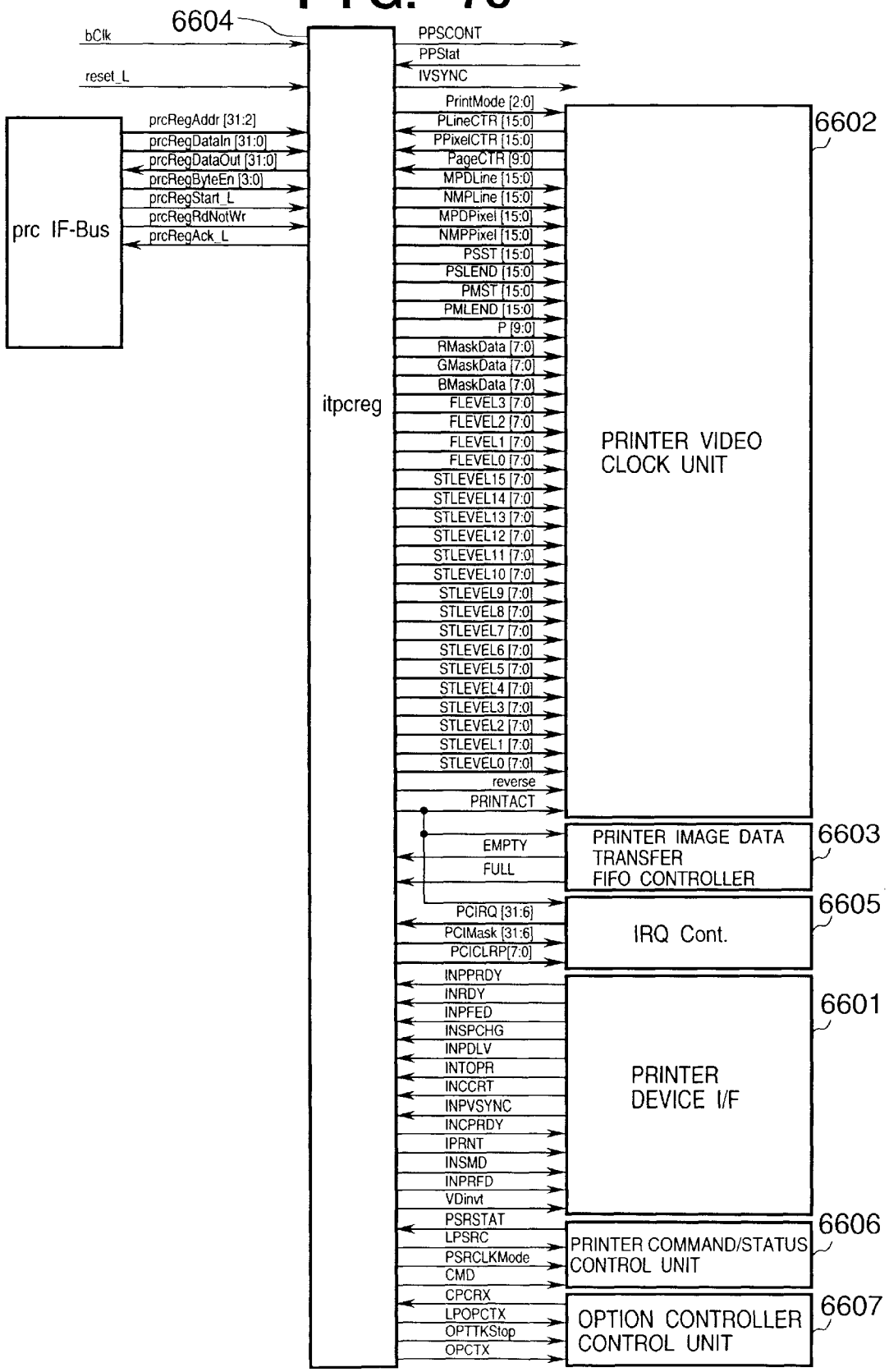
FIG. 78 is a block diagram of a printer controller control register 6604.

FIG. 78 shows a block diagram of a printer controller control register 6604. This block comprises registers which control internal members of the printer controller. The internal registers are:

1. Printer power management control register
2. Printer controller control register
3. Printer controller interrupt factor status register
4. Printer controller interrupt factor mask register
5. Printer subsidiary scanning mask line setting register
6. Printer main scanning mask pixel number setting register
7. Printer subsidiary scanning line number setting register
8. Printer subsidiary scanning line number counter read register
9. Printer main scanning pixel number setting register
10. Printer main scanning pixel number counter read register
11. Print page number setting register
12. Print page number counter read register
13. Printer device control register
14. Printer device status register
15. Printer serial command register
16. Printer serial status register
17. Option controller TX register
18. Option controller RX register
19. Printer video mask data register
20. 4-gradation output level setting register
21. 16-gradation output level setting register 1
22. 16-gradation output level setting register 2
23. 19-gradation output level setting register 3
24. 16-gradation output level setting register 4

[5. IRQ Controller]

Figure 79:
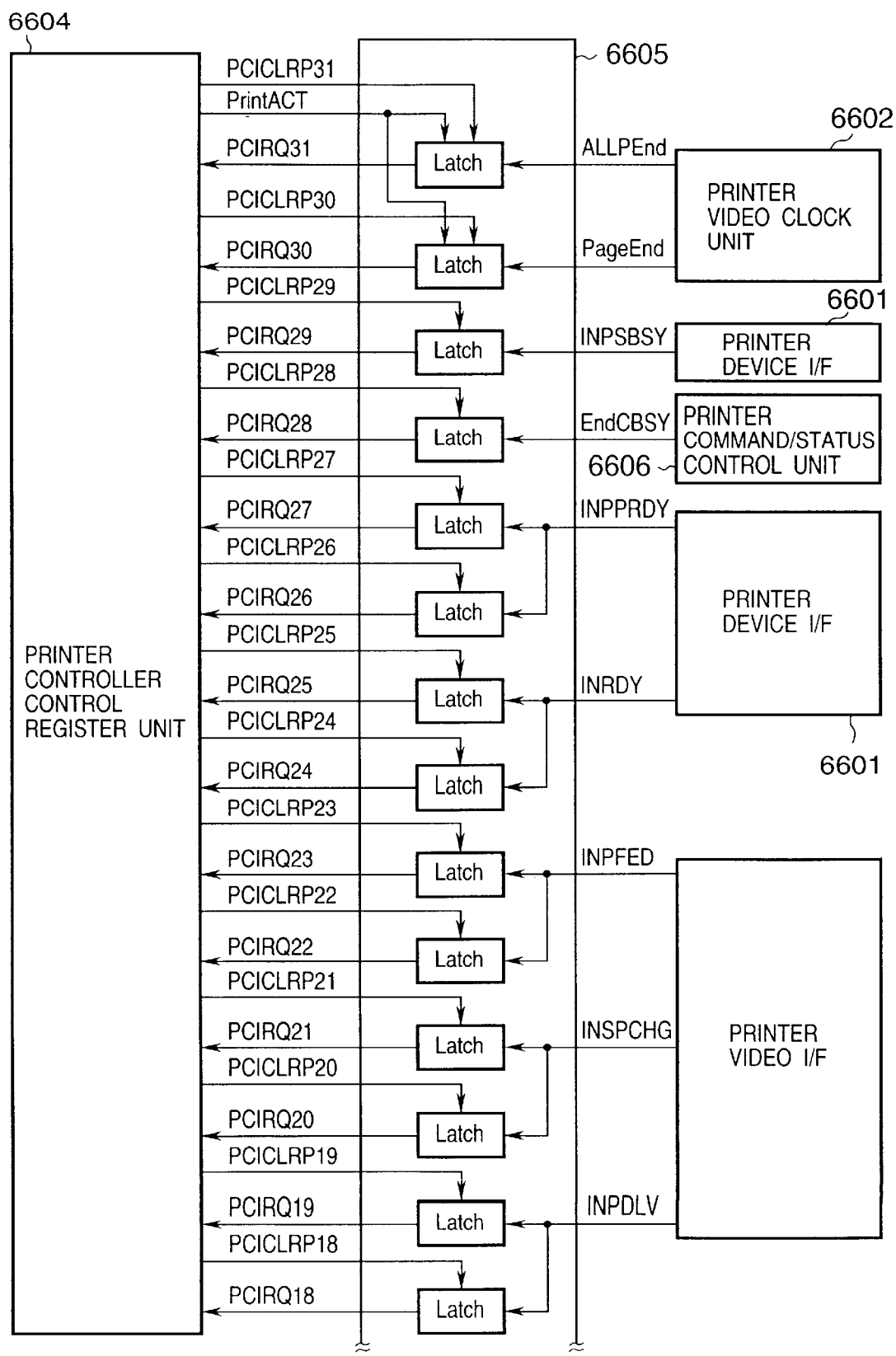
FIG. 79 is a block diagram of an IRQ controller 6605.
Figure 80:
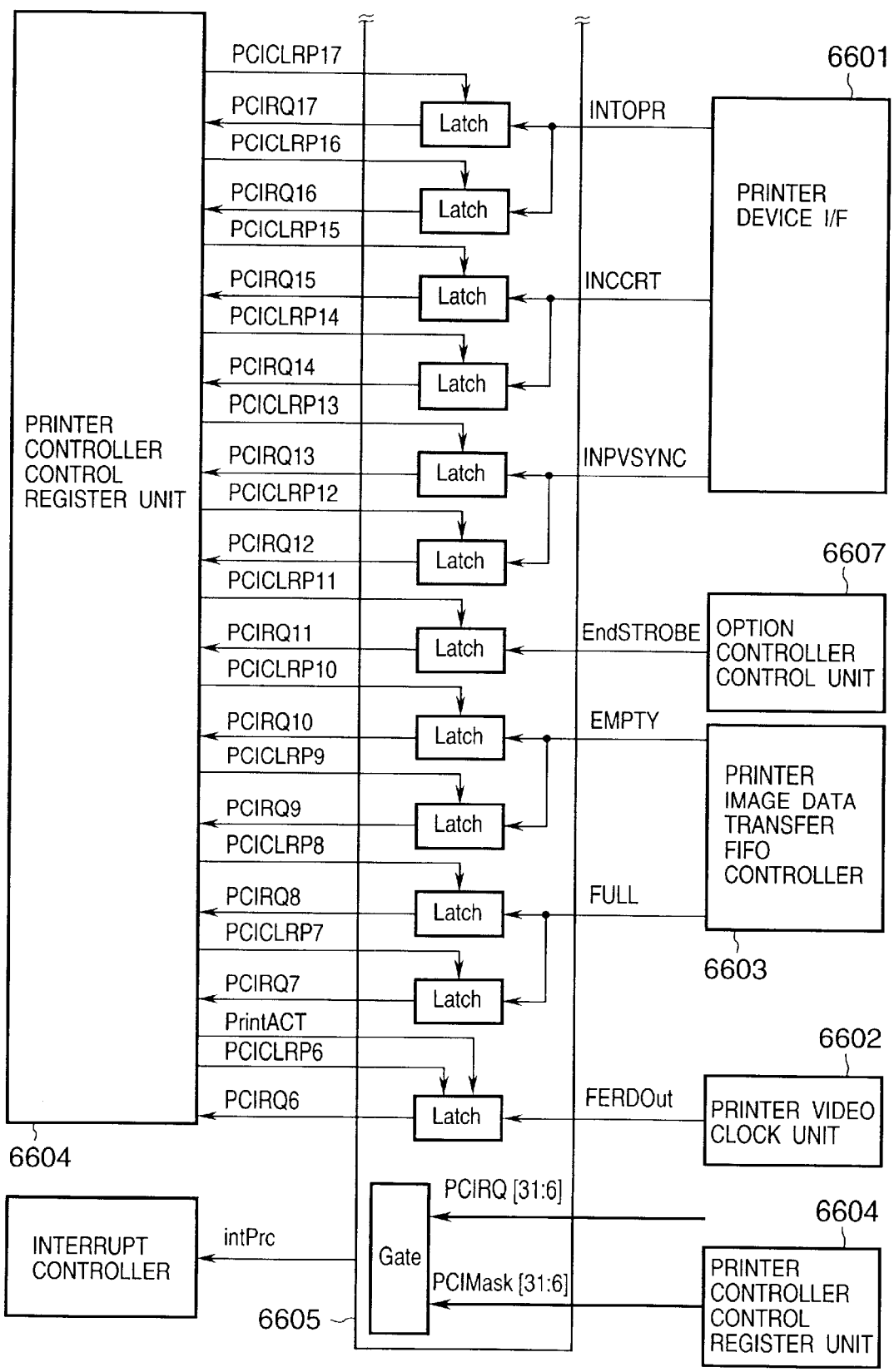
FIG. 80 is a block diagram of the IRQ controller 6605.

FIGS. 79 and 80 show block diagrams of an IRQ controller 6605. This block manages an interrupt signal which is generated in the printer controller. It causes an interrupt from an interrupt factor. The IRQ controller has a function to mask each interrupt factor and can clear individually. Interrupt factors are:

1. Transfer end of all pages of image data (ALLPEnd)
2. Transfer end of 1 page of image data (PageEnd)
3. Reception end of 1 byte of serial status (INPSBSY)
4. Transmission end of 1 byte of serial command (EndCBSY)

5. Rise of PPRDY signal (false→true) (INPPRDY)
6. Fall of PPRDY signal (true→false) (INPPRDY)
7. Rise of RDY signal (false→true) (INRDY)
8. Fall of RDY signal (true→false) (INRDY)
9. Rise of PFED signal (false→true) (INPFED)
10. Fall of PFED signal (true→false) (INPFED)
11. Rise of SPCHG signal (false→true) (INSPCHG)
12. Fall of SPCHG signal (true→false) (INSPCHG)
13. Rise of PDLV signal (false→true) (INPDLV)
14. Fall of PDLV signal (true→false) (INPDLV)
15. Rise of TOPR signal (false→true) (INTOPR)
16. Fall of TOPR signal (true→false) (INTOPR)
17. Rise of CCRT signal (false→true) (INCCRT)
18. Fall of CCRT signal (true→false) (INCCRT)
19. Rise of VSREQ signal (false→true) (INPVSYNC)
20. Fall of VSREQ signal (true→false) (INPVSYNC)
21. TX transmission & RX reception end of option controller
22. Rise of EMPTY signal from image data transfer FIFO
23. Fall of EMPTY signal from image data transfer FIFO
24. Rise of FULL signal from image data transfer FIFO
25. Fall of FULL signal from image data transfer FIFO
26. over-read occurrence in image data transfer FIFO (EERDOut)

Flag information (PCIRQ[31:6]) corresponding to the interrupt factor mentioned above is output to the printer controller control register 6604. From the printer controller control register 6604, a mask bit (PCIMask[31:6]) and a clear signal (PCICLRP[31:6]) corresponding to the interrupt factor are input. A logical sum of the interrupt factor is output to intprc.

[6. Printer Command/status Control Unit]

Figure 81:
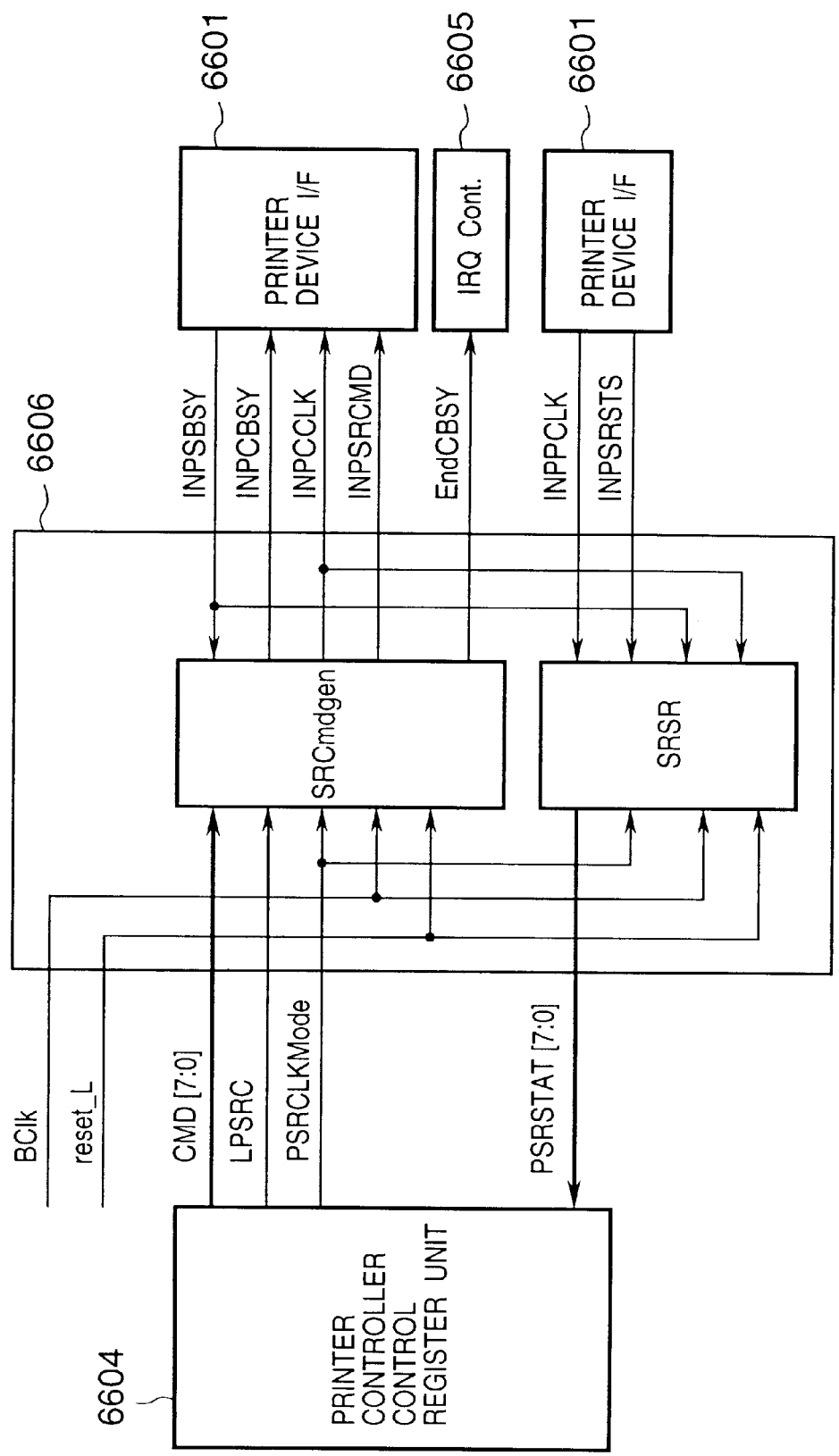
FIG. 81 is a block diagram of a printer command/status control unit 6606.

FIG. 81 shows a block diagram of the printer command/status control unit 6606. This is a block which transmits and receives serial commands/statuses for controlling the printer.

Generated as the serial commands are an INPCBSY signal which represents a period of command transmission, an INPCCLK signal which is a synchronous clock of the serial command and a serial command INPSRCMD signal.

As the serial statuses, an INPSBSY signal whith represents a period of status transmission and a serial status INPSRSTS signal are input to output a 8-bit status PSRSTAT[7:0]. An INPPCLK signal output from the printer or a PCCLK signal generated by the printer command/status control unit is selectable as a synchronous clock for inputting the serial status. Selection is made by a PSRCLKMode signal.

[7. Option Controller Control Unit]

Figure 82:
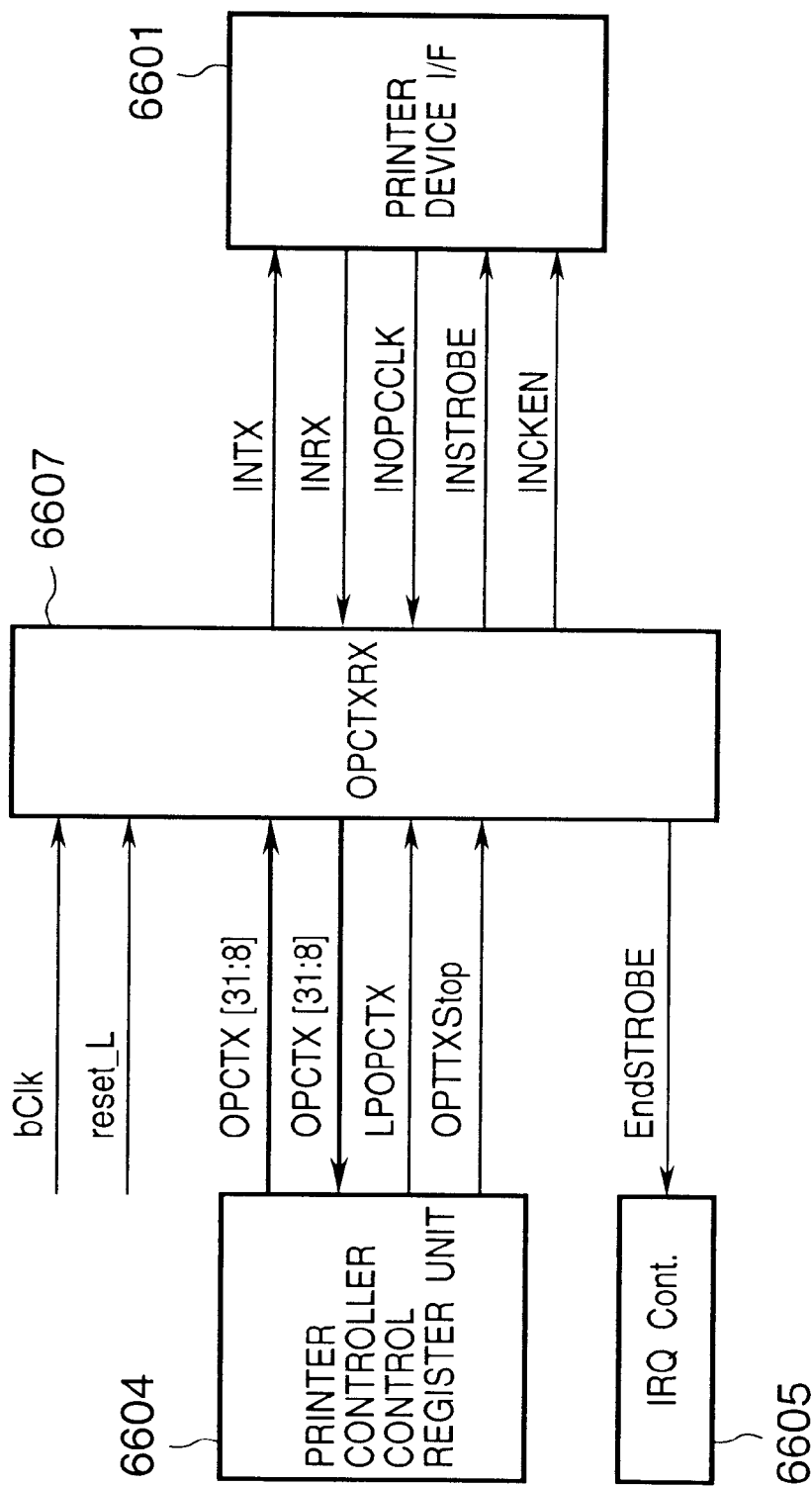
FIG. 82 is a block diagram of an option controller control unit 6607.

FIG. 82 shows a block diagram of the option controller control unit 6607. This unit is a block which outputs transmission data (TX) to an option controller. It generates an INSTROBE signal, an INCKEN signal and a CLK (OPCLK) signal for TX transmission. Furthermore, this unit executes reception of reception data (RX) simultaneously with TX transmission.

(prcIF-bus)

A prcIF-bus is a local bus which connects the G bus/B bus I/F unit 4301B to the printer controller 4303. Signals contained in this bus are described below. Signals which are output from the printer controller to the G bus/B bus I/F unit (GBI) are designated by OUT and signals which are input from the Gbus/B bus I/Funit (GBI) into the printer controller are designated by IN. Since an IF-bus has specifications which are the same for both the scanner controller and the printer controller, description will be made also of signals for functions which are not supported by the printer controller.

prcRst0_L: IN
This signal is used to return an internal FIFO of the printer controller to its initial state.

prcDataIn[63:0]: IN
This is a 64-bit data bus which is output from the G bus/B bus I/F unit (GBI) to the printer controller. Image data is transferred when the printer controller operates to transfer data.

prcRead: OUT
This is a read signal which is transmitted from the G bus/B bus I/F unit (GBI) when the printer controller operates to transfer data. At rise of Bclk for which the prcread signal is asserted, the G bus/B bus I/F unit (GBI) validates the prcDataIn[63:0]. Data can be read in 1 clock unit by keeping the prcRead signal asserted.

prcReadEnable: IN
This is a signal which indicates granting of data read from the Gbus/B bus I/Funit (GBI) when the printer controller is operating to transfer data. This signal is output from the G bus/B bus I/F unit (GBI). The signal indicates that data can be read at rise of a next clock if the prcReadEnable signal is asserted. Assertion of the prcRead signal is made by confirming the prcReadEnable signal.

prcRegAddr[31:2]: IN
This is a register address bus which is used to make access from the G bus/B bus I/F unit (GBI) to an internal register of the printer controller. This bus becomes valid upon assertion of the prcRegStart_L and is kept valid till response with the prcRegAck_L signal if access is made to an internal register of the scanner controller.

prcRegbyteEn[3:0]: IN
This is a byte enable signal for prcRegDataIn[31:0] output from the G bus/B bus I/F unit (GBI). This signal becomes valid upon assertion of the prcRegStart_L and is kept valid till response with the prcRegAck_L signal. Only a valid byte indicated by this signal is written into a register. At a stage to read data out of an internal register, this signal is ignored and all bytes are output. Bits of this signal correspond to bytes of prcRegDataIn[31:0] as listed below:

| prcRegbyteEn: | 3 | 2 | 1 | 0 |
|---|---|---|---|---|
| prcRegDataIn: | [31:24] | [25:16] | [15:8] | [7:0] | prcRegStart_L: IN

This is an access request signal which indicates access from the G bus/B bus I/F unit (GBI) to the internal register of the printer controller. The signal indicates an access request to the register when it is set at "Low." It is asserted for 1 clock of Bclk together with the prcRegAddr[31:2] signal and the prcRegRdNotWr signal. Assertion of next access is not granted till the printer controller returns the prcRegAck_L to this access.

prcRegDataOut[31:0]: OUT
This is a 32-bit data bus which is used to make read access from the G bus/B bus I/F unit (GBI) to the internal register of the printer controller. It is valid when the prcRegAck_L signal is asserted.

prcRegDataIn[31:0]: IN
This is a 32-bit data bus which is used to make write access from the G bus/B bus I/F unit (GBI) to the internal register of the printer controller. It becomes valid upon assertion of the prcRegStart_L and is kept valid till response with the prcRegAck_L signal if access is made to the internal register of the printer controller.

prcRegRdNotWr: IN

This is a signal which indicates an access direction (read or write) from the G bus/B bus I/F unit (GBI) to the internal register of the printer controller. Contents of the internal register of the printer controller are read out to the prcRegOut[31:0] when this signal is set at "High" and contents of the prcRegDataIn[31:0] are written into the internal register of the printer controller when the signal is set at "Low." The signal becomes valid upon assertion of prcRegStart_L and is kept valid till response with the prcRegAck_L signal when access is made to the internal register of the printer controller.

prcRegAck_L: OUT

This is a signal which indicates completion of access to the internal register of the printer controller. This signal is output from the printer controller to the G bus/B bus I/F unit (GBI). It is asserted for 1 clock of BClk. The signal is sensed at a clock next to assertion of the prcRegStart_L signal.

Signals prcReq0_L, prc byte En[7:0], prcWrite, prcDataOut[63:0] and prcReadEnable are not used in the printer controller.

Figure 83:
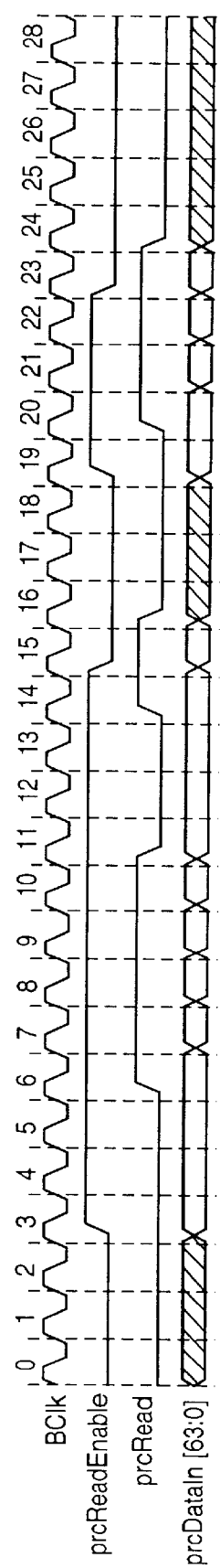
FIG. 83 is a timing chart for DMA transfer of data to the printer controller 4303.
Figure 84:
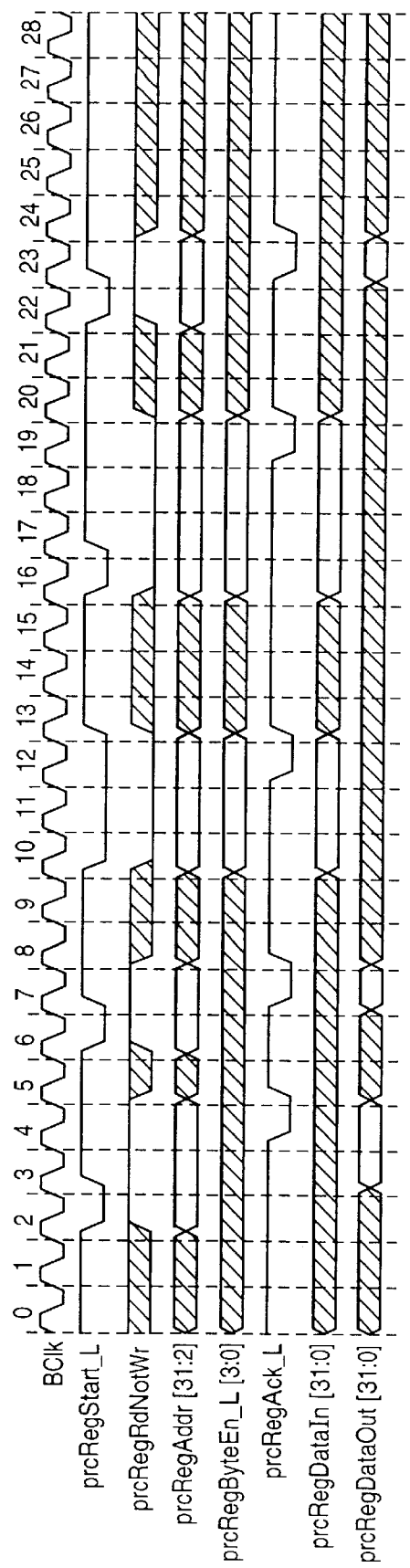
FIG. 84 is a timing chart for write and read into and from an internal register of the printer controller 4303.

FIGS. 83 and 84 are timing diagrams exemplifying timings of the signals described above. FIG. 83 shows timings for DMA transfer of data to the printer controller 4303, whereas FIG. 84 shows timings for read or write from or into the internal register of the printer controller 4303.

(Power Management)

In the printer controller, gates of video clocks (VCLK) are controlled according to settings in a printer controller power management control register (0X1B007000), thereby performing power management. A value of a PM state signal (prcPmState[1:0]) to be output to the power management unit (PMU) 409 is determined by adding a state of prcDmaPmState[1:0] input from the G bus/B bus I/F unit 4301B to a clock state. The prcPmState[1:0] is shown in FIG. 85.

In FIG. 85, the prcDmaPmState[1:0] indicates a power consumption state of a G bus/B bus interface GBI_prc of the printer. The GBI_prc has power consumption states at four steps of 00 to 11. This state signal prcDmaPmState[1:0] is output from the GBI_prc to the printer controller.

Furthermore, the printer controller has power consumption states at two steps which are indicated by an internal signal PPStat.

The signal prcPmstate[1:0] indicates a state which is composed of a state of the GBI_prc and that of the printer controller. This signal is output to the power management unit of the system. That is, the power consumption states of the printer controller at the four steps are informed to the power management unit. The steps are represented by values of the signal prcPmstate [1:0]. A value of 00 represents a lowest level and each increment of 1 designates a higher power consumption.

2.9.3. G bus/B Bus I/F Unit (GBI)

Figure 92:
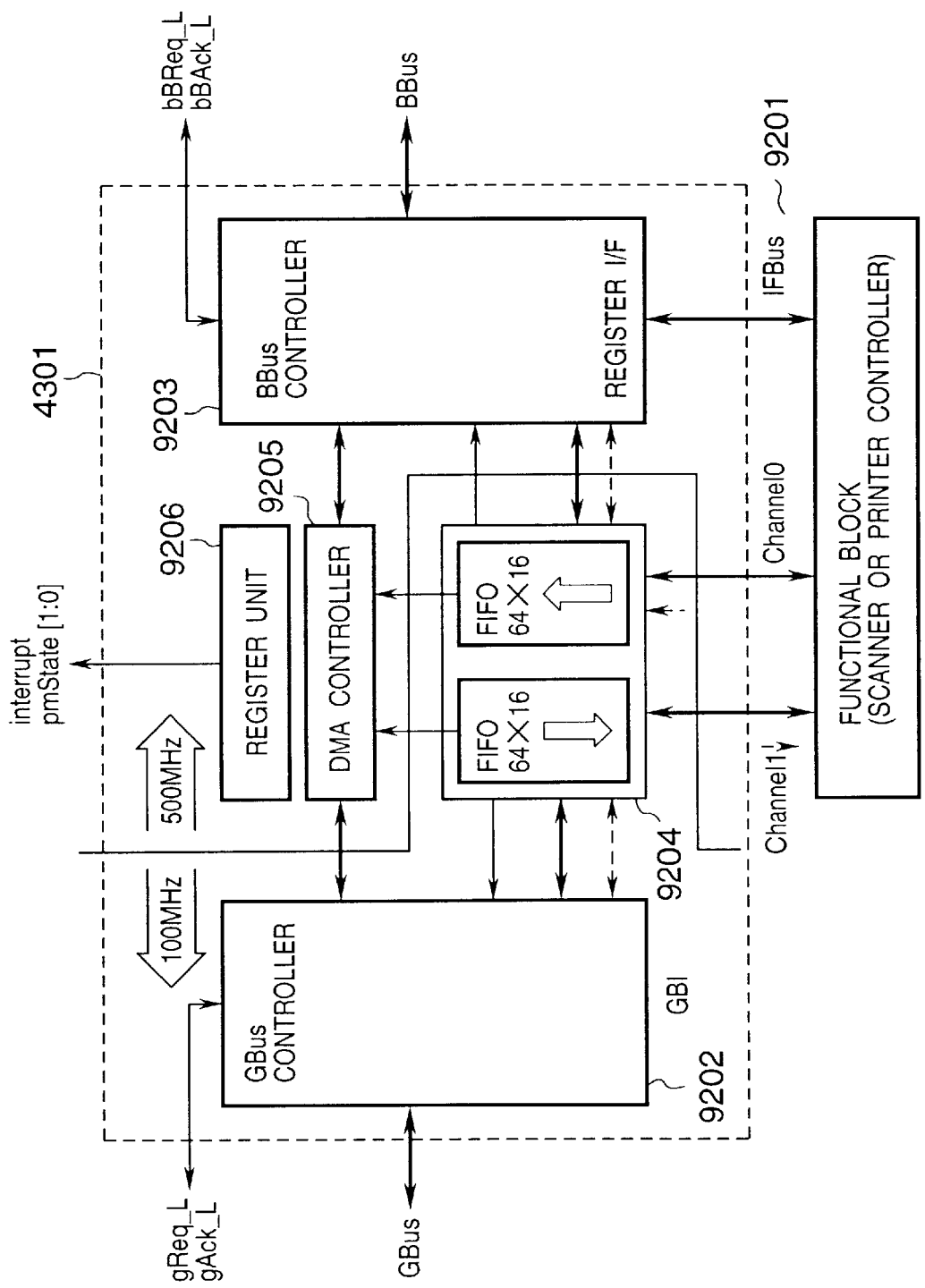
FIG. 92 is a block diagram of a GBI.

FIG. 92 shows a block diagram of the G bus/B bus I/F unit 4301. The G bus/B bus I/F unit is prepared for each of the scanner and the printer and has a configuration which is described below:

In FIG. 92, the GBI 4301 comprises a G bus controller which is connected to a G bus for its control and a B bus controller which is connected to a B bus for its control.

Comprised between these buses are not only a DMA controller 9205 which controls a DMA address but also a FIFO 9204 which is used for data transfer between a functional block and the G bus/B bus, and a register unit 9206 into which various set values are written. Out of these members, the G bus controller and the FIFO 9204 operate with clocks at 100 MHz in synchronization with the G bus, whereas other blocks operate at 50 MHz in synchronization with the B bus.

The GBI 4301 provides selective connection to the G bus or the B bus and a G bus/B bus interface for functional blocks (SCC: scanner controller and PRC: printer controller) which are to be connected to both the G bus and the B bus. The GBI is connected to each functional block with an IF bus 9201. It is unnecessary for the functional block to be aware of whether data is to be input or output to the G bus or the B bus. Since DMA is supported by the GBI, it is neither necessary for the functional block to generates an address. The GBI is configured as an independent unit by collecting functions which are necessary commonly for the functional blocks.

A functional block which is connected to the IF bus 9201 supported by the GBI receives or sends out data continuously. The IF bus does not contain an address signal. The GBI 4301 prepares two channels: channel 0 (G bus/B bus→IF bus 0) and channel 1 (G bus/B bus→IF bus 1) to which DMA controllers are prepared respectively. However, the scanner controller uses (mounts) only the channel 0 and the printer controller uses (mounts) only the channel 1.

A DMA controller 9205 is capable of setting data into an I/O (having fixed address) and a memory, and setting DMA in a continuous physical address mode and a chain table mode (described later) in case of the memory.

The GBI 4301 inputs and outputs data into and from the functional block by way of the FIFO. Accordingly, an access is made to the same location of an address of the GBI only with 0x18n0_0000–0x18n0_007F on a side of the G bus and 0x19n0_0000–0x19n0_001F on a side of the B bus when the GBI operates in a slave mode. Since the GBI 4301 uses the FIFO, it can hardly respond to a laparound during burst transfer. The GBI responds to a burst transfer request followed by a laparound of the B bus as a single access. It does not respond to a transfer request which is accompanied by a laparound of the G bus.

For a DMA transfer of image data between the two GBIs, these units are controlled by their DMA controllers respectively. Though either of the GBIs is not specified as a master in particular, it is desirable to select as a master a GBI whichever transfers data at a stricter timing. Therefore, a GBI_PRC is selected as a master and GBI_SCC is selected as a slave in this embodiment.

A GBI (G bus/B bus interface) is composed of:

1. Fifo unit which delivers data to and from the functional block

2. G bus controller 9202 which is connected directly to the G bus to connect the G bus to the Fifo unit.

3. B bus controller 9203 which is connected directly to the B bus to connect the B bus to the Fifo unit.

4. DMA controller 9205 which issues a DMA transfer request to each bus controller in the master mode.

5. Register unit 9206 which holds contents of a register to send a signal to each block.

The register unit contains an interrupt controller and a power controller. Each of the members will be described below.

<Fifo Unit>

Figure 93:
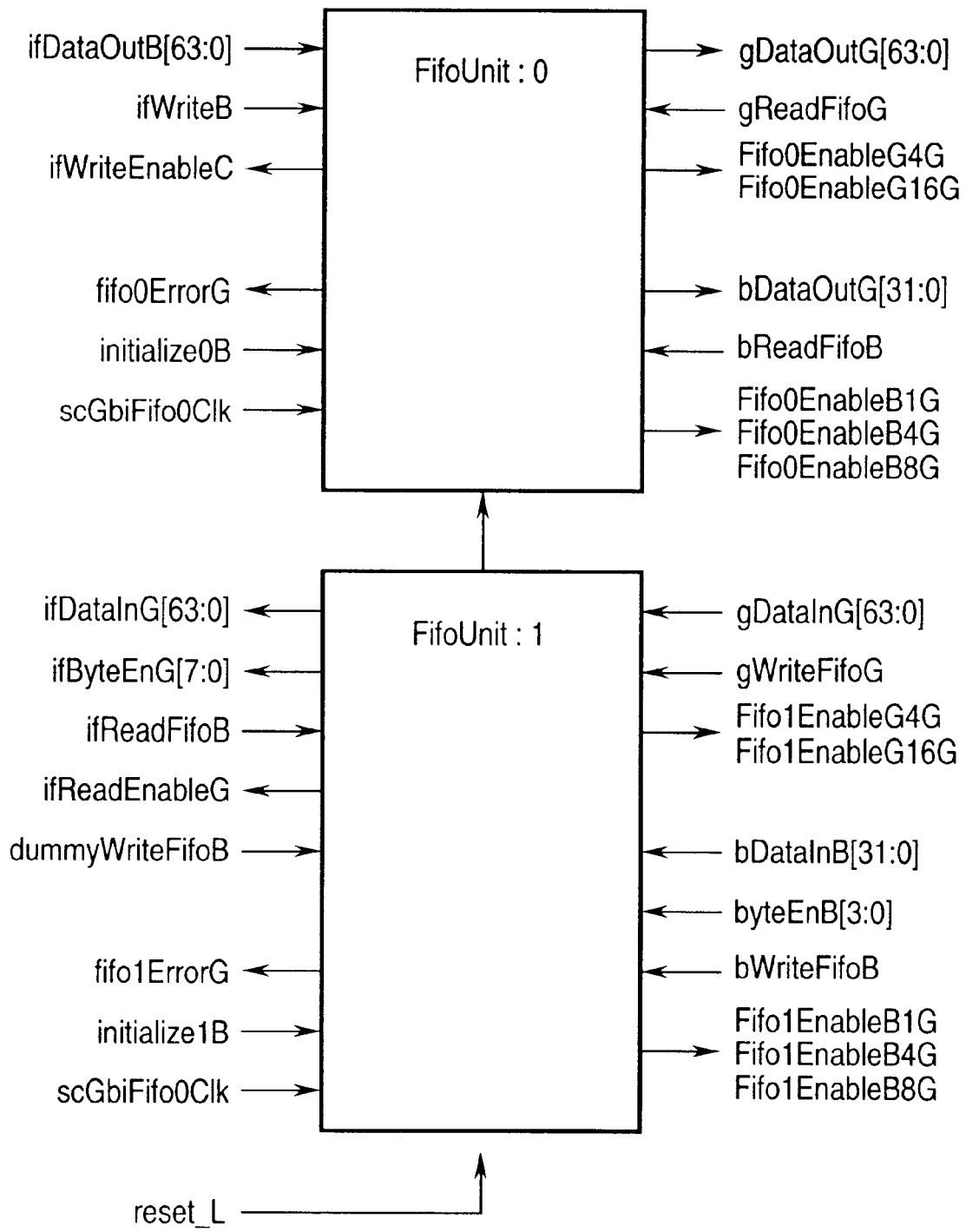
FIG. 93 is a block diagram of a FIFO unit.

The Fifo unit shown in FIG. 93 is a member which functions as a buffer for data transferred between the G bus/B bus and the IF bus. The Fifo unit is composed of a FIFO unit 0 and a FIFO unit 1 which are independent of each other. The Fifo unit 0 is used to input data from the IF bus or output data to the G bus or the B bus, whereas the Fifo unit 1 is used to input data from the G bus or the B bus, or output data to the IF bus.

A signal scGbiFifo0Clk or scGbiFifo1Clk is a gated clock which realizes a power saving mode by stopping a clock. This clock is stopped by writing a GBI FIFO register and automatically starts when a master mode or a slave mode is to be started.

[Fifo Unit 0]

The Fifo unit 0 writes data from an IF bus 0 (specifications for the IF bus are described later) into Fifo and sends it to the G bus/B bus. Signals ifDataOutB[63:0], ifWriteB and ifWriteEnableG are connected to the IF bus.

The Fifo 0 of the Fifo unit 0 receives 64-bit data as an input from the IF bus, and outputs 64-bit data DataOut64 for the G bus and 32-bit data DataOut32 for the B bus.

Status signals which are output from the Fifo unit 0 are:

Fifo0EnableB1G: Indicates that 1 word can be transferred from the Fifo 0 unit to the B bus. This signal is used by the DMA controller in the master mode or by the B bus controller in the slave mode.

Fifo0EnableB4G: Indicates that 4 words can be transferred successively from the Fifo 0 unit to the B bus. This signal is used by the DMA controller in the master mode or by the B bus controller in the slave mode.

Fifo0EnableB8G: Indicates that 8 words can be transferred successively from the Fifo 0 unit to the B bus. This signal is used by the DMA controller in the master mode or by the B bus controller in the slave mode.

Fifo0EnableG4G: Indicates that 4 words can be transferred successively from the Fifo 0 unit to the G bus (1 word consists of 64 bits). This signal is used by the DMA controller in the master mode or by the G bus controller in the slave mode.

Fifo0EnableG16G: Indicates that 16 words can be transferred successively from the Fifo 0 unit to the G bus. This signal is used by the DMA controller in the master mode by the G bus controller in the slave mode.

ifWriteEnable: Indicates that the Fifo 0 is not in a full state. This signal is connected to the IF bus to inform that data can be written into the functional block.

Furthermore, a signal Rd64 input into the Fifo 0 is used to read 64-bit G-bus data from the Fifo 0 and a signal Rd32 is used to read 32-bit B-bus data. The status signal and DataOut64 or DataOut32 output from the Fifo 0 are updated by reading the 64-bit data or the 32-bit data.

(B2G Block)

Clocks of the I/F bus and B bus are at 50 MHz, whereas a clock of the G bus is at 100 MHz. Accordingly, a B2G block (not shown) which is contained in the Fifo unit 0 converts a clock of a write signal ifWrireFifoB synchronized with the IF bus clock or a read signal bReadFifoB synchronized with the B bus clock into a clock (at a frequency twice as high as that of the IF bus) of the Fifo unit.

(ChkIllegal Block)

The Fifo 0 is communized by the G bus/B bus. Though the DMA controller controls exclusive use of the G bus/B bus in the master mode, the DMA master must control the exclusive use in the slave mode. For this purpose, a ChkIllegal block which is comprised in the Fifo unit 0 asserts a signal fifoErrorG when accesses are made to the Fifo 0 simultaneously from the G bus and the B bus. That is, when a read signal gReadFisoG from the G bus and a read signal bReadFisoB from the B bus are asserted simultaneously, the ChkIllegal block asserts the signal fifoErrorG. This signal is latched by the register unit and causes an interrupt if it is not masked.

[Fifo Unit 1]

The Fifo unit 1 writes data from the G bus/B bus into a FIFO 1 built therein and sends it out to an IF bus 1. ifDataIng[63:0], ifByteEnG[7:0], ifReadB and ifReadEnableG are connected to the IF bus.

In order to correspond to a DMA in a reverse direction in the master mode, the Fifo unit 1 comprises a front buffer disposed at its front stage. When the DMA is in the reverse direction (input signal reverse Mode is enable), data is buffered once into the front buffer and then sent out in a reverse sequence to a FIFO. In another mode (signal reverse MODE is disable), the Fifo unit 1 functions as an ordinary FIFO.

(Front Buffer)

The front buffer is a buffer having 64+4 bits _4 stages with byte enable which receives data from the G bus or the B bus as its input and outputs the data to the Fifo 1. When write is made from the B bus, the data is written together with a byte enable signal. By write from the G bus, the data is written by validating all byte enables. The data is not packed into 64 bits for write from B bus.

Provided as a status signal is a signal BufEmpty which indicates the front buffer is empty. For the DMA in the reverse direction, the signal reverseMode is enable and the DMA controller limits a transfer mode only to the 4-beat burst transfer of the G bus or the single transfer of the B bus. Data transferred by the 4-beat burst transfer of the G bus is stored once into the front buffer and sent out to the Fifo 1 in the reverse sequence (reversed in a 32-bit unit).

In another mode, the signal reverseMode is disable and the front buffer functions as a FIFO having four stages. An input signal dummyWriteFifo1B is once latched and then is sent to the Fifo 1 when the front buffer becomes empty.

(Fifo 1)

The Fifo 1 is a FIFO having 64+8 bits 16 stages with a byte enable which receives data from the front buffer as its input and outputs the data to the IF bus. Data from the B bus is written together with a byte enable signal. Data from the G bus is written with all byte enables validated. Data from the B bus is packed into the 64 bits for write.

On the basis of internal states of the Fifo 1 and a BufEmpty signal of the front buffer, the following status signals are prepared:

Fifo1EnableB1G: Indicates that 2 words (32 bits) can be transferred from the B bus to the Fifo unit 1. This signal is enabled when the Fifo 1 has an empty area for 1 or more BBus words, or when the front buffer is empty.

Fifo1EnableB4G: Indicates that 8 words can be transferred successively from the B bus to the Fifo unit 1. This signal is enabled when the Fifo 1 has an empty area for 4 or more BBus words, or when the front buffer is empty.

Fifo1EnableB8G: Indicates that 12 words can be transferred successively from the B bus to the Fifo unit 1. This signal is enabled when the Fifo 1 has an empty area for 8 or more BBus words, or when the Fifo 1 has an empty area for 4 or more BBus words and when the front buffer is empty.

Fifo1EnableG4G: Indicates that 4 words (1 word consist of 64 bits) can be transferred successively from the G bus to the Fifo unit 1. This signal is enabled when the Fifo 1 has an empty area for 4 or more GBus words, or when the front buffer is empty.

Fifo1EnableG16G: Indicates that 16 words can be transferred successively from the G bus to the Fifo unit 1.

This signal is enabled when the Fifo 1 is empty or has an empty area for 12 or more GBus words and when the front buffer is empty.

ifReadEnable: Indicate that the Fifo 1 is not empty. This signal is connected to the IF bus to inform that read to the functional block is enabled.

The signals Fifo1EnableB1G, Fifo1EnableB4G and Fifo1EnableB8G are used by the DMA controller in the master mode or by the B bus controller in the slave mode.

The signals Fifo1EnableG4G and Fifo1EnableG16G are used by the DMA controller in the master mode or by the G bus controller in the slave mode.

Furthermore, the Fifo unit 1 comprises, like the Fifo unit 0, the B2G block and the ChkIllegal block.

<G Bus Controller>

Figure 94:
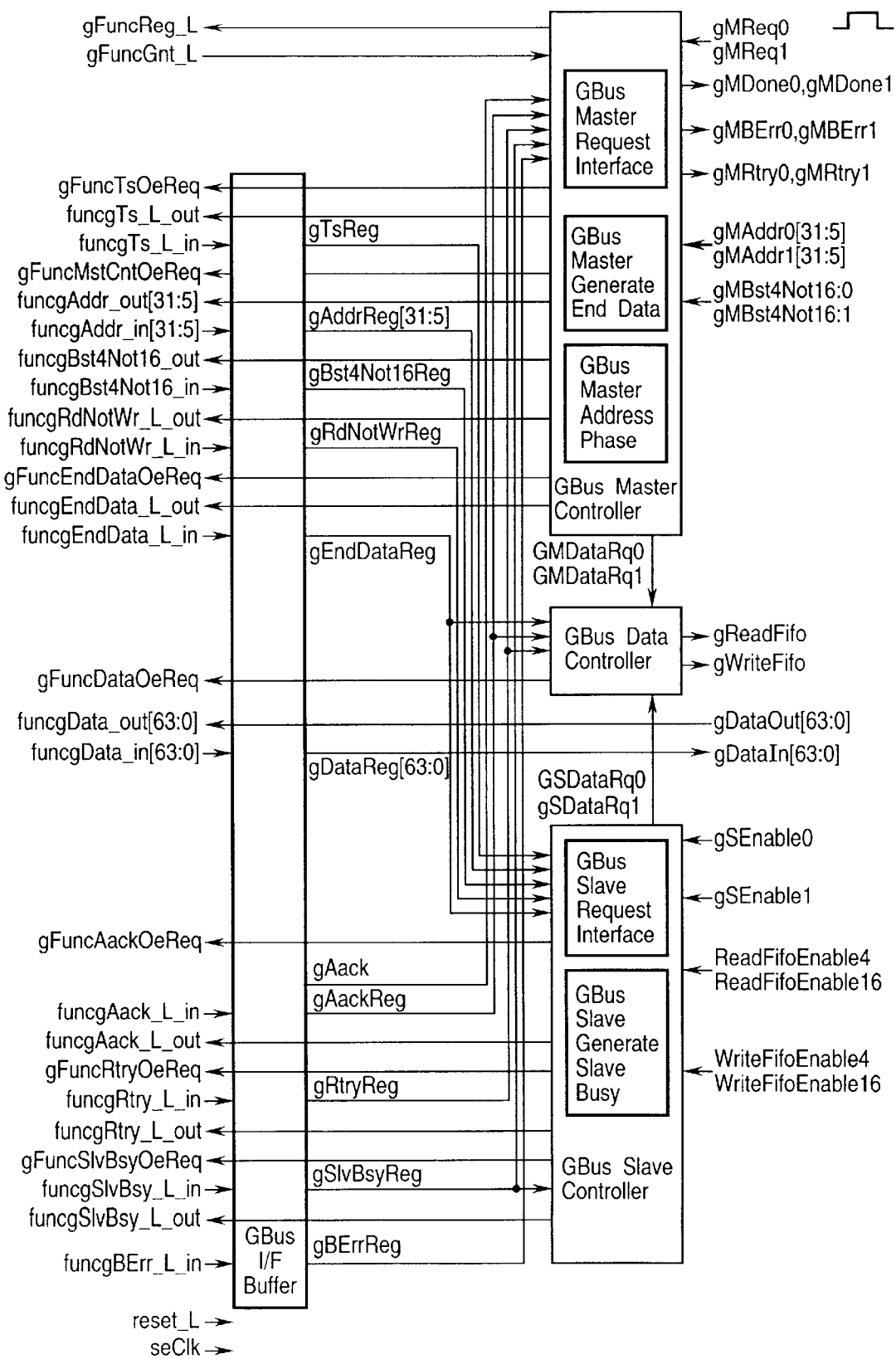
FIG. 94 is block diagram of a GBus controller.

FIG. 94 shows a block diagram of the G bus controller 9202. The G bus controller 9202 comprises a G bus master controller which controls the G bus using the GBI as a bus master, a G bus slave controller which controls the G bus when the GBI is selected as a slave, a G bus data controller which controls data and a G bus interface buffer. Owing to this configuration, the GBI 4301 is capable of operating as a master or a slave of the G bus.

[Operations of G bus master]

The G bus controller which uses a G bus master controller as a G bus master controls the G bus in the processes described below:

1. Request from DMA controller

At a stage where transfer through a channel N is enabled, the DMA controller 9205 requests DMA transfer by asserting a gMReq(N) signal together with a gMAddr (N)[31:5] signal and a gMBst4Not16_N signal with bclk (a B bus clock signal) for a clock.

The gMAddr (N)[31:5] signal and the gMBst4Not16_N signal must not be changed until any of gMDone(N) signal, gMRtry(N) signal and gMBErr(N) signal is asserted by the G bus master controller.

2. Transfer request to G bus arbiter

A gMReq(N) signal is latched by a G bus master request interface (gLatchReq(N) signal).

A gLatchReq signal in each channel which is arbitrated by a G bus master request arbiter (not shown) asserts a DMA request signal gReq_L for the G bus arbiter 406 and transmits a gIntReq(N) signal to a G bus master address phase.

3. Transfer grant from G bus arbiter

When a ggnt_L signal which is a DMA grant signal from the G bus arbiter 406 is asserted, a signal GGntSense is asserted and the DMArequest signal gReq_L is negated from the G bus master address phase. Simultaneously, the gLatchReq (N) signal and the gIntReq(N) signal are negated. The G bus master request interface monitors a signal gSlvBsy and asserts a GMDataRq(N) signal when a data bus becomes usable. This signal is sent to Gbus master generate end data and a G bus data controller.

4. G bus data transfer

The G bus starts data transfer when it confirms the gAack signal of a slave. G bus signals other than EndData are generated by the G bus master address phase. The EndData is generated G bus by master generate end data. Data is moved from the G bus to the Fifo or from the Fifo to the G bus by the G bus data controller with a GMDataRq(N) signal. When a gRtry signal is detected before the gAack signal, the G bus data controller does not transfer data.

5. End (or Retry) of G bus data transfer.

The G bus master generate end data informs an end of the G bus data transfer to the G bus master request interface with a checkBErr signal. Upon reception of this signal, the G bus master request interface clears a request held therein and asserts the gMDone signal if no bus error is made. When a bus error is detected, the G bus master request interface asserts the gMBErr signal to inform the end of transfer to the DMA controller 9205.

When the gRtry signal is detected, the G bus master reqeust interface clear the request held therein and asserts the gMRtry signal.

When a signal received from the G bus controller 9202 is the gMDone signal, the DMA controller 9205 updates a transfer address, a transfer length and so on. When the received signal is the gMRtry signal, the DMA controller does not update the transfer address, etc., but starts a next action. When the gMBErr signal is received, the DMA controller 9205 intercepts the transfer and generates an interrupt if it is not masked.

[G Bus Slave Operation]

The G bus controller which uses a G bus slave controller as a G bus slave controls in the processes described below:

1. Transfer request from master

A G bus slave request interface confirms a gAddrReg signal and a gRdNotWrReg signal (channel 0 or 1) at a timing to assert a gTsReg signal. If a gSEnable(N) signal (slave mode: set by a register) is asserted by an access to the GBI, the G bus slave request interface judges whether or not transfer is possible from a gBst4Not16 signal and a ReadFifoEnable4/16 signal (channel 0) or a WriteFifoEnable4/16 signal (channel 1). If possible, the G bus slave request interface asserts the gAack signal or otherwise, it asserts the gRtry signal.

2. G bus data transfer

When data transfer is enabled, the G bus slave request interface confirms negation of the gSlvBsy signal, asserts the gAack signal and informs its timing to G bus slave request slave busy with the GSlvStart signal. Furthermore, the Gbus slave request interface informs a start of data transfer to the Gbus data controller by asserting the GSDataRq(N) signal. The G bus data controller moves data from the G bus to the Fifo or from the Fifo to the G bus. The G bus slave request slave busy generates a gSlvBsy signal.

3. G bus data transfer end

No signal is prepared in particular to indicate a transfer end. The gBErr signal is not asserted. When the gSEnable (N) signal has been negated, however, a bus error occurs due to time-out since no response is made to an access from the master.

<B Bus Controller>

Figure 95:
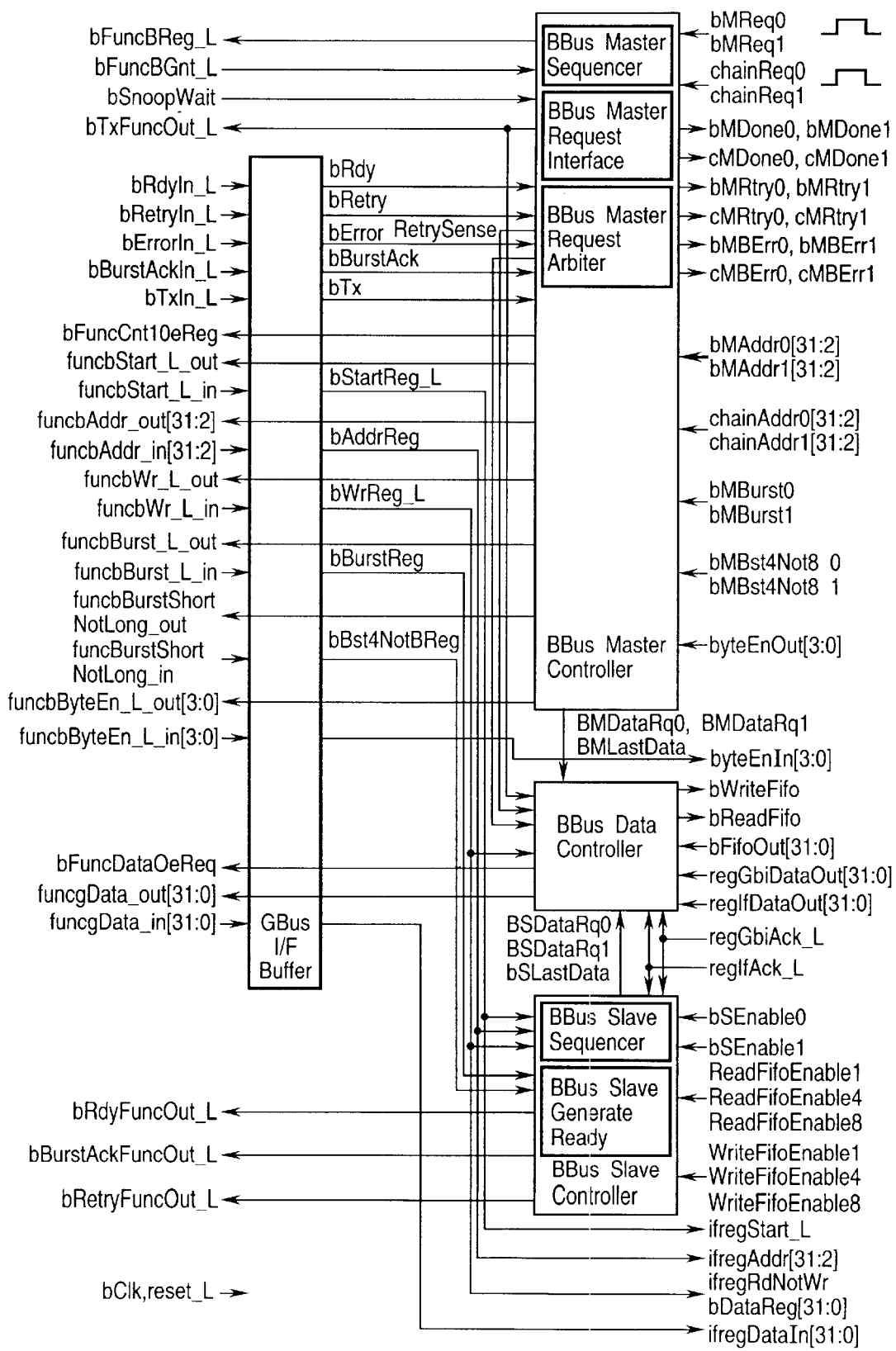
FIG. 95 is a block diagram of a BBus controller.

FIG. 95 shows a block diagram of the B bus controller 9203. The B bus controller 9203 comprises a B bus master controller, a B bus data controller, a B bus slave controller and a B bus interface buffer. This configuration allows the GBI 4301 to operate as a master or a slave of the B bus.

[B Bus Master Operation]

1. Request from DMA controller

When data transfer through the channel N becomes possible, the DMA controller 9205 asserts a bMReq(N) signal together with a bMAddr(N)[31:2] signal, bMBurst8n) signal and bMBstNot8_N signal for a clock with a B bus clock signal bCLk. Furthermore, at a stage to require read of a chain table in a chain DMA mode, the DMA controller 9205 asserts a cMReq(N) signal together with acMAddr(N)[31:2] signal with the bClk for a clock. The DMA controller 9205 does not use B bus burst transfer to read the chain table. DMA transfer of the Bbus is required from the DMA controller through these processes.

The bMAddr(N)[31:2] signal, bMBurst(N) signal and bMBst4Not8_N signal must not be chaged until access to the Fifo is started (bReadFifo and bWrireFifo are asserted).

The cMAddr(N) [31:2] signal must not either be changed until the cMDone(N) signal, cMrtry(N) signal or cMBErr (N) signal is asserted.

2. Transfer request to B bus arbiter

The BBusbMReq(N) signal and cMReq(N) signal are latched by the B bus master request interface (bLatchReq(N) signal and cLatchReq(N) signal). Each request signal is arbitrated by the B bus master request arbiter and a bBReq_L signal is asserted for the B bus arbiter 407.

3. Transfer grant from B bus arbiter

When the bBGnt_L signal which is a grant signal from the B bus arbiter is asserted, a B bus master request arbiter transmits a BGnt(N) signal or a CGnt(N) signal to a B bus master request interface which is a corresponding request source to negate a bBGnt_L signal. The B bus master request interface negates the bLatchReq(N) signal or the cLatchReq(N) signal, monitors a bTx signal and a bSnoop-Wait signal, and asserts a BMDataRq(N) signal and a CMDataRq(N) signal when a state is that transfer is possible. These signals are sent to the B bus master sequencer and the B bus data controller.

4. B bus data transfer

A B bus master sequencer generates all B bus signals other than data to be driven by the B bus master. The B bus master sequencer triggers the BMDataRq(N) signal or the CMDataRq(N) signal, asserts bStartOut_L (and bBurstOut_L at the same time in the burst mode) and checks bRdy (or bBurstAck in the burst mode), thereby detecting a transfer end. The B bus data controller transfers data from the B bus to the Fifo or from the Fifo to the Bbus with the BMDataRq(N) signal.

When the bRretry signal is detected before (or simultaneously with) the bRdy signal, the B bus data controller does not transfer data.

5. B bus data transfer end (or retry, bus error)

The B bus data controller terminates the data transfer by a BMLastData signal from the B bus master sequencer. Furthermore, the B bus master sequencer informs the data transfer end to the B bus request interface with a Done signal. In case of a retry or a bus error, the B bus master sequencer informs with a retry signal or an Error signal. The B bus master request interface informs the transfer end, retry or bus error to the DMA controller with [bc]MDone(N) signal (either b or c will hereinafter be represented as [bc]), a [bc]MRtry (N) signal or a [bc]MBErr signal respectively.

The DMA controller updates a transfer address, a transfer length and so on with signals bReadFifo and bWriteFifo, and starts a next action with a bMDone (N) signal or a bMRtry (N) signal which indicates a DMA B bus transfer end. A cMDone (N) signal which indicates readend of the chain table updates an internal chain table and issues a transfer request once again with the cMRtry(N) signal.

In case of a [bc]MBErr(N) signal, the DMA controller intercepts the transfer and generates an interrupt if it is not masked.

(Retry in Burst Mode)

When the slave responds by asserting the signal bRdy_L and the signal bBurstAck_L at the same time without asserting the signal bretry_L to simultaneous assertion of the signal bStart_L and the signal bBurst_L, the slave is judged as ready for a burst transfer. During the burst transfer, the signal bRetry_L is not checked. In other words, the signal bRetry_L is checked only at a timing of a first bRdy_L. Even during the burst transfer, the signal bError_L is checked at every clock.

(Simultaneous Assertion of Signals bError_L, bRetry_L and bRdy_L)

Assertion of the signal bError_L is regarded as a bus error even when the signal bRetry_L is asserted. Negation of the signal bError_L and assertion of the signal bRetry_L is regarded as a retryevenwhen the signal bRdy_L is asserted.

(Signal byteEn_L[3:0] in Master Mode)

In the master mode, the signal byteEn_L[3:0] is always set at "0000" except for last transfer for the single access or the burst access.

[B Bus Slave Operation (Except Operation for Register Access)]

1. Transfer request from master

The B bus master sequencer confirms the bAddr and bWr_L signals (channel 0 or 1) at a timing of assertion of the bStart_signal. When a bSEnable(N) signal is asserted (slave mode: set by a register) for access to the GBI, the B bus master sequencer judges whether or not transfer is possible from a bBurstShortNotLong signal (only when the bBurst_L signal is asserted) and a ReadFifoEnable1/4/8 signal (channel 0) or a WriteFifoEnable1/4/8 signal (channel 1). When transfer is possible, the B bus master sequencer asserts the bRdyOut_L signal (and the bBusrtAckOut_L signal in the burst mode) or otherwise, it asserts the bRetryOut_L signal.

When the burst transfer is impossible due to a Fifo state but the single transfer is possible in correspondence to the burst mode request (assertion of the bBurst_L signal) from the master, only the bRdyOut_L signal is asserted and the single transfer is executed. When the burst mode request from the master generates a lap around, the GBI does not correspond the lap around and the single transfer is executed if possible (the bBurstAckOut_L signal is not asserted).

2. B bus data transfer

As long as transfer is possible, the B bus master sequencer asserts the bRdyOut_L signal continuously for a required number of clocks. In case of the burst transfer, it asserts the bBurstAckOut_L signal for a B bus clock at a timing of assertion of a first bRdyout_L signal. The B bus master sequencer informs a data transfer start and a data transfer end to the B bus data controller with a BSDataRq(N) signal and a bMLastData signal respectively. The B bus data controller transfers data from the B bus to the Fifo or from the Fifo to the B bus.

3. B bus data transfer end

No signal is prepared in particular to indicate a transfer end. Either, the bErrorOut_L signal is not asserted. When the bSEnable(N) signal is negated, however, the B bus master sequencer does not respond to access and a bus error is generated due to time-out.

([B Bus Slave Operation (Register Access)]

Accesses to the GBI and registers in the functional blocks are made from the B bus. An access to the register can be made at any time regardless of a mode or a status of the GBI. It is unnecessary to assert the bRetryOut_L signal or the bErrorOut_L signal. The B bus slave sequencer always responds with the single transfer to a request of the burst mode request from a master (does not assert the bBurstAckOut_L signal).

The register controller 9206 senses the regstart_L, regAddr[31:2], byteEnIn[3:0] and regwr_L signals (B bus signals tapped by the B bus clock), writes data of the bDataIn[31:0] signal when data is to be written into a register and asserts an Ack signal (regGbiAck_L in the GBI or regIfAck_L in the IF bus). When data is to be read out from a register, the B bus slave sequencer set data in an internal bus (regGbiDataOut[31:0] in the GBI or regIfDataOut[31:0] in the IF bus) and asserts an Ack signal (regGbiAck_L in the GBI or regIfAck_L in the IF bus).

The Bbus slave sequencer generates bRdyOut_L from the Ack signal with a B bus slave generate ready block. (Cycles of B Bus For Operation Other than Access to GBI Register)

In the slave mode of the GBI, a cycle for the single transfer is always 3B bus clock. The burst transfer asserts a first bRdyOut_L signal at a timing which is the same as that for the single transfer and keeps it asserted for a required number of clocks without negating the signal. When transfer (single transfer and burst transfer) is impossible, it asserts only bRetryOut_L at a timing to assert the first bRdyout_L. (B bus Slave Generate Ready Block)

The B bus slave generate ready block ORs and taps with clocks a ChannelRdy_L signal from the B bus slave sequencer, a regGbiAck_L signal from the GBI register unit and a regIfAck_L signal from the functional block (IF bus).

<IF Bus Interface>

An IF bus is a simple bus which connects the GBI to the functional block. It uses a clock of bClk (50 MHz). An input signal means herein a signal sent in a direction from the functional block to the GBI. No two-way signal is used. IF bus signals will be described below. A suffix "L" of a signal name represents low active. This suffix is used commonly to the signal names which have already been described above. In practical implementation "_if" in the signal names is to be replaced with a name of a functional block.

ifRst0_L (channel 0) or ifRst1_L (channel 1) (output)

This is an IF bus reset signal. This signal returns the IF bus to its initial state. The signal is asserted by an internal register of the GBI. It is always asserted prior to data transfer between the GBI and the functional block.

ifDataOutB[63:0] (input: channel 0 only)

This is a data signal from the functional block to the GBI. This signal is connected to the Fifo unit 0 (see FIG. 93).

ifWriteB (input: channel 0 only)

This is a write signal from the functional block to the GBI. The GBI writes ifDataOut[63:0] at rise of ifClk for which the ifWrite signal is asserted. Data can be written in a 1 clock unit when ifWrireB signal is asserted continuously. This signal is connected to the Fifo unit 0 (see FIG. 93).

ifWriteEnableG (output: channel 0 only)

This is a write grant signal from the functional block to the GBI. The ifWriteEnableG signal which is asserted at rise of ifClk indicates that write is possible at rise of a next clock. An ifWriteB signal is asserted by confirming the ifWriteEnableG signal. This signal is output from the Fifo unit 0.

ifDataInG[63:0] or ifByteEnG[7:0] (output: channel 1 only) This signal is a data signal or a byte enable signal from the GBI to the functional block. This signal is connected to the Fifo unit 1. Correspondence between each digit of the ifByteEnG[7:0] signal and each byte unit of the ifDataInG[63:0] signal is listed in Table 8:

TABLE 8

| ifByteEn | 7 | 6 | 5 | 4 | 3 | 2 | 1 | 0 |
|---|---|---|---|---|---|---|---|---|
| ifDataIn | 63:56 | 55:48 | 47:40 | 39:32 | 31:24 | 23:16 | 15:8 | 7:0 | ifRead (input: channel 1 only)

This is a read signal from the GBI to the functional block. The GBI outputs ifDataInG[63:0], and ifByteEnG[7:0] at rise of ifClk for which the ifRead signal is asserted. Continuous assertion of the ifRead signal makes it possible to read data in the 1 clock unit. This signal is connected to the Fifo unit 1.

ifReadEnableG (output: channel 1 only)

This is a read grant signal from the GBI to the functional block. The ifReadEnableG signal which is asserted at rise of ifClk indicates that read is possible at rise of a next clock. The ifRead signal is asserted by confirming the ifReadEnableG signal. This signal is output from the Fifo unit 1.

ifRegStart_L (common to channels) (output)

This is the signal which tapped bStart_L of the B bus with a clock. It is asserted for a clock together with the ifRegAddr[31:2] signal, ifRegRdNotWr signal and ifByteEn_L[3:0] signal. For write into an internal register of the functional block, the signal ifRegDataIn[31:0] is also validated. The functional block checks an address upon assertion of ifRegStart_L and responds with the ifRegAck_L signal when an access is made to an internal register of the functional block. Otherwise, it waits for assertion of next ifRegStart_L. This signal is output from the B bus controller.

ifRegAddr[31:2] (common to channels) (output) This is the address signal which tapped bAddr[31:2] of the B bus with a clock. It is validated upon assertion of the signal ifRegStart_L and is kept valid during response with the ifRegAck_L signal when an access is made to an internal register of the functional block. This signal is output from the B bus controller.

ifRegByteEn[3:0] (common to channels) (output)

This is the byte enable signal which tapped byteEn_L of the B bus with a clock. This signal is validated upon assertion of the signal ifRegStart_L and is kept valid during response with the ifRegAck_L signal when an access is made to an internal register of the functional block. In case of write into the internal register of the functional block, only an effective byte which is indicated by this signal is written. In case of read from the internal register of the functional block, this signal is ignored and all bytes are output. This signal is output from the B bus controller. Table 9 lists correspondence between each digit of the signal ifRegByteEn[3:0] and each byte unit of the signal ifRegDataInG[31:0]:

TABLE 9

| ifRegByteEn | 3 | 2 | 1 | 0 |
|---|---|---|---|---|
| ifRegDataIn | 31:24 | 23:16 | 15:8 | 7:0 | ifRegRdNotWr (common to channels) (output)

This is the signal which tapped bWr_L of the B bus with a clock and indicates a direction access to an internal register of the functional block. When it is high, contents of the internal register of the functional block are output to the signal ifReqDataOut [31:0] and when the signal is low, data of the ifReqDataIn[31:0] is written into the internal register of the functional block. The signal becomes valid upon assertion of the signal ifRegStart_L and is kept valid till response with the ifRegAck_L signal when an access is made to the internal register of the functional block. This signal is output from the B bus controller.

ifRegAck_L (common to channels) (output)

This is a signal which indicates a functional block has completed an access to the internal register. An address is checked upon assertion of the signal ifRegStart_L and when an access is made to the internal register of the functional block, this signal is always asserted for a clock after reading or writing data into or from a register. This signal must not be asserted when an access is made to a member other than the internal register of the functional block. This signal is connected to the B bus controller.

ifRegDataOut[31:0] (common to channels) (input)

This is a data bus signal to read out contents of the internal register of the functional block. This signal must be valid when the signal ifRegAck_L signal is asserted. The signal is connected to the B bus controller.

ifRegDataIn[31:0] (common to channels) (output)

This is a bus signal which indicates data to be written into the internal register of the functional block. This signal is validated upon assertion of the signal ifRegStart_L and is kept valid during response with the ifRegAck_L signal when an access is made to the internal register of the functional block. This signal is output from the B bus controller.

IfDmaPmState[1:0] (common to channels) (output)

A signal indicating an operating state of the GBI. This output is always valid. The functional block generates a power management status signal to the power management unit on the basis of this signal and an operating state of the functional block itself. This signal is output from the register unit. A value to be output will be described later in a section of a power management.

<DMA Controller>

Figure 96:
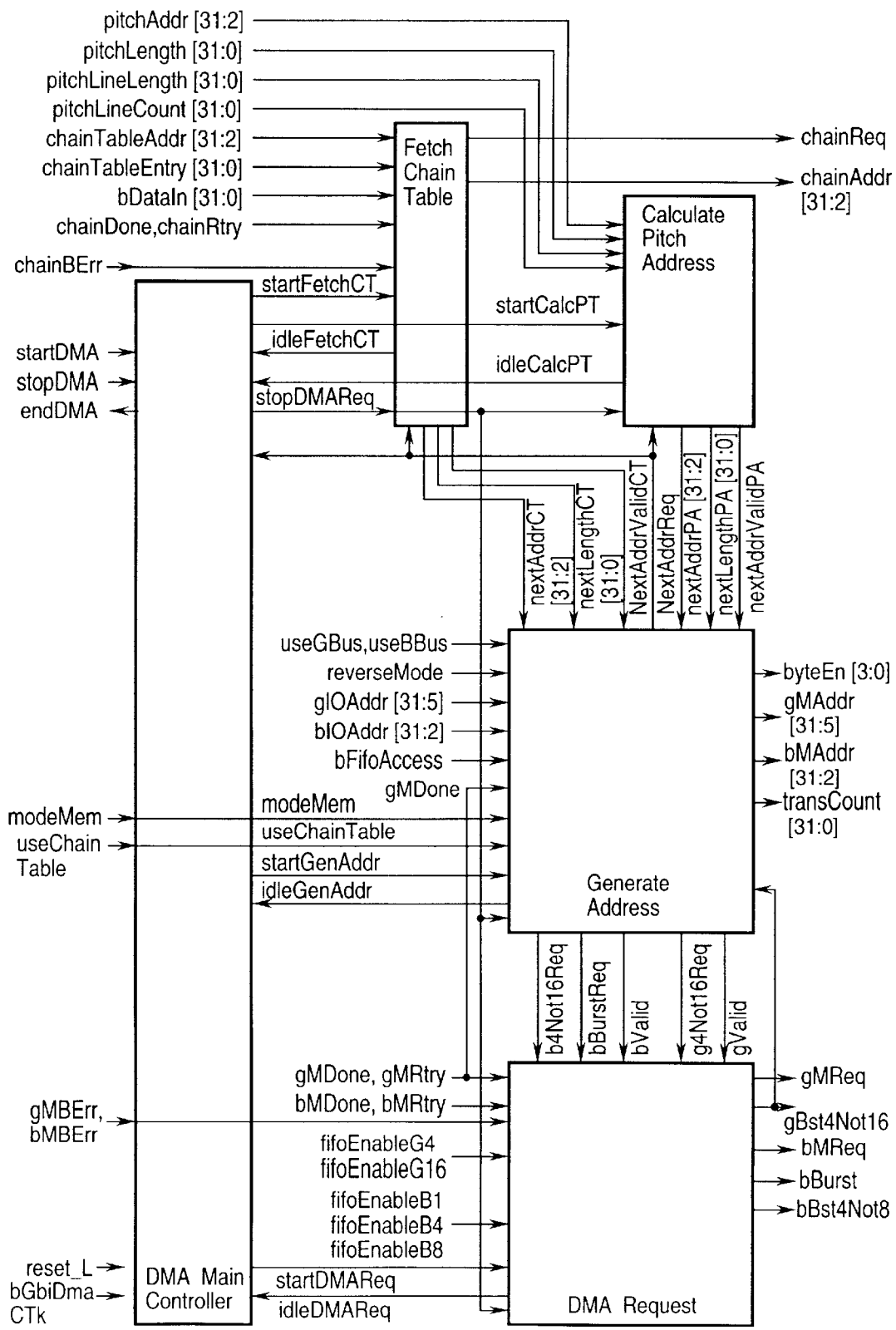
FIG. 96 is a block diagram of a DMA controller.

The GBI uses DMA controllers 9205 shown in FIG. 96 in channels 0 and 1 respectively.

The DMA controller consists of a DMA main controller block, a fetch chain table block, a calculate pitch address block, a generate address block and a DMA request block.

From the register unit 9206, a DMA mode is informed with a signal shown in Table 10.

TABLE 10

| Mode signal | modeMem | UseChain Table | Reverse Mode |
|---|---|---|---|
| Chain table DMA | 1 | 1 | 0 |
| Chain table DMA (Reverse direction) | | 1 | |
| Continuous address DMA | 1 | 0 | 0 |
| Continuous address DMA (Reverse direction) | | | 1 |
| To I/O DMA | 0 | 0 | always 0 |

Now, description will be made of each blocks of the DMA controller.

[DMA Main Controller]

The DMA main controller controls starts and stops of the other four blocks. A chain table type DMA starts the fetch chain table block, the generate address block and the DMA request block in this order at intervals of 1 clock. A DMA with a pitch starts the calculate pitch address block, the generate address block and the DMA request block in this order at intervals of 1 clock. Another type of DMA starts the generate address block and the DMA request block at an interval of 1 clock.

Furthermore, the DMA main controller judges a DMA end. The DMA main controller asserts a stopDMAReq signal for each block when it detects assertion of a NextAddreReq signal for the generate address block (a length counter is zeroed), a bus error or assertion of a stopDMA signal (forcible DMA end by a register) in an idle state of the fetch chain table block (the block has read all contents of the chain table or is not started) and in an idle state of the calculate pitch address block (the block has completed all lines or is not started). The DMA main controller judges the DMA end (asserts endDma) when all the blocks are set in idle states.

[Fetch Chain Table]

The fetch chain table block fetches tables in memories and is not started when a chain table is not used. The fetch chain table block consists of a chain table pointer address counter which designates a chain table for memory address, a chain table entry counter which indicates a number of rest entries in the chain table, a next address register which stores an address and a length fetched from the chain table, a next length register and a fetch chain table controller which controls the counters and the registers mentioned above.

When the fetch chain table is started from the DMA main controller, contents of the registers are loaded into the chain table pointer address counter and the chain table entry counter. The fetch chain table request fetch of an address of chainAddress[31:2] to the B bus controller with a chainReq signal. With a chainDone signal (normal end) from the B bus controller, read contents are latched to a next address register to increase the chain table pointer address counter. When a ChainRtry (retry) signal is returned from the B bus controller, the fetch chain table issues the same request to the B bus controller once again.

After the next address register is latched, the fetch chain table requests fetch of an address of the chainAddress[31:2] to the B bus controller. With the chainDone signal, the read contents are latched to a next length address to increase the chain table pointer address counter and decrease the chain table entry counter. Simultaneously, the fetch chain table asserts a nextAddrValid signal and informs to the generate address block that an address and a length have been read from the chain table.

If data is zero when the next length register is latched, contents of the next address register are loaded into the chain table pointer address counter.

When a NextAddrReq signal is asserted from the generate address block during assertion of the nextAddrValid signal, the fetch chain table judges that the generate address block has received the address and the length from the chain table, and negates the nextAddrValid signal.

Then, the fetch chain table checks the chain table entry counter and continues the fetch of chain table once again when the counter is not zero or returns to an idle state when the counter is zero.

Upon receiving a chainBErr signal (bus error), the fetch chain table returns immediately to the idle state. When the fetch chain table receives stopDMAReq from the DMA main controller, the fetch chain table returns to the idle state after an end of a request if it issues a request to the B bus main controller or otherwise, it immediately returns to the idle state.

In a mode where the chain table is not used, the fetch chain table is not started or is kept in the idle state and the nextAddrValid signal is kept negated.

[Generate Address]

The generate address block comprises a transfer memory address counter to store. a transfer address to a memory, a transfer length counter to store a transfer length to be transferred, a transfer counter to store a byte which has been transferred, a generate address controller to control these three counters, and a CheckGBusReq block and a CheckBBusReq block (referred to collectively as a CheckG/BBusReq) which judge a mode to be requested to the GBus/Bus from a transfer address and a transfer length.

(When Chain Table is Used)

When the chain table is started from the DMA main controller, it clears the transfer counter and waits for a nextValidAddrCT signal from the fetch chain table. When the nextValidAddrCT signal is asserted, an address and a length of the chain table are loaded into the transfer memory address counter and the transfer length counter respectively.

The CheckG/BBusReq judges a mode selectable for transfer from contents of the two counters.

The CheckG/BBusReq informs a transfer mode of the G/BBus to the DMA request block (a g/b Valid signal is negated when transfer is impossible) and the DMA request block issues a transfer request to each bus controller while giving a priority to the G bus.

In case of transfer thorough the G bus, the transfer memory address counter and the transfer counter are increased and transfer length counter is decreased at a time by a gMDone signal (transfer end signal through G bus) and a selected transfer mode. At a stage of transfer through the B bus, the transfer memory address counter is increased and the transfer length counter is decreased.

When the transfer length counter is zeroed, contents of a next chain table are loaded into the transfer memory address counter and the transfer length counter upon assertion of the nextValidAddrCT signal from the fetch chain table if this signal is negated, or otherwise, the contents are immediately loaded. Then, the generate address block starts a next transfer.

When the transfer length counter is zeroed upon completing transfer of a final portion of the chain table, the fetch chain table is in an idle state and the nextValidAddrCT signal is negated. Since the DMA main controller detects an end of the DMA, it asserts the stopDMAReq signal for the generate address block. The generate address block is set in the idle state accordingly.

(When DMA With Pitch is Used)

When the generate address block is started from the DMA main controller, it clears the transfer counter and waits for a nextValidAddrPA signal from a calculate pitch address. When the nextValidAddrPA signal is asserted, an address and a length calculated from a start address and a pitch are loaded into the transfer memory address counter and the transfer length counter respectively.

As in the mode where the chain table is used, the transfer memory address counter and the transfer counter are increased and the transfer length counter is decreased.

When the transfer length counter is zeroed, contents of a next table are loaded into the transfer memory address counter and the transfer length counter after assertion of the nextValidAddrPA signal from the calculate pitch address if the signal is negated, or otherwise, the contents are loaded immediately. Then, the generate address block starts a next transfer.

When the transfer length counter is zeroed upon completing a transfer of a final line, the calculate pitch address is in an idle state and the nextValidAddrPA signal is negated. Since the DMA main controller detects an end of the DMA, it asserts the stopDMAReq signal for the generate address block. The generate address block is set in the idle state accordingly.

(Operation of DMA to I/O)

When the generate address block is started from the DMA main controller, the transfer counter is cleared and contents of a GBIDMA transfer length register which stores a data length are loaded into the transfer length counter. The CheckGBusReq block and the CheckBBusReq block use contents of GBIDMAGBus I/O address register and GBIDMABBus I/O register respectively.

The transfer counter is increased and the transfer length counter is decreased as described above.

When the transfer length counter is zeroed, the fetch chain table and the calculate pitch address which were not started are in idle states, and the nextValidAddr signal is negated. Since the DMA main controller detects an end of the DMA, it asserts the stopDMAReq signal for the generate address block. The generate address block is set in an idle state accordingly.

(Reverse Mode)

The generate address block supports a reverse mode when it does not operate for DMA to I/O. It makes accesses to a block of the chain table DMA and a line of the DMA with pitch in order from higher to lower addresses. To designate each block and each line in a reverse direction, chain tables are prepared in the reverse direction in the chain table DMA. In case of the DMA with pitch, a value of the pitch is set a negative value (a complementary number of 2).

In the reverse mode, a final address is calculated using a transfer length to load a value into the transfer memory address counter. The transfer memory address counter is not increased but decreased.

The CheckBBusReq block requests the single transfer only. The CheckGBusReq block requests the 4-beat burst transfer only. Data is set in a reverse sequence in a 32-bit unit by the Fifo unit and sent to the functional block (responding only to the channel 1 in present conditions).

(Check of GBus Request)

The CheckGBusReq block checks the GBus request. The signal gValid is always negated unless a signal useGBus is active.

When bit 6 and lower bits of the transfer memory address have a value of 0 and a transfer length is 128 or longer, the signal gVlaid is asserted and g4Not16Req ='0', or when bit 4 and lower bits of the transfer memory address have a value of 0 and a transfer length is 32 or longer, the signal gvalid is asserted and g4Not16Req '1'. The signal gvalid is negated in other cases.

(Check of BBus Request)

The CheckBBusReq block checks the BBus request. The signal bValid is always negated unless the signal useBBus is active.

When bit 4 and the lower bits of the transfer memory address have a value of 0 and a transfer length is 29 or longer, the signal bValid is asserted, bBurstReq ='1' and b4Not8Req='0', or when bit 3 and lower bits of the transfer memory address have a value of 0 and the transfer length is 13 or longer, the signal bValid is asserted, the signal bBurstReq='1' and the signal b4Not8Req='1'. In other cases, bValid is asserted and bBurstReq='0'.

(DMA Request)

When the generate address block is started from the DMA main controller, the DMA request block checks a request for the G bus/B bus from the generate address block. When the generate address block issues requests for both the G bus and the B bus, the G bus is used preferentially. According to this request, the DMA request block issues a transfer request to the G bus controller or the B bus controller and waits for a response. The response is a signal of g/bMDone, g/bMRtry or g/bMBErr.

In case of g/bMDone which indicates a normal transfer end, the DMA request block checks a next GBus/BBus request from the generate address block.

In case of g/bMRtry, the generate address block issues a transfer request once again to the same bus controller.

In case of g/bMBErr, the generate address block immediately returns to the idle state.

When a final transfer completes, the DMA request block is set in a state to wait for a GBus/BBus request from the generate address block. Since the DMA main controller detects an end of the DMA and issues stopDMAReq signal in response to a DMA request, DMARequest is returned to an idle state by this signal.

In case of a bus error at a time of the chain table fetch or a forcible end of the DMA by a register, the DMA main controller also issues the stopDMAReq signal and the DMARequest returns to the idle state after completion of transfer when a transfer request is issued to the bus controller, or otherwise, the DMARequest returns to the idle state immediately.

<Register Unit>

Figure 97:
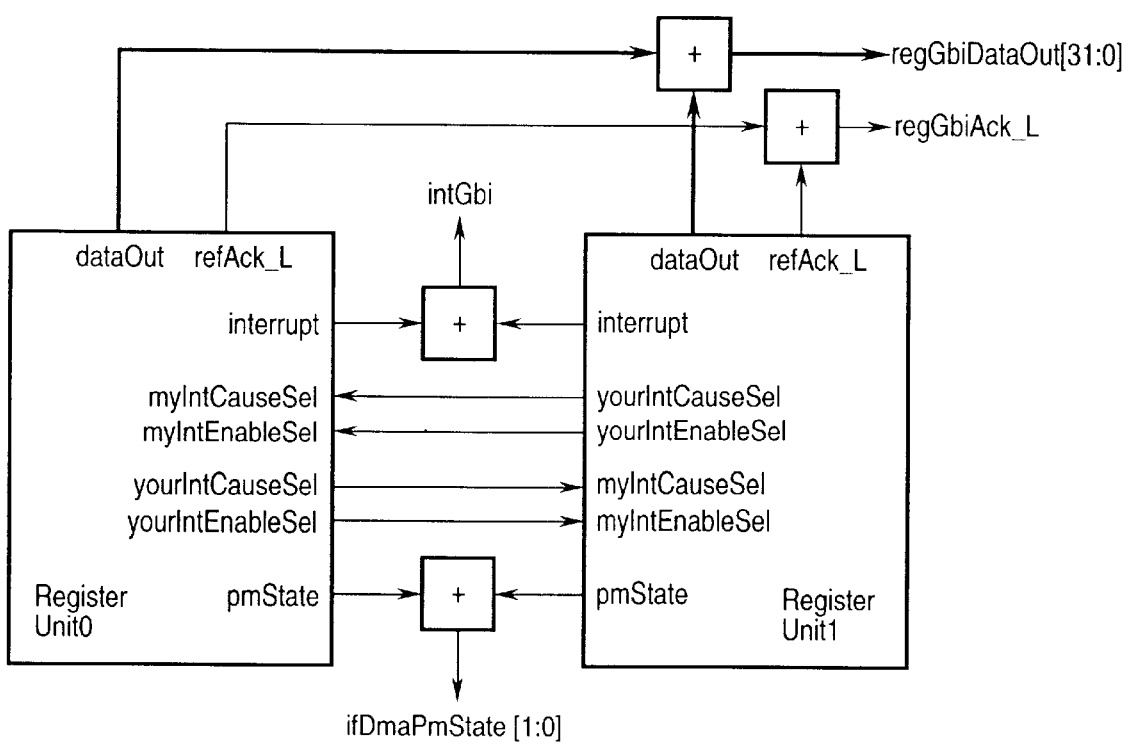
FIG. 97 is a block diagram of a register unit.

Register units corresponding to individual channels exist in the internal register. These register units are the same, except for addresses to be decoded. The register unit comprises a register unit 0 and a register unit 1 as shown in FIG. 97.

Each register unit is composed of a register I/F block, an action controller block, an interrupt controller block and a power status block. The register unit supplies a set point value to each block of the GBI and controls not only an interrupt with an interrupt controller but also blocks which can operate in a power saving mode with a power status block.

[Power status]

Units of the GBI which can operate in the power saving mode are the DMA controller and the FIFO unit. The power saving mode is realized by masking a clock of each block with a fifoInSleep signal and a dmaInSleep signal. Both the units are set in the power saving mode when they are reset. The DMA controller automatically starts when initiated in the master mode and enters into sleep with write of a GBIFIFO sleep register.

Power management status signals (pmState[1:0]) which are output from the power status block to the channels are:
pmState[1:0]00 leve10 (both DMA and FIFO stopped)
   01 level1 (only FIFO operates)
   10 level2 (both DMA and FIFO operate)
   11 NotDefine The power management signals are prepared as listed above for the GBI of the DoEngine which is connected to the scanner controller (Scc) and the printer controller (Prc) has only the channel 1, but when it includes two channels, the signals are degenerated to 4 stages as shown below: pmState [1:0]00 leve10 (both DMA and FIFO stopped) pmState[1:0] 00 leve10 (both FIFO and DMA stopped in both channels)
   01 level1 (FIFO operates only in channel 1)
   10 level2 (FIFOs operate in both channels but DMAs stopped in both channels)
   11 level3 (FIFOs operate in both channels and a DMA operates)

The power management status signal (pmstate[1:0]) is sent to the functional block by way of the IF bus. On the basis of this signal and an operating status of the functional block itself, the functional block generates a power management status signal to the power management unit.

<Operation Modes of GBI>

Description has been made above of the blocks which compose the GBI. Operations of the GBI will be summarized below. Operation modes of the GBI are roughly classified as follows:
1. Slave mode
2. Master mode In the master mode, the GBI operates in DMA modes which are listed below:
A. DMA-to-memory
B. DMA-to-I/O (fixed address)

In the DMA-to-memory mode, the GBI transfers data to:
a. Continuous physical addresses
b. Discontinuous physical addresses (assumed that a transfer destination memory is divided in a memory management page unit).

In the DMA-to-memory mode, the GBI supports also the reverse mode (channel 1 only).

The DMA to the continuous physical addresses is the so-called two-dimensional DMA in which a head address, a length of a line, a pitch to a next line and a number of lines are designated. A one-dimensional DMA can be realized by setting the number of lines at 1.

Figure 98:
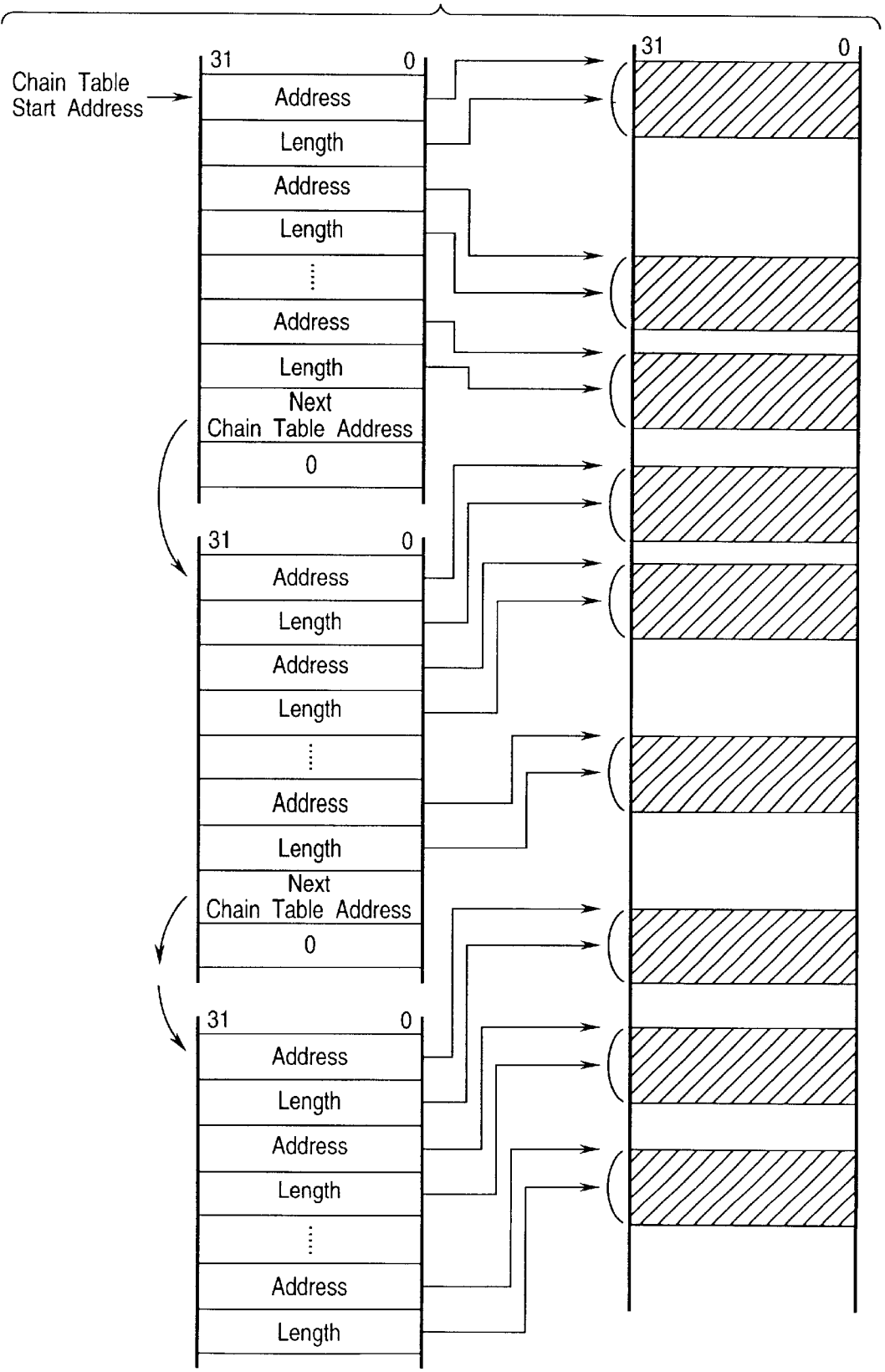
FIG. 98 is a diagram showing an example of configuration of a chain table.

In the DMA to the discontinuous physical addresses, a head address and a length of each divided memory block are disposed in a memory, and an address of a transfer destination is calculated while referring to the head address and the length to execute the DMA. A pair of the head address and the length will hereinafter be referred to as a chain table. FIG. 98 exemplifies a chain table. In the DMA to the discontinuous physical addresses a memory address in which the chain table is disposed and a number of address-length pairs are designated. Though the chain table itself must be arranged at continuous addresses needless to say, it is possible to connect chain tables by setting a length of 0 for an address of a next chain table in place of a head address when all chain tables cannot be arranged at continuous areas.

In the reverse mode, accesses are made to a block of a chain table DMA and a line of a two-dimensional DMA in a higher to lower address sequence. To designate a block or a line as a unit in the reverse direction for the chain table DMA, a chain table is prepared in the reverse direction. For the DMA with pitch, a pitch value is set as a negative value (a complementary number of 2).

<Interrupt Control>

Now, description will be made of interrupt control. An interrupt from the GBI occurs in conditions which are listed below:

[Master Mode]:
   1. Normal DMA end
   2. Bus error detected during DMA transfer through G bus
   3. Bus error detected during DMA transfer though B bus
   4. Bus error detected during read of chain table in the chain DMA mode In case of the forcible end by the GBI stop register, the DMA is ended normally when transfer requested by the DMA controller to a bus controller terminates normally. When requested transfer causes a bus error, the DMA is ended abnormally due to the bus error.

In the channel 0, the DMA is ended (an interrupt occurs) when the functional block has written all data into the FIFO in the GBI but data remains in the FIFO. Since the DMA is ended when FIFO data is transferred, the GBI judges the transfer of the FIFO data as an end of the DMA.

In the channel 1, the GBI ends the DMA (causes an interrupt) when all data has been written into the FIFO but data remains in the FIFO. Since the functional block is ended when the FIFO data is transferred, the GBI judges the transfer of the FIFO data as an end.

[Slave Mode]
   5. FIFO illegal access

Data is transferred between the functional block and a master which are connected to the GBI by way of the FIFO of the GBI.

When both the G bus and the B bus are used (in the DoEngine, the GBI is a unique master which is capable of using both the G bus and the B bus) and both the buses issue access request simultaneously, there is no available method to know which of the buses will make access first to the FIFO. The master must issue an exclusive transfer request to the Gbus/B bus. (The GBI issues an exclusive transfer request in the master mode.) If both the G bus and B bus make accesses to the FIFO simultaneously, a FIFO illegal access occurs.

An interrupt is caused when any one of the conditions 1 through 5 mentioned above occurs and the interrupt grant bit is set at "1."

<Core Interface>

Figure 99:
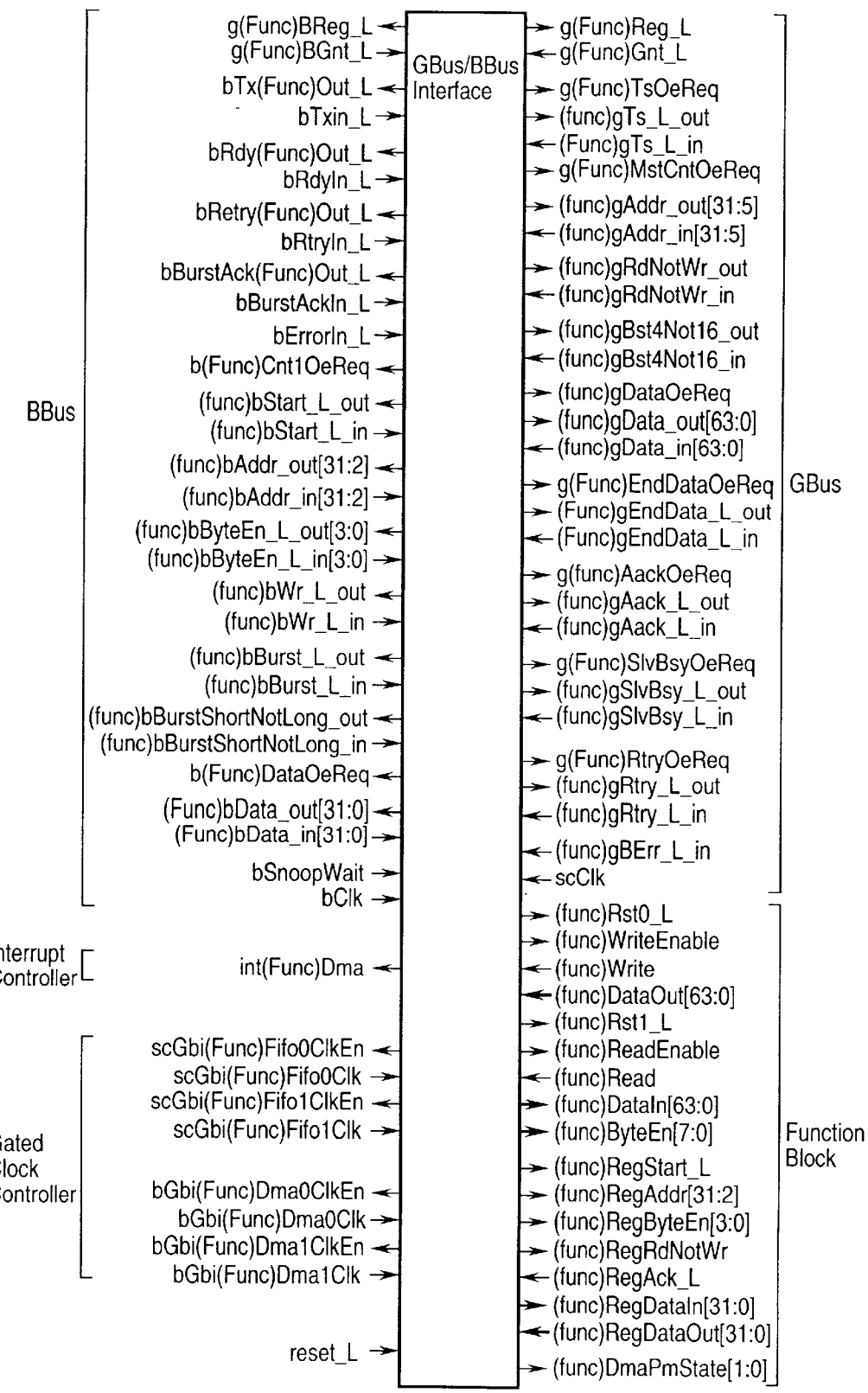
FIG. 99 is a diagram showing a core interface of the GBI.

FIG. 99 shows a diagram of a core interface which is composed of a combination of the interfaces between the GBI and the B bus/G bus/functional block. Since the GBI does not issue the bus error during the B bus slave operation, it is free from bError(Func)Out_L. Furthermore, the GBI does not check the bInstNotData signal during the B bus slave operation, it is free from (func) bInstNotData in and (func) bInstNotData_out always drive "0."

Furthermore, the GBI does not issue the bus error during the G bus slave operation, it is free from (func) gErr_L_out.

A functional block to be connected, that is, scc (scanner controller) or prc (printer controller) is set as Func (func) in the signal name of the GBI shown in FIG. 99.

The DoEngine uses the scanner controller Scc (scc) and the printer controller Prc (prc) as functional blocks. Since data flow is not in two directions when either of the functional blocks is used, the DoEngine is implemented with unnecessary FIFOs, DMA controllers and registers omitted.

<Printer Controller Core Interface>

Figure 86:
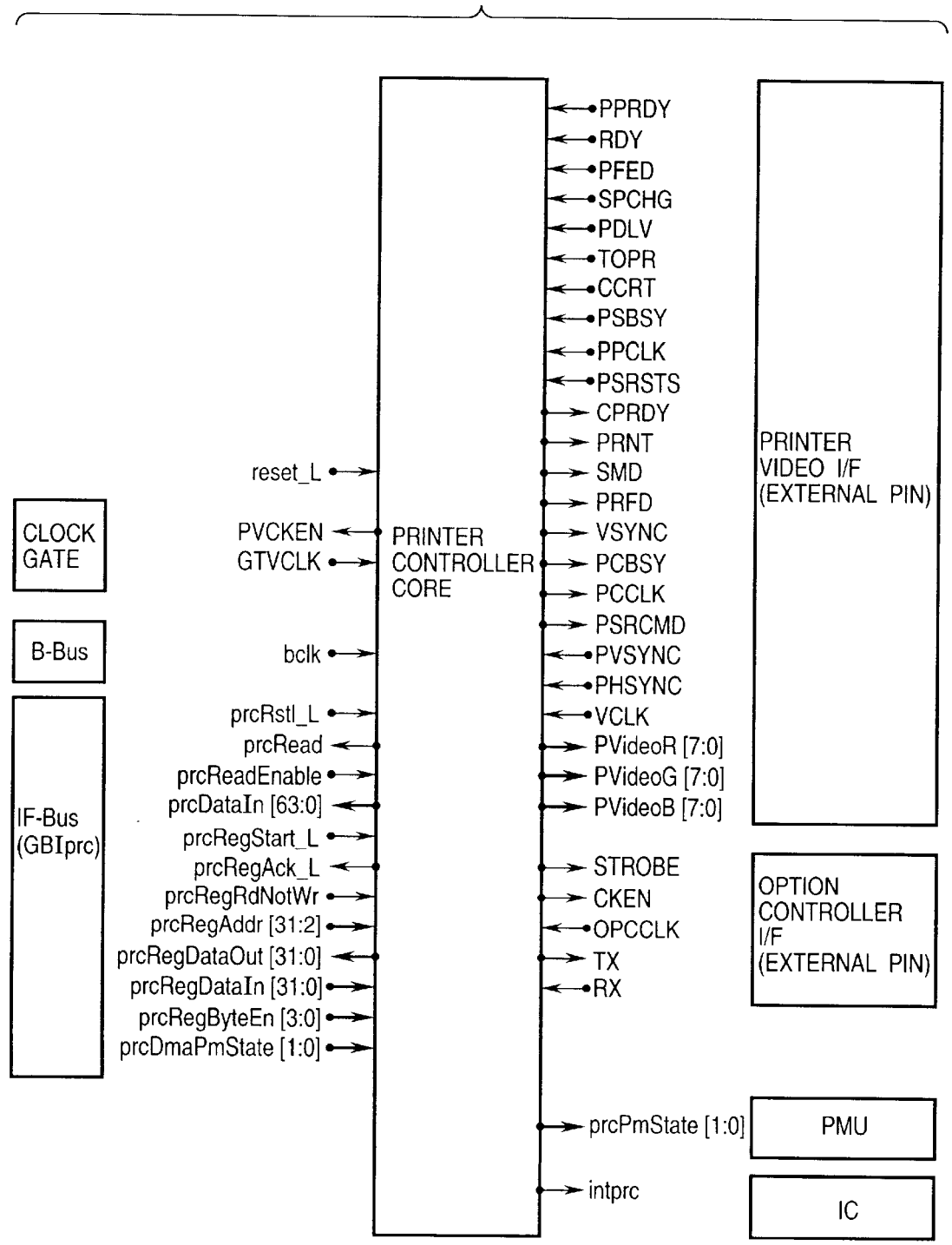
FIG. 86 is a diagram summarizing core areas including blocks in the printer controller 4303 and signals which are input and output into and from external buses and scanners.

FIG. 86 is a diagram showing a collection of signals which are input and output between cores including the blocks described above in the printer controller 4303 and external buses and scanners. As shown in FIG. 86, the printer controller 4303 is connected to the system bus bridge 402 by way of the G bus, to the IO device, power management device and system bus bridge by way of the B bus, to the printer controller by way of the PC bus and to the G bus/B bus I/F unit by way of the I/F bus.

2.10 Power Management Unit

Figure 87:
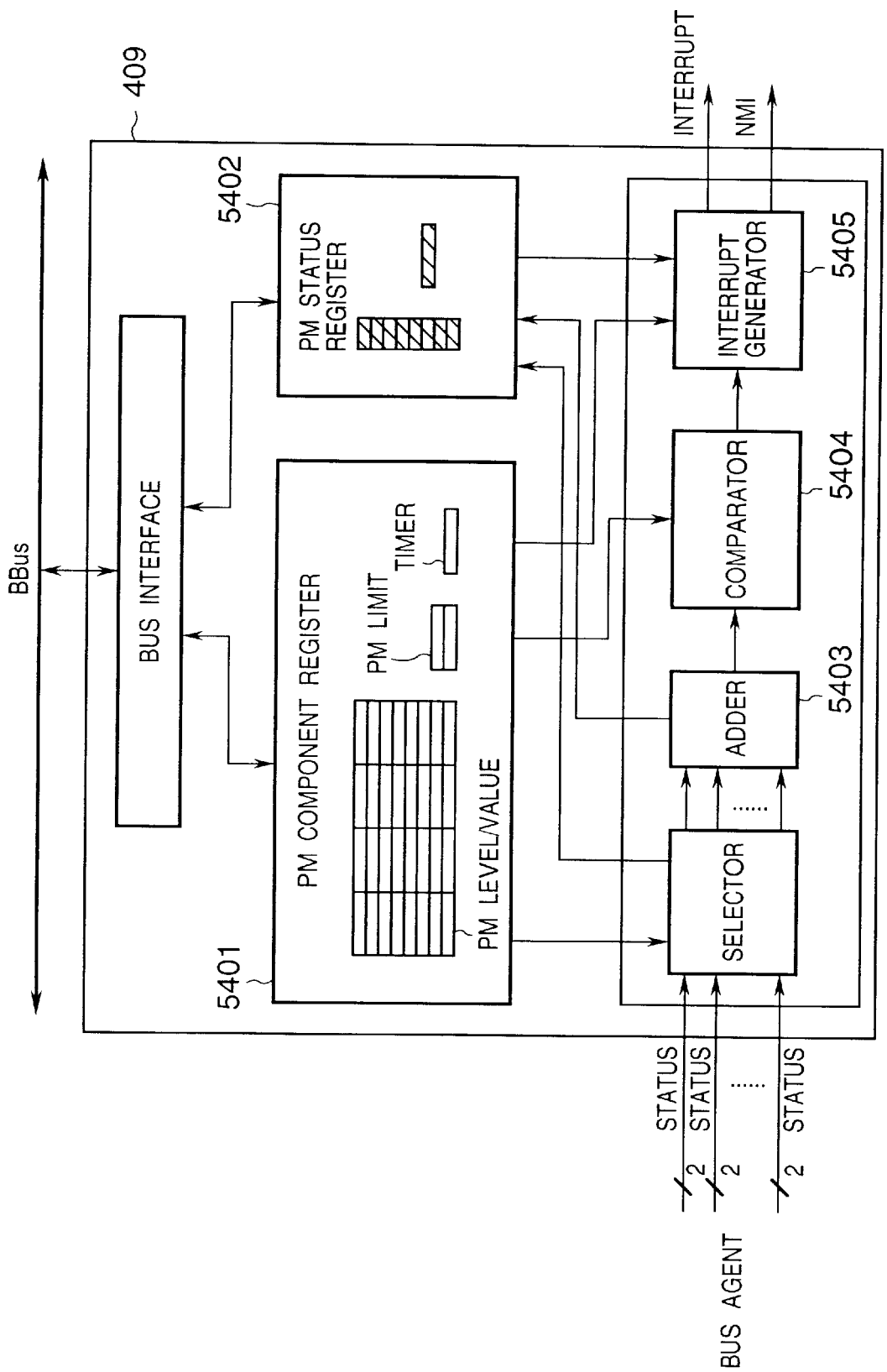
FIG. 87 is a block diagram of power management unit 409.

FIG. 87 shows a block diagram of the power management unit 409.

The DoEngine is a large-scale ASIC which comprises the CPU. It is therefore fearful that a large amount of heat is generated and the chip itself may be broken when all internal logic operate at the same time. In order to prevent such a trouble, the DoEngine manages electric power supplied to each block or perform power management and monitors an amount of electric power consumed by the chip as a whole.

The power management is performed independently by each block. Data of an amount of electric power consumed by each block is collected to the power management unit (PMU) 409 as a power management level. The PMU 409 totalizes amounts of electric power consumed by the blocks and monitors the amounts of electric power consumed by the blocks of the DoEngine so that a total value will not exceed a limit of electric power consumption.

<Operation>

The power management unit operates as described below:

Each block has power management levels at four steps.

The PMU has values of power consumptions at these levels as registers.

The level configuration and power consumption values are held in the PM component register 5401.

The PMU receives a power management level from each block as a 2-bit status signal (described later) and knows a power consumed by each block by verifying the value set in the register 5401.

The PMU adds powers consumed by the blocks with an adder 5403 and calculates an amount of electric power consumed by the DoEngine as a whole in real time.

A comparator 5404 compares a calculated amount of electric power with a limit value (PM limit) of consumed electric power set in the component register 5401 and an interrupt signal is issued from an interrupt generator 5405 when the calculated amount exceeds the limit value.

The limit value is settable in two steps. A first step is set at a level with a little margin from a true limit. When this limit value is exceeded, an ordinary interrupt signal is issued. The software receives this signal and prevents a block from being newly started. So far as the consumed amount is within a range where it does not attain to a second step, however, a new block can be started under management by the software. A limit value at the second step is set at a level at which a device may be broken. Should this value be exceeded, NMI (an interrupt which allows no interrupt mask to be set) is issued and the system is stopped for security.

The interrupt signal is released by reading a status register 5402 of the PMU. Upon reading the status register 5402, a timer starts counting and when the amount of consumed electric power does not return a normal level until the timer expires, the interrupt signal is issued once again. A value for the timer is set in the component register 5401 of the PMU.

<Power Management for Each Block>

Power management may be optionally configured independently for each block. Examples of power management configuration will be described below:

(CONFIGURATION EXAMPLE 1)

In this example, power management is carried out by turning on and off a clock to an internal logic and power consumption can be set at only two levels. One of these levels is sent as a status signal to the power management unit 409. FIG. 88 shows a block diagram of a bus agent.

A bus agent 5501 comprises an internal logic 5502 for each unit, a decoder 5503 which decodes an address, a clock control section 5504 and a clock gate 5505.

The decoder 5503 and the clock control section 5504 which are always operating monitor bus activity monitoring and perform gating of the clock into the internal logic as power management control.

<Clock Control>

The bus agent detects the bus activity and automatically turns on/off the clock.

The bus agent has three states of sleep, wake up and wait.

In the sleep state, the bus agent has no activity and the clock gate clock is stopped.

Even in the sleep state, the decoder 5503 and the clock control section 5504 are operating to monitor the bus and wait for a request.

When the decoder 5503 detects an address of itself, it operates the clock of the internal logic by opening the clock gate 5505 and responds to the bus request. The wake up state is entered. Furthermore, the decoder informs this state to the power management unit 409.

Upon completing data transfer, the wait state is entered and the bus agent waits for a next request. The clock is still operating in this state. When a request is issued, the bus agent returns to the wake up state and executes transfer. The timer counts while the bus agent is waiting for the request, and when the timer expires while no request is issued, the bus agent shifts to the sleep state and stops the clock. This state is also informed to the power management unit 409.

The power management unit 409 manages the consumed power so that it will not exceeds a predetermined value.

<Copying Operation>

The system which has the configuration described above is capable of transferring image data read from the scanner directly to the printer and carrying out a copying operation to form an image with the printer. The scanner/printer system which uses the DoEngine preferred as the embodiment is capable of selecting three kinds of copying mode dependently on system configurations which are described below:

(Mode 1)

A first mode is selectable by a system which has a configuration wherein vertical and horizontal timings for image input by the scanner are coincident with horizontal and vertical timings for image output from the printer respectively, and a transfer speed of video data is also coincident.

A vertical synchronous signal (VSYNC) is output from the printer and input into the printer controller (PRC). This VSYNC signal is input from the printer controller (PRC) to the scanner controller (SCC) by way of the CP bus. The signal is output from the scanner controller (SCC) to the scanner. The printer is vertically synchronized with the scanner accordingly. Also for horizontal synchronization a horizontal synchronous signal (HSYNC) signal is output, like the vertical synchronous signal VSYNC, from the printer and input into the scanner by way of the printer controller, CP-bus and the scanner controller. The scanner is horizontally synchronized with the printer accordingly. The scanner and the printer operate in synchronization in the vertical and horizontal directions as described above. The video data is output together with a synchronous video clock from the scanner. The output video clock and video data are input into the scanner controller (SCC) and then input into the printer controller (PRC) by way of the CP bus. The clock and data are output from the printer (PRC) controller to the printer. The printer receives the video data in synchronization with the video clock and outputs an image.

Figure 89:
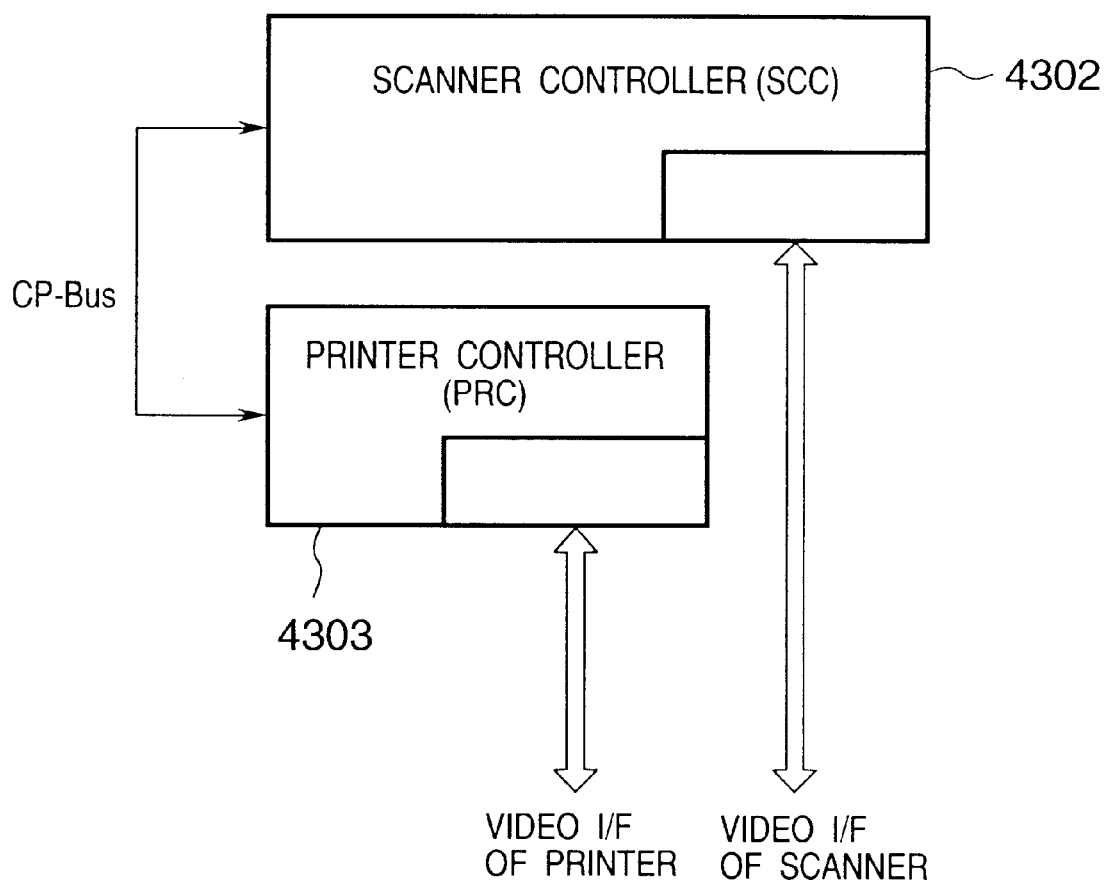
FIG. 89 is a diagram showing a block to be used in a copy mode in which an image is copied by transferring image data from the scanner controller directly to the printer controller.

This copying operation is carried out by a configuration shown in FIG. 89. This copying operation is carried out without using the G bus or the B bus.

Though the image data is transferred from the scanner directly to the printer by way of the CP bus during this copying operation, the image data can simultaneously be written into a SDRAM by the DMA transfer of the G bus from the scanner controller (SCC). The image data which is written into the SDRAM during the copying operation can be stored as image data as occasion demands. By outputting the image data from the SDRAM to the printer, the image data read by the scanner can be output to a plurality of members without operating the scanner.

(Mode 2)

A second mode is selectable by a system which has a configuration wherein a horizontal timing for image input by the scanner is coincident with a horizontal timing for image output from the printer but a vertical timing is not coincident with a video data transfer speed.

Figure 90:
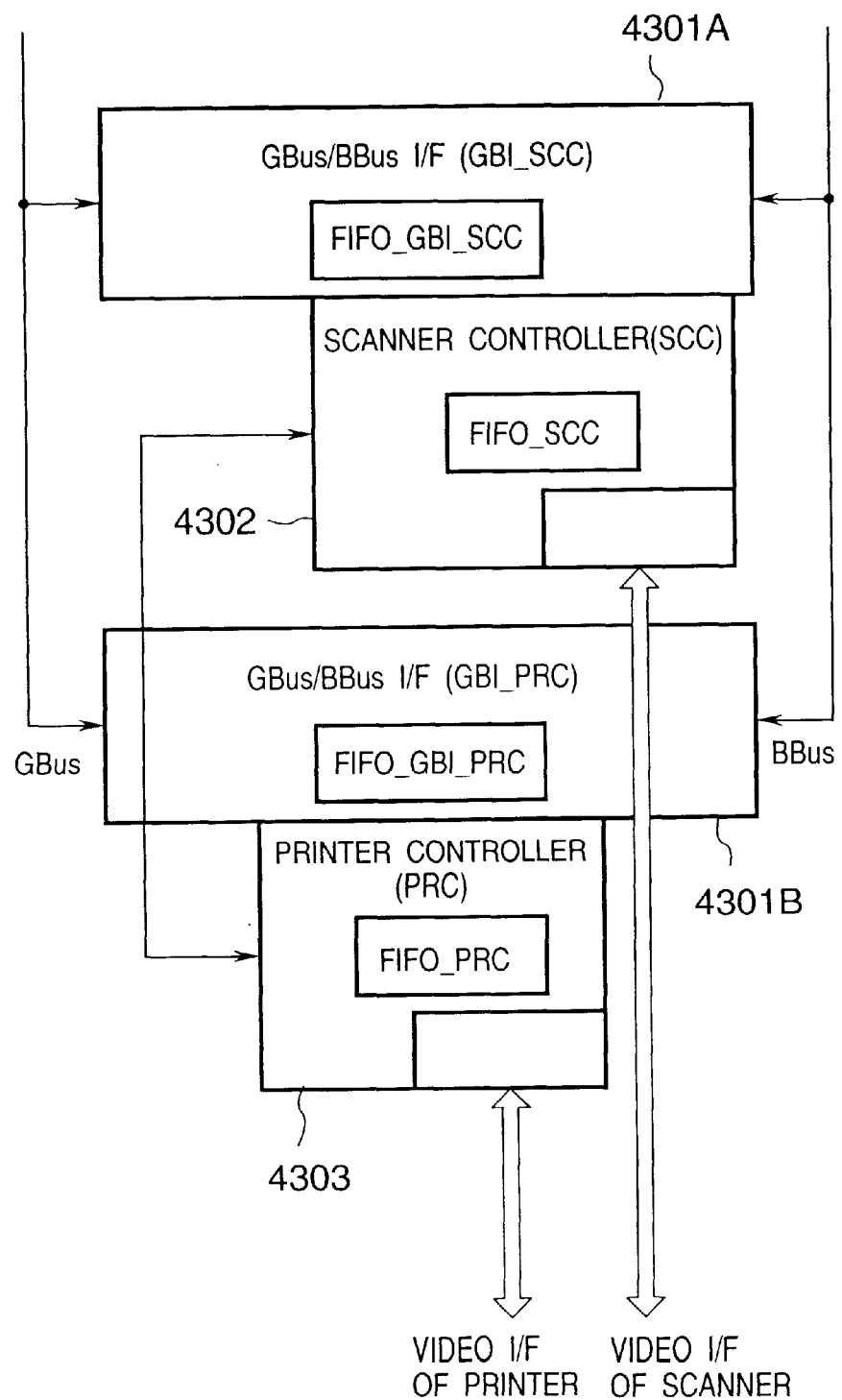
FIG. 90 is a diagram showing a block to be used in a copy mode in which an image is copied by transferring image data from the scanner controller to the printer controller by way of a FIFO.

A copying operation in this mode will be described with reference to FIG. 90. When the scanner starts reading an image, three timing signals of a vertical synchronous signal (VSYNC), a horizontal synchronous signal (HSYNC) and a video clock are input into the scanner controller (SCC). In synchronization with the video clock, video data is also input into the scanner controller (SCC). In synchronization with the timing signals mentioned above, the scanner controller (SCC) acquires the video data into an internal FIFO (FIFO_SCC). Simultaneously with image data entry into the FIFO_SCC, it starts data transfer to a FIFO (FIFO_GBI_SCC) of the G bus/B bus I/F unit 4301A (GBI_SCC) of the scanner. The image data is sequentially transferred from the scanner to the FIFO_GBI_SCC by way of the FIFO_SCC. Upon start of data entry into the FIFO_GBI_SCC, the DMA transfer is started using the G bus/B bus I/F unit 4301B (GBI_PRC) of the printer as a master and the G bus/B bus I/F unit 4301A (GBI_SCC) of the scanner as a slave. For this DMA transfer, the G bus is used when it is empty but the B bus may be used when the G bus is not empty.

By this DMA transfer, the image data of the FIFO_SCC is transferred to the FIFO (FIFO_GBI_PRC) in GBI_PRC. The image data of the FIFO_GBI_PRC is sequentially transferred to the FIFO (FIFO_PRC) of the printer controller (PRC). Upon image data entry into the FIFO_PRC, the printer controller (PRC) inputs the vertical synchronous signal (VSYNC) into the printer. The printer starts outputting the horizontal synchronous signal (HSYNC) and the video clock with the timing of VSYNC. The printer controller (PRC) synchronizes the video data with the horizontal synchronous signal HSYNC and output the video data from the FIFO_PRC in synchronization with the video clock. The video data is output from the printer as an image.

In case of this copying operation, the image is copied by transferring the image data in a sequence of the scanner, the FIFO (FIFO_SCC) of the scanner controller, the FIFO (FIFO_GBI_SCC) of the G bus/B bus I/F unit, the FIFO (FIFO_GBI_PRC) of the G bus/B bus I/F unit, the FIFO (FIFO_PRC) of the printer controller and the printer. Since intervals of the horizontal synchronization is the same between the scanner and the printer, a difference of the image data transfer speed is buffered by each FIFO.

(Mode 3)

A third mode is selected by the system which has a configuration wherein a vertical synchronous timing, a horizontal synchronous timing and a video data transfer speed are different from one another between the scanner and the printer.

Figure 91:
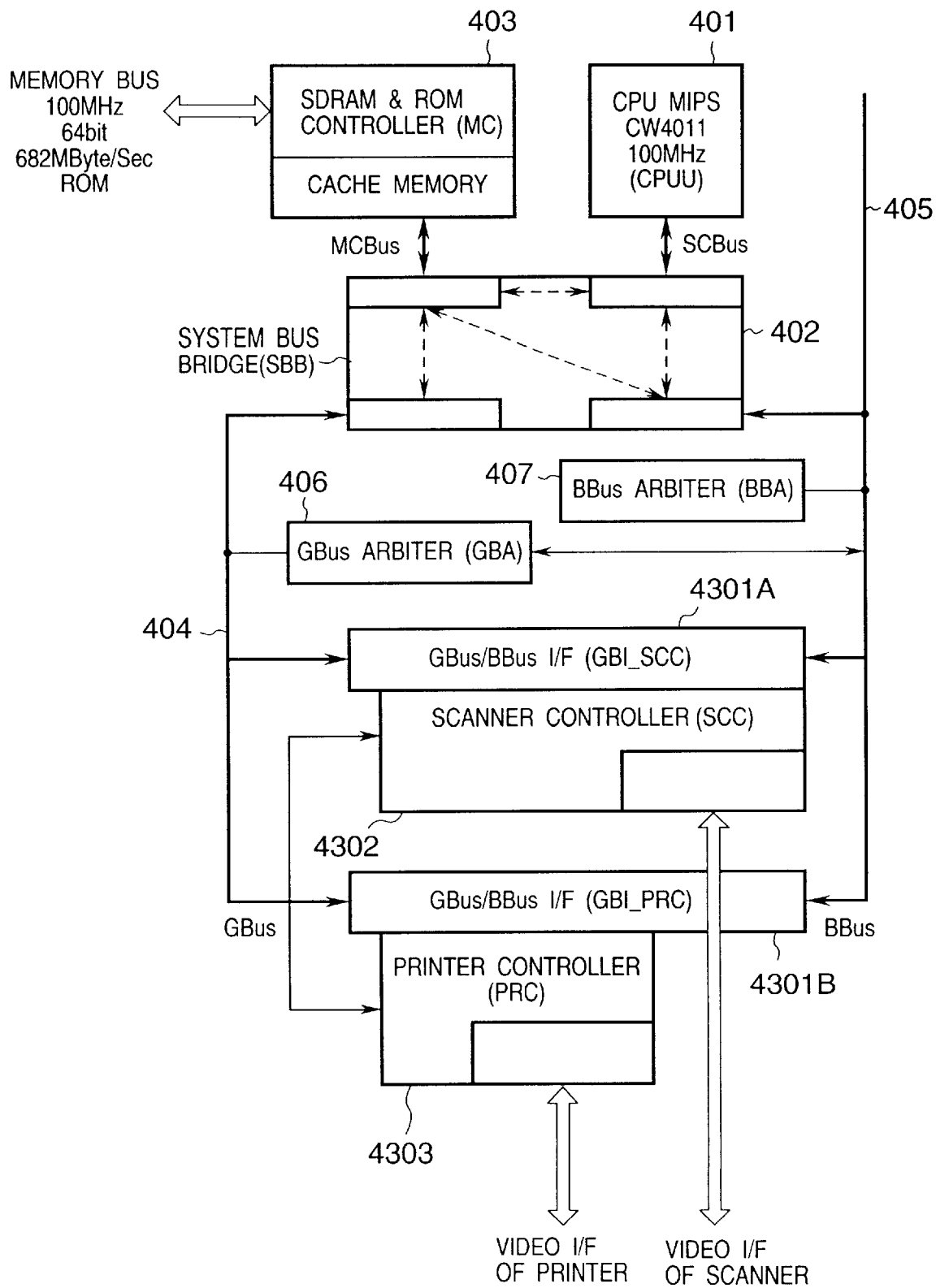
FIG. 91 is a diagram showing a block to be used in a copy mode in which an image is copied by transferring image data from the scanner controller to the printer controller by way of a memory.

A copying operation in this mode will be described with reference to FIG. 91. When the scanner starts reading an image, the scanner outputs a vertical synchronous signal (VSYNC), a horizontal synchronous signal (HSYNC) and a video clock to the scanner controller (SCC). Image data is output in synchronization with these timing signals. The scanner controller (SCC) acquires the image data in synchronization with the timing signals mentioned above. The GBI_SCC performs the DMA transfer of acquired image data to the memory controller (MC) 403. The image data transferred by DMA is written by the MC403 into the SDRAM. When an amount of the image data written into the SDRAM reaches to a level sufficient to buffer a difference between the data transfer speeds of the scanner and the printer, image data transfer to the printer is started. The amount of the image data can be judged from a data transfer time from the scanner, an address written into the SDRAM, an amount of data transferred by DMA to the GBI_SCC or the like.

The printer controller (PRC) transfers the image data to the printer. By the DMA transfer of the GBI_PRC, the printer controller (PRC) inputs the image data written in the SDRAM sequentially into the internal FIFO. Simultaneously, the printer controller (PRC) outputs the vertical synchronous signal (VSYNC) to the printer. Thereafter, the horizontal synchronous signal (HSYNC) and the video clock are input from the printer. In synchronization with the HSYNC and the video clock, the printer controller outputs the image data from the internal FIFO to the printer.

In the data flow described above, a copying operation is carried out to output the image data read by the scanner from the printer. In this case, the image data flows in a sequence of the scanner, scanner controller, G bus/B bus I/F unit (GBI_SCC) of the scanner, memory controller (MC), SDRAM, memory controller (MC), G bus/B bus I/F unit (GBI_PRC) of the printer, printer controller (PRC) and printer. The copying operation is carried out by storing the image data once into the memory and transferring the image data from the scanner to the printer using the memory as a buffer between the scanner and the printer as described above.

The system has functions for the copying operation in three modes described above. A larger number of the internal blocks which are used for the copying operation is increased in an order of (mode 1)→(mode 2)→(mode 3). Use of a larger number of the internal blocks constitutes a cause for degradation of performance or an efficiency of the system as a whole. The system permits selecting a copying operation mode where the system operates most efficiently dependently on a number of devices (the printer and scanner) which are connected to the system.

The coping operation modes can be selected, for example, by methods which are described below:

(1) To input a copying operation mode to be designated by way of a UART or the like to carry out the copying operation in a designated mode.

(2) To input required parameters such as data transfer speeds, horizontal and vertical synchronous frequencies and the like of the printer and scanner by way of the UART or the like so that the CPU 401 selects one of the three modes described above correspondingly to values of the parameters to carry out the copying operation in a selected mode.

(3) To allow the printer controller to read the required parameters such as a data transfer speed, vertical and horizontal synchronous frequencies of the printer and the like so that the scanner controller reads the required parameters such as the data transfer speed, horizontal and vertical synchronous frequencies from the scanner and the CPU 401 compares and judges the parameters to determine a copying operation mode.

A copying operation mode which is determined or selected by the methods (1) through (3) is informed from the CPU to the printer controller and the scanner controller so that the printer controller, the scanner controller and the like carry out the copying operation.

Now, description will be made of processes to determine a copying operation by the method (3) mentioned above.

Figure 100:
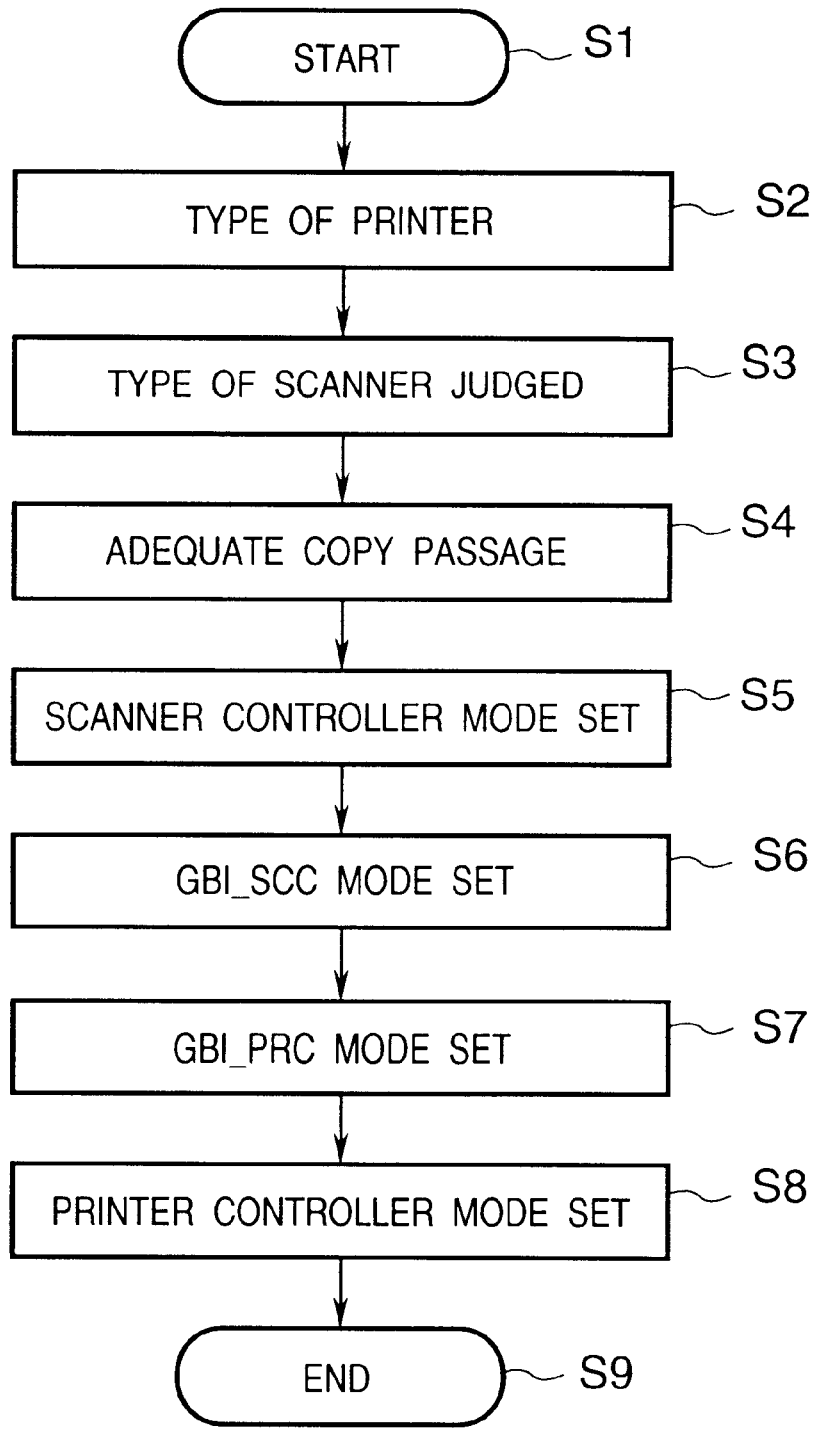
FIG. 100 is a flowchart showing procedures to select a copy mode.

FIG. 100 is a flowchart showing processes to select a copying mode to be used by the system out of the three copying operation mode. This operation starts at a step S1 at a rise time of a power source of the system.

At a step S2, a type of the printer is judged. By way of the printer controller 4303, the CPU 401 acquires an ID from the printer through a command/status line included in the printer video I/F. The command/status line is a serial communication line which is capable of communicating command/status 1:1 between the printer controller and the printer.

At a step S3, the CPU similarly acquires an ID indicating a type from the scanner though a command/status line included in the scanner video I/F by way of the scanner controller 4302.

At a step S4, a copy passage suited to a combination of the scanner and the printer which is judged at the steps S2 and S3 is judged. Judgement of the copy passage suited to the combination of the scanner and the printer is prepared in a form of a table, for example, in a memory of a flash ROM to which the CPU can make reference. A combinations of the scanner and the printer which is suited for each copy passage is:

(Mode 1) A combination wherein horizontal and vertical timings are synchronized, and video data transfer speeds are also synchronized between the scanner and the printer.

(Mode 2) A combination wherein a speed of horizontal synchronization timing is the same between the scanner and the printer, but vertical timings and video data transfer speeds are not synchronized.

(Mode 3) A combination wherein vertical synchronization timings, horizontal synchronization timings and video data transfer speeds are different between the scanner and the printer.

The CPU selects an adequate copying operation mode from among the three modes mentioned above by referring to a prepared table.

At a step S5, a mode corresponding to the copying operation mode selected at the step S4 is set for the scanner controller 4302. The CPU sets this mode by way of the B bus.

Figure 101:
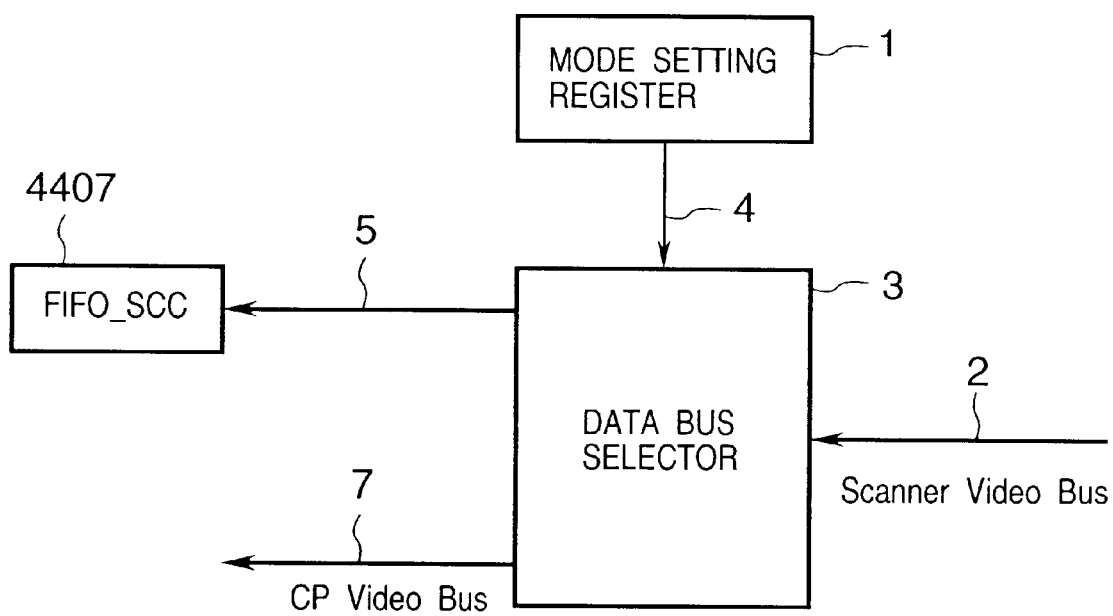
FIG. 101 is a diagram showing a circuit which switches data buses in the scanner controller 4302.

FIG. 101 is a diagram showing a circuit which switches the internal data bus of the scanner controller 4302. A data bus selector is included in the scanner device I/F 4401 shown in FIG. 44. The scanner video clock unit and other members which are not necessary for description of data bus switching are omitted.

A data bus mode is set in a register 1. A mode which corresponds to a copying operation mode selected at the step S4 in FIG. 100 is set in a register 1 by the CPU. A select control signal 4 is a signal used to select a data bus in correspondence to the mode which is set in the mode setting register 1. A scanner video bus 2 is a video data bus from the scanner. A bus 5 is used to transfer video data from the scanner to the FIFO_SCC 6. A CP video bus 7 is used for the copying operation in the (mode 1). In case of the (mode 1), a data bus is selected so that video data is output from the scanner video bus to the CP video bus 7. In case of the (mode 2) or (mode 3), the video data is output to the bus 5 and transferred to the FIFO_SCC 4407.

The CPU proceeds to a step S6 in FIG. 100. At the step S6, the system sets an operation mode for the GBI_scc. This mode is set in the copying operation mode which is selected by the CPU at the step S4. In the (mode 1), the GBI_scc is designated so as not to operate. In the (mode 2), a master is designated for the DMA transfer and the GBI_prc is set in a transfer destination of the DMA. In the (mode 3), a master is designated for the DMA transfer and the SDRAM is set in the transfer destination of the DMA.

At a next step S7, an operation mode is set for the GBI_prc. This mode is set by the CPU in the copying operation mode selected at the step S4. In the (mode 1), the GBI_prc is designated so as not to operate. In the (mode 2), a slave is designated for the DMA transfer. In the (mode 3), a master is designated for the DMA transfer and the SDRAM is set in a read source for the DMA transfer.

At a next step S8, a mode is set for the printer controller. This mode is set by the CPU in the copying operation mode selected at the step S4.

Figure 102:
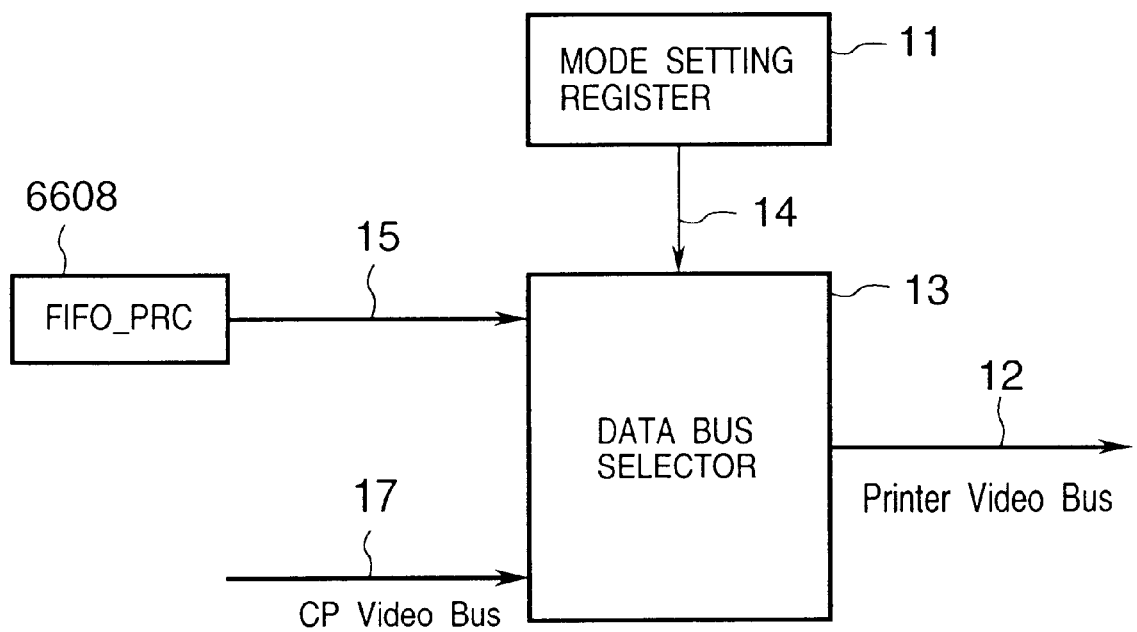
FIG. 102 is a diagram showing a circuit which switches data buses in the printer controller 4303.

FIG. 102 is a diagram showing a circuit which switches the internal data bus of the printer controller 4303. A data bus mode is set in a register 11. A mode which corresponds to the copying operation mode selected at the step S4 in FIG. 100 is set in the register 11 by the CPU. A select control signal 14 is used to select a data bus according to the mode set in the mode setting register 11. A bus 15 is a bus for data output from the FIFO_PRC 16. A bus 12 is a video data bus to the printer. A CP video bus 17 is used for the copying operation in the (mode 1). In case of the (mode 1), data in the CP video bus is selected and output to the printer. In case of the (mode 2) or (mode 3), data from the bus 15 is output to the printer video bus 12.

At a step S9, a flow to select a copying operation mode terminates at rise of the power source. The CPU is capable of determining a copying operation mode dependently on types of the scanner and the printer.

The processes described above are those for determining a copying operation mode on the basis of the vertical synchronization timing, horizontal synchronization timing and video data transfer speeds of the scanner and the printer, but not always applicable to a case where an image is to be not only copied but also to be processed. Speaking concretely of a case where an image is to be processed, it is judged whether or not the image is to be processed before the. step S2 in FIG. 100 and the mode 3 is selected regardless of specifications for the scanner and the printer and each block is set to obtain the data passage in the mode 3 at the steps S5 through S8. These processes allow read image data to be stored once into a memory, thereby making it possible to process the image data as required.

A bus is used in the mode 2 or the mode 3. The system determines whether the G bus or the B bus is to be used dependently on their conditions of use. In other words, the G bus which has a broader width is used when both the G bus and the B bus are in the idle states. When either of the buses is not used, the system selects the other bus which is not used.

As described above, the scanner is connected to the buses (G bus and B bus) in the DoEngine by way of the scanner controller 4302 and the GBI_SCC 4301A. The scanner controller 3402 and the GBI_SCC 4301A are connected to transfer image data to each other by way of the FIFOs respectively. Since the scanner controller and the GBI_SCC have the FIFOs respectively as described above, the GBI is capable of efficiently transferring image data read from the scanner which has a relatively low speed though the operation clock is connected at the 64-bit width to the G bus which has a remarkably high speed of 100 MHz. The printer controller is also capable of efficiently transferring the image data.

Furthermore, the GBI selects a data passage for the copying operation dependently on coincidence or mismatching between the synchronous signals of the scanner and the printer, thereby being capable of copying an image using data transfer as speedy as possible regardless of specifications for the scanner and the printer.

That is, connections of the scanner and the printer to the buses of the DoEngine using the scanner controller and the printer controller described above as well as their GBIs make it possible to make the DoEngine mode independent from the specifications for the scanner and the printer.

[ANOTHER EXAMPLE OF CONFIGURATION]

Figure 10:
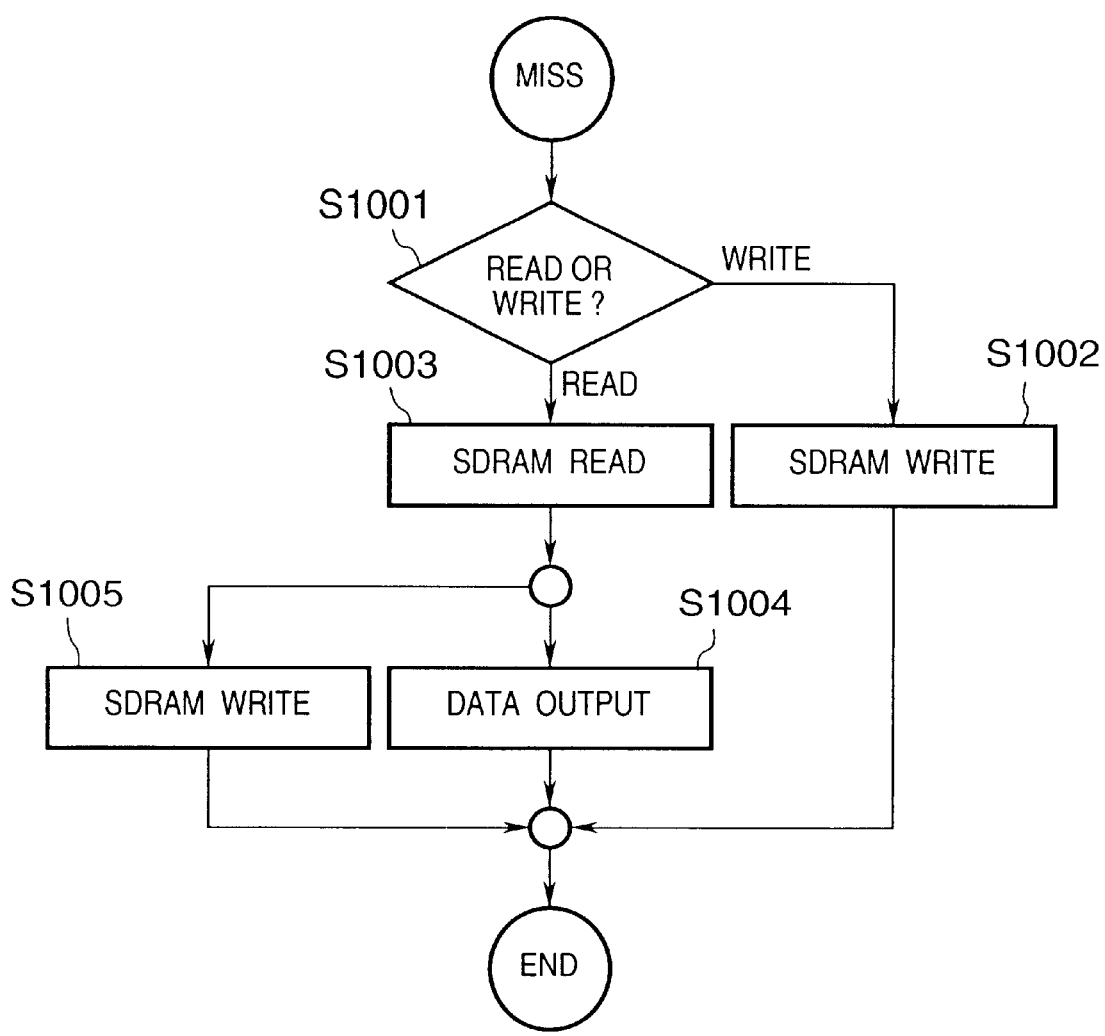
FIG. 10 is a flowchart showing operations of the cache when a memory read/write transfer is requested from the MC bus.
Figure 103:
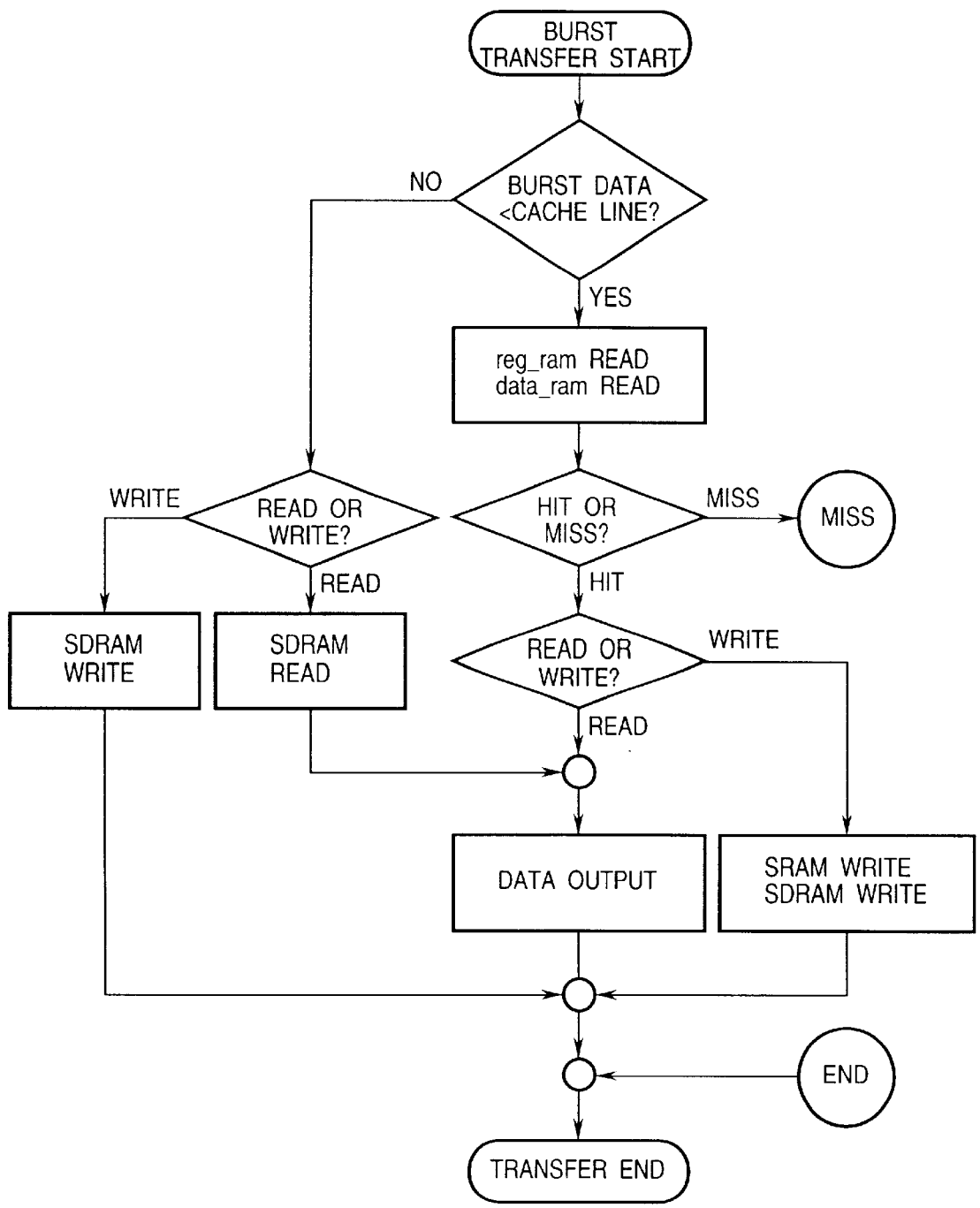
FIG. 103 is a flowchart showing another example of cache operations when a memory read/write transfer is requested from an MC bus.
Figure 104:
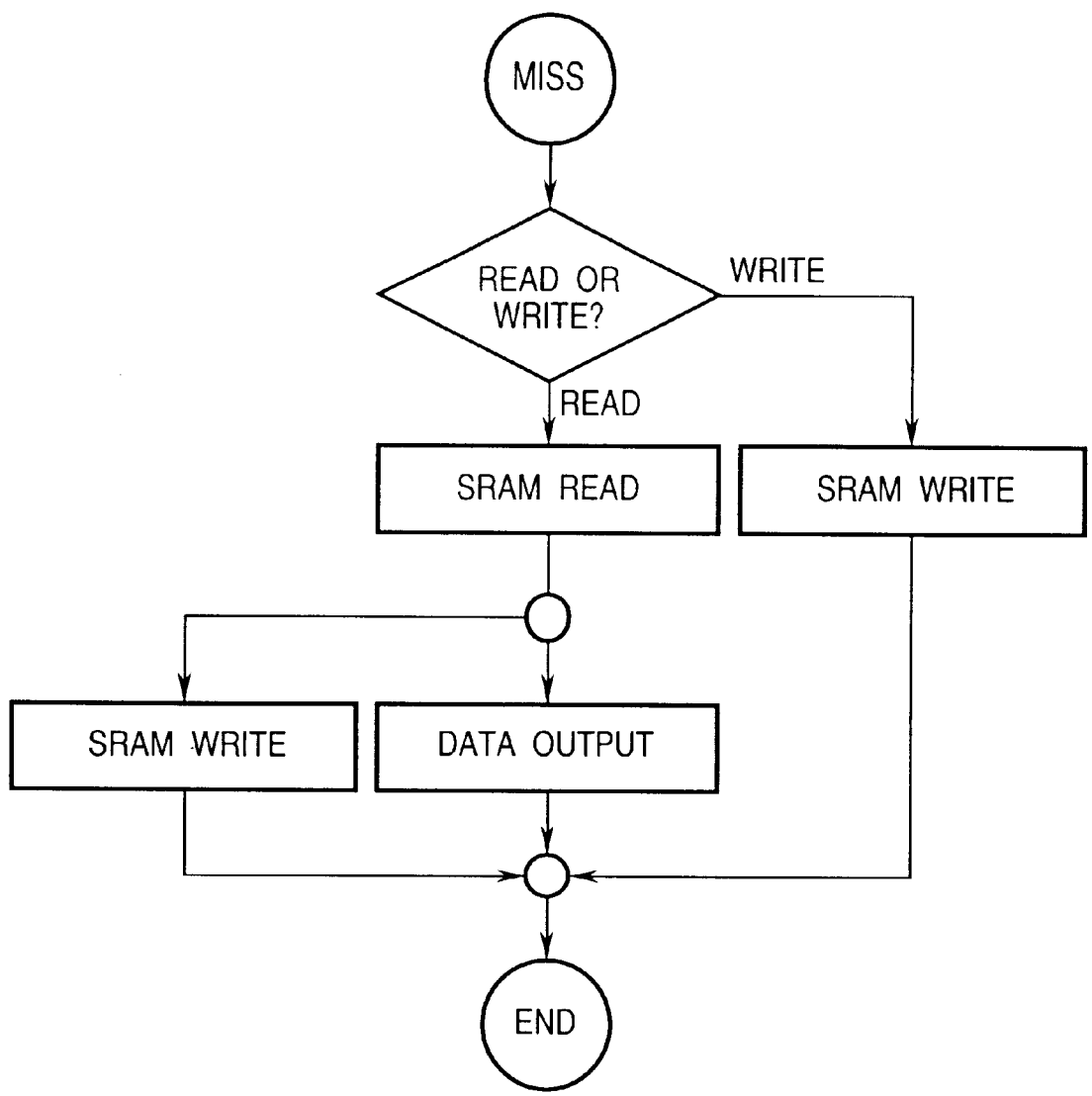
FIG. 104 is a flowchart showing still another example of cache operations when the memory read/write transfer is requested from the MC bus.

The operating sequence of the cache shown in FIGS. 9 and 10 may be those shown in FIGS. 103 and 104.

When data transfer is started from the MC bus in FIG. 103, the mTType [60:0] indicated by MCbus judges at an initial stage of the data transfer whether or not the transfer is to be carried out with the cache on or off. In case of the burst transfer in FIG. 103, it performs judgement dependently on whether or not an amount of data to be transferred is larger than a data amount on a line of the cache. A line of the cache corresponds to 256 bits =4 bursts.

In FIG. 103, the memory controller checks the mTType [3:0] at the start of the transfer and operates with the cache on when a burst length indicated by the mTType is 1/2/4 or operates with the cache off when the burst length is 6/8/16/ 2×16/3×16/4×16. After the cache is turned on or off, the memory controller operates as shown in FIGS. 9 and 10.

Figure 105:
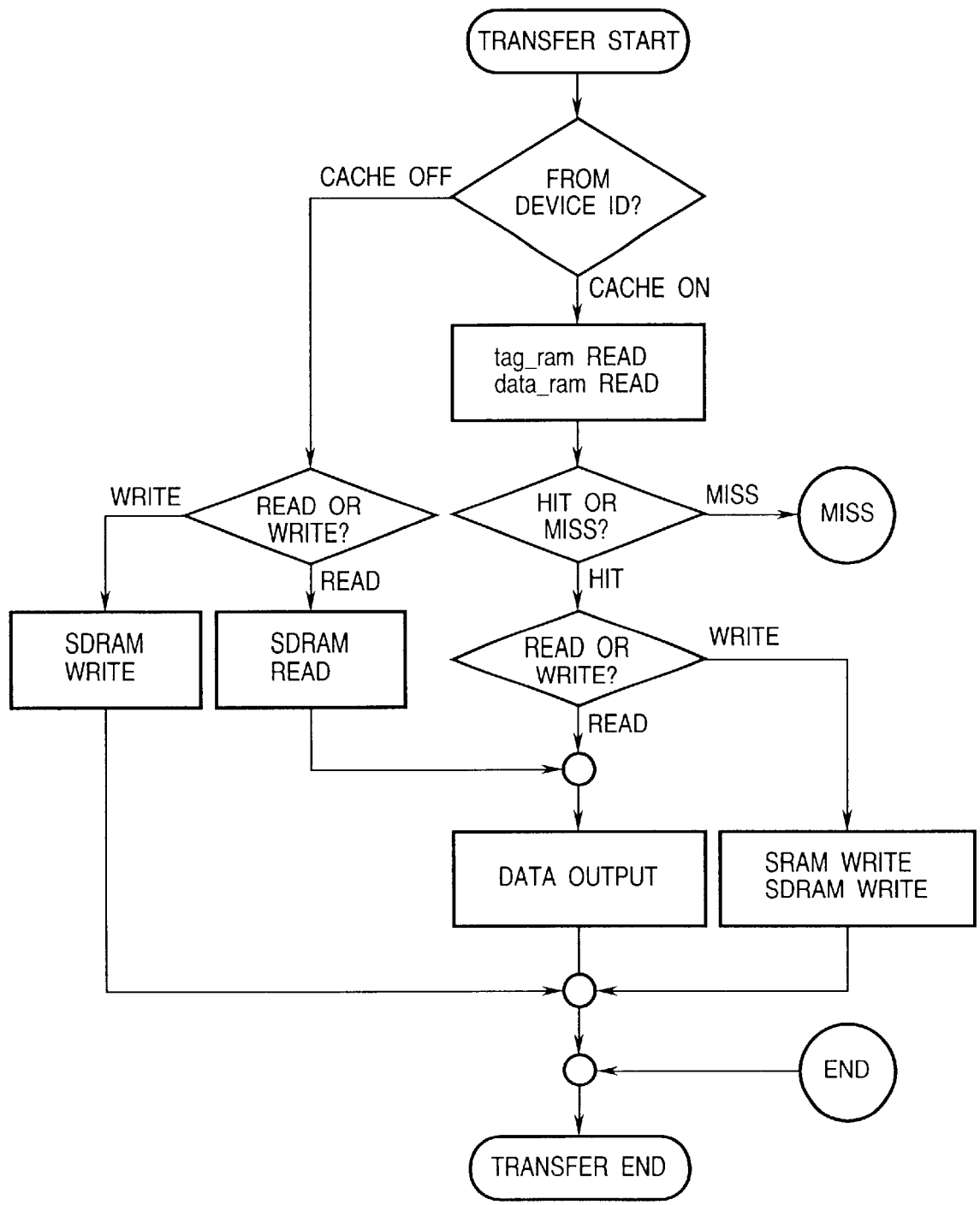
FIG. 105 is a flowchart showing still another example of cache operations when the memory read/write transfer is requested from the MC bus.
Figure 106:
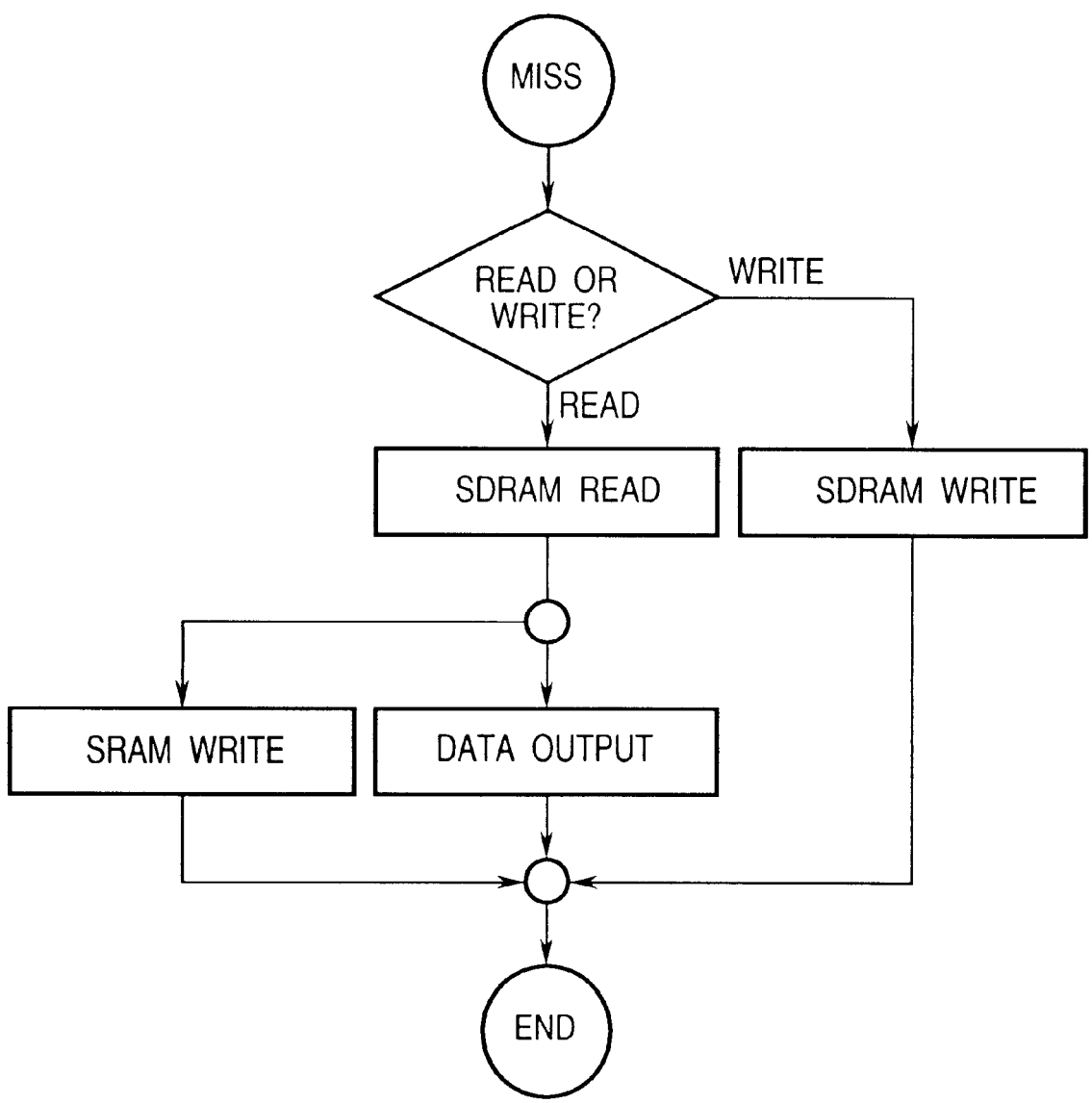
FIG. 106 is a flowchart showing a further example of cache operations when the memory read/write transfer is requested from the MC bus.

Furthermore, the cache can be turned on and off with a device as shown in FIGS. 105 and 106. In FIG. 105, the memory controller discriminates a device which issues a transfer request by checking the mTType[6:4] at a transfer start, refers to a value of a component register which is preliminarily set to judge whether it operates with the cache on or off, and determines whether it operates with the cache on or off. After the cache is turned on or off, the memory controller operates as shown in FIGS. 9 and 10. Setting of the component register may be determined (not modifiable) by a hardware or rewritten by a software.

<Division of Job>

An embodiment of the present invention will be described with reference to FIGS. 107 and 117. In this embodiment, acquisition and release of devices are done in parallel to process information in order to process various jobs issued to a digital composite appliance in units of pages.

Figure 107:
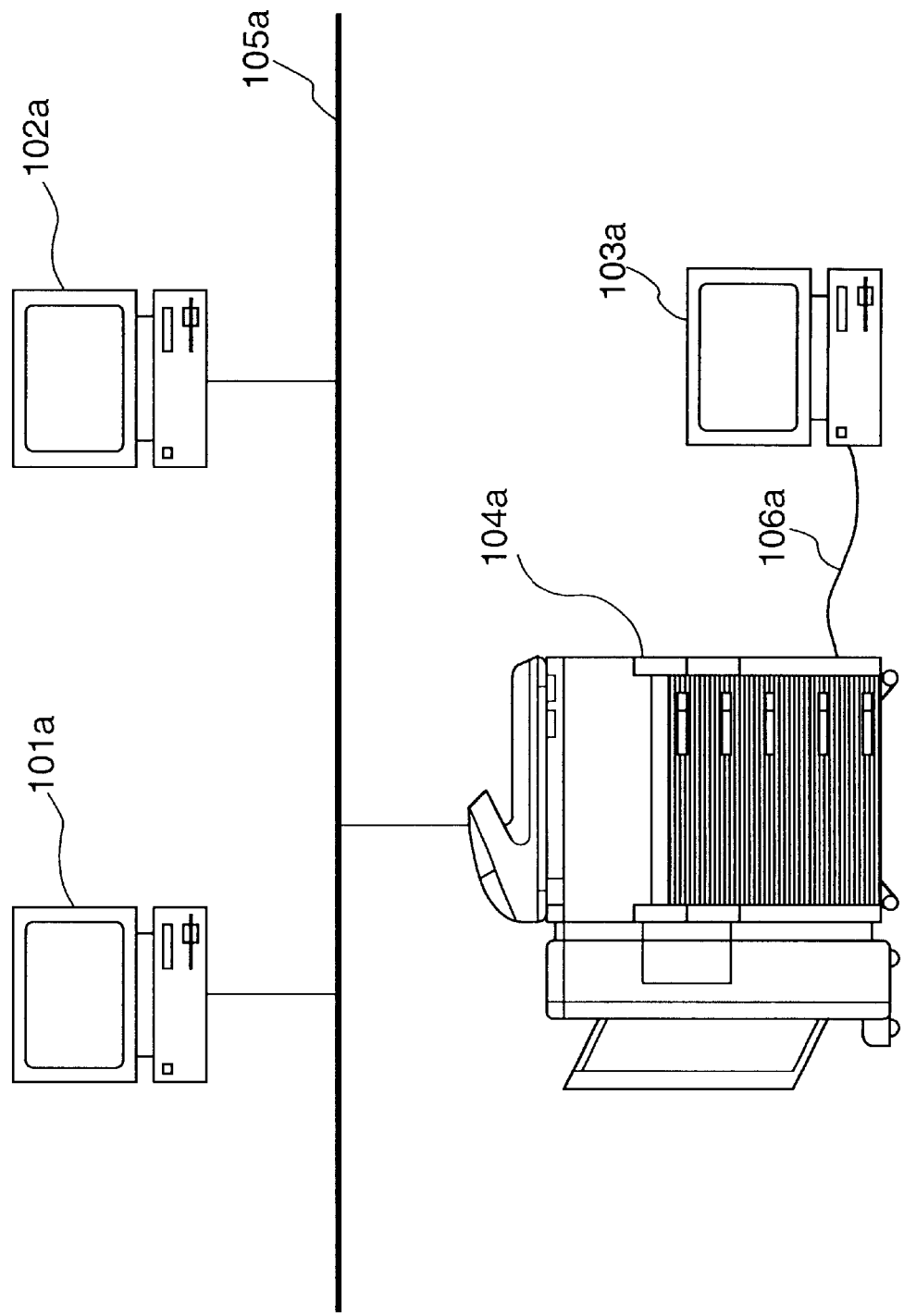
FIG. 107 is a view of the configuration of an information processing system according to an embodiment of the present invention.

FIG. 107 is a view of the configuration of an information processing system according to the present invention. In FIG. 107, reference numerals 101a, 102a, and 103a denote host computers which generate various jobs and transmit them to peripheral devices; and 104a, a digital composite appliance for executing various jobs such as a printing job, scanning job, FAX job, and copying job. The first and second host computers 101a and 102a and digital composite appliance 104a are connected to a LAN (Local Area Network) 105a. The first and second host computers 101a and 102a can use the digital composite appliance 104a by way of the LAN 105a.

The third host computer 103a is connected to the digital composite appliance 104a by way of not the LAN but a parallel (or serial) interface 106a, and can use the digital composite appliance 104a.

Figure 108:
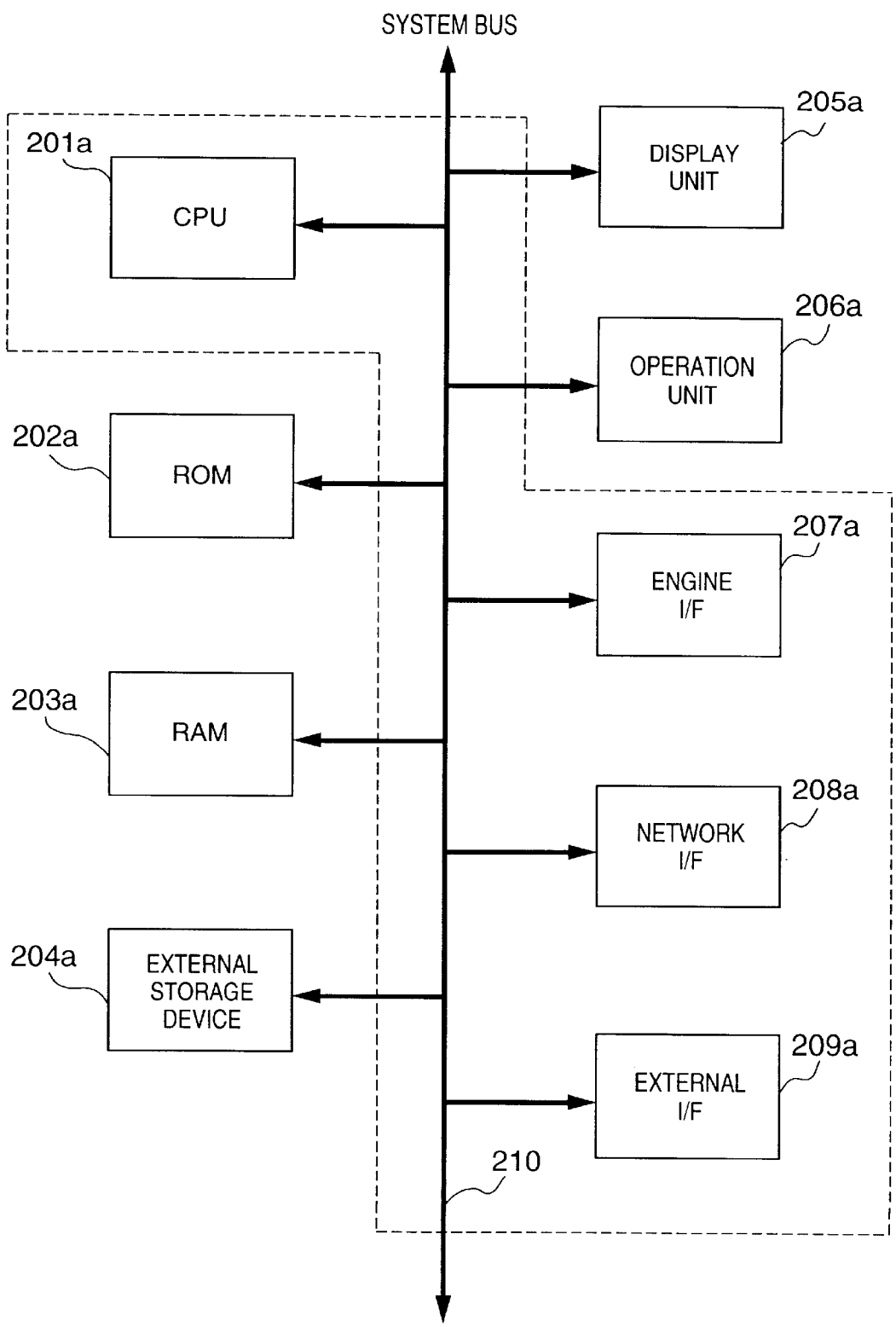
FIG. 108 is a block diagram showing the basic configuration of a peripheral device in the information processing system according to the embodiment of the present invention.

FIG. 108 is a block diagram showing the basic configuration of the information processing system shown in FIG. 107. In FIG. 108, reference numeral 201a denotes a CPU (Central Processing Unit) which controls the whole system and performs arithmetic operation and the like; and 207a, an engine interface (engine I/F) which exchanges commands and the like for actually controlling an engine.

Reference numeral 208a denotes a network interface (network I/F) through which a device is connected to a network.

Reference numeral 209a denotes an external interface (external I/F) which is connected to a host computer by way of a parallel (or serial) interface; and 210, a system bus serving as a data passage between the respective constituent elements.

The CPU 201a, engine interface (engine I/F) 207a, network interface (network I/F) 208a, and external interface (external I/F) 209a constitute a DoEngine 201 (FIG. 2).

Reference numeral 202a denotes a ROM (Read Only Memory) which is a storage area for system start programs, printer engine control programs, character data, character code information, and the like; and 203a, a RAM (Random Access Memory) which is a storage area not limited in the use period, stores font data additionally registered by download, and allows loading and executing programs and data for various processes.

Reference numeral 204a denotes an external storage device such as a hard disk which is used as a work area for spooling a printing job accepted by a printing device (printer) and storing programs and various information files.

Reference numeral 205a denotes a display unit such as a liquid crystal display which displays the setting state of the printing device, the internal processing state of the current printing device, the error state, and the like.

Reference numeral 206a denotes an operation unit used to change or reset the settings of the printing device.

Figure 109:
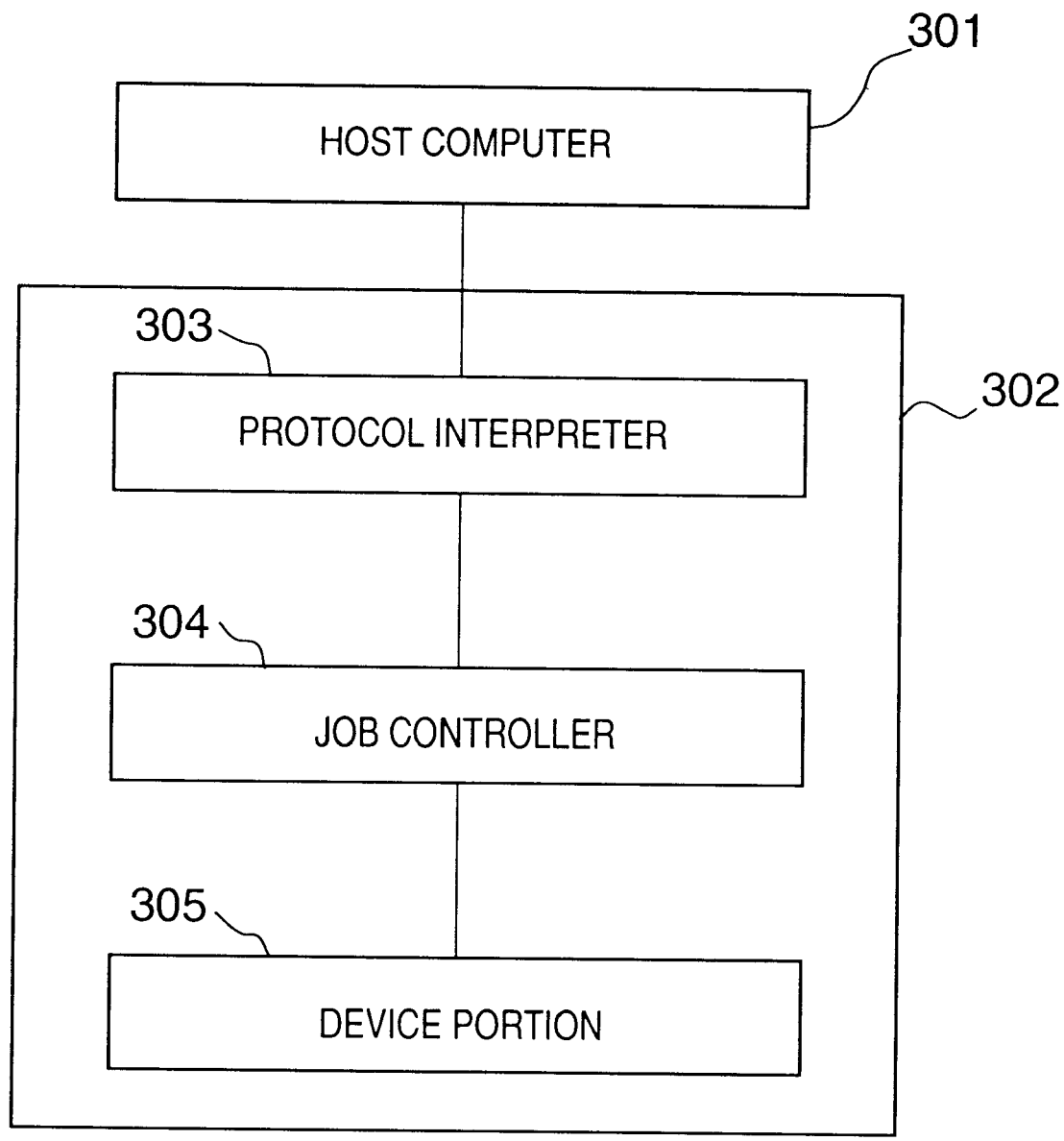
FIG. 109 is a block diagram showing the schematic software structure of the peripheral device in the information processing system according to the embodiment of the present invention.

FIG. 109 is a block diagram showing the internal software structure of the host computer and digital composite appliance 104a. In FIG. 109, reference numeral 301 denotes a host computer (corresponding to 101a through 103a in FIG. 107); and 302, controller software which is internally divided into a protocol interpreter 303, job controller 304, and device portion 305.

The protocol interpreter 303 interprets a command (protocol) transmitted from the host computer 301 by way of a LAN 105 in FIG. 1 or an external I/F 209 in FIG. 2, and requests the job controller 304 to execute a job. The job controller 304 actually processes the job requested by the protocol interpreter 303. The device portion 305 is used to execute the job by the job controller 304.

Figure 110:
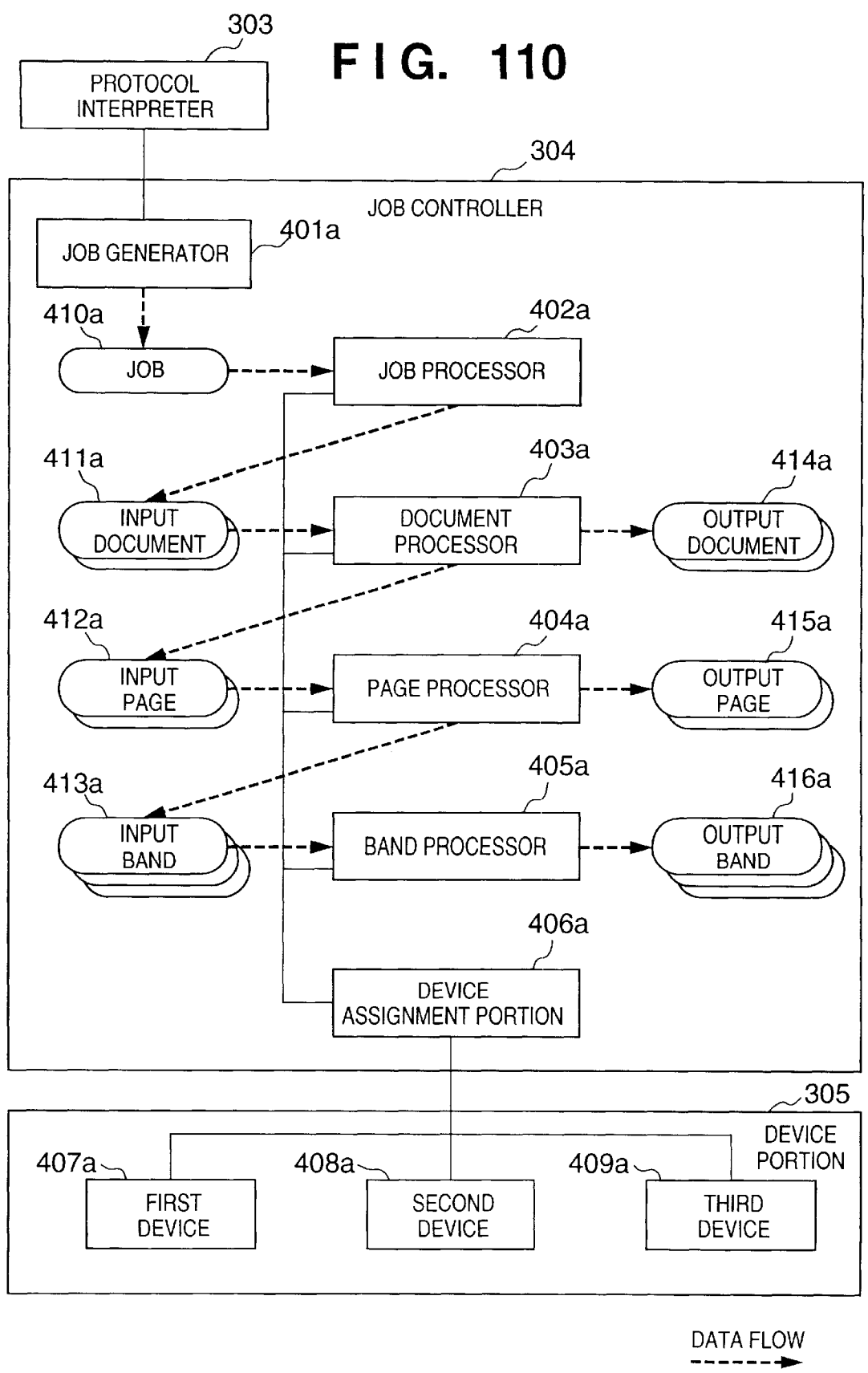
FIG. 110 is a block diagram showing the detailed software structure of the peripheral device in the information processing system according to the embodiment of the present invention.

FIG. 110 is a block diagram for explaining the outline of the controller software 302. In FIG. 110, the controller software 302 comprises the protocol interpreter 303, job controller 304, and device portion 305. The job controller 304 has a job generator 401a, job processor 402a, document processor 403a, page processor 404a, band processor 405a, and device assignment portion 406a.

The device portion 305 has a first device 407a, second device 408a, and third device 409a.

A series of operation requests transmitted from the host computers 101a through 103a in FIG. 107 are transmitted as commands (protocols) by way of the network I/F 208a and external I/F 209a. The transmitted commands are interpreted by the protocol interpreter 303 and then transmitted to the job generator 401a. At this time, the commands are converted into an understandable format for the job controller 304.

The job generator 401a generates a job 410a. The job 410a may be a copying job, printing job, scanning job, or FAX job.

For example, for a printing job, the job 410a includes printing data itself (PDL data), and setting information such as the name of a document to be printed, the number of prints, and designation of a discharge tray serving as an output destination. The job 410a is transmitted to the job processor 402a where the job 410a is processed. The job processor 402a performs settings (for example, a plurality of documents are printed and stapled at once) and processing concerning the entire job 410a.

Except for settings and processing concerning the entire job 410a, the job 410a is divided into input documents 411a as smaller job units by the job processor 402a. Each input document 411a is converted into an output document 414a by the document processor 403a.

For example, for a scanning job of scanning a bundle of originals by a scanner and converting them into a plurality of image data, settings and operation procedures concerning the bundle of originals are written in the input document 411a, and settings and operation procedures concerning a plurality of image data are written in the output document 414a. A bundle of sheets are converted into a plurality of image data by the document processor 403a.

The document processor 403a performs only processing in units of documents to generate input pages 412a serving as smaller job units. This is the same as the job processor 402a which is involved in processing in units of jobs to generate documents for detailed jobs. More specifically, settings and operations in units of documents concern the page order such as rearrangement of pages, designation of both-side printing, addition of a display, and OHP insertion.

The input page 412a is converted into an output page 415a by the page processor 404a. In the above scanning job, settings and procedures such as the scanning resolution and scanning direction (landscape/portrait) are written in the input page 412a, and settings and procedures such as the storage location of image data (address and data name in the RAM 203a or external storage device 204a) are written in the output page 415a.

By this processing, the job structure can be processed divisionally in units of pages.

If a high-end system can comprise a page memory for one page, a job suffices to be finally divided into pages. In practice, however, when the memory cost or the like must be suppressed, or the speed of the printing engine is low, like an ink-jet printer, the system may comprise only a memory (band memory) for several lines. In this case, a page is processed after being divided into bands as smaller units. This is done by an input band 413a, the band processor 405a, and an output band 416a. These operations are the same as those of the page.

Any of the job processor 402a, document processor 403a, page processor 404a, and band processor 405a uses a device in processing. If a plurality of processors simultaneously proceed with jobs, they contend with each other for the device. This is arbitrated by the device assignment portion 406a. The first through third devices 407a through 409a are assigned to the processors by the device assignment portion 406a.

Examples of the device are a page memory, band memory, document feeder, marking engine, and scanner.

(Processing of Composite Job)

FIG. 110 shows processing of dividing a single job in units of pages and assigning a device. Processing of a composite job will be explained with reference to FIG. 111.

The "composite job" is divided into a scanning job and printing job for a copying job, or a data reception job and received-data printing job for a FAX reception job. A device is assigned to the divided job in units of pages to process the job. The processing contents will be described below. The basic configuration of the information processing system is the same as that in FIGS. 107 through 109 described in division of a single job. The processing will be described with reference to FIGS. 107 through 109, as needed.

Figure 111:
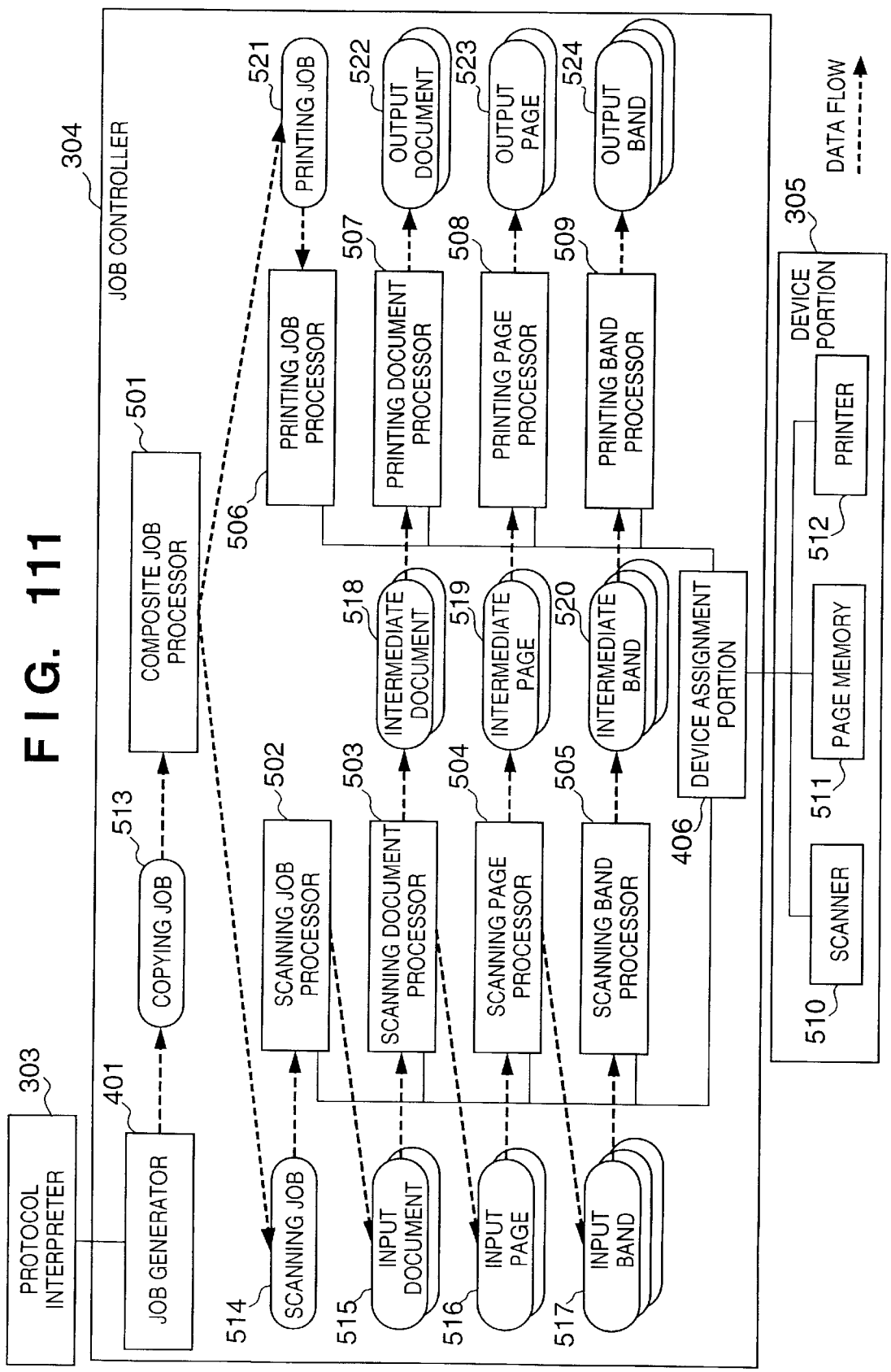
FIG. 111 is a block diagram showing the detailed software structure of the peripheral device in the information processing system according to the embodiment of the present invention.
Figure 112:
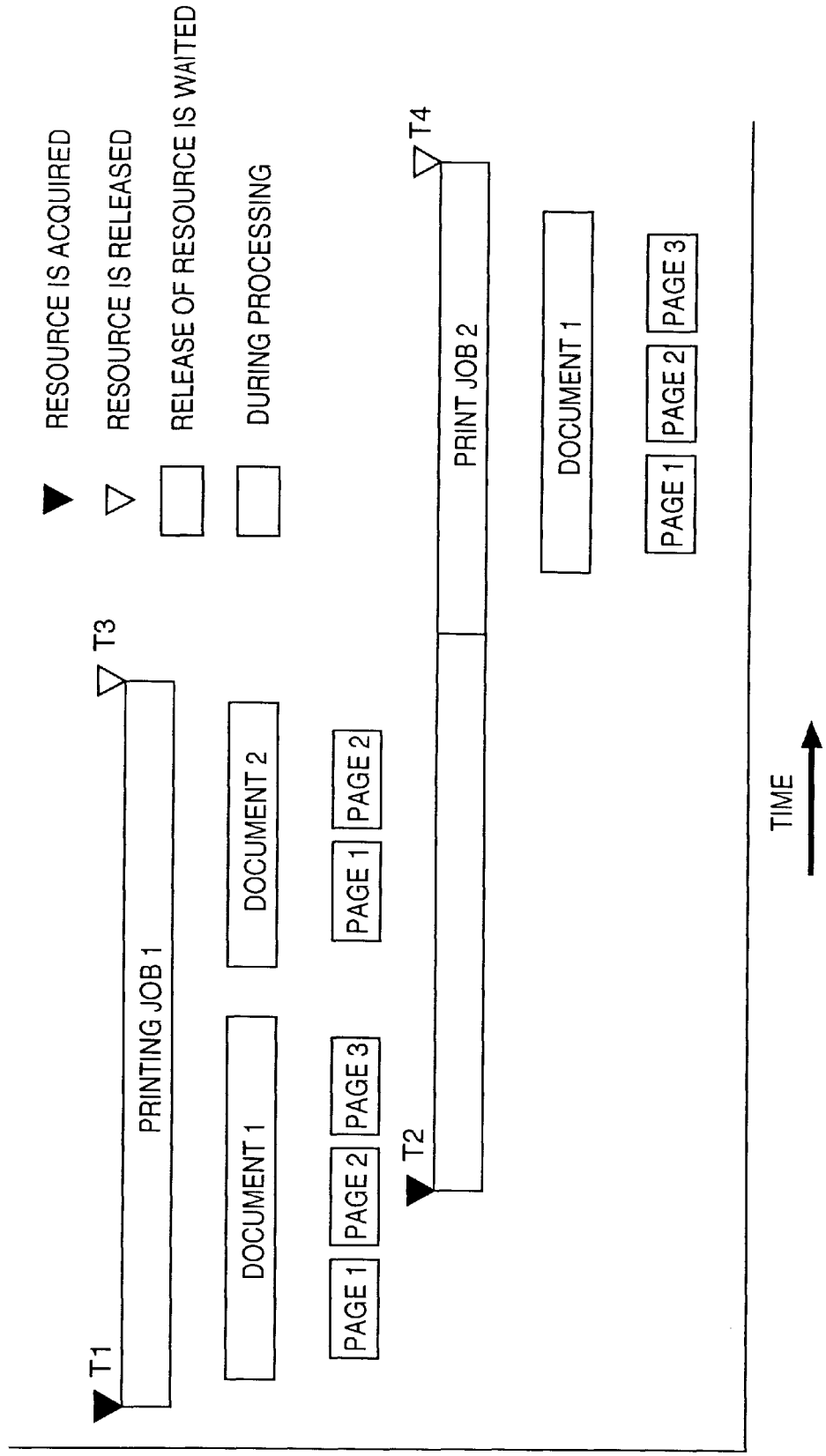
FIG. 112 is a timing chart when jobs are simultaneously processed in the prior art.

FIG. 111 is a block diagram showing the detailed software structure of a peripheral device in the information processing system for processing a composite job. In FIG. 111, the software structure is made up of the protocol interpreter 303, job controller 304, and device portion 305.

A copying job is processed after being divided into two jobs (scanning job and printing job) in the job controller 304. A series of operation requests transmitted from the host computers 101a through 103a in FIG. 107 are transmitted as commands (protocols) by way of the network I/F 208a and external I/F 209a in FIG. 108.

The transmitted commands are interpreted by the protocol interpreter 303 and then transmitted to the job controller 304. At this time, the commands are converted into an understandable format for the job controller 304. In this embodiment, a copying job is generated.

A generated copying job 513 is transmitted to a composite job processor 501 in FIG. 111 where a scanning job 514 and printing job 521 are generated. At the same time as generation, the scanning job 514 and printing job 521 are respectively transmitted to a scanning job processor 502 and printing job processor 506. As a matter of course, printing operation cannot start until scanning operation starts to generate (or prepare for) data to be output to a printer 512. Hence, scanning processors (502, 503, 504, and 505) and printing processors (506, 507, 508, and 509) proceed with processes in synchronism with each other by way of an intermediate document 518, intermediate page 519, and intermediate band 520 indicating intermediate data. Devices used in this copying job are a scanner 510, page memory 511, and printer 512.

Figure 115A:
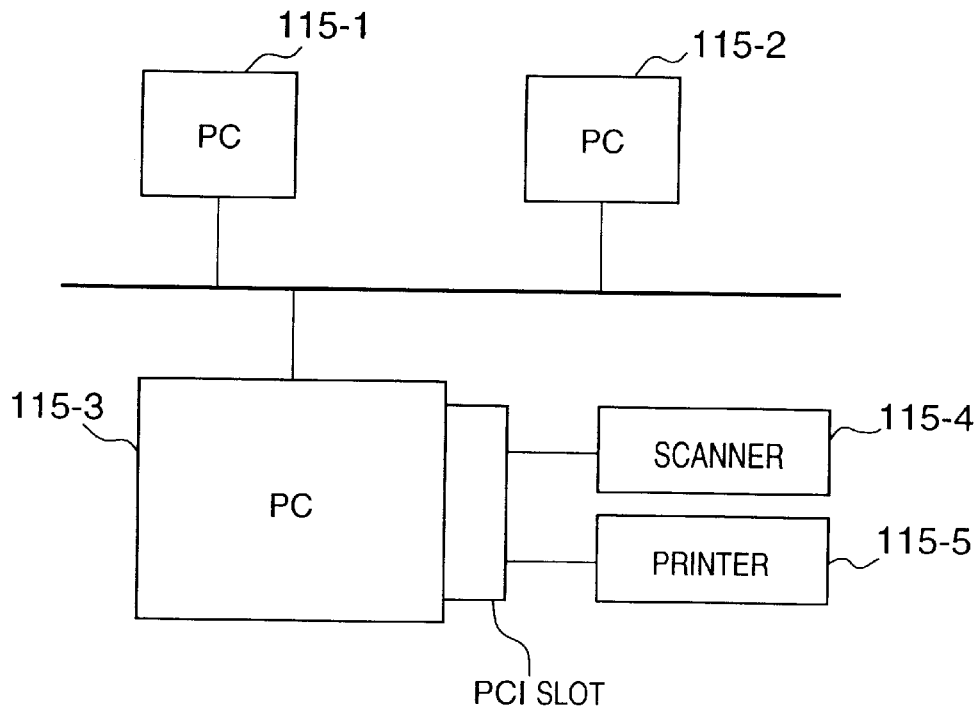
FIGS. 115A and 115B are block diagrams each showing a configuration of the system when the DoEngine is used as satellite.
Figure 115B:
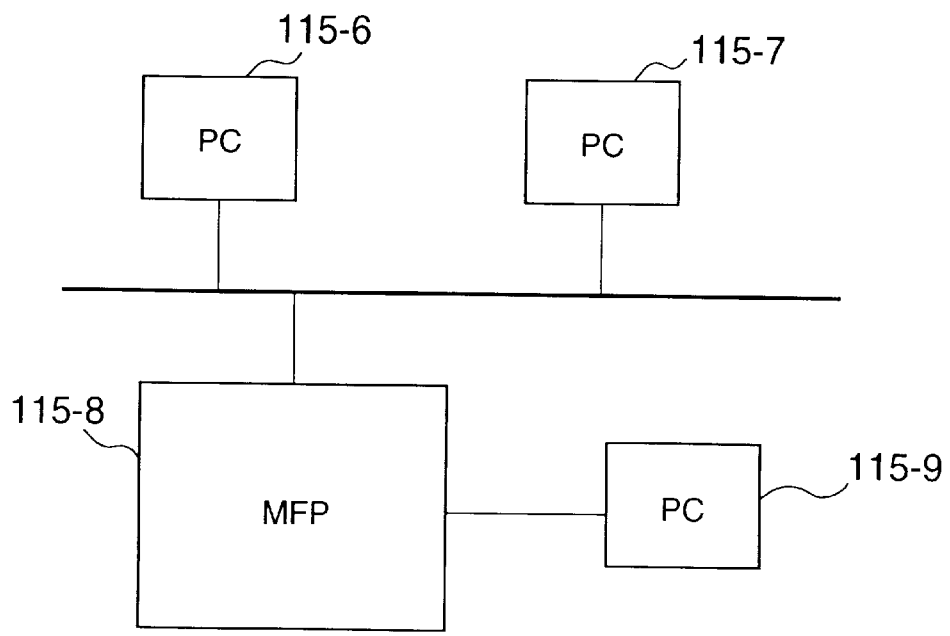

FIGS. 115A and 115B are block diagrams each showing an example of job division. When a command transmitted from the host computer 301 is a copying job, the job controller 304 divides the copying job into a printing job and scanning job, assigns devices (e.g., a printer, scanner, and memory) for processing the divided jobs, and proceeds with the processes.

The composite appliance can be efficiently controlled by performing assignment and release of devices for executing respective processing obtained by dividing a job in units of pages, in combination with the above-described DoEngine. This will be described below.

A data flow in performing copying operation using the DoEngine block in FIG. 4 will be explained. In this case, a scanner and printer (514 and 521 in FIG. 5) are assigned as devices of the processing system. For a scanning job (514), image data for the scanner is controlled by the scanner controller 4302, and written in the memory 403 by way of the G bus 404 and system bus bridge 402. For a printing job, data written in the memory 403 is transmitted by way of the system bus bridge 402 and B bus 405 to the printer controller 4303 where the data is printed. This dual-bus configuration can solve the problem on occupation of the bus, and allows accessing the CPU and memory in parallel. Data can be output in parallel with input of data.

The scanning job 514 and printing job 521 obtained by dividing the copying job 513 in processing of FIG. 5 can be processed in parallel.

Assignment and release of a device in input/output processing in units of pages using the DoEngine will be described.

Figures 113A, 113B:
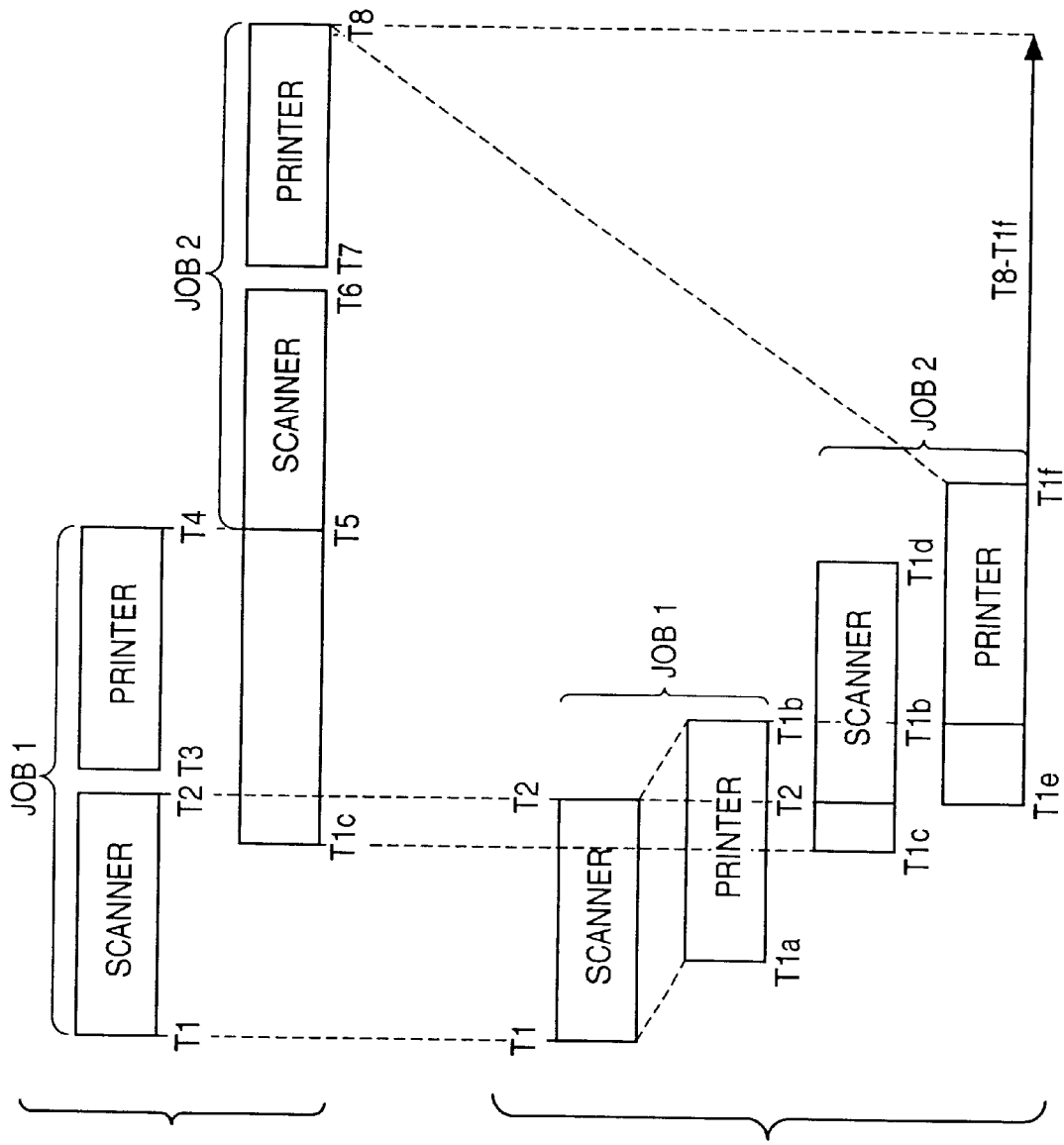
FIGS. 113A and 113B are timing charts for explaining processing of assigning and releasing a device.

FIGS. 113A and 113B are timing charts showing assignment and release of a device in a conventional case (FIG. 113A) where processing is done serially in units of jobs and a case (FIG. 113B) where processing is done in parallel in units of pages using a scanner and printer as device examples of the processing system.

In the case of FIG. 113A, as for device assignment to job 1, the scanner is assigned at time T1 and released at time T2. Then, the printer is assigned at time T3 and released at time T4. The scanner necessary for subsequent job 2 is assigned at time T5. However, the scanner is idle at the time interval from T2 to T4 in processing of job 1, and this time interval is wasteful for job 2. The printer for job 2 is assigned at time T7 after the scanner is released (time T6), and released at time T8.

The "wasteful time" means a time when a device serving as a resource cannot start processing owing to the trap of information to be input though the device can start processing.

In the case of FIG. 113B, as for device assignment to job 1, the scanner is assigned at time T1 and released at time T2. By parallel processing using the DoEngine, the printer is assigned (time T1$a$) before the scanner is released (time T2). After time T2, the scanner can be assigned to job 2. For example, if a scanner assignment request is issued at T1$c$, the time interval from T1$c$ to T2 is a standby time up to scanner assignment.

Similarly, the printer can be assigned before the scanner is released (time T1$d$). The printer is assigned after time T1$b$, and released at time T1$f$. If a printer assignment request is issued at T1$e$, the time interval from T1$e$ to T1$b$ is a standby time up to printer assignment. Assignment and release of a device have been described by exemplifying copying jobs, but can also be applied in processing a copying job and FAX job, a copying job and PDL printing job, and the like. The throughput of jobs 1 and 2 is increased by T8-T1$f$ from a comparison between FIGS. 113A and 113B.

The "standby time" means a time when data to be processed has already been prepared, and release of a device is waited. This configuration is different from the prior art in that input data and output data can be processed in parallel, and the trap of data is cancelled. The "standby time" can be optimized (minimized) by performing arbitration reflecting conditions such as job priority by the DoEngine and controlling assignment of a device.

Job units are FAX transmission/reception, PDL printing, copying, and the like. The device assignment portion 406$a$ assigns the first through third devices 407$a$ through 409$a$. The device includes a page memory, band memory, document feeder, marking engine, scanner, and the like.

Figure 114:
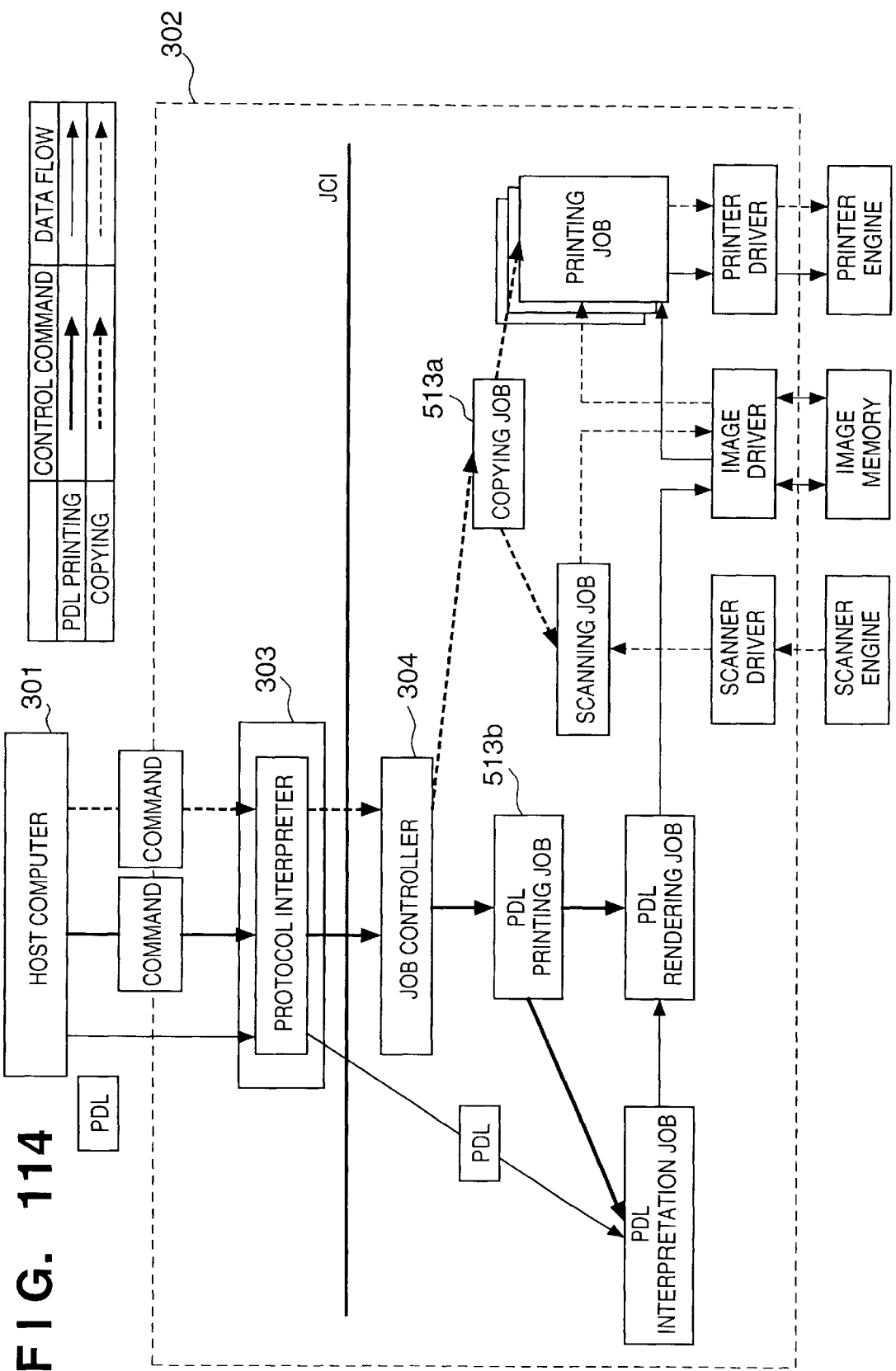
FIG. 114 is a block diagram for explaining processing when a plurality of jobs are generated.

FIG. 114 is a block diagram when a copying job 513$a$ and PDL printing job 513$b$ are generated. Even when various base jobs are generated, each job is divided in units of pages, and assignment and release of devices are done in parallel, as described above.

The DoEngine architecture using the system bus bridge 402 and dual-bus (G bus 404 and B bus 405) configuration can cancel contentions for data processing. Memories distributed to local devices such as an interface in the prior art can be omitted. Information can be shared by the centralized memory 403.

(Improvement of Real-Time Operation)

In the configuration shown in FIGS. 107 and 108, a common CPU is used for both a processor demanded for real-time operation and a processor demanded for less real-time operation. The real-time operation can be further improved by selectively using the CPU and the DoEngine serving as a satellite.

The configuration in FIG. 115A may replace that in FIG. 107. In FIG. 115A, PCs 115-1 and 115-2 are host computers. Reference numeral 115-3 denotes a satellite PC having a DoEngine. The DoEngine has a PCI bus interface, and thus can be used together with a computer system having a PCI bus slot. A scanner 115-4 and printer 115-5 are connected to the satellite PC 115-3 by way of the PCI slot to construct a PCI satellite configuration. FIG. 115B shows a host computer (115-6) and satellite PC (115-7) which are parallel-connected to each other and connected to a next-generation composite appliance peripheral device (MFP) by way of the PCI bus.

(DoEngine As Satellite)

Figure 116:
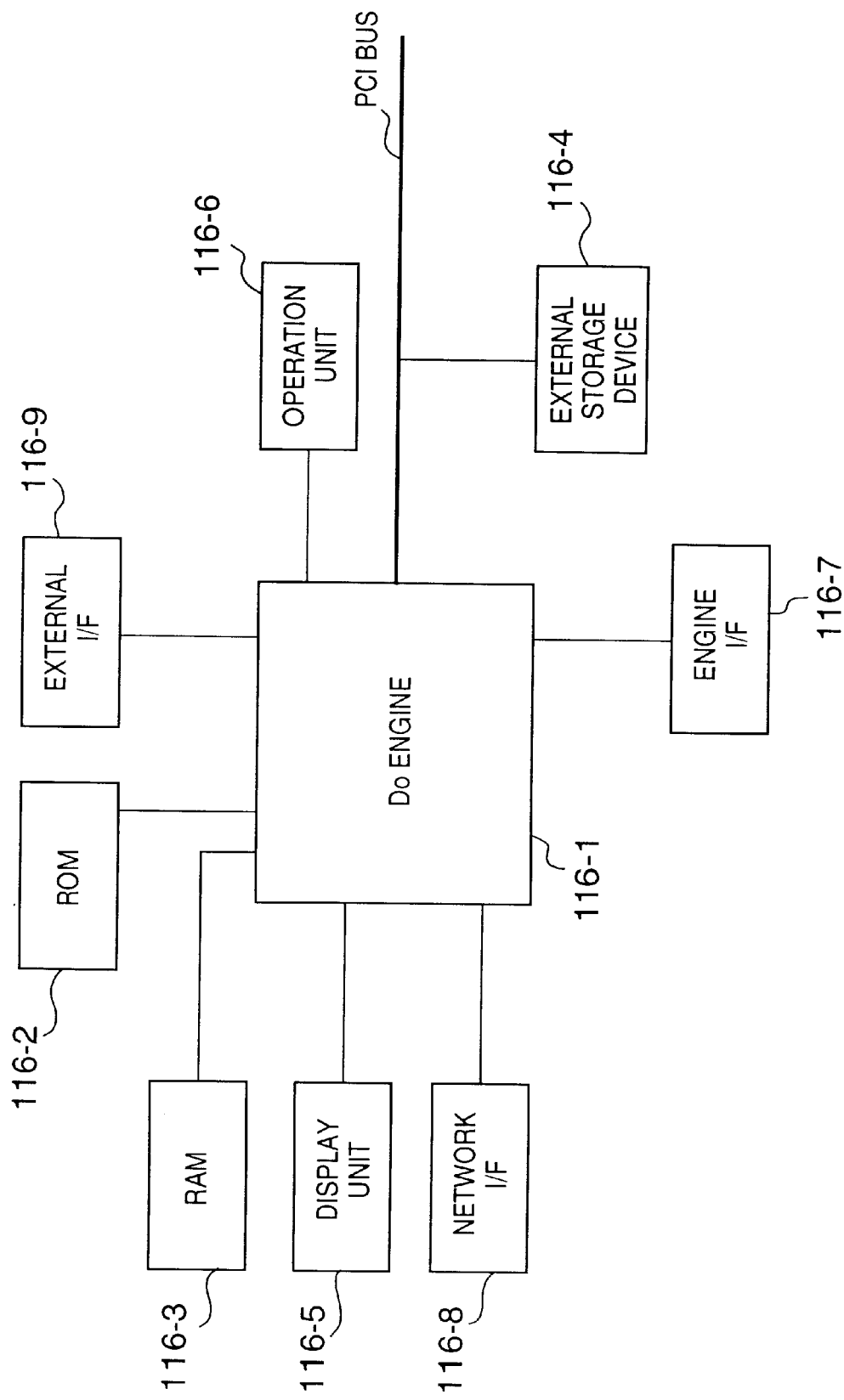
FIG. 116 is a block diagram for explaining a case where system software processing is separately processed by two CPUs.

FIG. 116 is a block diagram showing connection of the DoEngine in the satellite PC shown in FIGS. 115A and 115B. In FIG. 116, a DoEngine 116-1 comprises a CPU 401, and preferentially processes a job requiring real-time operation.

Reference numeral 116-2 denotes a ROM (Read Only Memory) which is a storage area for system start programs, printer engine control programs, character data, character code information, and the like.

Reference numeral 116-3 denotes a RAM (Random Access Memory) which is a storage area not limited in the use period, stores font data additionally registered by download, and allows loading and executing programs and data for various processes.

Reference numeral 116-4 denotes an external storage device such as a hard disk which is used as a work area for spooling a printing job accepted by a printing device (printer) and storing programs and various information files.

Reference numeral 116-5 denotes a display unit such as a liquid crystal display which displays the setting state of the printing device, the internal processing state of the current printing device, the error state, and the like.

Reference numeral 116-6 denotes an operation unit used to change or reset the settings of the printing device.

Reference numeral 116-7 denotes an engine interface (engine I/F) which exchanges commands and the like for actually controlling an engine.

Reference numeral 116-8 denotes a network interface (network I/F) through which a device is connected to a network.

Reference numeral 116-9 denotes an external interface (external I/F) which is connected to a host computer by way of a parallel (or serial) interface or the like; and 210, a system bus serving as a data passage between the respective constituent elements.

Figure 117:
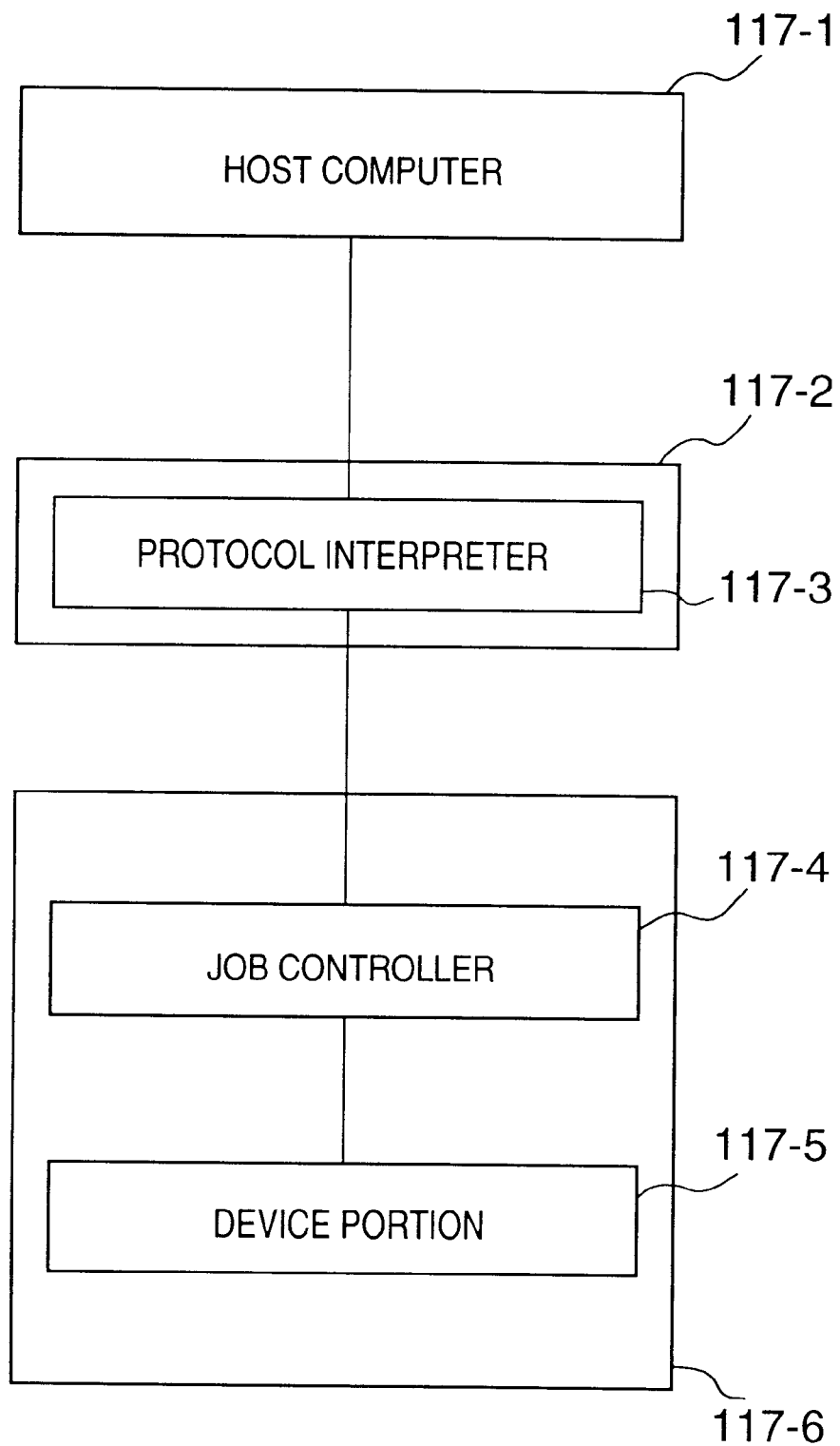
FIG. 117 is a block diagram showing a schematic software structure when processing is divided by a plurality of CPUs.

FIG. 117 is a block diagram showing a software structure corresponding to that of FIG. 109. In FIG. 117, processing requiring a small number of real-time operations and processing requiring a large number of real-time operations are separately processed. Instead of performing all the processes by a single CPU, they are separately performed by the host computer and satellite computer. This can reduce a load on the CPU to improve the performance of the whole system.

For example, processing in a protocol interpreter 117-3 in FIG. 117 has a small number of real-time operations, and is processed by the CPU of a PC 117-2 (e.g., PC 115-1 or 115-2 in FIG. 115A). An interpreted command is transmitted to a satellite computer 117-6 (PC 115-3 in FIG. 115A) by way of a PCI bus, and processed in real time by the DoEngine. The transmitted command undergoes job control (117-4) and assignment and release of a device (117-5) in the satellite computer.

As has been described above, according to the present invention, job processing is divided in units of pages, and devices are assigned to the processes divided in units of pages. The processing results of the devices for pages as processing units complement each other so as not to decrease the communication or data transfer rate by controlling the use of a plurality of buses. Meanwhile, data can be written and read in parallel.

A generated job is divided in units of pages, and devices for executing processes for the respective pages are assigned. Processes by the first and second CPUs are assigned in accordance with whether a large or small number of real-time operations are required in data processing. By controlling the use of a plurality of buses so as to perform processes in units of pages in parallel, the throughput of data processing can be increased.

Processes by the first and second CPUs are selectively used in accordance with whether a large or small number of real-time operations are required in data processing. This can reduce a load on the CPU to improve the performance of the whole system.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

The present invention is not limited to the above embodiments and various changes and modifications ca ben made within the spirit and scope of the present invention. Therefore, to apprise the public of the scope of the present invention, the following claims are made.

What is claimed is:

1. An information processing system for a composite appliance, comprising:

a first CPU for interpreting a protocol;

job generation means for generating a job based on a result interpreted by said first CPU;

a second CPU for processing the generated job;

means for dividing the generated job into elements based on processing by said second CPU;

device management means for managing assignment and release of devices for processing the elements based on processing by said second CPU; and means for controlling use of a plurality of buses to process input data and output data in parallel based on processing results of the devices.

2. The system according to claim 1, wherein data processing by said first CPU and data processing by said second CPU are divided and independently performed to synchronize the data processings, such that data-processing throughput is increased.

3. The system according to claim 1, wherein processes by said first and second CPUs are selectively used in accordance with whether a real-time operation is required in data processing, such that data-processing throughput is increased.

4. The system according to claim 1, wherein the devices include one or more of a memory, a document feeder, a marking engine, and a scanner.

5. The system according to claim 1, wherein the job includes one or more of an image communication job performed via a communication medium, a PDL printing job, and a copying job.

6. A control apparatus for input/output devices, comprising:

a memory bus connected with a memory;

a plurality of data buses connected with first input/output devices and second input/output devices;

a division unit, which divides a job into elements to be processed;

a device management unit, which manages assignment of a device to each element; and a bus control unit, which:
  switches connection of the plurality of data buses to the memory bus,
  controls data transfer between the plurality of data buses and the memory bus, and
  causes performance of a first process, in which at least the first input/output devices and the memory are used, and a second process, in which at least the second input/output devices are used, in parallel, corresponding to the elements.

7. The apparatus according to claim 6, wherein the first process is a process in which data inputted from a first input/output device is stored in the memory, and the second process is a process in which the data stored in the memory is outputted to second input/output device.

8. The apparatus according to claim 7, wherein the plurality of data buses includes a first data bus and a second data bus, and wherein said bus control means switches a connection to connect the first data bus and the memory bus for the first process, and to connect the second data bus and the memory bus for the second process.

9. The apparatus according to claim 6, wherein the first input/output devices includes a scanner, and wherein the second input/output devices includes a printer.

10. The apparatus according to claim 6, wherein the job includes at least an image communication job performed via a communication medium, a PDL printing job, and a copying job.

* * * * *

UNITED STATES PATENT AND TRADEMARK OFFICE
CERTIFICATE OF CORRECTION

PATENT NO. : 6,697,898 B1
DATED : February 24, 2004
INVENTOR(S) : Junichi Shishizuka et al.

It is certified that error appears in the above-identified patent and that said Letters Patent is hereby corrected as shown below:

Drawings,
SHEET 8, FIG. 8, "bl_comparater" should read -- bl_comparator--; and "b2_comparater" should read -- b2_comparator-.
SHEET 24, FIG. 24D, "PCI Profect" should read -- PCI Protect --.
SHEET 33, FIG. 33, "Initiater Sequencer" should read -- Initiator Sequencer --; "Initiater I/F" should read -- Initiator I/F --; and "Convertor" should read -- Converter --.
SHEET 60, FIG. 60, "CONTOROL" should read -- CONTROL --.

Column 2,
Line 10, "comprises" should read -- comprises: --.

Column 6,
Line 47, "satellite;" should read -- a satellite; --.

Column 9,
Line 4, "configuration" should read -- Configuration --; and
Line 62, "purpose 10" should read -- purpose IO --.

Column 11,
Line 52, "mBPWA L" should read -- mBPWA_L --;
Line 56, "mTPW L" should read -- mTPW_L --; and "mBPWA L" should read -- mBPWA_L --.

Column 13,
Line 56, "romaddr[23:2]" should read -- romAddr[23:2] -- and "(romCs L[3:0])." should read -- (romCs_L[3:0]). --.

Column 14,
Line 38, "b2_out data" should read -- b2_out_data --;
Line 40, "bl tag addr and b2 tag addr" should read -- bl_tag_addr and b2_tag_addr --;
Line 43, "b2 comparator 805," should read -- b2_comparator 805, --; and
Line 45, "b2_hit_miss L" should read -- b2_hit_miss_L --.

Column 15,
Line 1, "(bl hit)." should read -- (=bl hit). --; and
Line 13, "readout" should read -- read out --.

Column 16,
Line 26, "indetifiers." should read -- identifiers. --;
Line 28, "when" should read -- When --; and
Line 39, "performs" should read -- perform --.

UNITED STATES PATENT AND TRADEMARK OFFICE
CERTIFICATE OF CORRECTION

PATENT NO.      : 6,697,898 B1
DATED           : February 24, 2004
INVENTOR(S)     : Junichi Shishizuka et al.

It is certified that error appears in the above-identified patent and that said Letters Patent is hereby corrected as shown below:

Column 17,
Line 60, "items" should read -- item --.

Column 18,
Line 12, "Salve" should read -- Slave --;
Line 53, "Rdyoe_L" should read -- RdyOe_L --; and
Line 56, "RdyOe L" should read -- RdyOe_L --.

Column 19,
Line 8, "bWBurstGnt L" should read -- bWBurstGnt_L --;
Line 5, "Slave 3State..." should read -- Slave, 3 State... --;
Line 36, "bBurst L" should read -- bBurst_L --;
Line 44, "bRdy L." should read -- bRdy_L. --; and
Line 67, "it" should read -- It --.

Column 21,
Line 6, "gslv Bsy_L" should read -- gSlvBsy_L --;
Line 8, "gAack L," should read -- gAack_L, --;
Line 16, "salve" should read -- slave --;
Line 28, "Enablet):" should read -- Enable): --;
Line 33, "Sart):" should read -- Start): --;
Line 36, "indicates" should read -- indicate --; and
Line 56, "gTs L" should read -- gTs_L --.

Column 22,
Lines 19 and 58, "Enablet):" should read -- Enable): --; and
Line 47, "byLow." should read -- by Low. --.

Column 23,
Lines 17 and 34, "Enablet):" should read -- Enable): --;
Line 32, "gBstStp L." should read -- gBstStp_L. --;
Line 33, "BstStpoe_L" should read -- BstStpOe_L --;
Line 35, "gBstStp L" should read -- gBstStp_L --;
Line 41, "gReq L" should read -- gReq_L --;
Line 43, "ggnt L" should read -- gGnt_L --; and
Line 47, "gGnt L" should read -- gGnt_L --.

UNITED STATES PATENT AND TRADEMARK OFFICE
CERTIFICATE OF CORRECTION

PATENT NO. : 6,697,898 B1
DATED : February 24, 2004
INVENTOR(S) : Junichi Shishizuka et al.

It is certified that error appears in the above-identified patent and that said Letters Patent is hereby corrected as shown below:

Column 24,
Line 7, "ggnt_L" should read -- gGnt_L --;
Line 8, "gReq L." should read -- gReq_L. --;
Line 11, "gSlvBsy L" should read -- gSlvBsy_L --;
Line 14, "gTs L" should read -- gTs_L --;
Line 55, "bsnoop" should read -- bSnoop --; and
Line 56, "Stop L" should read -- Stop_L --.

Column 25,
Line 21, "cashable." should read -- cacheable --; and
Line 46, "Cashing" should read -- Caching --.

Column 26,
Line 2, "mybtes" should read -- Mbytes --; and "512 mybtes" should read -- 512 Mbytes --.

Column 29,
Line 9, "The bus" should read -- the bus --; and
Line 17, "cannot" should read -- can --.

Column 30,
Line 44, "Band" should read -- B and --.

Column 32,
Line 37, "has" should read -- have --; and
Line 42, "predetermine" should read -- predetermined --.

Column 33,
Line 2, "request" should read -- requests --.

Column 34,
Line 8, "DMAmaster" should read -- DMA master --.

Column 35,
Line 18, "byway" should read -- by way --; and
Line 47, "data" should read -- data. --.

Column 36,
Line 37, "daly" should read -- delay --.

UNITED STATES PATENT AND TRADEMARK OFFICE
CERTIFICATE OF CORRECTION

PATENT NO. : 6,697,898 B1
DATED : February 24, 2004
INVENTOR(S) : Junichi Shishizuka et al.

It is certified that error appears in the above-identified patent and that said Letters Patent is hereby corrected as shown below:

Column 40,
Line 14, "sccReg Ack L" should read -- sccRegAcK_L --;
Lines 20-25,

"
|               | 3       | 2       | 1      | 0     |
|---------------|---------|---------|--------|-------|
| sccRegbyteEn: |         |         |        |       |
| sccRegDataIn: | [31:24] | [25:16] | [15:8] | [7:0] |
| sccRegStart_L: IN |     |         |        |       |

"

should read

|               | 3       | 2       | 1      | 0     |
|---------------|---------|---------|--------|-------|
| sccRegbyteEn: | 3       | 2       | 1      | 0     |
| sccRegDataIn: | [31:24] | [25:16] | [15:8] | [7:0] |

--;

Line 27, "This is" should read -- sccRegStart_L: IN ¶ This is --;
Line 44, "sccRegStart L" should read -- sccRegStart_L --;
Line 46, "sccAck_signal" should read -- sccAck_L signal --;
Line 51, "High,"" should read -- "High", --;
Line 53, "Low,"" should read -- "Low", --;
Line 58, "sccRegAck L" should read -- sccRegAck_L --; and
Line 59, "sccRegAck L:" should read -- sccRegAck_L: --.

Column 41,
Line 21, "GBI sec" should read -- GBI_scc --.

Column 42,
Line 6, "is" should read -- are --; and
Line 16, "Yand" should read -- Y and --.

Column 43,
Line 51, "write-black" should read -- white-black --;
Lines 66-67, " 1 bit of fourth pixel → bit 60
1 bit of sixtieth pixel → bit 4 " should read -- 1 bit of fourth pixel → bit 60
.
.
1 bit of sixtieth pixel → bit 4 --.

Column 44,
Line 54, "19-gradation" should read -- 16-gradation --.

Column 45,
Line 23, "over-read" should read -- Over-read --;
Line 31, "intprc." should read -- intPrc. --;
Line 40, "whith" should read -- which --;
Line 42, "a" should read -- an --; and
Line 62, "I/Funit" should read -- I/F unit --.

UNITED STATES PATENT AND TRADEMARK OFFICE
CERTIFICATE OF CORRECTION

PATENT NO. : 6,697,898 B1
DATED : February 24, 2004
INVENTOR(S) : Junichi Shishizuka et al.

It is certified that error appears in the above-identified patent and that said Letters Patent is hereby corrected as shown below:

Column 46,
Line 12, "prcread" should read -- prcRead --;
Line 18, "I/Funit" should read -- I/F unit --;
Line 40, "prcRegDataln[31:0]" should read -- prcRegDataIn[31:0] --; and Lines 43-45, "

| prcRegbyteEn:   | 3      | 2       | 1      | 0     |
|-----------------|--------|---------|--------|-------|
| prcRegDataIn:   | [31:24]| [25:16] | [15:8] | [7:0] |
| prcRegStart L: IN |      |         |        |       |

" should read --

| prcRegbyteEn:   | 3      | 2       | 1      | 0     |
|-----------------|--------|---------|--------|-------|
| prcRegDataIn:   | [31:24]| [25:16] | [15:8] | [7:0] |

--;

Line 47, "This is" should read -- prcRegStart_L: IN ¶ This is --; and
Line 50, ""Low."" should read -- "Low". --.

Column 47,
Line 9, ""Low."" should read -- "Low". --; and
Line 39, "GBI prc" should read -- GBI_prc --.

Column 48,
Line 14, "neither" should read -- not --; and "generates" should read -- generate --;
Line 51, "block" should read -- block. --.

Column 49,
Line 54, "ifWrireFifoB" should read -- ifWriteFifoB --;
Line 66, "gReadFisoG" should read -- gReadFifoG --; and
Line 67, "gReadFisoB" should read -- gReadFifoB --.

Column 50,
Line 7, "ifDataIng[63:0]," should read -- ifDataInG[63:0], --;
Line 36, "16stages" should read -- 16 stages --; and
Line 61, "consist" should read -- consists --.

Column 51,
Line 4, "Indicate" should read -- Indicates --;
Line 32, "bclk" should read -- bClk --;
Line 43, "gReq L" should read -- gReg_L --;
Line 47, "ggnt_L" should read -- gGnt_L --; and
Line 54, "Gbus" should read -- G bus --.

UNITED STATES PATENT AND TRADEMARK OFFICE
CERTIFICATE OF CORRECTION

PATENT NO. : 6,697,898 B1
DATED : February 24, 2004
INVENTOR(S) : Junichi Shishizuka et al.

It is certified that error appears in the above-identified patent and that said Letters Patent is hereby corrected as shown below:

Column 52,
Line 8, "reqeust" should read -- request --;
Lines 35 and 36, "Gbus" should read -- G bus --;
Line 56, "bMBurst8n)" should read -- bMBurst8(N) --;
Line 60, "acMAddr(N)" should read -- a cMAddr(N) --;
Line 66, "chaged" should read -- changed --; and
Line 67, "bWrireFifo" should read -- bWriteFifo --.

Column 53,
Line 2, "cMrtry(N)" should read -- cMRtry(N) --;
Line 32, "bRretry" should read -- bRetry --;
Line 59, "bretry L" should read -- bRetry_L --.

Column 54,
Line 4, "retryevenwhen" should read -- retry even when --;
Line 14, "bStart_signal." should read -- bStart L signal. --;
Line 21, "bRdyOut L" should read -- bRdyOut_L --; and "bBurstAckOut L" should read --bBurstAckOut_L --;
Line 49, "([B" should read -- [B --; and "Access]" should read -- Access)] --;
Line 58, "regstart_L," should read -- regStart_L, --; and
Line 59, "regwr L" should read -- regWr_L --.

Column 55,
Line 10, "bRdyout_L." should read -- bRdyOut_L. --;
Line 21, ""L"" should read -- "_L" --;
Line 24, ""_if"" should read -- "if" --;
Line 25, "ifRst0 L" should read -- ifRst0_L --; and "ifRstl L" should read -- ifRstl_L --;
Line 38, "ifWrireB" should read -- ifWriteB --; and
Line 58, "ifRead" should read -- ¶ ifRead --.

Column 56,
Line 19, "ifRegStart L" should read -- ifRegStart_L --;
Line 43, "ifRegRdNotWr" should read -- ¶ ifRegRdNotWr --;
Line 44, "bWr L" should read -- bWr_L --; and
Line 58, "ifRegStart L" should read -- ifRegStart_L --.

UNITED STATES PATENT AND TRADEMARK OFFICE
CERTIFICATE OF CORRECTION

PATENT NO. : 6,697,898 B1
DATED : February 24, 2004
INVENTOR(S) : Junichi Shishizuka et al.

It is certified that error appears in the above-identified patent and that said Letters Patent is hereby corrected as shown below:

Column 57,
Table 10, "

TABLE 10

| Mode signal | modeMem | UseChain Table | Reverse Mode |
|---|---|---|---|
| Chain table DMA | 1 | 1 | 0 |
| Chain table DMA (Reverse direction) | | 1 | |
| Continuous address DMA | 1 | 0 | 0 |
| Continuous address DMA (Reverse Direction) | | | 1 |
| To I/O DMA | 0 | 0 | always 0 |

"

should read --

TABLE 10

| Mode signal | modeMem | UseChain Table | Reverse Mode |
|---|---|---|---|
| Chain table DMA | 1 | 1 | 0 |
| Chain table DMA (Reverse direction) | | | 1 |
| Continuous address DMA | 1 | 0 | 0 |
| Continuous address DMA (Reverse Direction) | | | 1 |
| To I/O DMA | 0 | 0 | always 0 |

--.

Column 57,
Line 39, "blocks" should read -- block --; and
Line 61, "endDMa)" should read -- endDMA) --.

Column 58,
Line 49, "store." should read -- store --; and
Line 4, "thorough" should read -- through --.

Column 60,
Line 8, "set" should read -- set as --;
Line 25, "gVlaid" should read -- gValid --;
Line 27, "gvalid" should read -- gValid --;
Line 28, "g4Notl6Req '1'." should read -- g4Notl6Reg = '1'. --; and "gvalid" should read --gValid --.

Column 61,
Line 29, "level0" should read -- level 0 --;
Line 37, "below: pmState" should read -- below: ¶ pmState --;
Line 38, "level0" should read -- level 0 --; and "stopped)pmState" should read
-- stopped)
¶ pmState --; and
Line 39, "leve10" should read -- level 0 --.

Column 62,
Line 32, "though" should read -- through --; and
Line 61, "Gbus/B bus" should read -- G bus/B bus --.

UNITED STATES PATENT AND TRADEMARK OFFICE
CERTIFICATE OF CORRECTION

PATENT NO. : 6,697,898 B1
DATED : February 24, 2004
INVENTOR(S) : Junichi Shishizuka et al.

It is certified that error appears in the above-identified patent and that said Letters Patent is hereby corrected as shown below:

Column 63,
Line 9, ""0."" should read -- "0". --; and
Line 40, "perform" should read -- performs --.

Column 66,
Line 21, "output" should read -- outputs --;
Line 56, "GBI SCC" should read -- GBI_SCC --; and
Line 59, "GBI PRC," should read -- GBI_PRC, --.

Column 67,
Line 51, "mode." should read -- modes. --.

Column 68,
Line 1, "combinations" should read -- combination --; and
Line 40, "FIFO SCC" should read -- FIFO_SCC --.

Column 69,
Line 17, "the. step" should read -- the step --; and
Line 59, "MCbus" should read -- MC bus --.

Column 76,
Line 4, "ca ben" should read -- can be --.

Column 77,
Line 2, "to" should read -- to the --.

Signed and Sealed this

Ninth Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,697,898 B1
DATED : February 24, 2004
INVENTOR(S) : Junichi Shishizuka et al.

It is certified that error appears in the above-identified patent and that said Letters Patent is hereby corrected as shown below:

Drawings,
SHEET 8, FIG. 8, "bl_comparater" should read -- bl_comparator--; and "b2_comparater" should read -- b2_comparator-.
SHEET 24, FIG. 24D, "PCI Profect" should read -- PCI Protect --.
SHEET 33, FIG. 33, "Initiater Sequencer" should read -- Initiator Sequencer --; "Initiater I/F" should read -- Initiator I/F --; and "Convertor" should read -- Converter --.
SHEET 60, FIG. 60, "CONTOROL" should read -- CONTROL --.

Column 2,
Line 10, "comprises" should read -- comprises: --.

Column 6,
Line 47, "satellite;" should read -- a satellite; --.

Column 9,
Line 4, "configuration" should read -- Configuration --; and
Line 62, "purpose 10" should read -- purpose IO --.

Column 11,
Line 52, "mBPWA L" should read -- mBPWA_L --;
Line 56, "mTPW L" should read -- mTPW_L --; and "mBPWA L" should read -- mBPWA_L --.

Column 13,
Line 56, "romaddr[23:2]" should read -- romAddr[23:2] -- and "(romCs L[3:0])." should read -- (romCs_L[3:0]). --.

Column 14,
Line 38, "b2_out data" should read -- b2_out_data --;
Line 40, "bl tag addr and b2 tag addr" should read -- bl_tag_addr and b2_tag_addr --;
Line 43, "b2 comparator 805," should read -- b2_comparator 805, --; and
Line 45, "b2_hit_miss L" should read -- b2_hit_miss_L --.

Column 15,
Line 1, "(bl hit)." should read -- (=bl hit). --; and
Line 13, "readout" should read -- read out --.

Column 16,
Line 26, "indetifiers." should read -- identifiers. --;
Line 28, "when" should read -- When --; and
Line 39, "performs" should read -- perform --.

UNITED STATES PATENT AND TRADEMARK OFFICE
CERTIFICATE OF CORRECTION

PATENT NO. : 6,697,898 B1
DATED : February 24, 2004
INVENTOR(S) : Junichi Shishizuka et al.

It is certified that error appears in the above-identified patent and that said Letters Patent is hereby corrected as shown below:

Column 17,
Line 60, "items" should read -- item --.

Column 18,
Line 12, "Salve" should read -- Slave --;
Line 53, "Rdyoe_L" should read -- RdyOe_L --; and
Line 56, "RdyOe L" should read -- RdyOe_L --.

Column 19,
Line 8, "bWBurstGnt L" should read -- bWBurstGnt_L --;
Line 5, "Slave 3State…" should read -- Slave, 3 State... --;
Line 36, "bBurst L" should read -- bBurst_L --;
Line 44, "bRdy L." should read -- bRdy_L. --; and
Line 67, "it" should read -- It --.

Column 21,
Line 6, "gslv Bsy_L" should read -- gSlvBsy_L --;
Line 8, "gAack L," should read -- gAack_L, --;
Line 16, "salve" should read -- slave --;
Line 28, "Enablet):" should read -- Enable): --;
Line 33, "Sart):" should read -- Start): --;
Line 36, "indicates" should read -- indicate --; and
Line 56, "gTs L" should read -- gTs_L --.

Column 22,
Lines 19 and 58, "Enablet):" should read -- Enable): --; and
Line 47, "byLow." should read -- by Low. --.

Column 23,
Lines 17 and 34, "Enablet):" should read -- Enable): --;
Line 32, "gBstStp L." should read -- gBstStp_L. --;
Line 33, "BstStpoe_L" should read -- BstStpOe_L --;
Line 35, "gBstStp L" should read -- gBstStp_L --;
Line 41, "gReq L" should read -- gReq_L --;
Line 43, "ggnt L" should read -- gGnt_L --; and
Line 47, "gGnt L" should read -- gGnt_L --.

UNITED STATES PATENT AND TRADEMARK OFFICE
CERTIFICATE OF CORRECTION

PATENT NO. : 6,697,898 B1
DATED : February 24, 2004
INVENTOR(S) : Junichi Shishizuka et al.

It is certified that error appears in the above-identified patent and that said Letters Patent is hereby corrected as shown below:

Column 24,
Line 7, "ggnt_L" should read -- gGnt_L --;
Line 8, "gReq L." should read -- gReq_L. --;
Line 11, "gSlvBsy L" should read -- gSlvBsy_L --;
Line 14, "gTs L" should read -- gTs_L --;
Line 55, "bsnoop" should read -- bSnoop --; and
Line 56, "Stop L" should read -- Stop_L --.

Column 25,
Line 21, "cashable." should read -- cacheable --; and
Line 46, "Cashing" should read -- Caching --.

Column 26,
Line 2, "mybtes" should read -- Mbytes --; and "512 mybtes" should read -- 512 Mbytes --.

Column 29,
Line 9, "The bus" should read -- the bus --; and
Line 17, "cannot" should read -- can --.

Column 30,
Line 44, "Band" should read -- B and --.

Column 32,
Line 37, "has" should read -- have --; and
Line 42, "predetermine" should read -- predetermined --.

Column 33,
Line 2, "request" should read -- requests --.

Column 34,
Line 8, "DMAmaster" should read -- DMA master --.

Column 35,
Line 18, "byway" should read -- by way --; and
Line 47, "data" should read -- data. --.

Column 36,
Line 37, "daly" should read -- delay --.

UNITED STATES PATENT AND TRADEMARK OFFICE
CERTIFICATE OF CORRECTION

PATENT NO. : 6,697,898 B1
DATED : February 24, 2004
INVENTOR(S) : Junichi Shishizuka et al.

It is certified that error appears in the above-identified patent and that said Letters Patent is hereby corrected as shown below:

Column 40,
Line 14, "sccReg Ack L" should read -- sccRegAcK_L --;
Lines 20-25,

|                  | 3      | 2       | 1      | 0     |
|------------------|--------|---------|--------|-------|
| sccRegbyteEn:    |        |         |        |       |
| sccRegDataIn:    | [31:24]| [25:16] | [15:8] | [7:0] |
| sccRegStart_L: IN|        |         |        |       | should read

|                  |        |         |        |       |
|------------------|--------|---------|--------|-------|
| sccRegbyteEn:    | 3      | 2       | 1      | 0     |
| sccRegDataIn:    | [31:24]| [25:16] | [15:8] | [7:0] |

Line 27, "This is" should read -- sccRegStart_L: IN ¶ This is --;
Line 44, "sccRegStart L" should read -- sccRegStart_L --;
Line 46, "sccAck_signal" should read -- sccAck_L signal --;
Line 51, ""High,""" should read -- "High", --;
Line 53, ""Low,""" should read -- "Low", --;
Line 58, "sccRegAck L" should read -- sccRegAck_L --; and
Line 59, "sccRegAck L:" should read -- sccRegAck_L: --.

Column 41,
Line 21, "GBI sec" should read -- GBI_scc --.

Column 42,
Line 6, "is" should read -- are --; and
Line 16, "Yand" should read -- Y and --.

Column 43,
Line 51, "write-black" should read -- white-black --;
Lines 66-67, " 1 bit of fourth pixel → bit 60 / 1 bit of sixtieth pixel → bit 4 " should read -- 1 bit of fourth pixel → bit 60 . 1 bit of sixtieth pixel → bit 4 --.

Column 44,
Line 54, "19-gradation" should read -- 16-gradation --.

Column 45,
Line 23, "over-read" should read -- Over-read --;
Line 31, "intprc." should read -- intPrc. --;
Line 40, "whith" should read -- which --;
Line 42, "a" should read -- an --; and
Line 62, "I/Funit" should read -- I/F unit --.

UNITED STATES PATENT AND TRADEMARK OFFICE
CERTIFICATE OF CORRECTION

PATENT NO.     : 6,697,898 B1
DATED          : February 24, 2004
INVENTOR(S)    : Junichi Shishizuka et al.

It is certified that error appears in the above-identified patent and that said Letters Patent is hereby corrected as shown below:

Column 46,
Line 12, "prcread" should read -- prcRead --;
Line 18, "I/Funit" should read -- I/F unit --;
Line 40, "prcRegDataln[31:0]" should read -- prcRegDataIn[31:0] --; and Lines 43-45,

| prcRegbyteEn: | 3 | 2 | 1 | 0 |
|---|---|---|---|---|
| prcRegDataIn: | [31:24] | [25:16] | [15:8] | [7:0] |
| prcRegStart L: IN | | | | | should read

| prcRegbyteEn: | 3 | 2 | 1 | 0 |
|---|---|---|---|---|
| prcRegDataIn: | [31:24] | [25:16] | [15:8] | [7:0] |

--;

Line 47, "This is" should read -- prcRegStart_L: IN ¶ This is --; and
Line 50, ""Low."" should read -- "Low". --.

Column 47,
Line 9, ""Low."" should read -- "Low". --; and
Line 39, "GBI prc" should read -- GBI_prc --.

Column 48,
Line 14, "neither" should read -- not --; and "generates" should read -- generate --;
Line 51, "block" should read -- block. --.

Column 49,
Line 54, "ifWrireFifoB" should read -- ifWriteFifoB --;
Line 66, "gReadFisoG" should read -- gReadFifoG --; and
Line 67, "gReadFisoB" should read -- gReadFifoB --.

Column 50,
Line 7, "ifDataIng[63:0]," should read -- ifDataInG[63:0], --;
Line 36, "16stages" should read -- 16 stages --; and
Line 61, "consist" should read -- consists --.

Column 51,
Line 4, "Indicate" should read -- Indicates --;
Line 32, "bclk" should read -- bClk --;
Line 43, "gReq L" should read -- gReg_L --;
Line 47, "ggnt_L" should read -- gGnt_L --; and
Line 54, "Gbus" should read -- G bus --.

UNITED STATES PATENT AND TRADEMARK OFFICE
CERTIFICATE OF CORRECTION

PATENT NO. : 6,697,898 B1
DATED : February 24, 2004
INVENTOR(S) : Junichi Shishizuka et al.

It is certified that error appears in the above-identified patent and that said Letters Patent is hereby corrected as shown below:

Column 52,
Line 8, "request" should read -- request --;
Lines 35 and 36, "Gbus" should read -- G bus --;
Line 56, "bMBurst8n)" should read -- bMBurst8(N) --;
Line 60, "acMAddr(N)" should read -- a cMAddr(N) --;
Line 66, "chaged" should read -- changed --; and
Line 67, "bWrireFifo" should read -- bWriteFifo --.

Column 53,
Line 2, "cMrtry(N)" should read -- cMRtry(N) --;
Line 32, "bRretry" should read -- bRetry --;
Line 59, "bretry L" should read -- bRetry_L --.

Column 54,
Line 4, "retryevenwhen" should read -- retry even when --;
Line 14, "bStart_signal." should read -- bStart_L signal. --;
Line 21, "bRdyOut L" should read -- bRdyOut_L --; and "bBurstAckOut L" should read -- bBurstAckOut_L --;
Line 49, "([B" should read -- [B --; and "Access]" should read -- Access)] --;
Line 58, "regstart_L," should read -- regStart_L, --; and
Line 59, "regwr L" should read -- regWr_L --.

Column 55,
Line 10, "bRdyout_L." should read -- bRdyOut_L. --;
Line 21, ""L"" should read -- "_L" --;
Line 24, ""_if"" should read -- "if" --;
Line 25, "ifRst0 L" should read -- ifRst0_L --; and "ifRstl L" should read -- ifRstl_L --;
Line 38, "ifWrireB" should read -- ifWriteB --; and
Line 58, "ifRead" should read -- ¶ ifRead --.

Column 56,
Line 19, "ifRegStart L" should read -- ifRegStart_L --;
Line 43, "ifRegRdNotWr" should read -- ¶ ifRegRdNotWr --;
Line 44, "bWr L" should read -- bWr_L --; and
Line 58, "ifRegStart L" should read -- ifRegStart_L --.

UNITED STATES PATENT AND TRADEMARK OFFICE
CERTIFICATE OF CORRECTION

PATENT NO. : 6,697,898 B1
DATED : February 24, 2004
INVENTOR(S) : Junichi Shishizuka et al.

It is certified that error appears in the above-identified patent and that said Letters Patent is hereby corrected as shown below:

Column 57,
Table 10, "

TABLE 10

| Mode signal | modeMem | UseChain Table | Reverse Mode |
|---|---|---|---|
| Chain table DMA | 1 | 1 | 0 |
| Chain table DMA (Reverse direction) | | 1 | |
| Continuous address DMA | 1 | 0 | 0 |
| Continuous address DMA (Reverse Direction) | | | 1 |
| To I/O DMA | 0 | 0 | always 0 |

"

should read --

TABLE 10

| Mode signal | modeMem | UseChain Table | Reverse Mode |
|---|---|---|---|
| Chain table DMA | 1 | 1 | 0 |
| Chain table DMA (Reverse direction) | | | 1 |
| Continuous address DMA | 1 | 0 | 0 |
| Continuous address DMA (Reverse Direction) | | | 1 |
| To I/O DMA | 0 | 0 | always 0 |

--.

Column 57,
Line 39, "blocks" should read -- block --; and
Line 61, "endDMa)" should read -- endDMA) --.

Column 58,
Line 49, "store." should read -- store --; and
Line 4, "thorough" should read -- through --.

Column 60,
Line 8, "set" should read -- set as --;
Line 25, "gVlaid" should read -- gValid --;
Line 27, "gvalid" should read -- gValid --;
Line 28, "g4Notl6Req '1'." should read -- g4Notl6Reg = '1'. --; and "gvalid" should read -- gValid --.

Column 61,
Line 29, "level0" should read -- level 0 --;
Line 37, "below: pmState" should read -- below: ¶ pmState --;
Line 38, "level0" should read -- level 0 --; and "stopped)pmState" should read -- stopped)
¶ pmState --; and
Line 39, "level0" should read -- level 0 --.

Column 62,
Line 32, "though" should read -- through --; and
Line 61, "Gbus/B bus" should read -- G bus/B bus --.

UNITED STATES PATENT AND TRADEMARK OFFICE
CERTIFICATE OF CORRECTION

PATENT NO.    : 6,697,898 B1
DATED         : February 24, 2004
INVENTOR(S)   : Junichi Shishizuka et al.

It is certified that error appears in the above-identified patent and that said Letters Patent is hereby corrected as shown below:

Column 63,
Line 9, ""0."" should read -- "0". --; and
Line 40, "perform" should read -- performs --.

Column 66,
Line 21, "output" should read -- outputs --;
Line 56, "GBI SCC" should read -- GBI_SCC --; and
Line 59, "GBI PRC," should read -- GBI_PRC, --.

Column 67,
Line 51, "mode." should read -- modes. --.

Column 68,
Line 1, "combinations" should read -- combination --; and
Line 40, "FIFO SCC" should read -- FIFO_SCC --.

Column 69,
Line 17, "the. step" should read -- the step --; and
Line 59, "MCbus" should read -- MC bus --.

Column 76,
Line 4, "ca ben" should read -- can be --.

Column 77,
Line 2, "to" should read -- to the --.

This certificate supersedes Certificate of Correction issued November 9, 2004.

Signed and Sealed this

Thirty-first Day of January, 2006

JON W. DUDAS
*Director of the United States Patent and Trademark Office*